US012619452B2

(12) United States Patent
Karashchuk et al.

(10) Patent No.:  US 12,619,452 B2
(45) **Date of Patent:      \*May 5, 2026**

(54) INTELLIGENT AUTOMATED ASSISTANT IN A MESSAGING ENVIRONMENT

(71) Applicant: Apple Inc., Cupertino, CA (US)

(72) Inventors: Petr Karashchuk, Berkeley, CA (US); Tomas A. Vega Galvez, Sunnyvale, CA (US); Thomas R. Gruber, Seattle, WA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,509

(22) Filed: Jul. 20, 2023

(65) Prior Publication Data

US 2023/0359475 A1      Nov. 9, 2023

Related U.S. Application Data

(63) Continuation of application No. 17/949,136, filed on Sep. 20, 2022, now Pat. No. 11,809,886, which is a (Continued)

(51) Int. Cl.
  *G06F 3/0482*      (2013.01)
  *G06F 3/04842*     (2022.01)
      (Continued)

(52) U.S. Cl.
  CPC ............ *G06F 9/453* (2018.02); *G06F 3/0482* (2013.01); *G06F 3/04842* (2013.01);
      (Continued)

(58) Field of Classification Search
  CPC .... G06F 9/453; G06F 3/0482; G06F 3/04842; G06F 3/04883; G06F 3/04886;
      (Continued)

(56) References Cited

U.S. PATENT DOCUMENTS 5,506,951 A    4/1996 Ishikawa
8,345,665 B2   1/2013 Vieri et al.
      (Continued)

FOREIGN PATENT DOCUMENTS

AU    2014100581 B4    9/2014
AU    2015203483 A1    7/2015
      (Continued)

OTHER PUBLICATIONS

Corrected Notice of Allowance received for U.S. Appl. No. 17/949,136, mailed on Aug. 31, 2023, 3 pages.

(Continued)

*Primary Examiner* — Jennifer N Welch
*Assistant Examiner* — Amy P Hoang
(74) *Attorney, Agent, or Firm* — YHE Law LLP

(57)                ABSTRACT

Systems and processes for operating an intelligent automated assistant in a messaging environment are provided. In one example process, a graphical user interface (GUI) having a plurality of previous messages between a user of the electronic device and the digital assistant can be displayed on a display. The plurality of previous messages can be presented in a conversational view. User input can be received and in response to receiving the user input, the user input can be displayed as a first message in the GUI. A contextual state of the electronic device corresponding to the displayed user input can be stored. The process can cause an action to be performed in accordance with a user intent derived from the user input. A response based on the action can be displayed as a second message in the GUI.

57 Claims, 41 Drawing Sheets

Related U.S. Application Data continuation of application No. 15/931,384, filed on May 13, 2020, now Pat. No. 11,526,368, which is a continuation of application No. 15/151,191, filed on May 10, 2016, now Pat. No. 10,691,473.

(60) Provisional application No. 62/252,311, filed on Nov. 6, 2015.

(51) Int. Cl.

| | |
|---|---|
| *G06F 3/04883* | (2022.01) |
| *G06F 3/04886* | (2022.01) |
| *G06F 9/451* | (2018.01) |
| *G06F 40/166* | (2020.01) |
| *G06Q 10/107* | (2023.01) |
| *G06Q 10/109* | (2023.01) |
| *H04L 51/02* | (2022.01) |
| *H04L 51/046* | (2022.01) |
| *H04L 51/216* | (2022.01) |
| *H04L 67/52* | (2022.01) |
| *H04W 4/12* | (2009.01) |
| *G06F 3/16* | (2006.01) |
| *G06Q 50/00* | (2012.01) |
| *G10L 15/22* | (2006.01) |
| *G10L 15/26* | (2006.01) |
| *H04L 51/10* | (2022.01) |

(52) U.S. Cl.
CPC ...... *G06F 3/04883* (2013.01); *G06F 3/04886* (2013.01); *G06F 40/166* (2020.01); *G06Q 10/107* (2013.01); *G06Q 10/109* (2013.01); *H04L 51/02* (2013.01); *H04L 51/046* (2013.01); *H04L 51/216* (2022.05); *H04L 67/52* (2022.05); *H04W 4/12* (2013.01); *G06F 3/167* (2013.01); *G06F 2203/04105* (2013.01); *G06Q 50/01* (2013.01); *G10L 2015/223* (2013.01); *G10L 15/26* (2013.01); *H04L 51/10* (2013.01)

(58) Field of Classification Search
CPC .................. G06F 40/166; G06F 3/167; G06F 2203/04105; G06Q 10/107; G06Q 10/109; G06Q 50/01; H04L 51/02; H04L 51/046; H04L 51/216; H04L 67/52; H04L 51/10; H04W 4/12; G10L 15/26; G10L 2015/223
See application file for complete search history.

(56) References Cited

U.S. PATENT DOCUMENTS

| | | | |
|---|---|---|---|
| 8,346,563 | B1 | 1/2013 | Hjelm et al. |
| 8,346,757 | B1 | 1/2013 | Lamping et al. |
| 8,352,183 | B2 | 1/2013 | Thota et al. |
| 8,352,268 | B2 | 1/2013 | Naik et al. |
| 8,352,272 | B2 | 1/2013 | Rogers et al. |
| 8,355,919 | B2 | 1/2013 | Silverman et al. |
| 8,359,234 | B2 | 1/2013 | Vieri |
| 8,370,145 | B2 | 2/2013 | Endo et al. |
| 8,370,158 | B2 | 2/2013 | Gazdzinski |
| 8,371,503 | B2 | 2/2013 | Gazdzinski |
| 8,374,871 | B2 | 2/2013 | Ehsani et al. |
| 8,375,320 | B2 | 2/2013 | Kotler et al. |
| 8,380,504 | B1 | 2/2013 | Peden et al. |
| 8,380,507 | B2 | 2/2013 | Herman et al. |
| 8,381,107 | B2 | 2/2013 | Rottler et al. |
| 8,381,135 | B2 | 2/2013 | Hotelling et al. |
| 8,386,079 | B1 | 2/2013 | Kohler et al. |
| 8,386,485 | B2 | 2/2013 | Kerschberg et al. |
| 8,386,926 | B1 | 2/2013 | Matsuoka et al. |
| 8,391,844 | B2 | 3/2013 | Novick et al. |
| 8,392,717 | B2 | 3/2013 | Chai et al. |
| 8,396,295 | B2 | 3/2013 | Gao et al. |
| 8,396,714 | B2 | 3/2013 | Rogers et al. |
| 8,396,715 | B2 | 3/2013 | Odell et al. |
| 8,401,163 | B1 | 3/2013 | Kirchhoff et al. |
| 8,406,745 | B1 | 3/2013 | Upadhyay et al. |
| 8,407,239 | B2 | 3/2013 | Dean et al. |
| 8,418,086 | B2 | 4/2013 | Weber et al. |
| 8,423,288 | B2 | 4/2013 | Stahl et al. |
| 8,428,758 | B2 | 4/2013 | Naik et al. |
| 8,433,572 | B2 | 4/2013 | Caskey et al. |
| 8,433,778 | B1 | 4/2013 | Shreesha et al. |
| 8,434,133 | B2 | 4/2013 | Kulkarni et al. |
| 8,442,821 | B1 | 5/2013 | Vanhoucke |
| 8,447,612 | B2 | 5/2013 | Gazdzinski |
| 8,452,597 | B2 | 5/2013 | Bringert et al. |
| 8,452,602 | B1 | 5/2013 | Bringert et al. |
| 8,453,058 | B1 | 5/2013 | Coccaro et al. |
| 8,457,959 | B2 | 6/2013 | Kaiser |
| 8,458,115 | B2 | 6/2013 | Cai et al. |
| 8,458,278 | B2 | 6/2013 | Christie et al. |
| 8,463,592 | B2 | 6/2013 | Lu et al. |
| 8,464,150 | B2 | 6/2013 | Davidson et al. |
| 8,468,502 | B2 | 6/2013 | Lui et al. |
| 8,473,289 | B2 | 6/2013 | Jitkoff et al. |
| 8,473,485 | B2 | 6/2013 | Wong et al. |
| 8,477,323 | B2 | 7/2013 | Low et al. |
| 8,478,816 | B2 | 7/2013 | Parks et al. |
| 8,479,122 | B2 | 7/2013 | Hotelling et al. |
| 8,484,027 | B1 | 7/2013 | Murphy |
| 8,489,599 | B2 | 7/2013 | Bellotti |
| 8,498,670 | B2 | 7/2013 | Cha et al. |
| 8,498,857 | B2 | 7/2013 | Kopparapu et al. |
| 8,514,197 | B2 | 8/2013 | Shahraray et al. |
| 8,515,736 | B1 | 8/2013 | Duta |
| 8,515,750 | B1 | 8/2013 | Lei et al. |
| 8,521,513 | B2 | 8/2013 | Millett et al. |
| 8,521,526 | B1 | 8/2013 | Lloyd et al. |
| 8,521,531 | B1 | 8/2013 | Kim |
| 8,521,533 | B1 | 8/2013 | Ostermann et al. |
| 8,527,276 | B1 | 9/2013 | Senior et al. |
| 8,533,266 | B2 | 9/2013 | Koulomzin et al. |
| 8,537,033 | B2 | 9/2013 | Gueziec |
| 8,539,342 | B1 | 9/2013 | Lewis |
| 8,543,375 | B2 | 9/2013 | Hong |
| 8,543,397 | B1 | 9/2013 | Nguyen |
| 8,543,398 | B1 | 9/2013 | Strope et al. |
| 8,560,229 | B1 | 10/2013 | Park et al. |
| 8,560,366 | B2 | 10/2013 | Mikurak |
| 8,571,528 | B1 | 10/2013 | Channakeshava |
| 8,571,851 | B1 | 10/2013 | Tickner et al. |
| 8,577,683 | B2 | 11/2013 | Dewitt |
| 8,583,416 | B2 | 11/2013 | Huang et al. |
| 8,583,511 | B2 | 11/2013 | Hendrickson |
| 8,583,638 | B2 | 11/2013 | Donelli |
| 8,589,156 | B2 | 11/2013 | Burke et al. |
| 8,589,161 | B2 | 11/2013 | Kennewick et al. |
| 8,589,374 | B2 | 11/2013 | Chaudhari |
| 8,589,869 | B2 | 11/2013 | Wolfram |
| 8,589,911 | B1 | 11/2013 | Sharkey et al. |
| 8,595,004 | B2 | 11/2013 | Koshinaka |
| 8,595,642 | B1 | 11/2013 | Lagassey |
| 8,600,743 | B2 | 12/2013 | Lindahl et al. |
| 8,600,746 | B1 | 12/2013 | Lei et al. |
| 8,600,930 | B2 | 12/2013 | Sata et al. |
| 8,606,090 | B2 | 12/2013 | Eyer |
| 8,606,568 | B1 | 12/2013 | Tickner et al. |
| 8,606,576 | B1 | 12/2013 | Barr et al. |
| 8,606,577 | B1 | 12/2013 | Stewart et al. |
| 8,615,221 | B1 | 12/2013 | Cosenza et al. |
| 8,620,659 | B2 | 12/2013 | Di Cristo et al. |
| 8,620,662 | B2 | 12/2013 | Bellegarda |
| 8,626,681 | B1 | 1/2014 | Jurca et al. |
| 8,630,841 | B2 | 1/2014 | Van Caldwell et al. |
| 8,635,073 | B2 | 1/2014 | Chang |
| 8,638,363 | B2 | 1/2014 | King et al. |
| 8,639,516 | B2 | 1/2014 | Lindahl et al. |
| 8,645,128 | B1 | 2/2014 | Agiomyrgiannakis |

(56)       References Cited

U.S. PATENT DOCUMENTS

| | | | |
|---|---|---|---|
| 8,645,137 B2 | 2/2014 | Bellegarda et al. |
| 8,645,138 B1 | 2/2014 | Weinstein et al. |
| 8,654,936 B1 | 2/2014 | Eslambolchi et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,924 B2 | 2/2014 | Hoch et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,273 B1 | 3/2014 | Fujisaki |
| 8,676,583 B2 | 3/2014 | Gupta et al. |
| 8,676,904 B2 | 3/2014 | Lindahl |
| 8,677,377 B2 | 3/2014 | Cheyer et al. |
| 8,681,950 B2 | 3/2014 | Vlack et al. |
| 8,682,667 B2 | 3/2014 | Haughay |
| 8,687,777 B1 | 4/2014 | Lavian et al. |
| 8,688,446 B2 | 4/2014 | Yanagihara |
| 8,688,453 B1 | 4/2014 | Joshi et al. |
| 8,689,135 B2 | 4/2014 | Portele et al. |
| 8,694,322 B2 | 4/2014 | Snitkovskiy et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,707,195 B2 | 4/2014 | Fleizach et al. |
| 8,712,778 B1 | 4/2014 | Thenthiruperai |
| 8,713,119 B2 | 4/2014 | Lindahl et al. |
| 8,713,418 B2 | 4/2014 | King et al. |
| 8,719,006 B2 | 5/2014 | Bellegarda |
| 8,719,014 B2 | 5/2014 | Wagner |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Davis et al. |
| 8,744,852 B1 | 6/2014 | Seymour et al. |
| 8,751,971 B2 | 6/2014 | Fleizach et al. |
| 8,760,537 B2 | 6/2014 | Johnson et al. |
| 8,762,145 B2 | 6/2014 | Ouchi et al. |
| 8,762,156 B2 | 6/2014 | Chen |
| 8,762,469 B2 | 6/2014 | Lindahl |
| 8,768,693 B2 | 7/2014 | Somekh et al. |
| 8,768,702 B2 | 7/2014 | Mason et al. |
| 8,775,154 B2 | 7/2014 | Clinchant et al. |
| 8,775,177 B1 | 7/2014 | Heigold et al. |
| 8,775,341 B1 | 7/2014 | Commons |
| 8,775,931 B2 | 7/2014 | Fux et al. |
| 8,781,456 B2 | 7/2014 | Prociw |
| 8,781,841 B1 | 7/2014 | Wang |
| 8,793,301 B2 | 7/2014 | Wegenkittl et al. |
| 8,798,255 B2 | 8/2014 | Lubowich et al. |
| 8,798,995 B1 | 8/2014 | Edara |
| 8,799,000 B2 | 8/2014 | Guzzoni et al. |
| 8,805,684 B1 | 8/2014 | Aleksic et al. |
| 8,805,690 B1 | 8/2014 | Lebeau et al. |
| 8,812,299 B1 | 8/2014 | Su |
| 8,812,302 B2 | 8/2014 | Xiao et al. |
| 8,812,321 B2 | 8/2014 | Gilbert et al. |
| 8,823,507 B1 | 9/2014 | Touloumtzis |
| 8,823,793 B2 | 9/2014 | Clayton et al. |
| 8,825,474 B1 | 9/2014 | Zhai et al. |
| 8,831,947 B2 | 9/2014 | Wasserblat et al. |
| 8,831,949 B1 | 9/2014 | Smith et al. |
| 8,838,457 B2 | 9/2014 | Cerra et al. |
| 8,843,369 B1 | 9/2014 | Sharifi |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,111 B1 | 10/2014 | Kahn et al. |
| 8,868,409 B1 | 10/2014 | Mengibar et al. |
| 8,868,431 B2 | 10/2014 | Yamazaki et al. |
| 8,868,469 B2 | 10/2014 | Xu et al. |
| 8,868,529 B2 | 10/2014 | Lerenc |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,897,822 B2 | 11/2014 | Martin |
| 8,898,064 B1 | 11/2014 | Thomas et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,909,715 B2 * | 12/2014 | Chinnam ............... H04L 51/04 |
| | | 709/204 |
| 8,918,321 B2 | 12/2014 | Czahor |
| 8,922,485 B1 | 12/2014 | Lloyd |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,954,440 B1 | 2/2015 | Gattani et al. |
| 8,964,947 B1 | 2/2015 | Noolu et al. |
| 8,965,770 B2 | 2/2015 | Petrushin |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,976,063 B1 | 3/2015 | Hawkins et al. |
| 8,976,108 B2 | 3/2015 | Hawkins et al. |
| 8,977,255 B2 | 3/2015 | Freeman et al. |
| 8,983,383 B1 | 3/2015 | Haskin |
| 8,984,098 B1 | 3/2015 | Tomkins et al. |
| 8,989,713 B2 | 3/2015 | Doulton |
| 8,990,235 B2 | 3/2015 | King et al. |
| 8,994,660 B2 | 3/2015 | Neels et al. |
| 8,995,972 B1 | 3/2015 | Cronin |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,550 B2 | 3/2015 | Ko et al. |
| 8,996,639 B1 | 3/2015 | Faaborg et al. |
| 9,002,714 B2 | 4/2015 | Kim et al. |
| 9,009,046 B1 | 4/2015 | Stewart |
| 9,013,992 B2 | 4/2015 | Perkins |
| 9,015,036 B2 | 4/2015 | Zangvil et al. |
| 9,020,804 B2 | 4/2015 | Barbaiani et al. |
| 9,026,425 B2 | 5/2015 | Nikoulina et al. |
| 9,026,426 B2 | 5/2015 | Wu et al. |
| 9,031,834 B2 | 5/2015 | Coorman et al. |
| 9,031,970 B1 | 5/2015 | Das et al. |
| 9,037,967 B1 | 5/2015 | Al-Jefri et al. |
| 9,043,208 B2 | 5/2015 | Koch et al. |
| 9,043,211 B2 | 5/2015 | Haiut et al. |
| 9,043,319 B1 | 5/2015 | Burns et al. |
| 9,046,932 B2 | 6/2015 | Medlock et al. |
| 9,049,255 B2 | 6/2015 | Macfarlane et al. |
| 9,049,295 B1 | 6/2015 | Cooper et al. |
| 9,053,706 B2 | 6/2015 | Jitkoff et al. |
| 9,058,105 B2 | 6/2015 | Drory et al. |
| 9,058,332 B1 | 6/2015 | Darby et al. |
| 9,058,811 B2 | 6/2015 | Wang et al. |
| 9,063,979 B2 | 6/2015 | Chiu et al. |
| 9,064,495 B1 | 6/2015 | Torok et al. |
| 9,065,660 B2 | 6/2015 | Ellis et al. |
| 9,070,247 B2 | 6/2015 | Kuhn et al. |
| 9,070,366 B1 | 6/2015 | Mathias et al. |
| 9,071,701 B2 | 6/2015 | Donaldson et al. |
| 9,075,435 B1 | 7/2015 | Noble et al. |
| 9,075,824 B2 | 7/2015 | Gordo et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,083,581 B1 | 7/2015 | Addepalli et al. |

(56) References Cited

U.S. PATENT DOCUMENTS

| | | | |
|---|---|---|---|
| 9,092,433 B2 | 7/2015 | Rodriguez |
| 9,092,789 B2 | 7/2015 | Anshul |
| 9,094,576 B1 | 7/2015 | Karakotsios |
| 9,094,636 B1 | 7/2015 | Sanders et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,212 B2 | 8/2015 | Sheets et al. |
| 9,117,447 B2 | 8/2015 | Gruber et al. |
| 9,123,338 B1 | 9/2015 | Sanders et al. |
| 9,143,907 B1 | 9/2015 | Caldwell et al. |
| 9,159,319 B1 | 10/2015 | Hoffmeister |
| 9,164,983 B2 | 10/2015 | Liu et al. |
| 9,171,541 B2 | 10/2015 | Kennewick et al. |
| 9,171,546 B1 | 10/2015 | Pike |
| 9,172,747 B2 | 10/2015 | Walters et al. |
| 9,183,845 B1 | 11/2015 | Gopalakrishnan et al. |
| 9,190,062 B2 | 11/2015 | Haughay |
| 9,196,245 B2 | 11/2015 | Larcheveque et al. |
| 9,197,848 B2 | 11/2015 | Felkai et al. |
| 9,201,955 B1 | 12/2015 | Quintao et al. |
| 9,202,520 B1 | 12/2015 | Tang |
| 9,208,153 B1 | 12/2015 | Zaveri et al. |
| 9,213,754 B1 | 12/2015 | Zhan et al. |
| 9,214,137 B2 | 12/2015 | Bala et al. |
| 9,218,122 B2 | 12/2015 | Thoma et al. |
| 9,218,809 B2 | 12/2015 | Bellegard et al. |
| 9,218,819 B1 | 12/2015 | Stekkelpa et al. |
| 9,223,529 B1 | 12/2015 | Khafizova |
| 9,223,537 B2 | 12/2015 | Brown et al. |
| 9,230,561 B2 | 1/2016 | Ostermann et al. |
| 9,232,293 B1 | 1/2016 | Hanson |
| 9,236,047 B2 | 1/2016 | Rasmussen |
| 9,241,073 B1 | 1/2016 | Rensburg et al. |
| 9,245,151 B2 | 1/2016 | LeBeau et al. |
| 9,245,388 B2 | 1/2016 | Poulos et al. |
| 9,246,984 B2 | 1/2016 | Zises |
| 9,250,703 B2 | 2/2016 | Hernandez-Abrego et al. |
| 9,251,713 B1 | 2/2016 | Giovanniello et al. |
| 9,251,787 B1 | 2/2016 | Hart et al. |
| 9,255,812 B2 | 2/2016 | Maeoka et al. |
| 9,257,120 B1 | 2/2016 | Guevara et al. |
| 9,258,604 B1 | 2/2016 | Bilobrov et al. |
| 9,262,412 B2 | 2/2016 | Yang et al. |
| 9,262,612 B2 | 2/2016 | Cheyer |
| 9,263,058 B2 | 2/2016 | Huang et al. |
| 9,274,598 B2 | 3/2016 | Beymer et al. |
| 9,280,535 B2 | 3/2016 | Varma et al. |
| 9,282,211 B2 | 3/2016 | Osawa |
| 9,286,727 B2 | 3/2016 | Kim et al. |
| 9,286,910 B1 | 3/2016 | Li et al. |
| 9,292,487 B1 | 3/2016 | Weber |
| 9,292,489 B1 | 3/2016 | Sak et al. |
| 9,292,492 B2 | 3/2016 | Sarikaya et al. |
| 9,298,358 B1 | 3/2016 | Wilden et al. |
| 9,299,344 B2 | 3/2016 | Braho et al. |
| 9,300,718 B2 | 3/2016 | Khanna |
| 9,301,256 B2 | 3/2016 | Mohan et al. |
| 9,305,543 B2 | 4/2016 | Fleizach et al. |
| 9,305,548 B2 | 4/2016 | Kennewick et al. |
| 9,311,308 B2 | 4/2016 | Sankarasubramaniam et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,325,842 B1 | 4/2016 | Siddiqi et al. |
| 9,330,659 B2 | 5/2016 | Ju et al. |
| 9,330,668 B2 | 5/2016 | Nanavati et al. |
| 9,330,720 B2 | 5/2016 | Lee |
| 9,335,983 B2 | 5/2016 | Breiner et al. |
| 9,338,493 B2 | 5/2016 | Van Os et al. |
| 9,342,829 B2 | 5/2016 | Zhou et al. |
| 9,342,930 B1 | 5/2016 | Kraft et al. |
| 9,349,368 B1 | 5/2016 | Lebeau et al. |
| 9,355,472 B2 | 5/2016 | Kocienda et al. |
| 9,361,084 B1 | 6/2016 | Costa |
| 9,361,625 B2 | 6/2016 | Parker et al. |
| 9,367,541 B1 | 6/2016 | Servan et al. |
| 9,368,114 B2 | 6/2016 | Larson et al. |
| 9,377,865 B2 | 6/2016 | Berenson et al. |
| 9,377,871 B2 | 6/2016 | Waddell et al. |
| 9,378,456 B2 | 6/2016 | White et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,384,185 B2 | 7/2016 | Medlock et al. |
| 9,390,726 B1 | 7/2016 | Smus et al. |
| 9,396,722 B2 | 7/2016 | Chung et al. |
| 9,400,779 B2 | 7/2016 | Convertino et al. |
| 9,401,140 B1 | 7/2016 | Weber et al. |
| 9,401,147 B2 | 7/2016 | Jitkoff et al. |
| 9,405,741 B1 | 8/2016 | Schaaf et al. |
| 9,406,224 B1 | 8/2016 | Sanders et al. |
| 9,406,299 B2 | 8/2016 | Gollan et al. |
| 9,408,182 B1 | 8/2016 | Hurley et al. |
| 9,412,392 B2 | 8/2016 | Lindahl |
| 9,418,650 B2 | 8/2016 | Bharadwaj et al. |
| 9,423,266 B2 | 8/2016 | Clark et al. |
| 9,424,246 B2 | 8/2016 | Spencer et al. |
| 9,424,840 B1 | 8/2016 | Hart et al. |
| 9,431,021 B1 | 8/2016 | Scalise et al. |
| 9,432,499 B2 | 8/2016 | Hajdu et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,442,687 B2 | 9/2016 | Park et al. |
| 9,443,527 B1 | 9/2016 | Watanabe et al. |
| 9,454,599 B2 | 9/2016 | Golden et al. |
| 9,454,957 B1 | 9/2016 | Mathias et al. |
| 9,465,798 B2 | 10/2016 | Lin |
| 9,465,833 B2 | 10/2016 | Aravamudan et al. |
| 9,465,864 B2 | 10/2016 | Hu et al. |
| 9,466,027 B2 | 10/2016 | Byrne et al. |
| 9,466,121 B2 | 10/2016 | Yang et al. |
| 9,466,294 B1 | 10/2016 | Tunstall-Pedoe et al. |
| 9,471,566 B1 | 10/2016 | Zhang et al. |
| 9,472,196 B1 | 10/2016 | Wang et al. |
| 9,483,388 B2 | 11/2016 | Sankaranarasimhan et al. |
| 9,483,461 B2 | 11/2016 | Fleizach et al. |
| 9,483,529 B1 | 11/2016 | Pasoi et al. |
| 9,484,021 B1 | 11/2016 | Mairesse et al. |
| 9,485,286 B1 | 11/2016 | Sellier et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,514,470 B2 | 12/2016 | Topatan et al. |
| 9,516,014 B2 | 12/2016 | Zafiroglu et al. |
| 9,519,453 B2 | 12/2016 | Perkuhn et al. |
| 9,524,355 B2 | 12/2016 | Forbes et al. |
| 9,529,500 B1 | 12/2016 | Gauci et al. |
| 9,531,803 B2 | 12/2016 | Chen et al. |
| 9,531,862 B1 | 12/2016 | Vadodaria |
| 9,535,906 B2 | 1/2017 | Lee et al. |
| 9,536,527 B1 | 1/2017 | Carlson |
| 9,536,544 B2 | 1/2017 | Osterman et al. |
| 9,547,647 B2 | 1/2017 | Badaskar |
| 9,548,050 B2 | 1/2017 | Gruber et al. |
| 9,548,979 B1 | 1/2017 | Johnson et al. |
| 9,569,549 B1 | 2/2017 | Jenkins et al. |
| 9,571,995 B1 | 2/2017 | Scheer et al. |
| 9,575,964 B2 | 2/2017 | Yadgar et al. |
| 9,576,575 B2 | 2/2017 | Heide |
| 9,578,173 B2 | 2/2017 | Sanghavi et al. |
| 9,584,946 B1 | 2/2017 | Lyren et al. |
| 9,586,318 B2 | 3/2017 | Djugash et al. |
| 9,602,946 B2 | 3/2017 | Karkkainen et al. |
| 9,607,612 B2 | 3/2017 | Deleeuw |
| 9,612,999 B2 | 4/2017 | Prakah-Asante et al. |
| 9,619,200 B2 | 4/2017 | Chakladar et al. |
| 9,619,459 B2 | 4/2017 | Hebert et al. |
| 9,620,113 B2 | 4/2017 | Kennewick et al. |
| 9,620,126 B2 | 4/2017 | Chiba |

(56) References Cited

U.S. PATENT DOCUMENTS

| | | | |
|---|---|---|---|
| 9,626,695 B2 | 4/2017 | Balasubramanian et al. |
| 9,626,799 B2 | 4/2017 | McArdle et al. |
| 9,626,955 B2 | 4/2017 | Fleizach et al. |
| 9,633,004 B2 | 4/2017 | Giuli et al. |
| 9,633,191 B2 | 4/2017 | Fleizach et al. |
| 9,633,660 B2 | 4/2017 | Haughay |
| 9,633,674 B2 | 4/2017 | Sinha |
| 9,646,313 B2 | 5/2017 | Kim et al. |
| 9,648,107 B1 | 5/2017 | Penilla et al. |
| 9,652,453 B2 | 5/2017 | Mathur et al. |
| 9,658,746 B2 | 5/2017 | Cohn et al. |
| 9,659,002 B2 | 5/2017 | Medlock et al. |
| 9,659,298 B2 | 5/2017 | Lynch et al. |
| 9,665,567 B2 | 5/2017 | Li et al. |
| 9,665,662 B1 | 5/2017 | Gautam et al. |
| 9,668,121 B2 | 5/2017 | Naik et al. |
| 9,672,725 B2 | 6/2017 | Dotan-Cohen et al. |
| 9,672,822 B2 | 6/2017 | Brown et al. |
| 9,678,664 B2 | 6/2017 | Zhai et al. |
| 9,679,570 B1 | 6/2017 | Edara |
| 9,690,542 B2 | 6/2017 | Reddy et al. |
| 9,691,161 B1 | 6/2017 | Yalniz et al. |
| 9,691,378 B1 | 6/2017 | Meyers et al. |
| 9,691,384 B1 | 6/2017 | Wang et al. |
| 9,696,963 B2 | 7/2017 | Son et al. |
| 9,697,016 B2 | 7/2017 | Jacob |
| 9,697,822 B1 | 7/2017 | Naik et al. |
| 9,697,827 B1 | 7/2017 | Lilly et al. |
| 9,697,828 B1 | 7/2017 | Prasad et al. |
| 9,698,999 B2 | 7/2017 | Mutagi |
| 9,711,148 B1 | 7/2017 | Sharifi et al. |
| 9,720,907 B2 | 8/2017 | Bangalore et al. |
| 9,721,566 B2 | 8/2017 | Newendorp et al. |
| 9,721,570 B1 | 8/2017 | Beal et al. |
| 9,723,130 B2 | 8/2017 | Rand |
| 9,734,817 B1 | 8/2017 | Putrycz |
| 9,734,839 B1 | 8/2017 | Adams |
| 9,741,343 B1 | 8/2017 | Miles et al. |
| 9,747,083 B1 | 8/2017 | Roman et al. |
| 9,747,093 B2 | 8/2017 | Latino et al. |
| 9,754,591 B1 | 9/2017 | Kumar et al. |
| 9,755,605 B1 | 9/2017 | Li et al. |
| 9,760,566 B2 | 9/2017 | Heck et al. |
| 9,767,710 B2 | 9/2017 | Lee et al. |
| 9,772,994 B2 | 9/2017 | Karov et al. |
| 9,786,271 B1 | 10/2017 | Combs et al. |
| 9,792,907 B2 | 10/2017 | Bocklet et al. |
| 9,798,719 B2 | 10/2017 | Karov et al. |
| 9,812,128 B2 | 11/2017 | Mixter et al. |
| 9,813,882 B1 | 11/2017 | Masterman |
| 9,818,400 B2 | 11/2017 | Paulik et al. |
| 9,823,811 B2 | 11/2017 | Brown et al. |
| 9,823,828 B2 | 11/2017 | Zambetti et al. |
| 9,824,379 B2 | 11/2017 | Khandelwal et al. |
| 9,824,691 B1 | 11/2017 | Montero et al. |
| 9,824,692 B1 | 11/2017 | Khoury et al. |
| 9,830,044 B2 | 11/2017 | Brown et al. |
| 9,830,449 B1 | 11/2017 | Wagner |
| 9,842,168 B2 | 12/2017 | Heck et al. |
| 9,842,584 B1 | 12/2017 | Hart et al. |
| 9,846,685 B2 | 12/2017 | Li |
| 9,846,836 B2 | 12/2017 | Gao et al. |
| 9,858,925 B2 | 1/2018 | Gruber et al. |
| 9,858,927 B2 | 1/2018 | Williams et al. |
| 9,886,953 B2 | 2/2018 | Lemay et al. |
| 9,887,949 B2 | 2/2018 | Shepherd et al. |
| 9,891,811 B2 | 2/2018 | Federighi et al. |
| 9,911,415 B2 | 3/2018 | Vanblon et al. |
| 9,916,839 B1 | 3/2018 | Scalise et al. |
| 9,922,642 B2 | 3/2018 | Pitschel et al. |
| 9,928,835 B1 | 3/2018 | Tang |
| 9,934,777 B1 | 4/2018 | Joseph et al. |
| 9,934,785 B1 | 4/2018 | Hulaud |
| 9,940,616 B1 | 4/2018 | Morgan et al. |
| 9,946,862 B2 | 4/2018 | Yun et al. |
| 9,948,728 B2 | 4/2018 | Linn et al. |
| 9,959,129 B2 | 5/2018 | Kannan et al. |
| 9,959,506 B1 | 5/2018 | Karppanen |
| 9,966,065 B2 | 5/2018 | Gruber et al. |
| 9,966,068 B2 | 5/2018 | Cash et al. |
| 9,967,381 B1 | 5/2018 | Kashimba et al. |
| 9,971,495 B2 | 5/2018 | Shetty et al. |
| 9,972,304 B2 | 5/2018 | Paulik et al. |
| 9,983,785 B2 | 5/2018 | Wong et al. |
| 9,984,686 B1 | 5/2018 | Mutagi et al. |
| 9,986,419 B2 | 5/2018 | Naik et al. |
| 9,990,129 B2 | 6/2018 | Yang et al. |
| 9,990,176 B1 | 6/2018 | Gray |
| 9,990,921 B2 | 6/2018 | Vanblon et al. |
| 9,990,926 B1 | 6/2018 | Pearce |
| 9,996,626 B1 | 6/2018 | Bailey et al. |
| 9,998,552 B1 | 6/2018 | Ledet |
| 10,001,817 B2 | 6/2018 | Zambetti et al. |
| 10,013,416 B1 | 7/2018 | Bhardwaj et al. |
| 10,013,654 B1 | 7/2018 | Levy et al. |
| 10,013,979 B1 | 7/2018 | Roma et al. |
| 10,019,436 B2 | 7/2018 | Huang |
| 10,025,378 B2 | 7/2018 | Venable et al. |
| 10,026,209 B1 | 7/2018 | Dagley et al. |
| 10,026,401 B1 | 7/2018 | Mutagi et al. |
| 10,027,662 B1 | 7/2018 | Mutagi et al. |
| 10,032,451 B1 | 7/2018 | Mamkina et al. |
| 10,032,455 B2 | 7/2018 | Newman et al. |
| 10,037,758 B2 | 7/2018 | Jing et al. |
| 10,043,516 B2 | 8/2018 | Saddler et al. |
| 10,048,748 B2 | 8/2018 | Sridharan et al. |
| 10,049,161 B2 | 8/2018 | Kaneko |
| 10,049,663 B2 | 8/2018 | Orr et al. |
| 10,049,668 B2 | 8/2018 | Huang et al. |
| 10,055,390 B2 | 8/2018 | Sharifi et al. |
| 10,055,681 B2 | 8/2018 | Brown et al. |
| 10,068,570 B2 | 9/2018 | Dai et al. |
| 10,074,360 B2 | 9/2018 | Kim |
| 10,074,371 B1 | 9/2018 | Wang et al. |
| 10,078,487 B2 | 9/2018 | Gruber et al. |
| 10,083,213 B1 | 9/2018 | Podgorny et al. |
| 10,083,688 B2 | 9/2018 | Piernot et al. |
| 10,083,690 B2 | 9/2018 | Giuli et al. |
| 10,088,972 B2 | 10/2018 | Brown et al. |
| 10,089,072 B2 | 10/2018 | Piersol et al. |
| 10,089,983 B1 | 10/2018 | Gella et al. |
| 10,096,319 B1 | 10/2018 | Jin et al. |
| 10,101,887 B2 | 10/2018 | Bernstein et al. |
| 10,102,359 B2 | 10/2018 | Cheyer |
| 10,115,055 B2 | 10/2018 | Weiss et al. |
| 10,127,901 B2 | 11/2018 | Zhao et al. |
| 10,127,908 B1 | 11/2018 | Deller et al. |
| 10,127,926 B2 | 11/2018 | James |
| 10,134,425 B1 | 11/2018 | Johnson, Jr. |
| 10,135,965 B2 | 11/2018 | Woolsey et al. |
| 10,142,222 B1 | 11/2018 | Zhang |
| 10,146,923 B2 | 12/2018 | Pitkanen et al. |
| 10,147,421 B2 | 12/2018 | Liddell et al. |
| 10,147,441 B1 | 12/2018 | Pogue et al. |
| 10,149,156 B1 | 12/2018 | Tiku et al. |
| 10,158,728 B1 | 12/2018 | Vanblon et al. |
| 10,162,512 B2 | 12/2018 | Seo et al. |
| 10,162,817 B2 | 12/2018 | Schlesinger et al. |
| 10,169,329 B2 | 1/2019 | Futrell et al. |
| 10,170,123 B2 | 1/2019 | Orr et al. |
| 10,170,135 B1 | 1/2019 | Pearce et al. |
| 10,175,879 B2 | 1/2019 | Missig et al. |
| 10,176,167 B2 | 1/2019 | Evermann |
| 10,176,802 B1 | 1/2019 | Ladhak et al. |
| 10,176,808 B1 | 1/2019 | Lovitt et al. |
| 10,178,301 B1 | 1/2019 | Welbourne et al. |
| 10,185,542 B2 | 1/2019 | Carson et al. |
| 10,186,254 B2 | 1/2019 | Williams et al. |
| 10,186,266 B1 | 1/2019 | Devaraj et al. |
| 10,191,627 B2 | 1/2019 | Cieplinski et al. |
| 10,191,646 B2 | 1/2019 | Zambetti et al. |
| 10,191,718 B2 | 1/2019 | Rhee et al. |
| 10,192,546 B1 | 1/2019 | Piersol et al. |
| 10,192,552 B2 | 1/2019 | Raitio et al. |

(56) References Cited

U.S. PATENT DOCUMENTS

| | | | |
|---|---|---|---|
| 10,192,557 B2 | 1/2019 | Lee et al. |
| 10,193,840 B1 | 1/2019 | Dar |
| 10,198,877 B1 | 2/2019 | Maltsev et al. |
| 10,199,051 B2 | 2/2019 | Binder et al. |
| 10,200,824 B2 | 2/2019 | Gross et al. |
| 10,204,627 B2 | 2/2019 | Nitz et al. |
| 10,210,860 B1 | 2/2019 | Ward et al. |
| 10,216,351 B2 | 2/2019 | Yang |
| 10,216,832 B2 | 2/2019 | Bangalore et al. |
| 10,223,066 B2 | 3/2019 | Martel et al. |
| 10,225,711 B2 | 3/2019 | Parks et al. |
| 10,228,904 B2 | 3/2019 | Raux |
| 10,229,109 B1 | 3/2019 | Cherepanov et al. |
| 10,229,356 B1 | 3/2019 | Liu et al. |
| 10,229,680 B1 | 3/2019 | Gillespie et al. |
| 10,237,711 B2 | 3/2019 | Linn et al. |
| 10,241,644 B2 | 3/2019 | Gruber et al. |
| 10,242,501 B1 | 3/2019 | Pusch et al. |
| 10,248,308 B2 | 4/2019 | Karunamuni et al. |
| 10,248,771 B1 | 4/2019 | Ziraknejad et al. |
| 10,249,300 B2 | 4/2019 | Booker et al. |
| 10,249,305 B2 | 4/2019 | Yu |
| 10,255,922 B1 | 4/2019 | Sharifi et al. |
| 10,261,672 B1 | 4/2019 | Dolbakian et al. |
| 10,261,830 B2 | 4/2019 | Gupta et al. |
| 10,269,345 B2 | 4/2019 | Sanchez et al. |
| 10,275,513 B1 | 4/2019 | Cowan et al. |
| 10,282,737 B2 | 5/2019 | Clark et al. |
| 10,289,205 B1 | 5/2019 | Sumter et al. |
| 10,291,066 B1 | 5/2019 | Leabman et al. |
| 10,296,160 B2 | 5/2019 | Shah et al. |
| 10,297,253 B2 | 5/2019 | Walker, II et al. |
| 10,303,772 B2 | 5/2019 | Hosn et al. |
| 10,304,463 B2 | 5/2019 | Mixter et al. |
| 10,311,482 B2 | 6/2019 | Baldwin |
| 10,311,871 B2 | 6/2019 | Newendorp et al. |
| 10,325,598 B2 | 6/2019 | Basye et al. |
| 10,331,312 B2 | 6/2019 | Napolitano et al. |
| 10,332,509 B2 | 6/2019 | Catanzaro et al. |
| 10,332,513 B1 | 6/2019 | D'Souza et al. |
| 10,332,518 B2 | 6/2019 | Garg et al. |
| 10,339,224 B2 | 7/2019 | Fukuoka |
| 10,339,714 B2 | 7/2019 | Corso et al. |
| 10,339,721 B1 | 7/2019 | Dascola et al. |
| 10,339,925 B1 | 7/2019 | Rastrow et al. |
| 10,346,540 B2 | 7/2019 | Karov et al. |
| 10,346,541 B1 | 7/2019 | Phillips et al. |
| 10,346,753 B2 | 7/2019 | Soon-Shiong et al. |
| 10,346,878 B1 | 7/2019 | Ostermann et al. |
| 10,353,975 B2 | 7/2019 | Oh et al. |
| 10,354,168 B2 | 7/2019 | Bluche |
| 10,354,677 B2 | 7/2019 | Mohamed et al. |
| 10,356,243 B2 | 7/2019 | Sanghavi et al. |
| 10,360,305 B2 | 7/2019 | Larcheveque et al. |
| 10,360,716 B1 | 7/2019 | Van Der Meulen et al. |
| 10,365,887 B1 | 7/2019 | Mulherkar |
| 10,366,160 B2 | 7/2019 | Castelli et al. |
| 10,366,692 B1 | 7/2019 | Adams et al. |
| 10,372,814 B2 | 8/2019 | Gliozzo et al. |
| 10,372,881 B2 | 8/2019 | Ingrassia, Jr. et al. |
| 10,373,381 B2 | 8/2019 | Nuernberger et al. |
| 10,389,876 B2 | 8/2019 | Engelke et al. |
| 10,402,066 B2 | 9/2019 | Kawana |
| 10,403,283 B1 | 9/2019 | Schramm et al. |
| 10,409,454 B2 | 9/2019 | Kagan et al. |
| 10,410,637 B2 | 9/2019 | Paulik et al. |
| 10,416,760 B2 | 9/2019 | Burns et al. |
| 10,417,037 B2 | 9/2019 | Gruber et al. |
| 10,417,344 B2 | 9/2019 | Futrell et al. |
| 10,417,554 B2 | 9/2019 | Scheffler |
| 10,431,210 B1 | 10/2019 | Huang et al. |
| 10,437,928 B2 | 10/2019 | Bhaya et al. |
| 10,446,142 B2 | 10/2019 | Lim et al. |
| 10,453,117 B1 | 10/2019 | Reavely et al. |
| 10,469,665 B1 | 11/2019 | Bell et al. |
| 10,474,961 B2 | 11/2019 | Brigham et al. |
| 10,475,446 B2 | 11/2019 | Gruber et al. |
| 10,482,875 B2 | 11/2019 | Henry |
| 10,490,195 B1 | 11/2019 | Krishnamoorthy et al. |
| 10,496,364 B2 | 12/2019 | Yao |
| 10,496,705 B1 | 12/2019 | Irani et al. |
| 10,497,365 B2 | 12/2019 | Gruber et al. |
| 10,497,366 B2 | 12/2019 | Sapugay et al. |
| 10,504,518 B1 | 12/2019 | Irani et al. |
| 10,512,750 B1 | 12/2019 | Lewin et al. |
| 10,515,133 B1 | 12/2019 | Sharifi |
| 10,515,623 B1 | 12/2019 | Grizzel |
| 10,521,946 B1 | 12/2019 | Roche et al. |
| 10,528,386 B2 | 1/2020 | Yu |
| 10,540,976 B2 | 1/2020 | Van Os et al. |
| 10,558,893 B2 | 2/2020 | Bluche |
| 10,559,225 B1 | 2/2020 | Tao et al. |
| 10,559,299 B1 | 2/2020 | Arel et al. |
| 10,566,007 B2 | 2/2020 | Fawaz et al. |
| 10,568,032 B2 | 2/2020 | Freeman et al. |
| 10,572,885 B1 | 2/2020 | Guo et al. |
| 10,579,401 B2 | 3/2020 | Dawes |
| 10,580,409 B2 | 3/2020 | Walker, II et al. |
| 10,582,355 B1 | 3/2020 | Lebeau et al. |
| 10,585,957 B2 | 3/2020 | Heck et al. |
| 10,586,369 B1 | 3/2020 | Roche et al. |
| 10,599,449 B1 | 3/2020 | Chatzipanagiotis et al. |
| 10,628,483 B1 | 4/2020 | Rao et al. |
| 10,629,186 B1 | 4/2020 | Slifka |
| 10,630,795 B2 | 4/2020 | Aoki et al. |
| 10,642,934 B2 | 5/2020 | Heck et al. |
| 10,649,652 B2 | 5/2020 | Sun |
| 10,652,394 B2 | 5/2020 | Van Os et al. |
| 10,659,851 B2 | 5/2020 | Lister et al. |
| 10,671,428 B2 | 6/2020 | Zeitlin |
| 10,679,007 B2 | 6/2020 | Jia et al. |
| 10,679,608 B2 | 6/2020 | Mixter et al. |
| 10,684,099 B2 | 6/2020 | Zaetterqvist |
| 10,684,703 B2 | 6/2020 | Hindi et al. |
| 10,685,187 B2 | 6/2020 | Badr et al. |
| 10,699,697 B2 | 6/2020 | Qian et al. |
| 10,706,841 B2 | 7/2020 | Gruber et al. |
| 10,721,190 B2 | 7/2020 | Zhao et al. |
| 10,732,708 B1 | 8/2020 | Roche et al. |
| 10,743,107 B1 | 8/2020 | Yoshioka et al. |
| 10,748,529 B1 | 8/2020 | Milden |
| 10,748,546 B2 | 8/2020 | Kim et al. |
| 10,754,658 B2 | 8/2020 | Tamiya |
| 10,755,032 B2 | 8/2020 | Douglas et al. |
| 10,757,499 B1 | 8/2020 | Vautrin et al. |
| 10,769,385 B2 | 9/2020 | Evermann |
| 10,776,933 B2 | 9/2020 | Faulkner |
| 10,778,839 B1 | 9/2020 | Newstadt et al. |
| 10,783,151 B1 | 9/2020 | Bushkin et al. |
| 10,783,883 B2 | 9/2020 | Mixter et al. |
| 10,789,945 B2 | 9/2020 | Acero et al. |
| 10,791,176 B2 | 9/2020 | Phipps et al. |
| 10,795,944 B2 | 10/2020 | Brown et al. |
| 10,796,100 B2 | 10/2020 | Bangalore et al. |
| 10,803,255 B2 | 10/2020 | Dubyak et al. |
| 10,811,013 B1 | 10/2020 | Secker-Walker et al. |
| 10,818,288 B2 | 10/2020 | Garcia et al. |
| 10,831,494 B2 | 11/2020 | Grocutt et al. |
| 10,832,031 B2 | 11/2020 | Kienzle et al. |
| 10,832,684 B2 | 11/2020 | Sarikaya |
| 10,842,968 B1 | 11/2020 | Kahn et al. |
| 10,846,618 B2 | 11/2020 | Ravi et al. |
| 10,847,142 B2 | 11/2020 | Newendorp et al. |
| 10,860,629 B1 | 12/2020 | Gangadharaiah et al. |
| 10,861,483 B2 | 12/2020 | Feinauer et al. |
| 10,877,637 B1 | 12/2020 | Antos et al. |
| 10,880,668 B1 | 12/2020 | Robinson et al. |
| 10,885,277 B2 | 1/2021 | Ravi et al. |
| 10,891,968 B2 | 1/2021 | Chung et al. |
| 10,892,996 B2 | 1/2021 | Piersol |
| 10,909,459 B2 | 2/2021 | Tsatsin et al. |
| 10,937,263 B1 | 3/2021 | Tout et al. |
| 10,937,410 B1 | 3/2021 | Rule |
| 10,942,702 B2 | 3/2021 | Piersol et al. |

(56) References Cited

U.S. PATENT DOCUMENTS

| | | | |
|---|---|---|---|
| 10,942,703 B2 | 3/2021 | Martel et al. |
| 10,944,859 B2 | 3/2021 | Weinstein et al. |
| 10,957,310 B1 | 3/2021 | Mohajer et al. |
| 10,957,311 B2 | 3/2021 | Solomon et al. |
| 10,957,337 B2 | 3/2021 | Chen et al. |
| 10,970,660 B1 | 4/2021 | Harris et al. |
| 10,974,139 B2 | 4/2021 | Feder et al. |
| 10,978,056 B1 | 4/2021 | Challa et al. |
| 10,978,090 B2 | 4/2021 | Binder et al. |
| 10,983,971 B2 | 4/2021 | Carvalho et al. |
| 11,009,970 B2 | 5/2021 | Hindi et al. |
| 11,010,127 B2 | 5/2021 | Orr et al. |
| 11,017,766 B2 | 5/2021 | Chao et al. |
| 11,037,565 B2 | 6/2021 | Kudurshian et al. |
| 11,038,934 B1 | 6/2021 | Hansen et al. |
| 11,043,086 B1 | 6/2021 | Daoura et al. |
| 11,043,220 B1 | 6/2021 | Hansen et al. |
| 11,048,473 B2 | 6/2021 | Carson et al. |
| 11,061,543 B1 | 7/2021 | Blatz et al. |
| 11,072,344 B2 | 7/2021 | Provost et al. |
| 11,076,039 B2 | 7/2021 | Weinstein et al. |
| 11,080,336 B2 | 8/2021 | Van Dusen |
| 11,086,858 B1 | 8/2021 | Koukoumidis et al. |
| 11,094,311 B2 | 8/2021 | Candelore et al. |
| 11,113,598 B2 | 9/2021 | Socher et al. |
| 11,126,331 B2 | 9/2021 | Lo et al. |
| 11,132,172 B1 | 9/2021 | Naik et al. |
| 11,133,008 B2 | 9/2021 | Piernot et al. |
| 11,151,899 B2 | 10/2021 | Pitschel et al. |
| 11,169,660 B2 | 11/2021 | Gupta et al. |
| 11,181,988 B1 | 11/2021 | Bellegarda et al. |
| 11,183,193 B1 | 11/2021 | Hansen et al. |
| 11,183,205 B1 | 11/2021 | Ebenezer et al. |
| 11,200,027 B2 | 12/2021 | Aggarwal et al. |
| 11,204,787 B2 | 12/2021 | Radebaugh et al. |
| 11,205,192 B1 | 12/2021 | Rivera et al. |
| 11,210,477 B2 | 12/2021 | Srinivasan et al. |
| 11,211,048 B2 | 12/2021 | Kim et al. |
| 11,217,255 B2 | 1/2022 | Kim et al. |
| 11,223,699 B1 | 1/2022 | Niewczas |
| 11,235,248 B1 | 2/2022 | Orrino et al. |
| 11,269,426 B2 | 3/2022 | Jorasch et al. |
| 11,269,678 B2 | 3/2022 | Gruber et al. |
| 11,283,631 B2 | 3/2022 | Yan et al. |
| 11,289,082 B1 | 3/2022 | Lacy et al. |
| 11,302,310 B1 | 4/2022 | Gandhe et al. |
| 11,380,323 B2 | 7/2022 | Shin et al. |
| 11,388,291 B2 | 7/2022 | Van Os et al. |
| 11,418,461 B1 | 8/2022 | Elfardy et al. |
| 11,449,802 B2 | 9/2022 | Maalouf et al. |
| 11,487,932 B2 | 11/2022 | Kramer |
| 11,507,183 B2 | 11/2022 | Manjunath et al. |
| 11,508,380 B2 | 11/2022 | Hu et al. |
| 2005/0091604 A1 | 4/2005 | Davis et al. |
| 2006/0004640 A1 | 1/2006 | Swierczek |
| 2006/0130006 A1 | 6/2006 | Chitale |
| 2007/0150403 A1 | 6/2007 | Mock et al. |
| 2008/0039120 A1 | 2/2008 | Gad |
| 2008/0189110 A1 | 8/2008 | Freeman et al. |
| 2008/0215678 A1 | 9/2008 | Coletrane et al. |
| 2009/0174667 A1 | 7/2009 | Kocienda et al. |
| 2011/0295590 A1 | 12/2011 | Lloyd et al. |
| 2012/0016678 A1 | 1/2012 | Gruber et al. |
| 2012/0035931 A1 | 2/2012 | LeBeau et al. |
| 2012/0114108 A1 | 5/2012 | Katis et al. |
| 2012/0245944 A1 | 9/2012 | Gruber et al. |
| 2012/0310642 A1 | 12/2012 | Cao et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0006957 A1 | 1/2013 | Huang et al. |
| 2013/0007240 A1 | 1/2013 | Qiu et al. |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0014026 A1 | 1/2013 | Beringer et al. |
| 2013/0014143 A1 | 1/2013 | Bhatia et al. |
| 2013/0018659 A1 | 1/2013 | Chi |
| 2013/0018863 A1 | 1/2013 | Regan et al. |
| 2013/0022189 A1 | 1/2013 | Ganong et al. |
| 2013/0024277 A1 | 1/2013 | Tuchman et al. |
| 2013/0024576 A1 | 1/2013 | Dishneau et al. |
| 2013/0027875 A1 | 1/2013 | Zhu et al. |
| 2013/0028404 A1 | 1/2013 | Omalley et al. |
| 2013/0030787 A1 | 1/2013 | Cancedda et al. |
| 2013/0030789 A1 | 1/2013 | Dalce |
| 2013/0030804 A1 | 1/2013 | Zavaliagkos et al. |
| 2013/0030815 A1 | 1/2013 | Madhvanath et al. |
| 2013/0030904 A1 | 1/2013 | Aidasani et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0035994 A1 | 2/2013 | Pattan et al. |
| 2013/0036200 A1 | 2/2013 | Roberts et al. |
| 2013/0038618 A1 | 2/2013 | Urbach |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041685 A1 | 2/2013 | Yegnanarayanan |
| 2013/0041968 A1 | 2/2013 | Cohen et al. |
| 2013/0046544 A1 | 2/2013 | Kay et al. |
| 2013/0047178 A1 | 2/2013 | Moon et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054631 A1 | 2/2013 | Govani et al. |
| 2013/0054675 A1 | 2/2013 | Jenkins et al. |
| 2013/0054706 A1 | 2/2013 | Graham et al. |
| 2013/0054945 A1 | 2/2013 | Free et al. |
| 2013/0055099 A1 | 2/2013 | Yao et al. |
| 2013/0055147 A1 | 2/2013 | Vasudev et al. |
| 2013/0055201 A1 | 2/2013 | No et al. |
| 2013/0055402 A1 | 2/2013 | Amit et al. |
| 2013/0060571 A1 | 3/2013 | Soemo et al. |
| 2013/0060807 A1 | 3/2013 | Rambhia et al. |
| 2013/0061139 A1 | 3/2013 | Mahkovec et al. |
| 2013/0061166 A1 | 3/2013 | Seo et al. |
| 2013/0063611 A1 | 3/2013 | Papakipos et al. |
| 2013/0064104 A1 | 3/2013 | Bekiares et al. |
| 2013/0066832 A1 | 3/2013 | Sheehan et al. |
| 2013/0067307 A1 | 3/2013 | Tian et al. |
| 2013/0067312 A1 | 3/2013 | Rose |
| 2013/0067421 A1 | 3/2013 | Osman et al. |
| 2013/0069769 A1 | 3/2013 | Pennington et al. |
| 2013/0073286 A1 | 3/2013 | Bastea-Forte et al. |
| 2013/0073293 A1 | 3/2013 | Jang et al. |
| 2013/0073346 A1 | 3/2013 | Chun et al. |
| 2013/0073580 A1 | 3/2013 | Mehanna et al. |
| 2013/0073676 A1 | 3/2013 | Cockcroft |
| 2013/0077772 A1 | 3/2013 | Lichorowic et al. |
| 2013/0078930 A1 | 3/2013 | Chen et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080178 A1 | 3/2013 | Kang et al. |
| 2013/0080251 A1 | 3/2013 | Dempski |
| 2013/0080890 A1 | 3/2013 | Krishnamurthi |
| 2013/0080972 A1 | 3/2013 | Moshrefi et al. |
| 2013/0082967 A1 | 4/2013 | Hillis et al. |
| 2013/0084882 A1 | 4/2013 | Khorashadi et al. |
| 2013/0085755 A1 | 4/2013 | Bringert et al. |

(56)   References Cited

U.S. PATENT DOCUMENTS

| | | |
|---|---|---|
| 2013/0085757 A1 | 4/2013 | Nakamura et al. |
| 2013/0085761 A1 | 4/2013 | Bringert et al. |
| 2013/0086609 A1 | 4/2013 | Levy et al. |
| 2013/0090921 A1 | 4/2013 | Liu et al. |
| 2013/0091090 A1 | 4/2013 | Spivack et al. |
| 2013/0095805 A1 | 4/2013 | LeBeau et al. |
| 2013/0096909 A1 | 4/2013 | Brun et al. |
| 2013/0096911 A1 | 4/2013 | Beaufort et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100017 A1 | 4/2013 | Papakipos et al. |
| 2013/0100268 A1 | 4/2013 | Mihailidis et al. |
| 2013/0103383 A1 | 4/2013 | Du et al. |
| 2013/0103391 A1 | 4/2013 | Millmore et al. |
| 2013/0103405 A1 | 4/2013 | Namba et al. |
| 2013/0103698 A1 | 4/2013 | Schlipf |
| 2013/0106742 A1 | 5/2013 | Lee et al. |
| 2013/0107053 A1 | 5/2013 | Ozaki |
| 2013/0109412 A1 | 5/2013 | Nguyen et al. |
| 2013/0110505 A1 | 5/2013 | Gruber et al. |
| 2013/0110511 A1 | 5/2013 | Spiegel et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |
| 2013/0124187 A1 | 5/2013 | Qin |
| 2013/0124189 A1 | 5/2013 | Baldwin et al. |
| 2013/0124672 A1 | 5/2013 | Pan |
| 2013/0125168 A1 | 5/2013 | Agnihotri et al. |
| 2013/0130669 A1 | 5/2013 | Xiao et al. |
| 2013/0132081 A1 | 5/2013 | Ryu et al. |
| 2013/0132084 A1 | 5/2013 | Stonehocker et al. |
| 2013/0132089 A1 | 5/2013 | Fanty et al. |
| 2013/0132094 A1 | 5/2013 | Lim |
| 2013/0132871 A1 | 5/2013 | Zeng et al. |
| 2013/0138440 A1 | 5/2013 | Strope et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore |
| 2013/0151258 A1 | 6/2013 | Chandrasekar et al. |
| 2013/0151339 A1 | 6/2013 | Kim et al. |
| 2013/0152092 A1 | 6/2013 | Yadgar |
| 2013/0154811 A1 | 6/2013 | Ferren et al. |
| 2013/0155948 A1 | 6/2013 | Pinheiro et al. |
| 2013/0156198 A1 | 6/2013 | Kim et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0159861 A1 | 6/2013 | Rottler et al. |
| 2013/0165232 A1 | 6/2013 | Nelson et al. |
| 2013/0166278 A1 | 6/2013 | James et al. |
| 2013/0166303 A1 | 6/2013 | Chang et al. |
| 2013/0166332 A1 | 6/2013 | Hammad |
| 2013/0166442 A1 | 6/2013 | Nakajima et al. |
| 2013/0167242 A1 | 6/2013 | Paliwal |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0173268 A1 | 7/2013 | Weng et al. |
| 2013/0173513 A1 | 7/2013 | Chu et al. |
| 2013/0173610 A1 | 7/2013 | Hu et al. |
| 2013/0173614 A1 | 7/2013 | Ismalon |
| 2013/0174034 A1 | 7/2013 | Brown et al. |
| 2013/0176147 A1 | 7/2013 | Anderson et al. |
| 2013/0176208 A1 | 7/2013 | Tanaka et al. |
| 2013/0176244 A1 | 7/2013 | Yamamoto et al. |
| 2013/0176592 A1 | 7/2013 | Sasaki |
| 2013/0177296 A1 | 7/2013 | Geisner et al. |
| 2013/0179168 A1 | 7/2013 | Bae et al. |
| 2013/0179172 A1 | 7/2013 | Nakamura et al. |
| 2013/0179440 A1 | 7/2013 | Gordon |
| 2013/0179806 A1 | 7/2013 | Bastide et al. |
| 2013/0183942 A1 | 7/2013 | Novick et al. |
| 2013/0183944 A1 | 7/2013 | Mozer et al. |
| 2013/0185059 A1 | 7/2013 | Riccardi |
| 2013/0185066 A1 | 7/2013 | Tzirkel-Hancock et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0190021 A1 | 7/2013 | Vieri et al. |
| 2013/0191117 A1 | 7/2013 | Atti et al. |
| 2013/0191408 A1 | 7/2013 | Volkert |
| 2013/0197911 A1 | 8/2013 | Wei et al. |
| 2013/0197914 A1 | 8/2013 | Yelvington et al. |
| 2013/0198159 A1 | 8/2013 | Hendry |
| 2013/0198841 A1 | 8/2013 | Poulson |
| 2013/0204813 A1 | 8/2013 | Master et al. |
| 2013/0204897 A1 | 8/2013 | McDougall |
| 2013/0204967 A1 | 8/2013 | Seo et al. |
| 2013/0207898 A1 | 8/2013 | Sullivan et al. |
| 2013/0210410 A1 | 8/2013 | Xu |
| 2013/0210492 A1 | 8/2013 | You et al. |
| 2013/0212501 A1 | 8/2013 | Anderson et al. |
| 2013/0218553 A1 | 8/2013 | Fujii et al. |
| 2013/0218560 A1 | 8/2013 | Hsiao et al. |
| 2013/0218574 A1 | 8/2013 | Falcon et al. |
| 2013/0218899 A1 | 8/2013 | Raghavan et al. |
| 2013/0219333 A1 | 8/2013 | Palwe et al. |
| 2013/0222249 A1 | 8/2013 | Pasquero et al. |
| 2013/0223279 A1 | 8/2013 | Tinnakornsrisuphap et al. |
| 2013/0225128 A1 | 8/2013 | Gomar |
| 2013/0226580 A1 | 8/2013 | Witt-Ehsani |
| 2013/0226935 A1 | 8/2013 | Bai et al. |
| 2013/0226996 A1 | 8/2013 | Itagaki et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar |
| 2013/0238312 A1 | 9/2013 | Waibel |
| 2013/0238326 A1 | 9/2013 | Kim et al. |
| 2013/0238334 A1 | 9/2013 | Ma et al. |
| 2013/0238540 A1 | 9/2013 | O'Donoghue et al. |
| 2013/0238647 A1 | 9/2013 | Thompson |
| 2013/0238729 A1 | 9/2013 | Holzman et al. |
| 2013/0244615 A1 | 9/2013 | Miller |
| 2013/0244633 A1 | 9/2013 | Jacobs et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0246920 A1 | 9/2013 | Fields et al. |
| 2013/0247055 A1 | 9/2013 | Berner et al. |
| 2013/0253911 A1 | 9/2013 | Petri et al. |
| 2013/0253912 A1 | 9/2013 | Medlock et al. |
| 2013/0260739 A1 | 10/2013 | Saino |
| 2013/0262168 A1 | 10/2013 | Makanawala et al. |
| 2013/0268263 A1 | 10/2013 | Park et al. |
| 2013/0268956 A1 | 10/2013 | Recco |
| 2013/0275117 A1 | 10/2013 | Winer |
| 2013/0275136 A1 | 10/2013 | Czahor |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0279724 A1 | 10/2013 | Stafford et al. |
| 2013/0282709 A1 | 10/2013 | Zhu et al. |
| 2013/0283168 A1 | 10/2013 | Brown et al. |
| 2013/0283199 A1 | 10/2013 | Selig et al. |
| 2013/0283283 A1 | 10/2013 | Wang et al. |
| 2013/0285913 A1 | 10/2013 | Griffin et al. |
| 2013/0288722 A1 | 10/2013 | Ramanujam et al. |

(56) References Cited

U.S. PATENT DOCUMENTS

| | | |
|---|---|---|
| 2013/0289991 A1 | 10/2013 | Eshwar et al. |
| 2013/0289993 A1 | 10/2013 | Rao |
| 2013/0289994 A1 | 10/2013 | Newman et al. |
| 2013/0290001 A1 | 10/2013 | Yun et al. |
| 2013/0290222 A1 | 10/2013 | Gordo et al. |
| 2013/0290905 A1 | 10/2013 | Luvogt et al. |
| 2013/0291015 A1 | 10/2013 | Pan |
| 2013/0297078 A1 | 11/2013 | Kolavennu |
| 2013/0297198 A1 | 11/2013 | Velde et al. |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0298139 A1 | 11/2013 | Resnick et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304476 A1 | 11/2013 | Kim et al. |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307785 A1 | 11/2013 | Matsunaga |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311179 A1 | 11/2013 | Wagner |
| 2013/0311184 A1 | 11/2013 | Badavne et al. |
| 2013/0311487 A1 | 11/2013 | Moore et al. |
| 2013/0311997 A1 | 11/2013 | Gruber et al. |
| 2013/0315038 A1 | 11/2013 | Ferren et al. |
| 2013/0316679 A1 | 11/2013 | Miller et al. |
| 2013/0316746 A1 | 11/2013 | Miller et al. |
| 2013/0317921 A1 | 11/2013 | Havas |
| 2013/0318468 A1 | 11/2013 | Lee |
| 2013/0318478 A1 | 11/2013 | Ogura |
| 2013/0321267 A1 | 12/2013 | Bhatti et al. |
| 2013/0322634 A1 | 12/2013 | Bennett et al. |
| 2013/0322665 A1 | 12/2013 | Bennett et al. |
| 2013/0325340 A1 | 12/2013 | Forstall et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325460 A1 | 12/2013 | Kim et al. |
| 2013/0325473 A1 | 12/2013 | Larcher et al. |
| 2013/0325480 A1 | 12/2013 | Lee et al. |
| 2013/0325481 A1 | 12/2013 | Van Os et al. |
| 2013/0325484 A1 | 12/2013 | Chakladar et al. |
| 2013/0325844 A1 | 12/2013 | Plaisant |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0326576 A1 | 12/2013 | Zhang et al. |
| 2013/0328809 A1 | 12/2013 | Smith |
| 2013/0329023 A1 | 12/2013 | Suplee, III et al. |
| 2013/0331127 A1 | 12/2013 | Sabatelli et al. |
| 2013/0332113 A1 | 12/2013 | Piemonte et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0332538 A1 | 12/2013 | Clark et al. |
| 2013/0332721 A1 | 12/2013 | Chaudhri et al. |
| 2013/0332886 A1 | 12/2013 | Cranfill et al. |
| 2013/0337771 A1 | 12/2013 | Klein et al. |
| 2013/0339028 A1 | 12/2013 | Rosner et al. |
| 2013/0339256 A1 | 12/2013 | Shroff |
| 2013/0339454 A1 | 12/2013 | Walker et al. |
| 2013/0339991 A1 | 12/2013 | Ricci |
| 2013/0342487 A1 | 12/2013 | Jeon |
| 2013/0342672 A1 | 12/2013 | Gray et al. |
| 2013/0343584 A1 | 12/2013 | Bennett et al. |
| 2013/0343721 A1 | 12/2013 | Abecassis |
| 2013/0346016 A1 | 12/2013 | Suzuki et al. |
| 2013/0346065 A1 | 12/2013 | Davidson et al. |
| 2013/0346068 A1 | 12/2013 | Solem et al. |
| 2013/0346347 A1 | 12/2013 | Patterson et al. |
| 2013/0346488 A1 | 12/2013 | Lunt et al. |
| 2013/0347018 A1 | 12/2013 | Limp et al. |
| 2013/0347029 A1 | 12/2013 | Tang et al. |
| 2013/0347102 A1 | 12/2013 | Shi |
| 2013/0347117 A1 | 12/2013 | Parks et al. |
| 2014/0001255 A1 | 1/2014 | Anthoine |
| 2014/0002338 A1 | 1/2014 | Raffa et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006028 A1 | 1/2014 | Hu |
| 2014/0006030 A1 | 1/2014 | Fleizach et al. |
| 2014/0006153 A1 | 1/2014 | Thangam et al. |
| 2014/0006191 A1 | 1/2014 | Shankar et al. |
| 2014/0006483 A1 | 1/2014 | Garmark et al. |
| 2014/0006496 A1 | 1/2014 | Dearman et al. |
| 2014/0006562 A1 | 1/2014 | Handa et al. |
| 2014/0006944 A1 | 1/2014 | Selig et al. |
| 2014/0006947 A1 | 1/2014 | Garmark et al. |
| 2014/0006951 A1 | 1/2014 | Hunter |
| 2014/0006955 A1 | 1/2014 | Greenzeiger et al. |
| 2014/0008163 A1 | 1/2014 | Mikonaho et al. |
| 2014/0012574 A1 | 1/2014 | Pasupalak et al. |
| 2014/0012575 A1 | 1/2014 | Ganong et al. |
| 2014/0012580 A1 | 1/2014 | Ganong, III et al. |
| 2014/0012586 A1 | 1/2014 | Rubin et al. |
| 2014/0012587 A1 | 1/2014 | Park |
| 2014/0013336 A1 | 1/2014 | Yang |
| 2014/0019116 A1 | 1/2014 | Lundberg et al. |
| 2014/0019133 A1 | 1/2014 | Bao et al. |
| 2014/0019135 A1 | 1/2014 | Talwar et al. |
| 2014/0019460 A1 | 1/2014 | Sambrani et al. |
| 2014/0019873 A1 | 1/2014 | Gupta et al. |
| 2014/0026037 A1 | 1/2014 | Garb et al. |
| 2014/0028029 A1 | 1/2014 | Jochman |
| 2014/0028477 A1 | 1/2014 | Michalske |
| 2014/0028603 A1 | 1/2014 | Xie et al. |
| 2014/0028735 A1 | 1/2014 | Williams et al. |
| 2014/0032453 A1 | 1/2014 | Eustice et al. |
| 2014/0032678 A1 | 1/2014 | Koukoumidis et al. |
| 2014/0033071 A1 | 1/2014 | Gruber et al. |
| 2014/0035823 A1 | 2/2014 | Khoe et al. |
| 2014/0037075 A1 | 2/2014 | Bouzid et al. |
| 2014/0039888 A1 | 2/2014 | Taubman et al. |
| 2014/0039893 A1 | 2/2014 | Weiner et al. |
| 2014/0039894 A1 | 2/2014 | Shostak |
| 2014/0040228 A1 | 2/2014 | Kritt et al. |
| 2014/0040274 A1 | 2/2014 | Aravamudan et al. |
| 2014/0040748 A1 | 2/2014 | Lemay et al. |
| 2014/0040754 A1 | 2/2014 | Donelli |
| 2014/0040801 A1 | 2/2014 | Patel et al. |
| 2014/0040905 A1 | 2/2014 | Tsunoda et al. |
| 2014/0040918 A1 | 2/2014 | Li |
| 2014/0040961 A1 | 2/2014 | Green et al. |
| 2014/0045547 A1 | 2/2014 | Singamsetty et al. |
| 2014/0046922 A1 | 2/2014 | Crook et al. |
| 2014/0046934 A1 | 2/2014 | Zhou et al. |
| 2014/0047001 A1 | 2/2014 | Phillips et al. |
| 2014/0051399 A1 | 2/2014 | Walker |
| 2014/0052451 A1 | 2/2014 | Cheong et al. |
| 2014/0052680 A1 | 2/2014 | Nitz et al. |
| 2014/0052791 A1 | 2/2014 | Chakra et al. |
| 2014/0053082 A1 | 2/2014 | Park |
| 2014/0053101 A1 | 2/2014 | Buehler et al. |
| 2014/0053210 A1 | 2/2014 | Cheong et al. |
| 2014/0057610 A1 | 2/2014 | Olincy et al. |
| 2014/0058732 A1 | 2/2014 | Labsky et al. |
| 2014/0059030 A1 | 2/2014 | Hakkani-Tur et al. |
| 2014/0059423 A1 | 2/2014 | Gorga et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0067738 A1 | 3/2014 | Kingsbury |
| 2014/0067740 A1 | 3/2014 | Solari |
| 2014/0068751 A1 | 3/2014 | Last |

(56)     References Cited

U.S. PATENT DOCUMENTS

| | | |
|---|---|---|
| 2014/0071241 A1 | 3/2014 | Yang et al. |
| 2014/0074454 A1* | 3/2014 | Brown .................... G10L 15/08 |
| | | 704/235 |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074482 A1 | 3/2014 | Ohno |
| 2014/0074483 A1 | 3/2014 | Van Os |
| 2014/0074589 A1 | 3/2014 | Nielsen et al. |
| 2014/0074815 A1 | 3/2014 | Plimton |
| 2014/0074846 A1 | 3/2014 | Moss et al. |
| 2014/0075453 A1 | 3/2014 | Bellessort et al. |
| 2014/0078065 A1 | 3/2014 | Akkok |
| 2014/0079195 A1 | 3/2014 | Srivastava et al. |
| 2014/0080410 A1 | 3/2014 | Jung et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar |
| 2014/0081635 A1 | 3/2014 | Yanagihara |
| 2014/0081829 A1 | 3/2014 | Milne |
| 2014/0081941 A1 | 3/2014 | Bai et al. |
| 2014/0082500 A1 | 3/2014 | Wilensky et al. |
| 2014/0082501 A1 | 3/2014 | Bae et al. |
| 2014/0082545 A1 | 3/2014 | Zhai et al. |
| 2014/0082715 A1 | 3/2014 | Grajek et al. |
| 2014/0086458 A1 | 3/2014 | Rogers |
| 2014/0087711 A1 | 3/2014 | Geyer et al. |
| 2014/0088952 A1 | 3/2014 | Fife et al. |
| 2014/0088961 A1 | 3/2014 | Woodward et al. |
| 2014/0088964 A1 | 3/2014 | Bellegarda |
| 2014/0088970 A1 | 3/2014 | Kang |
| 2014/0088989 A1 | 3/2014 | Krishnapuram et al. |
| 2014/0092007 A1 | 4/2014 | Kim et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0095432 A1 | 4/2014 | Trumbull et al. |
| 2014/0095601 A1 | 4/2014 | Abuelsaad et al. |
| 2014/0095965 A1 | 4/2014 | Li |
| 2014/0096077 A1 | 4/2014 | Jacob et al. |
| 2014/0096209 A1 | 4/2014 | Saraf et al. |
| 2014/0098247 A1 | 4/2014 | Rao et al. |
| 2014/0100847 A1 | 4/2014 | Ishii et al. |
| 2014/0101127 A1 | 4/2014 | Simhon et al. |
| 2014/0104175 A1 | 4/2014 | Ouyang et al. |
| 2014/0108017 A1 | 4/2014 | Mason et al. |
| 2014/0108357 A1 | 4/2014 | Procops et al. |
| 2014/0108391 A1 | 4/2014 | Volkert |
| 2014/0108792 A1 | 4/2014 | Borzycki et al. |
| 2014/0112556 A1 | 4/2014 | Kalinli-Akbacak |
| 2014/0114554 A1 | 4/2014 | Lagassey |
| 2014/0115062 A1 | 4/2014 | Liu et al. |
| 2014/0115114 A1 | 4/2014 | Garmark et al. |
| 2014/0118155 A1 | 5/2014 | Bowers et al. |
| 2014/0118624 A1 | 5/2014 | Jang et al. |
| 2014/0120961 A1 | 5/2014 | Buck |
| 2014/0122057 A1 | 5/2014 | Chelba et al. |
| 2014/0122059 A1 | 5/2014 | Patel et al. |
| 2014/0122085 A1 | 5/2014 | Piety et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0122589 A1 | 5/2014 | Fyke et al. |
| 2014/0123022 A1 | 5/2014 | Lee et al. |
| 2014/0128021 A1 | 5/2014 | Walker et al. |
| 2014/0129006 A1 | 5/2014 | Chen et al. |
| 2014/0129226 A1 | 5/2014 | Lee et al. |
| 2014/0132935 A1 | 5/2014 | Kim et al. |
| 2014/0134983 A1 | 5/2014 | Jung et al. |
| 2014/0135036 A1 | 5/2014 | Bonanni et al. |
| 2014/0136013 A1 | 5/2014 | Wolverton et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142934 A1 | 5/2014 | Kim |
| 2014/0142935 A1 | 5/2014 | Lindahl et al. |
| 2014/0142953 A1 | 5/2014 | Kim et al. |
| 2014/0143550 A1 | 5/2014 | Ganong, III et al. |
| 2014/0143721 A1 | 5/2014 | Suzuki et al. |
| 2014/0143784 A1 | 5/2014 | Mistry et al. |
| 2014/0146200 A1 | 5/2014 | Scott et al. |
| 2014/0148209 A1 | 5/2014 | Weng et al. |
| 2014/0149118 A1 | 5/2014 | Lee et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156268 A1 | 6/2014 | Arizmendi et al. |
| 2014/0156269 A1 | 6/2014 | Lee et al. |
| 2014/0156279 A1 | 6/2014 | Okamoto et al. |
| 2014/0156564 A1 | 6/2014 | Knight et al. |
| 2014/0157319 A1 | 6/2014 | Kimura et al. |
| 2014/0157422 A1 | 6/2014 | Livshits et al. |
| 2014/0160157 A1 | 6/2014 | Poulos et al. |
| 2014/0163751 A1 | 6/2014 | Davis et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163962 A1 | 6/2014 | Castelli et al. |
| 2014/0163976 A1 | 6/2014 | Park et al. |
| 2014/0163977 A1 | 6/2014 | Hoffmeister et al. |
| 2014/0163978 A1 | 6/2014 | Basye et al. |
| 2014/0163981 A1 | 6/2014 | Cook et al. |
| 2014/0163995 A1 | 6/2014 | Burns et al. |
| 2014/0164305 A1 | 6/2014 | Lynch et al. |
| 2014/0164312 A1 | 6/2014 | Lynch et al. |
| 2014/0164476 A1 | 6/2014 | Thomson |
| 2014/0164508 A1 | 6/2014 | Lynch et al. |
| 2014/0164532 A1 | 6/2014 | Lynch et al. |
| 2014/0164533 A1 | 6/2014 | Lynch et al. |
| 2014/0164953 A1 | 6/2014 | Lynch et al. |
| 2014/0165006 A1 | 6/2014 | Chaudhri et al. |
| 2014/0169795 A1 | 6/2014 | Clough |
| 2014/0171064 A1 | 6/2014 | Das |
| 2014/0172412 A1 | 6/2014 | Viegas et al. |
| 2014/0172878 A1 | 6/2014 | Clark et al. |
| 2014/0173445 A1 | 6/2014 | Grassiotto |
| 2014/0173460 A1 | 6/2014 | Kim |
| 2014/0176814 A1 | 6/2014 | Ahn |
| 2014/0179295 A1 | 6/2014 | Luebbers et al. |
| 2014/0180499 A1 | 6/2014 | Cooper et al. |
| 2014/0180689 A1 | 6/2014 | Kim |
| 2014/0180697 A1 | 6/2014 | Torok et al. |
| 2014/0181123 A1 | 6/2014 | Blaise et al. |
| 2014/0181703 A1 | 6/2014 | Sullivan et al. |
| 2014/0181715 A1 | 6/2014 | Axelrod et al. |
| 2014/0181741 A1 | 6/2014 | Apacible et al. |
| 2014/0181865 A1 | 6/2014 | Koganei |
| 2014/0188335 A1 | 7/2014 | Madhok et al. |
| 2014/0188460 A1 | 7/2014 | Ouyang et al. |
| 2014/0188477 A1 | 7/2014 | Zhang |
| 2014/0188478 A1 | 7/2014 | Zhang |
| 2014/0188485 A1 | 7/2014 | Kim et al. |
| 2014/0188835 A1 | 7/2014 | Zhang et al. |
| 2014/0195226 A1 | 7/2014 | Yun et al. |
| 2014/0195230 A1 | 7/2014 | Han et al. |
| 2014/0195233 A1 | 7/2014 | Bapat et al. |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0200891 A1 | 7/2014 | Larcheveque et al. |
| 2014/0201655 A1 | 7/2014 | Mahaffey et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207447 A1 | 7/2014 | Jiang et al. |
| 2014/0207466 A1 | 7/2014 | Smadi |
| 2014/0207468 A1 | 7/2014 | Bartnik |

(56)  References Cited

U.S. PATENT DOCUMENTS

| | | |
|---|---|---|
| 2014/0207582 A1 | 7/2014 | Flinn et al. |
| 2014/0211944 A1 | 7/2014 | Hayward et al. |
| 2014/0214429 A1 | 7/2014 | Pantel |
| 2014/0214537 A1 | 7/2014 | Yoo et al. |
| 2014/0215367 A1 | 7/2014 | Kim et al. |
| 2014/0215513 A1 | 7/2014 | Ramer et al. |
| 2014/0218372 A1 | 8/2014 | Missig et al. |
| 2014/0222422 A1 | 8/2014 | Sarikaya et al. |
| 2014/0222435 A1 | 8/2014 | Li et al. |
| 2014/0222436 A1 | 8/2014 | Binder et al. |
| 2014/0222678 A1 | 8/2014 | Sheets et al. |
| 2014/0222967 A1 | 8/2014 | Harrang et al. |
| 2014/0223377 A1 | 8/2014 | Shaw et al. |
| 2014/0223481 A1 | 8/2014 | Fundament |
| 2014/0226503 A1 | 8/2014 | Cooper et al. |
| 2014/0229158 A1 | 8/2014 | Zweig et al. |
| 2014/0229184 A1 | 8/2014 | Shires |
| 2014/0229847 A1 | 8/2014 | Park |
| 2014/0230055 A1 | 8/2014 | Boehl |
| 2014/0232570 A1 | 8/2014 | Skinder et al. |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0237366 A1 | 8/2014 | Poulos et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244270 A1 | 8/2014 | Han et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249812 A1 | 9/2014 | Bou-Ghazale et al. |
| 2014/0249816 A1 | 9/2014 | Pickering et al. |
| 2014/0249817 A1 | 9/2014 | Hart et al. |
| 2014/0249820 A1 | 9/2014 | Hsu et al. |
| 2014/0249821 A1 | 9/2014 | Kennewick et al. |
| 2014/0250046 A1 | 9/2014 | Winn et al. |
| 2014/0253455 A1 | 9/2014 | Mauro et al. |
| 2014/0257809 A1 | 9/2014 | Goel et al. |
| 2014/0257815 A1 | 9/2014 | Zhao et al. |
| 2014/0257902 A1 | 9/2014 | Moore et al. |
| 2014/0258324 A1 | 9/2014 | Mauro et al. |
| 2014/0258357 A1 | 9/2014 | Singh et al. |
| 2014/0258857 A1 | 9/2014 | Dykstra-Erickson et al. |
| 2014/0258905 A1 | 9/2014 | Lee et al. |
| 2014/0267022 A1 | 9/2014 | Kim |
| 2014/0267599 A1 | 9/2014 | Drouin et al. |
| 2014/0267933 A1 | 9/2014 | Young |
| 2014/0272821 A1 | 9/2014 | Pitschel et al. |
| 2014/0273974 A1 | 9/2014 | Varghese et al. |
| 2014/0273979 A1 | 9/2014 | Van Os et al. |
| 2014/0274005 A1 | 9/2014 | Luna et al. |
| 2014/0274203 A1 | 9/2014 | Ganong, III et al. |
| 2014/0274211 A1 | 9/2014 | Sejnoha et al. |
| 2014/0278051 A1 | 9/2014 | Mcgavran et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278426 A1 | 9/2014 | Jost et al. |
| 2014/0278429 A1 | 9/2014 | Ganong, III |
| 2014/0278435 A1 | 9/2014 | Ganong, III et al. |
| 2014/0278436 A1 | 9/2014 | Khanna et al. |
| 2014/0278438 A1 | 9/2014 | Hart et al. |
| 2014/0278443 A1 | 9/2014 | Gunn et al. |
| 2014/0278444 A1 | 9/2014 | Larson et al. |
| 2014/0278513 A1 | 9/2014 | Prakash et al. |
| 2014/0279622 A1 | 9/2014 | Lamoureux et al. |
| 2014/0279739 A1 | 9/2014 | Elkington et al. |
| 2014/0279787 A1 | 9/2014 | Cheng et al. |
| 2014/0280072 A1 | 9/2014 | Coleman |
| 2014/0280107 A1 | 9/2014 | Heymans et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0280757 A1 | 9/2014 | Tran |
| 2014/0281944 A1 | 9/2014 | Winer |
| 2014/0281983 A1 | 9/2014 | Xian et al. |
| 2014/0281997 A1 | 9/2014 | Fleizach et al. |
| 2014/0282003 A1 | 9/2014 | Gruber et al. |
| 2014/0282007 A1 | 9/2014 | Fleizach |
| 2014/0282016 A1 | 9/2014 | Hosier, Jr. |
| 2014/0282045 A1 | 9/2014 | Ayanam et al. |
| 2014/0282178 A1 | 9/2014 | Borzello et al. |
| 2014/0282201 A1 | 9/2014 | Pasquero et al. |
| 2014/0282203 A1 | 9/2014 | Pasquero et al. |
| 2014/0282559 A1 | 9/2014 | Verduzco et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0298395 A1 | 10/2014 | Yang et al. |
| 2014/0304086 A1 | 10/2014 | Dasdan et al. |
| 2014/0304605 A1 | 10/2014 | Ohmura et al. |
| 2014/0309990 A1 | 10/2014 | Gandrabur et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0310348 A1 | 10/2014 | Keskitalo et al. |
| 2014/0310365 A1 | 10/2014 | Sample et al. |
| 2014/0310595 A1 | 10/2014 | Acharya et al. |
| 2014/0313007 A1 | 10/2014 | Harding |
| 2014/0315492 A1 | 10/2014 | Woods |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0320398 A1 | 10/2014 | Papstein |
| 2014/0324429 A1 | 10/2014 | Weilhammer et al. |
| 2014/0324884 A1 | 10/2014 | Lindahl et al. |
| 2014/0330560 A1 | 11/2014 | Venkatesha et al. |
| 2014/0330569 A1 | 11/2014 | Kolavennu et al. |
| 2014/0330951 A1 | 11/2014 | Sukoff et al. |
| 2014/0335823 A1 | 11/2014 | Heredia et al. |
| 2014/0337037 A1 | 11/2014 | Chi |
| 2014/0337048 A1 | 11/2014 | Brown et al. |
| 2014/0337266 A1 | 11/2014 | Wolverton et al. |
| 2014/0337370 A1 | 11/2014 | Aravamudan et al. |
| 2014/0337371 A1 | 11/2014 | Li |
| 2014/0337438 A1 | 11/2014 | Govande et al. |
| 2014/0337621 A1 | 11/2014 | Nakhimov |
| 2014/0337751 A1 | 11/2014 | Lim et al. |
| 2014/0337814 A1 | 11/2014 | Kalns et al. |
| 2014/0341217 A1 | 11/2014 | Eisner et al. |
| 2014/0342762 A1 | 11/2014 | Hajdu et al. |
| 2014/0343834 A1 | 11/2014 | Demerchant et al. |
| 2014/0343943 A1 | 11/2014 | Al-Telmissani |
| 2014/0343946 A1 | 11/2014 | Torok et al. |
| 2014/0344205 A1 | 11/2014 | Luna et al. |
| 2014/0344627 A1 | 11/2014 | Schaub et al. |
| 2014/0344687 A1 | 11/2014 | Durham et al. |
| 2014/0347181 A1 | 11/2014 | Luna et al. |
| 2014/0350847 A1 | 11/2014 | Ichinokawa |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |

(56)        References Cited

U.S. PATENT DOCUMENTS

| | | | |
|---|---|---|---|
| 2014/0358521 A1 | 12/2014 | Mikutel et al. |
| 2014/0358523 A1 | 12/2014 | Sheth et al. |
| 2014/0358549 A1 | 12/2014 | O'Connor et al. |
| 2014/0359456 A1 | 12/2014 | Thiele et al. |
| 2014/0359637 A1 | 12/2014 | Yan |
| 2014/0359709 A1 | 12/2014 | Nassar et al. |
| 2014/0361973 A1 | 12/2014 | Raux et al. |
| 2014/0363074 A1 | 12/2014 | Dolfing et al. |
| 2014/0364149 A1 | 12/2014 | Marti et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365218 A1 | 12/2014 | Chang et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365505 A1 | 12/2014 | Clark et al. |
| 2014/0365880 A1 | 12/2014 | Bellegarda |
| 2014/0365885 A1 | 12/2014 | Carson et al. |
| 2014/0365895 A1 | 12/2014 | Magahern et al. |
| 2014/0365922 A1 | 12/2014 | Yang |
| 2014/0365945 A1 | 12/2014 | Karunamuni et al. |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372468 A1 | 12/2014 | Collins et al. |
| 2014/0372931 A1 | 12/2014 | Zhai et al. |
| 2014/0379326 A1 | 12/2014 | Sarikaya et al. |
| 2014/0379334 A1 | 12/2014 | Fry |
| 2014/0379338 A1 | 12/2014 | Fry |
| 2014/0379341 A1 | 12/2014 | Seo et al. |
| 2014/0379798 A1 | 12/2014 | Bunner et al. |
| 2014/0380214 A1 | 12/2014 | Huang et al. |
| 2014/0380285 A1 | 12/2014 | Gabel et al. |
| 2015/0003797 A1 | 1/2015 | Schmidt |
| 2015/0004958 A1 | 1/2015 | Wang et al. |
| 2015/0005009 A1 | 1/2015 | Tomkins et al. |
| 2015/0006147 A1 | 1/2015 | Schmidt |
| 2015/0006148 A1 | 1/2015 | Goldszmit et al. |
| 2015/0006157 A1 | 1/2015 | Silva et al. |
| 2015/0006167 A1 | 1/2015 | Kato et al. |
| 2015/0006176 A1 | 1/2015 | Pogue et al. |
| 2015/0006178 A1 | 1/2015 | Peng et al. |
| 2015/0006182 A1 | 1/2015 | Schmidt |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0012862 A1 | 1/2015 | Ikeda et al. |
| 2015/0019219 A1 | 1/2015 | Tzirkel-Hancock et al. |
| 2015/0019221 A1 | 1/2015 | Lee et al. |
| 2015/0019445 A1 | 1/2015 | Glass et al. |
| 2015/0019944 A1 | 1/2015 | Kalgi |
| 2015/0019954 A1 | 1/2015 | Dalal et al. |
| 2015/0019974 A1 | 1/2015 | Doi et al. |
| 2015/0025405 A1 | 1/2015 | Vairavan et al. |
| 2015/0025890 A1 | 1/2015 | Jagatheesan et al. |
| 2015/0026620 A1 | 1/2015 | Kwon et al. |
| 2015/0027178 A1 | 1/2015 | Scalisi |
| 2015/0031416 A1 | 1/2015 | Labowicz et al. |
| 2015/0032443 A1 | 1/2015 | Karov et al. |
| 2015/0032457 A1 | 1/2015 | Koo et al. |
| 2015/0033130 A1 | 1/2015 | Scheessele |
| 2015/0033219 A1 | 1/2015 | Breiner et al. |
| 2015/0033275 A1 | 1/2015 | Natani et al. |
| 2015/0034855 A1 | 2/2015 | Shen |
| 2015/0038161 A1 | 2/2015 | Jakobson et al. |
| 2015/0039292 A1 | 2/2015 | Suleman et al. |
| 2015/0039295 A1 | 2/2015 | Soschen |
| 2015/0039299 A1 | 2/2015 | Weinstein et al. |
| 2015/0039305 A1 | 2/2015 | Huang |
| 2015/0039606 A1 | 2/2015 | Salaka et al. |
| 2015/0040012 A1 | 2/2015 | Faaborg et al. |
| 2015/0042640 A1 | 2/2015 | Algreatly |
| 2015/0045003 A1 | 2/2015 | Vora et al. |
| 2015/0045007 A1 | 2/2015 | Cash |
| 2015/0045068 A1 | 2/2015 | Soffer et al. |
| 2015/0046375 A1 | 2/2015 | Mandel et al. |
| 2015/0046434 A1 | 2/2015 | Lim et al. |
| 2015/0046537 A1 | 2/2015 | Rakib |
| 2015/0046828 A1 | 2/2015 | Desai et al. |
| 2015/0049884 A1 | 2/2015 | Ye |
| 2015/0050633 A1 | 2/2015 | Christmas et al. |
| 2015/0050923 A1 | 2/2015 | Tu et al. |
| 2015/0051754 A1 | 2/2015 | Kwon et al. |
| 2015/0051901 A1 | 2/2015 | Stonehouse et al. |
| 2015/0052128 A1 | 2/2015 | Sharifi |
| 2015/0053779 A1 | 2/2015 | Adamek et al. |
| 2015/0053781 A1 | 2/2015 | Nelson et al. |
| 2015/0055879 A1 | 2/2015 | Yang |
| 2015/0058013 A1 | 2/2015 | Pakhomov et al. |
| 2015/0058018 A1 | 2/2015 | Georges et al. |
| 2015/0058720 A1 | 2/2015 | Smadja et al. |
| 2015/0058785 A1 | 2/2015 | Ookawara |
| 2015/0065149 A1 | 3/2015 | Russell et al. |
| 2015/0065200 A1 | 3/2015 | Namgung et al. |
| 2015/0066473 A1 | 3/2015 | Jeong et al. |
| 2015/0066479 A1 | 3/2015 | Pasupalak et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0066817 A1 | 3/2015 | Slayton et al. |
| 2015/0067485 A1 | 3/2015 | Kim et al. |
| 2015/0067819 A1 | 3/2015 | Shribman et al. |
| 2015/0067822 A1 | 3/2015 | Randall |
| 2015/0071121 A1 | 3/2015 | Patil et al. |
| 2015/0073788 A1 | 3/2015 | Sak et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0081295 A1 | 3/2015 | Yun et al. |
| 2015/0082180 A1 | 3/2015 | Ames et al. |
| 2015/0082229 A1 | 3/2015 | Ouyang et al. |
| 2015/0086174 A1 | 3/2015 | Abecassis et al. |
| 2015/0088511 A1 | 3/2015 | Bharadwaj et al. |
| 2015/0088514 A1 | 3/2015 | Typrin |
| 2015/0088518 A1 | 3/2015 | Kim et al. |
| 2015/0088522 A1 | 3/2015 | Hendrickson et al. |
| 2015/0088523 A1 | 3/2015 | Schuster |
| 2015/0088998 A1 | 3/2015 | Isensee et al. |
| 2015/0092520 A1 | 4/2015 | Robison et al. |
| 2015/0094834 A1 | 4/2015 | Vega et al. |
| 2015/0095026 A1 | 4/2015 | Bisani et al. |
| 2015/0095031 A1 | 4/2015 | Conkie et al. |
| 2015/0095159 A1 | 4/2015 | Kennewick et al. |
| 2015/0095268 A1 | 4/2015 | Greenzeiger et al. |
| 2015/0095278 A1 | 4/2015 | Flinn et al. |
| 2015/0095310 A1 | 4/2015 | Beaurepaire |
| 2015/0100144 A1 | 4/2015 | Lee et al. |
| 2015/0100313 A1 | 4/2015 | Sharma |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106061 A1 | 4/2015 | Yang et al. |
| 2015/0106085 A1 | 4/2015 | Lindahl |
| 2015/0106093 A1 | 4/2015 | Weeks et al. |
| 2015/0106096 A1 | 4/2015 | Toopran et al. |
| 2015/0106737 A1 | 4/2015 | Montoy-Wilson et al. |
| 2015/0112684 A1 | 4/2015 | Scheffer et al. |
| 2015/0113407 A1 | 4/2015 | Hoffert et al. |
| 2015/0113435 A1 | 4/2015 | Phillips |
| 2015/0113454 A1 | 4/2015 | McLaughlin |
| 2015/0120296 A1 | 4/2015 | Stern et al. |
| 2015/0120641 A1 | 4/2015 | Soon-Shiong et al. |
| 2015/0120723 A1 | 4/2015 | Deshmukh et al. |
| 2015/0121216 A1 | 4/2015 | Brown et al. |
| 2015/0121227 A1 | 4/2015 | Peng |
| 2015/0123898 A1 | 5/2015 | Kim et al. |
| 2015/0127336 A1 | 5/2015 | Lei et al. |
| 2015/0127337 A1 | 5/2015 | Heigold et al. |
| 2015/0127348 A1 | 5/2015 | Follis |
| 2015/0127350 A1 | 5/2015 | Agiomyrgiannakis |
| 2015/0128058 A1 | 5/2015 | Anajwala |

(56) References Cited

U.S. PATENT DOCUMENTS

| | | | |
|---|---|---|---|
| 2015/0130716 A1 | 5/2015 | Sridharan et al. | |
| 2015/0133049 A1 | 5/2015 | Lee et al. | |
| 2015/0133109 A1 | 5/2015 | Freeman et al. | |
| 2015/0134318 A1 | 5/2015 | Cuthbert et al. | |
| 2015/0134322 A1 | 5/2015 | Cuthbert et al. | |
| 2015/0134323 A1* | 5/2015 | Cuthbert | G06V 20/20 |
| | | | 704/3 |
| 2015/0134334 A1 | 5/2015 | Sachidanandam et al. | |
| 2015/0135085 A1 | 5/2015 | Shoham et al. | |
| 2015/0135123 A1 | 5/2015 | Carr et al. | |
| 2015/0140934 A1 | 5/2015 | Abdurrahman et al. | |
| 2015/0140990 A1 | 5/2015 | Kim et al. | |
| 2015/0141150 A1 | 5/2015 | Zha | |
| 2015/0142420 A1 | 5/2015 | Sarikaya et al. | |
| 2015/0142438 A1 | 5/2015 | Dai et al. | |
| 2015/0142440 A1 | 5/2015 | Parkinson et al. | |
| 2015/0142447 A1 | 5/2015 | Kennewick et al. | |
| 2015/0142851 A1 | 5/2015 | Gupta et al. | |
| 2015/0143419 A1 | 5/2015 | Bhagwat et al. | |
| 2015/0148013 A1 | 5/2015 | Baldwin et al. | |
| 2015/0149146 A1 | 5/2015 | Abramovitz et al. | |
| 2015/0149177 A1 | 5/2015 | Kalns et al. | |
| 2015/0149182 A1 | 5/2015 | Kalns et al. | |
| 2015/0149354 A1 | 5/2015 | McCoy | |
| 2015/0149469 A1 | 5/2015 | Xu et al. | |
| 2015/0149899 A1 | 5/2015 | Bernstein et al. | |
| 2015/0149964 A1 | 5/2015 | Bernstein et al. | |
| 2015/0154001 A1 | 6/2015 | Knox et al. | |
| 2015/0154185 A1 | 6/2015 | Waibel | |
| 2015/0154976 A1 | 6/2015 | Mutagi | |
| 2015/0160635 A1 | 6/2015 | Schofield et al. | |
| 2015/0160855 A1 | 6/2015 | Bi | |
| 2015/0161108 A1 | 6/2015 | Back | |
| 2015/0161291 A1 | 6/2015 | Gur et al. | |
| 2015/0161370 A1 | 6/2015 | North et al. | |
| 2015/0161521 A1 | 6/2015 | Shah et al. | |
| 2015/0161989 A1 | 6/2015 | Hsu et al. | |
| 2015/0161997 A1 | 6/2015 | Wetsel et al. | |
| 2015/0162000 A1 | 6/2015 | Di Censo et al. | |
| 2015/0162001 A1 | 6/2015 | Kar et al. | |
| 2015/0162006 A1 | 6/2015 | Kummer | |
| 2015/0163558 A1 | 6/2015 | Wheatley | |
| 2015/0169081 A1 | 6/2015 | Neels et al. | |
| 2015/0169195 A1 | 6/2015 | Choi | |
| 2015/0169284 A1 | 6/2015 | Quast et al. | |
| 2015/0169336 A1 | 6/2015 | Harper et al. | |
| 2015/0169696 A1 | 6/2015 | Krishnappa et al. | |
| 2015/0170073 A1 | 6/2015 | Baker | |
| 2015/0170664 A1 | 6/2015 | Doherty et al. | |
| 2015/0172262 A1 | 6/2015 | Ortiz, Jr. et al. | |
| 2015/0172463 A1 | 6/2015 | Quast et al. | |
| 2015/0177945 A1 | 6/2015 | Sengupta et al. | |
| 2015/0178388 A1 | 6/2015 | Winnemoeller et al. | |
| 2015/0178785 A1 | 6/2015 | Salonen | |
| 2015/0179168 A1 | 6/2015 | Hakkani-Tur et al. | |
| 2015/0179176 A1 | 6/2015 | Ryu et al. | |
| 2015/0181285 A1 | 6/2015 | Zhang et al. | |
| 2015/0185718 A1 | 7/2015 | Tappan et al. | |
| 2015/0185964 A1 | 7/2015 | Stout | |
| 2015/0185993 A1 | 7/2015 | Wheatley et al. | |
| 2015/0185996 A1 | 7/2015 | Brown et al. | |
| 2015/0186012 A1 | 7/2015 | Coleman et al. | |
| 2015/0186110 A1 | 7/2015 | Kannan | |
| 2015/0186154 A1 | 7/2015 | Brown et al. | |
| 2015/0186155 A1 | 7/2015 | Brown et al. | |
| 2015/0186156 A1 | 7/2015 | Brown et al. | |
| 2015/0186351 A1 | 7/2015 | Hicks et al. | |
| 2015/0186538 A1 | 7/2015 | Yan et al. | |
| 2015/0186783 A1 | 7/2015 | Byrne et al. | |
| 2015/0186892 A1 | 7/2015 | Zhang et al. | |
| 2015/0187355 A1 | 7/2015 | Parkinson et al. | |
| 2015/0187369 A1 | 7/2015 | Dadu et al. | |
| 2015/0189362 A1 | 7/2015 | Lee et al. | |
| 2015/0193379 A1 | 7/2015 | Mehta | |
| 2015/0193391 A1 | 7/2015 | Khvostichenko et al. | |
| 2015/0193392 A1 | 7/2015 | Greenblatt et al. | |
| 2015/0194152 A1 | 7/2015 | Katuri et al. | |
| 2015/0194165 A1 | 7/2015 | Faaborg et al. | |
| 2015/0194187 A1 | 7/2015 | Cleven et al. | |
| 2015/0195379 A1 | 7/2015 | Zhang et al. | |
| 2015/0195606 A1 | 7/2015 | McDevitt | |
| 2015/0199077 A1 | 7/2015 | Zuger et al. | |
| 2015/0199960 A1 | 7/2015 | Huo et al. | |
| 2015/0199965 A1 | 7/2015 | Leak et al. | |
| 2015/0199967 A1 | 7/2015 | Reddy et al. | |
| 2015/0200879 A1 | 7/2015 | Wu et al. | |
| 2015/0201064 A1 | 7/2015 | Bells et al. | |
| 2015/0201077 A1 | 7/2015 | Konig et al. | |
| 2015/0205425 A1 | 7/2015 | Kuscher et al. | |
| 2015/0205568 A1 | 7/2015 | Matsuoka | |
| 2015/0205632 A1 | 7/2015 | Gaster | |
| 2015/0205858 A1 | 7/2015 | Xie et al. | |
| 2015/0206529 A1 | 7/2015 | Kwon et al. | |
| 2015/0208226 A1 | 7/2015 | Kuusilinna et al. | |
| 2015/0212791 A1 | 7/2015 | Kumar et al. | |
| 2015/0213140 A1 | 7/2015 | Volkert | |
| 2015/0213796 A1 | 7/2015 | Waltermann et al. | |
| 2015/0215258 A1 | 7/2015 | Nowakowski et al. | |
| 2015/0215350 A1 | 7/2015 | Slayton et al. | |
| 2015/0217870 A1 | 8/2015 | Mccullough et al. | |
| 2015/0220264 A1 | 8/2015 | Lewis et al. | |
| 2015/0220507 A1 | 8/2015 | Mohajer et al. | |
| 2015/0220715 A1 | 8/2015 | Kim et al. | |
| 2015/0220972 A1 | 8/2015 | Subramanya et al. | |
| 2015/0221302 A1 | 8/2015 | Han et al. | |
| 2015/0221304 A1 | 8/2015 | Stewart | |
| 2015/0221307 A1 | 8/2015 | Shah et al. | |
| 2015/0222586 A1 | 8/2015 | Ebersman et al. | |
| 2015/0224848 A1 | 8/2015 | Eisenhour | |
| 2015/0227505 A1 | 8/2015 | Morimoto | |
| 2015/0227633 A1 | 8/2015 | Shapira | |
| 2015/0228274 A1 | 8/2015 | Leppanen et al. | |
| 2015/0228275 A1 | 8/2015 | Watanabe et al. | |
| 2015/0228281 A1 | 8/2015 | Raniere | |
| 2015/0228282 A1 | 8/2015 | Evrard | |
| 2015/0228283 A1 | 8/2015 | Ehsani et al. | |
| 2015/0228292 A1 | 8/2015 | Goldstein et al. | |
| 2015/0230095 A1 | 8/2015 | Smith et al. | |
| 2015/0234556 A1 | 8/2015 | Shaofeng et al. | |
| 2015/0234636 A1 | 8/2015 | Barnes, Jr. | |
| 2015/0234800 A1 | 8/2015 | Patrick et al. | |
| 2015/0235434 A1 | 8/2015 | Miller et al. | |
| 2015/0235540 A1 | 8/2015 | Verna et al. | |
| 2015/0237301 A1 | 8/2015 | Shi et al. | |
| 2015/0242091 A1 | 8/2015 | Lu et al. | |
| 2015/0242385 A1 | 8/2015 | Bao et al. | |
| 2015/0243278 A1 | 8/2015 | Kibre et al. | |
| 2015/0243279 A1 | 8/2015 | Morse et al. | |
| 2015/0243283 A1 | 8/2015 | Halash et al. | |
| 2015/0244665 A1 | 8/2015 | Choi et al. | |
| 2015/0245154 A1 | 8/2015 | Dadu et al. | |
| 2015/0248494 A1 | 9/2015 | Mital | |
| 2015/0248651 A1 | 9/2015 | Akutagawa et al. | |
| 2015/0248886 A1 | 9/2015 | Sarikaya et al. | |
| 2015/0249664 A1 | 9/2015 | Talhami et al. | |
| 2015/0249715 A1 | 9/2015 | Helvik et al. | |
| 2015/0253146 A1 | 9/2015 | Annapureddy et al. | |
| 2015/0253885 A1 | 9/2015 | Kagan et al. | |
| 2015/0254057 A1 | 9/2015 | Klein et al. | |
| 2015/0254058 A1 | 9/2015 | Klein et al. | |
| 2015/0254333 A1 | 9/2015 | Fife et al. | |
| 2015/0255068 A1 | 9/2015 | Kim et al. | |
| 2015/0255071 A1 | 9/2015 | Chiba | |
| 2015/0256873 A1 | 9/2015 | Klein et al. | |
| 2015/0261298 A1 | 9/2015 | Li | |
| 2015/0261496 A1 | 9/2015 | Faaborg et al. | |
| 2015/0261850 A1 | 9/2015 | Mittal | |
| 2015/0261944 A1 | 9/2015 | Hosom et al. | |
| 2015/0262443 A1 | 9/2015 | Chong | |
| 2015/0262573 A1 | 9/2015 | Brooks et al. | |
| 2015/0262583 A1 | 9/2015 | Kanda et al. | |
| 2015/0269139 A1 | 9/2015 | McAteer et al. | |
| 2015/0269420 A1 | 9/2015 | Kim et al. | |
| 2015/0269617 A1 | 9/2015 | Mikurak | |

(56)  References Cited

U.S. PATENT DOCUMENTS

| | | |
|---|---|---|
| 2015/0269677 A1 | 9/2015 | Milne |
| 2015/0269943 A1 | 9/2015 | VanBlon et al. |
| 2015/0277574 A1 | 10/2015 | Jain et al. |
| 2015/0278199 A1 | 10/2015 | Hazen et al. |
| 2015/0278348 A1 | 10/2015 | Paruchuri et al. |
| 2015/0278370 A1 | 10/2015 | Stratvert et al. |
| 2015/0278737 A1 | 10/2015 | Huebscher et al. |
| 2015/0279354 A1 | 10/2015 | Gruenstein et al. |
| 2015/0279358 A1 | 10/2015 | Kingsbury et al. |
| 2015/0279360 A1 | 10/2015 | Mengibar et al. |
| 2015/0279366 A1 | 10/2015 | Krestnikov et al. |
| 2015/0281380 A1 | 10/2015 | Wang et al. |
| 2015/0281401 A1 | 10/2015 | Le et al. |
| 2015/0286627 A1 | 10/2015 | Chang et al. |
| 2015/0286710 A1 | 10/2015 | Chang et al. |
| 2015/0286716 A1 | 10/2015 | Snibbe et al. |
| 2015/0286937 A1 | 10/2015 | Hildebrand |
| 2015/0287401 A1 | 10/2015 | Lee et al. |
| 2015/0287408 A1 | 10/2015 | Svendsen et al. |
| 2015/0287409 A1 | 10/2015 | Jang |
| 2015/0287411 A1 | 10/2015 | Kojima et al. |
| 2015/0288629 A1 | 10/2015 | Choi et al. |
| 2015/0293602 A1 | 10/2015 | Kay et al. |
| 2015/0294086 A1 | 10/2015 | Kare et al. |
| 2015/0294377 A1 | 10/2015 | Chow |
| 2015/0294516 A1 | 10/2015 | Chiang |
| 2015/0294670 A1 | 10/2015 | Roblek et al. |
| 2015/0295915 A1 | 10/2015 | Xiu |
| 2015/0296065 A1 | 10/2015 | Narita et al. |
| 2015/0301796 A1 | 10/2015 | Visser et al. |
| 2015/0302316 A1 | 10/2015 | Buryak et al. |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0302870 A1 | 10/2015 | Burke et al. |
| 2015/0308470 A1 | 10/2015 | Graham et al. |
| 2015/0309691 A1 | 10/2015 | Seo et al. |
| 2015/0309997 A1 | 10/2015 | Lee et al. |
| 2015/0310114 A1 | 10/2015 | Ryger et al. |
| 2015/0310852 A1 | 10/2015 | Spizzo et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0310888 A1 | 10/2015 | Chen |
| 2015/0312182 A1 | 10/2015 | Langholz |
| 2015/0312409 A1 | 10/2015 | Czarnecki et al. |
| 2015/0314454 A1 | 11/2015 | Breazeal et al. |
| 2015/0317069 A1 | 11/2015 | Clements et al. |
| 2015/0317310 A1 | 11/2015 | Eiche et al. |
| 2015/0319264 A1 | 11/2015 | Allen et al. |
| 2015/0319411 A1 | 11/2015 | Kasmir et al. |
| 2015/0324041 A1 | 11/2015 | Varley et al. |
| 2015/0324334 A1 | 11/2015 | Lee et al. |
| 2015/0324362 A1 | 11/2015 | Glass et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0334346 A1 | 11/2015 | Cheatham, III et al. |
| 2015/0339049 A1 | 11/2015 | Kasemset et al. |
| 2015/0339391 A1 | 11/2015 | Kang et al. |
| 2015/0340033 A1 | 11/2015 | Di Fabbrizio et al. |
| 2015/0340034 A1 | 11/2015 | Schalkwyk et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0346845 A1 | 12/2015 | Di Censo et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347383 A1 | 12/2015 | Willmore et al. |
| 2015/0347385 A1 | 12/2015 | Flor et al. |
| 2015/0347393 A1 | 12/2015 | Futrell et al. |
| 2015/0347552 A1 | 12/2015 | Habouzit et al. |
| 2015/0347733 A1 | 12/2015 | Tsou et al. |
| 2015/0347985 A1 | 12/2015 | Gross et al. |
| 2015/0348533 A1 | 12/2015 | Saddler et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0348555 A1 | 12/2015 | Sugita |
| 2015/0348565 A1 | 12/2015 | Rhoten et al. |
| 2015/0349934 A1 | 12/2015 | Pollack et al. |
| 2015/0350031 A1 | 12/2015 | Burks et al. |
| 2015/0350147 A1 | 12/2015 | Shepherd et al. |
| 2015/0350342 A1 | 12/2015 | Thorpe et al. |
| 2015/0350594 A1 | 12/2015 | Mate et al. |
| 2015/0352999 A1 | 12/2015 | Bando et al. |
| 2015/0355879 A1 | 12/2015 | Beckhardt et al. |
| 2015/0356410 A1 | 12/2015 | Faith et al. |
| 2015/0363587 A1 | 12/2015 | Ahn et al. |
| 2015/0364128 A1 | 12/2015 | Zhao et al. |
| 2015/0364140 A1 | 12/2015 | Thorn |
| 2015/0365251 A1 | 12/2015 | Kinoshita et al. |
| 2015/0370455 A1 | 12/2015 | Van Os et al. |
| 2015/0370531 A1 | 12/2015 | Faaborg |
| 2015/0370780 A1 | 12/2015 | Wang et al. |
| 2015/0370787 A1 | 12/2015 | Akbacak et al. |
| 2015/0370884 A1 | 12/2015 | Hurley et al. |
| 2015/0371215 A1 | 12/2015 | Zhou et al. |
| 2015/0371529 A1 | 12/2015 | Dolecki |
| 2015/0371639 A1 | 12/2015 | Foerster et al. |
| 2015/0371663 A1 | 12/2015 | Gustafson et al. |
| 2015/0371664 A1 | 12/2015 | Bar-Or et al. |
| 2015/0371665 A1 | 12/2015 | Naik et al. |
| 2015/0373183 A1 | 12/2015 | Woolsey et al. |
| 2015/0373428 A1 | 12/2015 | Trollope et al. |
| 2015/0379118 A1 | 12/2015 | Wickenkamp et al. |
| 2015/0379414 A1 | 12/2015 | Yeh et al. |
| 2015/0379993 A1 | 12/2015 | Subhojit et al. |
| 2015/0381923 A1 | 12/2015 | Wickenkamp et al. |
| 2015/0382047 A1 | 12/2015 | Van Os et al. |
| 2015/0382079 A1 | 12/2015 | Lister et al. |
| 2015/0382147 A1 | 12/2015 | Clark et al. |
| 2015/0382322 A1 | 12/2015 | Migicovsky et al. |
| 2016/0004499 A1 | 1/2016 | Kim et al. |
| 2016/0004690 A1 | 1/2016 | Bangalore et al. |
| 2016/0005320 A1 | 1/2016 | DeCharms et al. |
| 2016/0006795 A1 | 1/2016 | Yunten |
| 2016/0012038 A1 | 1/2016 | Edwards et al. |
| 2016/0014476 A1 | 1/2016 | Caliendo, Jr. et al. |
| 2016/0018872 A1 | 1/2016 | Tu et al. |
| 2016/0018899 A1 | 1/2016 | Tu et al. |
| 2016/0018900 A1 | 1/2016 | Tu et al. |
| 2016/0018959 A1 | 1/2016 | Yamashita et al. |
| 2016/0019886 A1 | 1/2016 | Hong |
| 2016/0019896 A1 | 1/2016 | Guevara et al. |
| 2016/0021414 A1 | 1/2016 | Padi et al. |
| 2016/0026242 A1 | 1/2016 | Burns et al. |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0028802 A1 | 1/2016 | Balasingh et al. |
| 2016/0029316 A1 | 1/2016 | Mohan et al. |
| 2016/0034042 A1 | 2/2016 | Joo |
| 2016/0034447 A1 | 2/2016 | Shin et al. |
| 2016/0034811 A1 | 2/2016 | Paulik et al. |
| 2016/0036750 A1 | 2/2016 | Yuan et al. |
| 2016/0036953 A1 | 2/2016 | Lee et al. |
| 2016/0041733 A1 | 2/2016 | Qian et al. |
| 2016/0041809 A1 | 2/2016 | Clayton et al. |
| 2016/0042735 A1 | 2/2016 | Vibbert et al. |
| 2016/0042748 A1 | 2/2016 | Jain et al. |
| 2016/0043905 A1 | 2/2016 | Fiedler |
| 2016/0048666 A1 | 2/2016 | Dey et al. |
| 2016/0050254 A1 | 2/2016 | Rao et al. |
| 2016/0055422 A1 | 2/2016 | Li |
| 2016/0057203 A1 | 2/2016 | Gardenfors et al. |
| 2016/0057475 A1 | 2/2016 | Liu |
| 2016/0061623 A1 | 3/2016 | Pahwa et al. |
| 2016/0062459 A1 | 3/2016 | Publicover et al. |
| 2016/0062605 A1 | 3/2016 | Agarwal et al. |
| 2016/0063094 A1 | 3/2016 | Udupa et al. |

(56)            References Cited

U.S. PATENT DOCUMENTS

| | | |
|---|---|---|
| 2016/0063095 A1 | 3/2016 | Nassar et al. |
| 2016/0063998 A1 | 3/2016 | Krishnamoorthy et al. |
| 2016/0065155 A1 | 3/2016 | Bharj et al. |
| 2016/0065519 A1* | 3/2016 | Waltermann .......... H04L 51/216 |
| | | 709/206 |
| 2016/0065626 A1 | 3/2016 | Jain et al. |
| 2016/0066020 A1 | 3/2016 | Mountain |
| 2016/0066360 A1 | 3/2016 | Vinegrad et al. |
| 2016/0070581 A1 | 3/2016 | Soon-Shiong |
| 2016/0071516 A1 | 3/2016 | Lee et al. |
| 2016/0071517 A1 | 3/2016 | Beaver et al. |
| 2016/0071520 A1 | 3/2016 | Hayakawa |
| 2016/0071521 A1 | 3/2016 | Haughay |
| 2016/0072940 A1 | 3/2016 | Cronin |
| 2016/0077794 A1 | 3/2016 | Kim et al. |
| 2016/0078359 A1 | 3/2016 | Csurka et al. |
| 2016/0078860 A1 | 3/2016 | Paulik et al. |
| 2016/0080165 A1 | 3/2016 | Ehsani et al. |
| 2016/0080475 A1 | 3/2016 | Singh et al. |
| 2016/0085295 A1 | 3/2016 | Shimy et al. |
| 2016/0085827 A1 | 3/2016 | Chadha et al. |
| 2016/0086116 A1 | 3/2016 | Rao et al. |
| 2016/0086599 A1 | 3/2016 | Kurata et al. |
| 2016/0088335 A1 | 3/2016 | Zucchetta |
| 2016/0091871 A1 | 3/2016 | Marti et al. |
| 2016/0091967 A1 | 3/2016 | Prokofieva et al. |
| 2016/0092046 A1 | 3/2016 | Hong et al. |
| 2016/0092074 A1 | 3/2016 | Raux et al. |
| 2016/0092434 A1 | 3/2016 | Bellegarda |
| 2016/0092447 A1 | 3/2016 | Pathurudeen et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094700 A1 | 3/2016 | Lee et al. |
| 2016/0094889 A1 | 3/2016 | Venkataraman et al. |
| 2016/0094979 A1 | 3/2016 | Naik et al. |
| 2016/0098991 A1 | 4/2016 | Luo et al. |
| 2016/0098992 A1 | 4/2016 | Renard et al. |
| 2016/0099892 A1 | 4/2016 | Palakovich et al. |
| 2016/0099984 A1 | 4/2016 | Karagiannis et al. |
| 2016/0104480 A1 | 4/2016 | Sharifi |
| 2016/0104486 A1 | 4/2016 | Penilla et al. |
| 2016/0105308 A1 | 4/2016 | Dutt |
| 2016/0111091 A1 | 4/2016 | Bakish |
| 2016/0112746 A1 | 4/2016 | Zhang et al. |
| 2016/0112792 A1 | 4/2016 | Lee et al. |
| 2016/0116980 A1 | 4/2016 | George-Svahn et al. |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132046 A1 | 5/2016 | Beoughter et al. |
| 2016/0132290 A1 | 5/2016 | Raux |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140113 A1* | 5/2016 | Shen .................. H04N 21/4884 |
| | | 704/3 |
| 2016/0140951 A1 | 5/2016 | Agiomyrgiannakis et al. |
| 2016/0140962 A1 | 5/2016 | Sharifi |
| 2016/0147725 A1 | 5/2016 | Patten et al. |
| 2016/0147739 A1 | 5/2016 | Lim et al. |
| 2016/0148610 A1 | 5/2016 | Kennewick, Jr. et al. |
| 2016/0148612 A1 | 5/2016 | Guo et al. |
| 2016/0148613 A1 | 5/2016 | Kwon et al. |
| 2016/0149966 A1 | 5/2016 | Remash et al. |
| 2016/0150020 A1 | 5/2016 | Farmer et al. |
| 2016/0151668 A1 | 6/2016 | Barnes et al. |
| 2016/0154624 A1 | 6/2016 | Son et al. |
| 2016/0154792 A1 | 6/2016 | Sarikaya et al. |
| 2016/0154880 A1 | 6/2016 | Hoarty |
| 2016/0155442 A1 | 6/2016 | Kannan et al. |
| 2016/0155443 A1 | 6/2016 | Khan et al. |
| 2016/0156574 A1 | 6/2016 | Hum et al. |
| 2016/0156990 A1 | 6/2016 | Miccoy et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0169267 A1 | 6/2016 | Pool |
| 2016/0170710 A1 | 6/2016 | Kim et al. |
| 2016/0170966 A1 | 6/2016 | Kolo |
| 2016/0171980 A1 | 6/2016 | Liddell et al. |
| 2016/0173578 A1 | 6/2016 | Sharma et al. |
| 2016/0173617 A1 | 6/2016 | Allinson |
| 2016/0173929 A1 | 6/2016 | Klappert |
| 2016/0173960 A1 | 6/2016 | Snibbe et al. |
| 2016/0179462 A1 | 6/2016 | Bjorkengren |
| 2016/0179464 A1 | 6/2016 | Reddy et al. |
| 2016/0179787 A1 | 6/2016 | Deleeuw |
| 2016/0180840 A1 | 6/2016 | Siddiq et al. |
| 2016/0180844 A1 | 6/2016 | Vanblon et al. |
| 2016/0182410 A1 | 6/2016 | Janakiraman et al. |
| 2016/0182709 A1* | 6/2016 | Kim ........................ H04W 4/14 |
| | | 455/466 |
| 2016/0188181 A1 | 6/2016 | Smith |
| 2016/0188738 A1 | 6/2016 | Gruber et al. |
| 2016/0189198 A1 | 6/2016 | Daniel et al. |
| 2016/0189715 A1 | 6/2016 | Nishikawa |
| 2016/0189717 A1 | 6/2016 | Kannan et al. |
| 2016/0195924 A1 | 7/2016 | Weber et al. |
| 2016/0196110 A1 | 7/2016 | Yehoshua et al. |
| 2016/0198319 A1 | 7/2016 | Huang et al. |
| 2016/0202957 A1 | 7/2016 | Siddall et al. |
| 2016/0203002 A1 | 7/2016 | Kannan et al. |
| 2016/0203193 A1 | 7/2016 | Kevin et al. |
| 2016/0210551 A1 | 7/2016 | Lee et al. |
| 2016/0210981 A1 | 7/2016 | Lee |
| 2016/0212206 A1 | 7/2016 | Wu et al. |
| 2016/0212208 A1 | 7/2016 | Kulkarni et al. |
| 2016/0212488 A1 | 7/2016 | Os et al. |
| 2016/0217784 A1 | 7/2016 | Gelfenbeyn et al. |
| 2016/0217794 A1 | 7/2016 | Imoto et al. |
| 2016/0224540 A1 | 8/2016 | Stewart et al. |
| 2016/0224559 A1 | 8/2016 | Hicks et al. |
| 2016/0224774 A1 | 8/2016 | Pender |
| 2016/0225372 A1 | 8/2016 | Cheung et al. |
| 2016/0226956 A1 | 8/2016 | Hong et al. |
| 2016/0227107 A1 | 8/2016 | Beaumont |
| 2016/0227633 A1 | 8/2016 | Sun et al. |
| 2016/0232500 A1 | 8/2016 | Wang et al. |
| 2016/0234206 A1 | 8/2016 | Tunnell et al. |
| 2016/0239480 A1 | 8/2016 | Larcheveque et al. |
| 2016/0239568 A1 | 8/2016 | Packer et al. |
| 2016/0239645 A1 | 8/2016 | Heo et al. |
| 2016/0239848 A1 | 8/2016 | Chang et al. |
| 2016/0240187 A1 | 8/2016 | Fleizach et al. |
| 2016/0240189 A1 | 8/2016 | Lee et al. |
| 2016/0240192 A1 | 8/2016 | Raghuvir |
| 2016/0242148 A1 | 8/2016 | Reed |
| 2016/0247061 A1 | 8/2016 | Trask et al. |
| 2016/0249319 A1 | 8/2016 | Dotan-Cohen et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labsky et al. |
| 2016/0260130 A1* | 9/2016 | Chand ................. G06F 16/5854 |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0262442 A1 | 9/2016 | Davila et al. |
| 2016/0266871 A1 | 9/2016 | Schmid et al. |
| 2016/0267904 A1 | 9/2016 | Biadsy et al. |
| 2016/0269540 A1 | 9/2016 | Butcher et al. |
| 2016/0274938 A1 | 9/2016 | Strinati et al. |
| 2016/0275941 A1 | 9/2016 | Bellegarda et al. |
| 2016/0275947 A1 | 9/2016 | Li et al. |
| 2016/0282824 A1 | 9/2016 | Smallwood et al. |
| 2016/0282956 A1 | 9/2016 | Ouyang et al. |

(56) References Cited

U.S. PATENT DOCUMENTS

| | | | |
|---|---|---|---|
| 2016/0283055 A1 | 9/2016 | Haghighat et al. | |
| 2016/0283185 A1 | 9/2016 | Mclaren et al. | |
| 2016/0284005 A1 | 9/2016 | Daniel et al. | |
| 2016/0284199 A1 | 9/2016 | Dotan-Cohen et al. | |
| 2016/0284340 A1 | 9/2016 | Li et al. | |
| 2016/0285808 A1 | 9/2016 | Franklin et al. | |
| 2016/0286045 A1 | 9/2016 | Shaltiel et al. | |
| 2016/0291831 A1 | 10/2016 | Baek | |
| 2016/0292603 A1 | 10/2016 | Prajapati et al. | |
| 2016/0293157 A1 | 10/2016 | Chen et al. | |
| 2016/0293167 A1 | 10/2016 | Chen et al. | |
| 2016/0293168 A1 | 10/2016 | Chen | |
| 2016/0294755 A1 | 10/2016 | Prabhu | |
| 2016/0294813 A1 | 10/2016 | Zou | |
| 2016/0299685 A1 | 10/2016 | Zhai et al. | |
| 2016/0299882 A1 | 10/2016 | Hegerty et al. | |
| 2016/0299883 A1 | 10/2016 | Zhu et al. | |
| 2016/0299977 A1 | 10/2016 | Hreha | |
| 2016/0300571 A1 | 10/2016 | Foerster et al. | |
| 2016/0301639 A1* | 10/2016 | Liu | H04L 51/52 |
| 2016/0306683 A1 | 10/2016 | Standley et al. | |
| 2016/0307566 A1 | 10/2016 | Bellegarda | |
| 2016/0308799 A1 | 10/2016 | Schubert et al. | |
| 2016/0309035 A1 | 10/2016 | Li | |
| 2016/0313906 A1 | 10/2016 | Kilchenko et al. | |
| 2016/0314788 A1 | 10/2016 | Jitkoff et al. | |
| 2016/0314789 A1 | 10/2016 | Marcheret et al. | |
| 2016/0314792 A1 | 10/2016 | Alvarez et al. | |
| 2016/0315996 A1 | 10/2016 | Ha et al. | |
| 2016/0316349 A1 | 10/2016 | Lee et al. | |
| 2016/0317924 A1 | 11/2016 | Tanaka et al. | |
| 2016/0320838 A1 | 11/2016 | Teller et al. | |
| 2016/0321239 A1 | 11/2016 | Iso-Sipila et al. | |
| 2016/0321243 A1 | 11/2016 | Walia et al. | |
| 2016/0321261 A1 | 11/2016 | Spasojevic et al. | |
| 2016/0321358 A1 | 11/2016 | Kanani et al. | |
| 2016/0322043 A1 | 11/2016 | Bellegarda | |
| 2016/0322044 A1 | 11/2016 | Jung et al. | |
| 2016/0322045 A1 | 11/2016 | Hatfield et al. | |
| 2016/0322048 A1 | 11/2016 | Amano et al. | |
| 2016/0322050 A1 | 11/2016 | Wang et al. | |
| 2016/0322055 A1 | 11/2016 | Sainath et al. | |
| 2016/0328134 A1 | 11/2016 | Xu | |
| 2016/0328147 A1 | 11/2016 | Zhang et al. | |
| 2016/0328205 A1 | 11/2016 | Agrawal et al. | |
| 2016/0328893 A1 | 11/2016 | Cordova et al. | |
| 2016/0329060 A1 | 11/2016 | Ito et al. | |
| 2016/0334973 A1 | 11/2016 | Reckhow et al. | |
| 2016/0335138 A1 | 11/2016 | Surti et al. | |
| 2016/0335139 A1 | 11/2016 | Hurley et al. | |
| 2016/0335532 A1 | 11/2016 | Sanghavi et al. | |
| 2016/0336007 A1 | 11/2016 | Hanazawa et al. | |
| 2016/0336010 A1 | 11/2016 | Lindahl | |
| 2016/0336011 A1 | 11/2016 | Koll et al. | |
| 2016/0336024 A1 | 11/2016 | Choi et al. | |
| 2016/0337299 A1 | 11/2016 | Lane et al. | |
| 2016/0337301 A1 | 11/2016 | Rollins et al. | |
| 2016/0342317 A1 | 11/2016 | Lim et al. | |
| 2016/0342685 A1 | 11/2016 | Basu et al. | |
| 2016/0342781 A1 | 11/2016 | Jeon | |
| 2016/0342803 A1 | 11/2016 | Goodridge et al. | |
| 2016/0350070 A1 | 12/2016 | Sung et al. | |
| 2016/0350650 A1 | 12/2016 | Leeman-Munk et al. | |
| 2016/0350812 A1 | 12/2016 | Priness et al. | |
| 2016/0351190 A1 | 12/2016 | Piernot et al. | |
| 2016/0352567 A1 | 12/2016 | Robbins et al. | |
| 2016/0352887 A1* | 12/2016 | Na | H04M 1/72454 |
| 2016/0352924 A1 | 12/2016 | Senarath et al. | |
| 2016/0357304 A1 | 12/2016 | Hatori et al. | |
| 2016/0357728 A1 | 12/2016 | Bellegarda et al. | |
| 2016/0357790 A1 | 12/2016 | Elkington et al. | |
| 2016/0357861 A1 | 12/2016 | Carlhian et al. | |
| 2016/0357870 A1 | 12/2016 | Hentschel et al. | |
| 2016/0358598 A1 | 12/2016 | Williams et al. | |
| 2016/0358600 A1 | 12/2016 | Nallasamy et al. | |
| 2016/0358603 A1 | 12/2016 | Azam et al. | |
| 2016/0358609 A1 | 12/2016 | Connell et al. | |
| 2016/0358619 A1 | 12/2016 | Ramprashad et al. | |
| 2016/0359771 A1 | 12/2016 | Sridhar | |
| 2016/0360039 A1 | 12/2016 | Sanghavi et al. | |
| 2016/0360336 A1 | 12/2016 | Gross et al. | |
| 2016/0360382 A1 | 12/2016 | Gross et al. | |
| 2016/0364378 A1 | 12/2016 | Futrell et al. | |
| 2016/0364382 A1 | 12/2016 | Sarikaya | |
| 2016/0365101 A1 | 12/2016 | Foy et al. | |
| 2016/0371054 A1 | 12/2016 | Beaumont et al. | |
| 2016/0371250 A1 | 12/2016 | Rhodes | |
| 2016/0372112 A1 | 12/2016 | Miller et al. | |
| 2016/0372119 A1 | 12/2016 | Sak et al. | |
| 2016/0373571 A1 | 12/2016 | Woolsey et al. | |
| 2016/0378747 A1 | 12/2016 | Orr et al. | |
| 2016/0379091 A1 | 12/2016 | Lin et al. | |
| 2016/0379105 A1 | 12/2016 | Moore, Jr. | |
| 2016/0379626 A1 | 12/2016 | Deisher et al. | |
| 2016/0379632 A1 | 12/2016 | Hoffmeister et al. | |
| 2016/0379633 A1 | 12/2016 | Lehman et al. | |
| 2016/0379639 A1 | 12/2016 | Weinstein et al. | |
| 2016/0379641 A1 | 12/2016 | Liu et al. | |
| 2017/0000348 A1 | 1/2017 | Karsten et al. | |
| 2017/0003931 A1 | 1/2017 | Dvortsov et al. | |
| 2017/0004209 A1 | 1/2017 | Johl et al. | |
| 2017/0004409 A1 | 1/2017 | Chu et al. | |
| 2017/0004824 A1 | 1/2017 | Yoo et al. | |
| 2017/0005818 A1 | 1/2017 | Gould | |
| 2017/0006329 A1 | 1/2017 | Jang et al. | |
| 2017/0011091 A1 | 1/2017 | Chehreghani | |
| 2017/0011279 A1 | 1/2017 | Soldevila et al. | |
| 2017/0011303 A1 | 1/2017 | Annapureddy et al. | |
| 2017/0011742 A1 | 1/2017 | Jing et al. | |
| 2017/0013124 A1 | 1/2017 | Havelka et al. | |
| 2017/0013331 A1 | 1/2017 | Watanabe et al. | |
| 2017/0018271 A1 | 1/2017 | Khan et al. | |
| 2017/0019987 A1 | 1/2017 | Dragone et al. | |
| 2017/0023963 A1 | 1/2017 | Davis et al. | |
| 2017/0025124 A1 | 1/2017 | Mixter et al. | |
| 2017/0026318 A1* | 1/2017 | Daniel | H04L 51/046 |
| 2017/0026509 A1 | 1/2017 | Rand | |
| 2017/0027522 A1 | 2/2017 | Van Hasselt et al. | |
| 2017/0031576 A1 | 2/2017 | Saoji et al. | |
| 2017/0031711 A1 | 2/2017 | Wu et al. | |
| 2017/0032440 A1 | 2/2017 | Paton | |
| 2017/0032783 A1 | 2/2017 | Lord et al. | |
| 2017/0032787 A1 | 2/2017 | Dayal | |
| 2017/0032791 A1 | 2/2017 | Elson et al. | |
| 2017/0034087 A1 | 2/2017 | Borenstein et al. | |
| 2017/0039283 A1 | 2/2017 | Bennett et al. | |
| 2017/0039475 A1 | 2/2017 | Cheyer et al. | |
| 2017/0040002 A1 | 2/2017 | Basson et al. | |
| 2017/0041388 A1 | 2/2017 | Tal et al. | |
| 2017/0046025 A1 | 2/2017 | Dascola et al. | |
| 2017/0046330 A1 | 2/2017 | Si et al. | |
| 2017/0047063 A1 | 2/2017 | Ohmura et al. | |
| 2017/0052760 A1 | 2/2017 | Johnson et al. | |
| 2017/0053652 A1 | 2/2017 | Choi et al. | |
| 2017/0055895 A1 | 3/2017 | Jardins et al. | |
| 2017/0060853 A1 | 3/2017 | Lee et al. | |
| 2017/0061423 A1 | 3/2017 | Bryant et al. | |
| 2017/0068423 A1 | 3/2017 | Napolitano et al. | |
| 2017/0068513 A1 | 3/2017 | Stasior et al. | |
| 2017/0068550 A1 | 3/2017 | Zeitlin | |
| 2017/0068670 A1 | 3/2017 | Orr et al. | |
| 2017/0069308 A1 | 3/2017 | Aleksic et al. | |
| 2017/0069321 A1 | 3/2017 | Toiyama | |
| 2017/0069327 A1 | 3/2017 | Heigold et al. | |
| 2017/0075653 A1 | 3/2017 | Dawidowsky et al. | |
| 2017/0076518 A1 | 3/2017 | Patterson et al. | |
| 2017/0076720 A1 | 3/2017 | Gopalan et al. | |
| 2017/0076721 A1 | 3/2017 | Bargetzi et al. | |
| 2017/0078490 A1 | 3/2017 | Kaminsky et al. | |
| 2017/0083179 A1 | 3/2017 | Gruber et al. | |
| 2017/0083285 A1 | 3/2017 | Meyers et al. | |
| 2017/0083504 A1 | 3/2017 | Huang | |
| 2017/0083506 A1 | 3/2017 | Liu et al. | |
| 2017/0084277 A1 | 3/2017 | Sharifi | |

(56) References Cited

U.S. PATENT DOCUMENTS

| | | |
|---|---|---|
| 2017/0085547 A1 | 3/2017 | De Aguiar et al. |
| 2017/0085696 A1 | 3/2017 | Abkairov |
| 2017/0090428 A1 | 3/2017 | Oohara |
| 2017/0090569 A1 | 3/2017 | Levesque |
| 2017/0090864 A1 | 3/2017 | Jorgovanovic |
| 2017/0091168 A1 | 3/2017 | Bellegarda et al. |
| 2017/0091169 A1 | 3/2017 | Bellegarda et al. |
| 2017/0091612 A1 | 3/2017 | Gruber et al. |
| 2017/0092259 A1 | 3/2017 | Jeon |
| 2017/0092270 A1 | 3/2017 | Newendorp et al. |
| 2017/0092278 A1 | 3/2017 | Evermann et al. |
| 2017/0093356 A1 | 3/2017 | Cudak et al. |
| 2017/0097743 A1 | 4/2017 | Hameed et al. |
| 2017/0102837 A1 | 4/2017 | Toumpelis |
| 2017/0102915 A1 | 4/2017 | Kuscher et al. |
| 2017/0103749 A1 | 4/2017 | Zhao et al. |
| 2017/0103752 A1 | 4/2017 | Senior et al. |
| 2017/0105190 A1 | 4/2017 | Logan et al. |
| 2017/0108236 A1 | 4/2017 | Guan et al. |
| 2017/0110117 A1 | 4/2017 | Chakladar et al. |
| 2017/0110125 A1 | 4/2017 | Xu et al. |
| 2017/0116177 A1 | 4/2017 | Walia |
| 2017/0116982 A1 | 4/2017 | Gelfenbeyn et al. |
| 2017/0116987 A1 | 4/2017 | Kang et al. |
| 2017/0116989 A1 | 4/2017 | Yadgar et al. |
| 2017/0124190 A1 | 5/2017 | Wang et al. |
| 2017/0124311 A1 | 5/2017 | Li et al. |
| 2017/0124531 A1 | 5/2017 | McCormack |
| 2017/0125016 A1 | 5/2017 | Wang |
| 2017/0127124 A9 | 5/2017 | Wilson et al. |
| 2017/0131778 A1 | 5/2017 | Iyer |
| 2017/0132019 A1 | 5/2017 | Karashchuk et al. |
| 2017/0132199 A1 | 5/2017 | Vescovi et al. |
| 2017/0133007 A1 | 5/2017 | Drewes |
| 2017/0133009 A1 | 5/2017 | Cho et al. |
| 2017/0134807 A1 | 5/2017 | Shaw et al. |
| 2017/0140041 A1 | 5/2017 | Dotan-Cohen et al. |
| 2017/0140052 A1 | 5/2017 | Bufe, III et al. |
| 2017/0140644 A1 | 5/2017 | Hwang et al. |
| 2017/0140760 A1 | 5/2017 | Sachdev |
| 2017/0147722 A1 | 5/2017 | Greenwood |
| 2017/0147841 A1 | 5/2017 | Stagg et al. |
| 2017/0148044 A1 | 5/2017 | Fukuda et al. |
| 2017/0148307 A1 | 5/2017 | Yeom et al. |
| 2017/0154033 A1 | 6/2017 | Lee |
| 2017/0154055 A1 | 6/2017 | Dimson et al. |
| 2017/0154628 A1 | 6/2017 | Mohajer et al. |
| 2017/0155940 A1 | 6/2017 | Jin et al. |
| 2017/0155965 A1 | 6/2017 | Ward |
| 2017/0161018 A1 | 6/2017 | Lemay et al. |
| 2017/0161268 A1 | 6/2017 | Badaskar |
| 2017/0161293 A1 | 6/2017 | Ionescu et al. |
| 2017/0161393 A1 | 6/2017 | Oh et al. |
| 2017/0161439 A1 | 6/2017 | Raduchel et al. |
| 2017/0161500 A1 | 6/2017 | Yang |
| 2017/0162191 A1 | 6/2017 | Grost et al. |
| 2017/0162202 A1 | 6/2017 | Anthony et al. |
| 2017/0162203 A1 | 6/2017 | Huang et al. |
| 2017/0169506 A1 | 6/2017 | Wishne et al. |
| 2017/0169818 A1 | 6/2017 | Vanblon et al. |
| 2017/0169819 A1 | 6/2017 | Mese et al. |
| 2017/0171139 A1 | 6/2017 | Marra et al. |
| 2017/0171387 A1 | 6/2017 | Vendrow |
| 2017/0177080 A1 | 6/2017 | Deleeuw |
| 2017/0177547 A1 | 6/2017 | Ciereszko et al. |
| 2017/0178619 A1 | 6/2017 | Naik et al. |
| 2017/0178620 A1 | 6/2017 | Fleizach et al. |
| 2017/0178626 A1 | 6/2017 | Gruber et al. |
| 2017/0178666 A1 | 6/2017 | Yu |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0186446 A1 | 6/2017 | Wosk et al. |
| 2017/0187711 A1 | 6/2017 | Joo et al. |
| 2017/0193083 A1 | 7/2017 | Bhatt et al. |
| 2017/0195493 A1 | 7/2017 | Sudarsan et al. |
| 2017/0195495 A1 | 7/2017 | Deora et al. |
| 2017/0195636 A1 | 7/2017 | Child et al. |
| 2017/0195856 A1 | 7/2017 | Snyder et al. |
| 2017/0199870 A1 | 7/2017 | Zheng et al. |
| 2017/0199874 A1 | 7/2017 | Patel et al. |
| 2017/0200066 A1 | 7/2017 | Wang et al. |
| 2017/0201609 A1 | 7/2017 | Salmenkaita et al. |
| 2017/0201613 A1 | 7/2017 | Engelke et al. |
| 2017/0201846 A1 | 7/2017 | Katayama et al. |
| 2017/0206002 A1 | 7/2017 | Badger et al. |
| 2017/0206899 A1 | 7/2017 | Bryant et al. |
| 2017/0215052 A1 | 7/2017 | Koum et al. |
| 2017/0220212 A1 | 8/2017 | Yang et al. |
| 2017/0221486 A1 | 8/2017 | Kurata et al. |
| 2017/0222961 A1 | 8/2017 | Beach et al. |
| 2017/0223189 A1 | 8/2017 | Meredith et al. |
| 2017/0227935 A1 | 8/2017 | Su et al. |
| 2017/0228367 A1 | 8/2017 | Pasupalak et al. |
| 2017/0228382 A1 | 8/2017 | Haviv et al. |
| 2017/0229121 A1 | 8/2017 | Taki et al. |
| 2017/0230429 A1 | 8/2017 | Garmark et al. |
| 2017/0230497 A1 | 8/2017 | Kim et al. |
| 2017/0230709 A1 | 8/2017 | Van Os et al. |
| 2017/0235361 A1 | 8/2017 | Rigazio et al. |
| 2017/0235618 A1 | 8/2017 | Lin et al. |
| 2017/0235721 A1 | 8/2017 | Almosallam et al. |
| 2017/0236512 A1 | 8/2017 | Williams et al. |
| 2017/0236514 A1 | 8/2017 | Nelson |
| 2017/0236517 A1 | 8/2017 | Yu et al. |
| 2017/0238039 A1 | 8/2017 | Sabattini |
| 2017/0242478 A1 | 8/2017 | Ma |
| 2017/0242653 A1 | 8/2017 | Lang et al. |
| 2017/0242657 A1 | 8/2017 | Jarvis et al. |
| 2017/0242840 A1 | 8/2017 | Lu et al. |
| 2017/0243468 A1 | 8/2017 | Dotan-Cohen et al. |
| 2017/0243576 A1 | 8/2017 | Millington et al. |
| 2017/0243583 A1 | 8/2017 | Raichelgauz et al. |
| 2017/0243586 A1 | 8/2017 | Civelli et al. |
| 2017/0249291 A1 | 8/2017 | Patel |
| 2017/0249309 A1 | 8/2017 | Sarikaya |
| 2017/0256256 A1 | 9/2017 | Wang et al. |
| 2017/0257723 A1 | 9/2017 | Morishita et al. |
| 2017/0262051 A1 | 9/2017 | Tall et al. |
| 2017/0262432 A1 | 9/2017 | Sarikaya et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0263254 A1 | 9/2017 | Dewan et al. |
| 2017/0264451 A1 | 9/2017 | Yu et al. |
| 2017/0264711 A1 | 9/2017 | Natarajan et al. |
| 2017/0270092 A1 | 9/2017 | He et al. |
| 2017/0270715 A1 | 9/2017 | Lindsay et al. |
| 2017/0270822 A1 | 9/2017 | Cohen |
| 2017/0270912 A1 | 9/2017 | Levit et al. |
| 2017/0273044 A1 | 9/2017 | Alsina |
| 2017/0277691 A1 | 9/2017 | Agarwal |
| 2017/0278513 A1 | 9/2017 | Li et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0286407 A1 | 10/2017 | Chochowski et al. |
| 2017/0287218 A1 | 10/2017 | Nuernberger et al. |
| 2017/0287472 A1 | 10/2017 | Ogawa et al. |
| 2017/0289305 A1 | 10/2017 | Liensberger et al. |
| 2017/0295446 A1 | 10/2017 | Shivappa |
| 2017/0301348 A1 | 10/2017 | Chen et al. |
| 2017/0308552 A1 | 10/2017 | Soni et al. |
| 2017/0308589 A1 | 10/2017 | Liu et al. |
| 2017/0308609 A1 | 10/2017 | Berkhin et al. |
| 2017/0311005 A1 | 10/2017 | Lin |
| 2017/0316775 A1 | 11/2017 | Le et al. |
| 2017/0316779 A1 | 11/2017 | Mohapatra et al. |
| 2017/0316782 A1 | 11/2017 | Haughay |
| 2017/0319123 A1 | 11/2017 | Voss et al. |
| 2017/0323637 A1 | 11/2017 | Naik |
| 2017/0329466 A1 | 11/2017 | Krenkler et al. |
| 2017/0329490 A1 | 11/2017 | Esinovskaya et al. |

(56) References Cited

U.S. PATENT DOCUMENTS

| | | |
|---|---|---|
| 2017/0329572 A1 | 11/2017 | Shah et al. |
| 2017/0329630 A1 | 11/2017 | Jann et al. |
| 2017/0330567 A1 | 11/2017 | Van Wissen et al. |
| 2017/0336920 A1 | 11/2017 | Chan et al. |
| 2017/0337035 A1 | 11/2017 | Choudhary et al. |
| 2017/0337478 A1 | 11/2017 | Sarikaya et al. |
| 2017/0337540 A1 | 11/2017 | Buckman et al. |
| 2017/0345411 A1 | 11/2017 | Raitio et al. |
| 2017/0345420 A1 | 11/2017 | Barnett, Jr. |
| 2017/0345429 A1 | 11/2017 | Hardee et al. |
| 2017/0346949 A1 | 11/2017 | Sanghavi et al. |
| 2017/0347180 A1 | 11/2017 | Petrank |
| 2017/0347222 A1 | 11/2017 | Kanter |
| 2017/0351487 A1 | 12/2017 | Avilés-Casco et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357529 A1 | 12/2017 | Venkatraman et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0358317 A1 | 12/2017 | James |
| 2017/0359680 A1 | 12/2017 | Ledvina et al. |
| 2017/0365251 A1 | 12/2017 | Park et al. |
| 2017/0371509 A1 | 12/2017 | Jung et al. |
| 2017/0371865 A1 | 12/2017 | Eck et al. |
| 2017/0371866 A1 | 12/2017 | Eck |
| 2017/0371885 A1 | 12/2017 | Aggarwal et al. |
| 2017/0372703 A1 | 12/2017 | Sung et al. |
| 2017/0372719 A1 | 12/2017 | Li et al. |
| 2017/0374093 A1 | 12/2017 | Dhar et al. |
| 2017/0374176 A1 | 12/2017 | Agrawal et al. |
| 2018/0004372 A1 | 1/2018 | Zurek et al. |
| 2018/0004396 A1 | 1/2018 | Ying |
| 2018/0005112 A1 | 1/2018 | Iso-Sipila et al. |
| 2018/0007060 A1 | 1/2018 | Leblang et al. |
| 2018/0007096 A1 | 1/2018 | Levin et al. |
| 2018/0007210 A1 | 1/2018 | Todasco |
| 2018/0007538 A1 | 1/2018 | Naik et al. |
| 2018/0012596 A1 | 1/2018 | Piernot et al. |
| 2018/0018248 A1 | 1/2018 | Bhargava et al. |
| 2018/0018590 A1 | 1/2018 | Szeto et al. |
| 2018/0018814 A1 | 1/2018 | Patrik et al. |
| 2018/0018959 A1 | 1/2018 | Jardins et al. |
| 2018/0018973 A1 | 1/2018 | Moreno et al. |
| 2018/0020093 A1 | 1/2018 | Bentitou et al. |
| 2018/0024985 A1 | 1/2018 | Asano |
| 2018/0025124 A1 | 1/2018 | Mohr et al. |
| 2018/0025287 A1 | 1/2018 | Mathew et al. |
| 2018/0028918 A1 | 2/2018 | Tang et al. |
| 2018/0033431 A1 | 2/2018 | Newendorp et al. |
| 2018/0033435 A1 | 2/2018 | Jacobs, II |
| 2018/0033436 A1 | 2/2018 | Zhou |
| 2018/0039239 A1 | 2/2018 | Burchard |
| 2018/0041571 A1 | 2/2018 | Rogers et al. |
| 2018/0045963 A1 | 2/2018 | Hoover et al. |
| 2018/0046340 A1 | 2/2018 | Mall |
| 2018/0046851 A1 | 2/2018 | Kienzle et al. |
| 2018/0047201 A1 | 2/2018 | Filev et al. |
| 2018/0047288 A1 | 2/2018 | Cordell et al. |
| 2018/0047391 A1 | 2/2018 | Baik et al. |
| 2018/0047393 A1 | 2/2018 | Tian et al. |
| 2018/0047406 A1 | 2/2018 | Park |
| 2018/0052909 A1 | 2/2018 | Sharifi et al. |
| 2018/0054505 A1 | 2/2018 | Hart et al. |
| 2018/0060032 A1 | 3/2018 | Boesen |
| 2018/0060301 A1 | 3/2018 | Li et al. |
| 2018/0060312 A1 | 3/2018 | Won |
| 2018/0060555 A1 | 3/2018 | Boesen |
| 2018/0061400 A1 | 3/2018 | Carbune et al. |
| 2018/0061401 A1 | 3/2018 | Sarikaya et al. |
| 2018/0061402 A1 | 3/2018 | Devaraj et al. |
| 2018/0062691 A1 | 3/2018 | Barnett, Jr. |
| 2018/0063276 A1 | 3/2018 | Foged |
| 2018/0063308 A1 | 3/2018 | Crystal et al. |
| 2018/0063324 A1 | 3/2018 | Van Meter, II |
| 2018/0063624 A1 | 3/2018 | Boesen |
| 2018/0067904 A1 | 3/2018 | Li |
| 2018/0067914 A1 | 3/2018 | Chen et al. |
| 2018/0067918 A1 | 3/2018 | Bellegarda et al. |
| 2018/0067929 A1 | 3/2018 | Ahn |
| 2018/0068074 A1 | 3/2018 | Shen |
| 2018/0068194 A1 | 3/2018 | Matsuda |
| 2018/0069743 A1 | 3/2018 | Bakken et al. |
| 2018/0075659 A1 | 3/2018 | Browy et al. |
| 2018/0075847 A1 | 3/2018 | Lee et al. |
| 2018/0075849 A1 | 3/2018 | Khoury et al. |
| 2018/0077095 A1 | 3/2018 | Deyle et al. |
| 2018/0077648 A1 | 3/2018 | Nguyen |
| 2018/0081739 A1 | 3/2018 | Gravenites et al. |
| 2018/0082692 A1 | 3/2018 | Khoury et al. |
| 2018/0083898 A1 | 3/2018 | Pham |
| 2018/0088788 A1 | 3/2018 | Cheung et al. |
| 2018/0088902 A1 | 3/2018 | Mese et al. |
| 2018/0088969 A1 | 3/2018 | Vanblon et al. |
| 2018/0089166 A1 | 3/2018 | Meyer et al. |
| 2018/0089588 A1 | 3/2018 | Ravi et al. |
| 2018/0090143 A1 | 3/2018 | Saddler et al. |
| 2018/0091604 A1 | 3/2018 | Yamashita et al. |
| 2018/0091732 A1 | 3/2018 | Wilson et al. |
| 2018/0091847 A1 | 3/2018 | Wu et al. |
| 2018/0096683 A1 | 4/2018 | James et al. |
| 2018/0096690 A1 | 4/2018 | Mixter et al. |
| 2018/0097812 A1 | 4/2018 | Gillett et al. |
| 2018/0101599 A1 | 4/2018 | Kenneth et al. |
| 2018/0101925 A1 | 4/2018 | Brinig et al. |
| 2018/0102914 A1 | 4/2018 | Kawachi et al. |
| 2018/0103209 A1 | 4/2018 | Fischler et al. |
| 2018/0107917 A1 | 4/2018 | Hewavitharana et al. |
| 2018/0107945 A1 | 4/2018 | Gao et al. |
| 2018/0108346 A1 | 4/2018 | Paulik et al. |
| 2018/0108351 A1 | 4/2018 | Beckhardt et al. |
| 2018/0108357 A1 | 4/2018 | Liu |
| 2018/0109920 A1 | 4/2018 | Aggarwal et al. |
| 2018/0113673 A1 | 4/2018 | Sheynblat |
| 2018/0114591 A1 | 4/2018 | Pribanic et al. |
| 2018/0121430 A1 | 5/2018 | Kagoshima et al. |
| 2018/0121432 A1 | 5/2018 | Parson et al. |
| 2018/0122376 A1 | 5/2018 | Kojima |
| 2018/0122378 A1 | 5/2018 | Mixter et al. |
| 2018/0124458 A1 | 5/2018 | Knox |
| 2018/0126260 A1 | 5/2018 | Chansoriya et al. |
| 2018/0129967 A1 | 5/2018 | Herreshoff |
| 2018/0130470 A1 | 5/2018 | Lemay et al. |
| 2018/0130471 A1 | 5/2018 | Trufinescu et al. |
| 2018/0137097 A1 | 5/2018 | Lim et al. |
| 2018/0137404 A1 | 5/2018 | Fauceglia et al. |
| 2018/0137856 A1 | 5/2018 | Gilbert |
| 2018/0137857 A1 | 5/2018 | Zhou et al. |
| 2018/0137865 A1 | 5/2018 | Ling |
| 2018/0143857 A1 | 5/2018 | Anbazhagan et al. |
| 2018/0143967 A1 | 5/2018 | Anbazhagan et al. |
| 2018/0144465 A1 | 5/2018 | Hsieh et al. |
| 2018/0144615 A1 | 5/2018 | Kinney et al. |
| 2018/0144746 A1 | 5/2018 | Mishra et al. |
| 2018/0144748 A1 | 5/2018 | Leong |
| 2018/0146089 A1 | 5/2018 | Rauenbuehler et al. |
| 2018/0150744 A1 | 5/2018 | Orr et al. |
| 2018/0152557 A1 | 5/2018 | White et al. |
| 2018/0152558 A1 | 5/2018 | Chan et al. |
| 2018/0152803 A1 | 5/2018 | Seefeldt et al. |
| 2018/0157372 A1 | 6/2018 | Kurabayashi |
| 2018/0157398 A1 | 6/2018 | Kaehler et al. |
| 2018/0157408 A1 | 6/2018 | Yu et al. |
| 2018/0157992 A1 | 6/2018 | Susskind et al. |
| 2018/0158548 A1 | 6/2018 | Taheri et al. |

(56) References Cited

U.S. PATENT DOCUMENTS

| | | |
|---|---|---|
| 2018/0158552 A1 | 6/2018 | Liu et al. |
| 2018/0165278 A1 | 6/2018 | He et al. |
| 2018/0165801 A1 | 6/2018 | Kim et al. |
| 2018/0165857 A1 | 6/2018 | Lee et al. |
| 2018/0166076 A1 | 6/2018 | Higuchi et al. |
| 2018/0167884 A1 | 6/2018 | Dawid et al. |
| 2018/0173403 A1 | 6/2018 | Carbune et al. |
| 2018/0173542 A1 | 6/2018 | Chan et al. |
| 2018/0174406 A1 | 6/2018 | Arashi et al. |
| 2018/0174576 A1 | 6/2018 | Soltau et al. |
| 2018/0174597 A1 | 6/2018 | Lee et al. |
| 2018/0181370 A1 | 6/2018 | Parkinson |
| 2018/0182376 A1 | 6/2018 | Gysel et al. |
| 2018/0188840 A1 | 7/2018 | Tamura et al. |
| 2018/0188948 A1 | 7/2018 | Ouyang et al. |
| 2018/0189267 A1 | 7/2018 | Takiel |
| 2018/0190263 A1 | 7/2018 | Calef, III |
| 2018/0190273 A1 | 7/2018 | Karimli et al. |
| 2018/0190279 A1 | 7/2018 | Anderson et al. |
| 2018/0191670 A1 | 7/2018 | Suyama |
| 2018/0196683 A1 | 7/2018 | Radebaugh et al. |
| 2018/0205983 A1 | 7/2018 | Lee et al. |
| 2018/0210874 A1 | 7/2018 | Fuxman et al. |
| 2018/0213448 A1 | 7/2018 | Segal et al. |
| 2018/0214061 A1 | 8/2018 | Knoth et al. |
| 2018/0217810 A1 | 8/2018 | Agrawal |
| 2018/0218735 A1 | 8/2018 | Hunt et al. |
| 2018/0221783 A1 | 8/2018 | Gamero |
| 2018/0225131 A1 | 8/2018 | Tommy et al. |
| 2018/0225274 A1 | 8/2018 | Tommy et al. |
| 2018/0232203 A1 | 8/2018 | Gelfenbeyn et al. |
| 2018/0232608 A1 | 8/2018 | Pradeep et al. |
| 2018/0232688 A1 | 8/2018 | Pike et al. |
| 2018/0233132 A1 | 8/2018 | Herold et al. |
| 2018/0233140 A1 | 8/2018 | Koishida et al. |
| 2018/0247065 A1 | 8/2018 | Rhee et al. |
| 2018/0253209 A1 | 9/2018 | Jaygarl et al. |
| 2018/0253652 A1 | 9/2018 | Palzer et al. |
| 2018/0260680 A1 | 9/2018 | Finkelstein et al. |
| 2018/0267952 A1 | 9/2018 | Osborne et al. |
| 2018/0268023 A1 | 9/2018 | Korpusik et al. |
| 2018/0268106 A1 | 9/2018 | Velaga |
| 2018/0268337 A1 | 9/2018 | Miller et al. |
| 2018/0270343 A1 | 9/2018 | Rout et al. |
| 2018/0275839 A1 | 9/2018 | Kocienda et al. |
| 2018/0276197 A1 | 9/2018 | Nell et al. |
| 2018/0277113 A1 | 9/2018 | Hartung et al. |
| 2018/0278740 A1 | 9/2018 | Choi et al. |
| 2018/0285056 A1 | 10/2018 | Cutler et al. |
| 2018/0293086 A1 | 10/2018 | Laird-McConnell et al. |
| 2018/0293984 A1 | 10/2018 | Lindahl |
| 2018/0293988 A1 | 10/2018 | Huang et al. |
| 2018/0293989 A1 | 10/2018 | De et al. |
| 2018/0299878 A1 | 10/2018 | Cella et al. |
| 2018/0300317 A1 | 10/2018 | Bradbury |
| 2018/0300400 A1 | 10/2018 | Paulus |
| 2018/0300608 A1 | 10/2018 | Sevrens et al. |
| 2018/0300952 A1 | 10/2018 | Evans et al. |
| 2018/0307216 A1 | 10/2018 | Ypma et al. |
| 2018/0307603 A1 | 10/2018 | Che |
| 2018/0308470 A1 | 10/2018 | Park et al. |
| 2018/0308477 A1 | 10/2018 | Nagasaka |
| 2018/0308480 A1 | 10/2018 | Jang et al. |
| 2018/0308485 A1 | 10/2018 | Kudurshian et al. |
| 2018/0308486 A1 | 10/2018 | Saddler et al. |
| 2018/0308491 A1 | 10/2018 | Oktem et al. |
| 2018/0314362 A1 | 11/2018 | Kim et al. |
| 2018/0314552 A1 | 11/2018 | Kim et al. |
| 2018/0314689 A1 | 11/2018 | Wang et al. |
| 2018/0314981 A1 | 11/2018 | Chen |
| 2018/0315415 A1 | 11/2018 | Mosley et al. |
| 2018/0315416 A1 | 11/2018 | Berthelsen et al. |
| 2018/0322112 A1 | 11/2018 | Bellegarda et al. |
| 2018/0322881 A1 | 11/2018 | Min et al. |
| 2018/0324518 A1 | 11/2018 | Dusan et al. |
| 2018/0329508 A1 | 11/2018 | Klein et al. |
| 2018/0329512 A1 | 11/2018 | Liao et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0329998 A1 | 11/2018 | Thomson et al. |
| 2018/0330714 A1 | 11/2018 | Paulik et al. |
| 2018/0330721 A1 | 11/2018 | Thomson et al. |
| 2018/0330722 A1 | 11/2018 | Newendorp et al. |
| 2018/0330723 A1 | 11/2018 | Acero et al. |
| 2018/0330729 A1 | 11/2018 | Golipour et al. |
| 2018/0330730 A1 | 11/2018 | Garg et al. |
| 2018/0330731 A1 | 11/2018 | Zeitlin et al. |
| 2018/0330733 A1 | 11/2018 | Orr et al. |
| 2018/0330737 A1 | 11/2018 | Paulik et al. |
| 2018/0332118 A1 | 11/2018 | Phipps et al. |
| 2018/0332389 A1 | 11/2018 | Ekkizogloy et al. |
| 2018/0335903 A1 | 11/2018 | Coffman et al. |
| 2018/0336006 A1 | 11/2018 | Chakraborty et al. |
| 2018/0336049 A1 | 11/2018 | Mukherjee et al. |
| 2018/0336184 A1 | 11/2018 | Bellegarda et al. |
| 2018/0336197 A1 | 11/2018 | Skilling et al. |
| 2018/0336275 A1 | 11/2018 | Graham et al. |
| 2018/0336439 A1 | 11/2018 | Kliger et al. |
| 2018/0336449 A1 | 11/2018 | Adan et al. |
| 2018/0336880 A1 | 11/2018 | Arik et al. |
| 2018/0336885 A1 | 11/2018 | Mukherjee et al. |
| 2018/0336892 A1 | 11/2018 | Kim et al. |
| 2018/0336893 A1 | 11/2018 | Robinson et al. |
| 2018/0336894 A1 | 11/2018 | Graham et al. |
| 2018/0336904 A1 | 11/2018 | Piercy et al. |
| 2018/0336905 A1 | 11/2018 | Kim et al. |
| 2018/0336911 A1 | 11/2018 | Dahl et al. |
| 2018/0336920 A1 | 11/2018 | Bastian et al. |
| 2018/0338191 A1 | 11/2018 | Van Scheltinga et al. |
| 2018/0341643 A1 | 11/2018 | Alders et al. |
| 2018/0342243 A1 | 11/2018 | Vanblon et al. |
| 2018/0343557 A1 | 11/2018 | Naik et al. |
| 2018/0349084 A1 | 12/2018 | Nagasaka et al. |
| 2018/0349346 A1 | 12/2018 | Hatori et al. |
| 2018/0349349 A1 | 12/2018 | Bellegarda et al. |
| 2018/0349447 A1 | 12/2018 | Maccartney et al. |
| 2018/0349472 A1 | 12/2018 | Kohlschuetter et al. |
| 2018/0349728 A1 | 12/2018 | Wang et al. |
| 2018/0350345 A1 | 12/2018 | Naik |
| 2018/0350353 A1 | 12/2018 | Gruber et al. |
| 2018/0357073 A1 | 12/2018 | Johnson et al. |
| 2018/0357308 A1 | 12/2018 | Cheyer |
| 2018/0358015 A1 | 12/2018 | Cash et al. |
| 2018/0358019 A1 | 12/2018 | Mont-Reynaud |
| 2018/0365091 A1 | 12/2018 | Donaldson et al. |
| 2018/0365653 A1 | 12/2018 | Cleaver et al. |
| 2018/0366105 A1 | 12/2018 | Kim |
| 2018/0366110 A1 | 12/2018 | Hashem et al. |
| 2018/0366116 A1 | 12/2018 | Nicholson et al. |
| 2018/0366118 A1 | 12/2018 | Lovitt et al. |
| 2018/0373487 A1 | 12/2018 | Gruber et al. |
| 2018/0373493 A1 | 12/2018 | Watson et al. |
| 2018/0373796 A1 | 12/2018 | Rathod |
| 2018/0374484 A1 | 12/2018 | Huang et al. |
| 2019/0005024 A1 | 1/2019 | Somech et al. |
| 2019/0007228 A1 | 1/2019 | Vuskovic et al. |
| 2019/0012141 A1 | 1/2019 | Piersol et al. |
| 2019/0012445 A1 | 1/2019 | Lesso et al. |
| 2019/0012449 A1 | 1/2019 | Cheyer |
| 2019/0012599 A1 | 1/2019 | El Kaliouby et al. |
| 2019/0013018 A1 | 1/2019 | Rekstad |
| 2019/0013025 A1 | 1/2019 | Alcorn et al. |
| 2019/0014450 A1 | 1/2019 | Gruber et al. |
| 2019/0019077 A1 | 1/2019 | Griffin et al. |
| 2019/0019508 A1 | 1/2019 | Rochford et al. |
| 2019/0020482 A1 | 1/2019 | Gupta et al. |
| 2019/0027152 A1 | 1/2019 | Huang et al. |
| 2019/0034040 A1 | 1/2019 | Shah et al. |
| 2019/0034826 A1 | 1/2019 | Ahmad et al. |
| 2019/0035385 A1 | 1/2019 | Lawson et al. |
| 2019/0035405 A1 | 1/2019 | Haughay |
| 2019/0037258 A1 | 1/2019 | Justin et al. |
| 2019/0042059 A1 | 2/2019 | Baer |

(56) References Cited

U.S. PATENT DOCUMENTS

| | | |
|---|---|---|
| 2019/0042627 A1 | 2/2019 | Osotio et al. |
| 2019/0043507 A1 | 2/2019 | Huang et al. |
| 2019/0044854 A1 | 2/2019 | Yang et al. |
| 2019/0045040 A1 | 2/2019 | Lee et al. |
| 2019/0051306 A1 | 2/2019 | Torama et al. |
| 2019/0051309 A1 | 2/2019 | Kim et al. |
| 2019/0057697 A1 | 2/2019 | Giuli et al. |
| 2019/0065027 A1 | 2/2019 | Hauenstein et al. |
| 2019/0065144 A1 | 2/2019 | Sumner et al. |
| 2019/0065993 A1 | 2/2019 | Srinivasan et al. |
| 2019/0066674 A1 | 2/2019 | Jaygarl et al. |
| 2019/0068810 A1 | 2/2019 | Okamoto et al. |
| 2019/0073607 A1 | 3/2019 | Jia et al. |
| 2019/0073998 A1 | 3/2019 | Leblang et al. |
| 2019/0074009 A1 | 3/2019 | Kim et al. |
| 2019/0074015 A1 | 3/2019 | Orr et al. |
| 2019/0074016 A1 | 3/2019 | Orr et al. |
| 2019/0079476 A1 | 3/2019 | Funes |
| 2019/0079724 A1 | 3/2019 | Feuz et al. |
| 2019/0080685 A1 | 3/2019 | Johnson, Jr. |
| 2019/0080698 A1 | 3/2019 | Miller |
| 2019/0082044 A1 | 3/2019 | Olivia et al. |
| 2019/0087205 A1 | 3/2019 | Guday |
| 2019/0087412 A1 | 3/2019 | Ibrahim et al. |
| 2019/0087455 A1 | 3/2019 | He et al. |
| 2019/0090812 A1 | 3/2019 | Martin et al. |
| 2019/0095050 A1 | 3/2019 | Gruber et al. |
| 2019/0095069 A1 | 3/2019 | Proctor et al. |
| 2019/0095171 A1 | 3/2019 | Carson et al. |
| 2019/0095535 A1 | 3/2019 | Miller et al. |
| 2019/0096134 A1 | 3/2019 | Amacker et al. |
| 2019/0102145 A1 | 4/2019 | Wilberding et al. |
| 2019/0102378 A1 | 4/2019 | Piernot et al. |
| 2019/0102381 A1 | 4/2019 | Futrell et al. |
| 2019/0103103 A1 | 4/2019 | Ni et al. |
| 2019/0103112 A1 | 4/2019 | Walker et al. |
| 2019/0108834 A1 | 4/2019 | Nelson et al. |
| 2019/0114320 A1 | 4/2019 | Patwardhan et al. |
| 2019/0116264 A1 | 4/2019 | Sanghavi et al. |
| 2019/0122666 A1 | 4/2019 | Raitio et al. |
| 2019/0122692 A1 | 4/2019 | Binder et al. |
| 2019/0124019 A1 | 4/2019 | Leon et al. |
| 2019/0129499 A1 | 5/2019 | Li |
| 2019/0129615 A1 | 5/2019 | Sundar et al. |
| 2019/0132694 A1 | 5/2019 | Hanes et al. |
| 2019/0134501 A1 | 5/2019 | Feder et al. |
| 2019/0138704 A1 | 5/2019 | Shrivastava et al. |
| 2019/0139058 A1 | 5/2019 | Clark et al. |
| 2019/0139541 A1 | 5/2019 | Andersen et al. |
| 2019/0139563 A1 | 5/2019 | Chen et al. |
| 2019/0141494 A1 | 5/2019 | Gross et al. |
| 2019/0146219 A1 | 5/2019 | Rodriguez, II |
| 2019/0147052 A1 | 5/2019 | Lu et al. |
| 2019/0147369 A1 | 5/2019 | Gupta et al. |
| 2019/0147869 A1 | 5/2019 | Wang |
| 2019/0147880 A1 | 5/2019 | Booker et al. |
| 2019/0147883 A1 | 5/2019 | Mellenthin et al. |
| 2019/0149972 A1 | 5/2019 | Parks et al. |
| 2019/0156830 A1 | 5/2019 | Devaraj et al. |
| 2019/0158994 A1 | 5/2019 | Gross et al. |
| 2019/0163667 A1 | 5/2019 | Feuz et al. |
| 2019/0164546 A1 | 5/2019 | Piernot et al. |
| 2019/0172243 A1 | 6/2019 | Mishra et al. |
| 2019/0172458 A1 | 6/2019 | Mishra et al. |
| 2019/0172465 A1 | 6/2019 | Lee et al. |
| 2019/0172467 A1 | 6/2019 | Kim et al. |
| 2019/0173996 A1 | 6/2019 | Butcher et al. |
| 2019/0179607 A1 | 6/2019 | Thangarathnam et al. |
| 2019/0179890 A1 | 6/2019 | Evermann |
| 2019/0180749 A1 | 6/2019 | Carey et al. |
| 2019/0180750 A1 | 6/2019 | Renard et al. |
| 2019/0180770 A1 | 6/2019 | Kothari et al. |
| 2019/0182176 A1 | 6/2019 | Niewczas |
| 2019/0187787 A1 | 6/2019 | White et al. |
| 2019/0188326 A1 | 6/2019 | Daianu et al. |
| 2019/0188328 A1 | 6/2019 | Oyenan et al. |
| 2019/0189118 A1 | 6/2019 | Piernot et al. |
| 2019/0189125 A1 | 6/2019 | Van Os et al. |
| 2019/0190898 A1 | 6/2019 | Cui |
| 2019/0197053 A1 | 6/2019 | Graham et al. |
| 2019/0197119 A1 | 6/2019 | Zhang et al. |
| 2019/0213498 A1 | 7/2019 | Adjaoute |
| 2019/0213601 A1 | 7/2019 | Hackman et al. |
| 2019/0213774 A1 | 7/2019 | Jiao et al. |
| 2019/0213999 A1 | 7/2019 | Grupen et al. |
| 2019/0214024 A1 | 7/2019 | Gruber et al. |
| 2019/0220245 A1 | 7/2019 | Martel et al. |
| 2019/0220246 A1 | 7/2019 | Orr et al. |
| 2019/0220247 A1 | 7/2019 | Lemay et al. |
| 2019/0220704 A1 | 7/2019 | Schulz-Trieglaff et al. |
| 2019/0220727 A1 | 7/2019 | Dohrmann et al. |
| 2019/0222684 A1 | 7/2019 | Li et al. |
| 2019/0224049 A1 | 7/2019 | Creasy et al. |
| 2019/0228581 A1 | 7/2019 | Dascola et al. |
| 2019/0230215 A1 | 7/2019 | Zhu et al. |
| 2019/0230426 A1 | 7/2019 | Chun |
| 2019/0236130 A1 | 8/2019 | Li et al. |
| 2019/0236459 A1 | 8/2019 | Cheyer et al. |
| 2019/0237061 A1 | 8/2019 | Rusak et al. |
| 2019/0243902 A1 | 8/2019 | Saeki et al. |
| 2019/0244618 A1 | 8/2019 | Newendorp et al. |
| 2019/0251167 A1 | 8/2019 | Subbaraya et al. |
| 2019/0251339 A1 | 8/2019 | Hawker |
| 2019/0251960 A1 | 8/2019 | Maker et al. |
| 2019/0258852 A1 | 8/2019 | Shimauchi et al. |
| 2019/0259386 A1 | 8/2019 | Kudurshian et al. |
| 2019/0265886 A1 | 8/2019 | Moon et al. |
| 2019/0266246 A1 | 8/2019 | Wang et al. |
| 2019/0272318 A1 | 9/2019 | Suzuki et al. |
| 2019/0272818 A1 | 9/2019 | Fernandez et al. |
| 2019/0272825 A1 | 9/2019 | O'Malley et al. |
| 2019/0272831 A1 | 9/2019 | Kajarekar |
| 2019/0273963 A1 | 9/2019 | Jobanputra et al. |
| 2019/0278841 A1 | 9/2019 | Pusateri et al. |
| 2019/0279622 A1 | 9/2019 | Liu et al. |
| 2019/0281387 A1 | 9/2019 | Woo et al. |
| 2019/0287012 A1 | 9/2019 | Asli et al. |
| 2019/0287522 A1 | 9/2019 | Lambourne et al. |
| 2019/0294769 A1 | 9/2019 | Lesso |
| 2019/0294962 A1 | 9/2019 | Vezer et al. |
| 2019/0295529 A1 | 9/2019 | Tomita |
| 2019/0295540 A1 | 9/2019 | Grima |
| 2019/0295544 A1 | 9/2019 | Garcia et al. |
| 2019/0303442 A1 | 10/2019 | Peitz et al. |
| 2019/0303504 A1 | 10/2019 | Pasumarthy |
| 2019/0304438 A1 | 10/2019 | Qian et al. |
| 2019/0310765 A1 | 10/2019 | Napolitano et al. |
| 2019/0311031 A1 | 10/2019 | Powell et al. |
| 2019/0311708 A1 | 10/2019 | Bengio et al. |
| 2019/0311720 A1 | 10/2019 | Pasko |
| 2019/0318722 A1 | 10/2019 | Bromand |
| 2019/0318724 A1 | 10/2019 | Chao et al. |
| 2019/0318725 A1 | 10/2019 | Le Roux et al. |
| 2019/0318732 A1 | 10/2019 | Huang et al. |
| 2019/0318735 A1 | 10/2019 | Chao et al. |
| 2019/0318739 A1 | 10/2019 | Garg et al. |
| 2019/0324780 A1 | 10/2019 | Zhu et al. |
| 2019/0324925 A1 | 10/2019 | Toyoda et al. |
| 2019/0325081 A1 | 10/2019 | Liu et al. |
| 2019/0325866 A1 | 10/2019 | Bromand et al. |
| 2019/0333523 A1 | 10/2019 | Kim et al. |
| 2019/0335567 A1 | 10/2019 | Boudreau et al. |
| 2019/0339784 A1 | 11/2019 | Lemay et al. |
| 2019/0340252 A1 | 11/2019 | Huyghe |
| 2019/0341027 A1 | 11/2019 | Vescovi et al. |
| 2019/0341056 A1 | 11/2019 | Paulik et al. |
| 2019/0347063 A1 | 11/2019 | Liu et al. |
| 2019/0347525 A1 | 11/2019 | Liem et al. |
| 2019/0348022 A1 | 11/2019 | Park et al. |
| 2019/0349333 A1 | 11/2019 | Pickover et al. |
| 2019/0349622 A1 | 11/2019 | Kim et al. |
| 2019/0354256 A1 | 11/2019 | Karunamuni et al. |
| 2019/0354548 A1 | 11/2019 | Orr et al. |
| 2019/0355346 A1 | 11/2019 | Bellegarda |

(56) References Cited

U.S. PATENT DOCUMENTS

| | | |
|---|---|---|
| 2019/0355384 A1 | 11/2019 | Sereshki et al. |
| 2019/0361729 A1 | 11/2019 | Gruber et al. |
| 2019/0361978 A1 | 11/2019 | Ray et al. |
| 2019/0362252 A1 | 11/2019 | Miller et al. |
| 2019/0362557 A1 | 11/2019 | Lacey et al. |
| 2019/0369748 A1 | 12/2019 | Hindi et al. |
| 2019/0369842 A1 | 12/2019 | Dolbakian et al. |
| 2019/0369868 A1 | 12/2019 | Jin et al. |
| 2019/0370292 A1 | 12/2019 | Irani et al. |
| 2019/0370323 A1 | 12/2019 | Davidson et al. |
| 2019/0370443 A1 | 12/2019 | Lesso |
| 2019/0371315 A1 | 12/2019 | Newendorp et al. |
| 2019/0371316 A1 | 12/2019 | Weinstein et al. |
| 2019/0371317 A1 | 12/2019 | Irani et al. |
| 2019/0371331 A1 | 12/2019 | Schramm et al. |
| 2019/0372902 A1 | 12/2019 | Piersol |
| 2019/0373102 A1 | 12/2019 | Weinstein et al. |
| 2019/0377955 A1 | 12/2019 | Swaminathan et al. |
| 2019/0385043 A1 | 12/2019 | Choudhary et al. |
| 2019/0385418 A1 | 12/2019 | Mixter et al. |
| 2019/0387352 A1 | 12/2019 | Jot et al. |
| 2019/0391726 A1 | 12/2019 | Iskandar et al. |
| 2020/0005779 A1 | 1/2020 | Liao et al. |
| 2020/0012718 A1 | 1/2020 | Kung et al. |
| 2020/0019609 A1 | 1/2020 | Yu et al. |
| 2020/0020326 A1 | 1/2020 | Srinivasan et al. |
| 2020/0034421 A1 | 1/2020 | Ferrucci et al. |
| 2020/0035224 A1 | 1/2020 | Ward et al. |
| 2020/0042334 A1 | 2/2020 | Radebaugh et al. |
| 2020/0043467 A1 | 2/2020 | Qian et al. |
| 2020/0043471 A1 | 2/2020 | Ma et al. |
| 2020/0043482 A1 | 2/2020 | Gruber et al. |
| 2020/0043489 A1 | 2/2020 | Bradley et al. |
| 2020/0044485 A1 | 2/2020 | Smith et al. |
| 2020/0045164 A1 | 2/2020 | Kwatra et al. |
| 2020/0051554 A1 | 2/2020 | Kim et al. |
| 2020/0051565 A1 | 2/2020 | Singh |
| 2020/0051583 A1 | 2/2020 | Wu et al. |
| 2020/0053218 A1 | 2/2020 | Gray |
| 2020/0058299 A1 | 2/2020 | Lee et al. |
| 2020/0065601 A1 | 2/2020 | Andreassen |
| 2020/0066236 A1 | 2/2020 | Giusti et al. |
| 2020/0073629 A1 | 3/2020 | Lee et al. |
| 2020/0075018 A1 | 3/2020 | Chen |
| 2020/0075040 A1 | 3/2020 | Provost et al. |
| 2020/0076538 A1 | 3/2020 | Soultan et al. |
| 2020/0081615 A1 | 3/2020 | Yi et al. |
| 2020/0082807 A1 | 3/2020 | Kim et al. |
| 2020/0084572 A1 | 3/2020 | Jadav et al. |
| 2020/0090393 A1 | 3/2020 | Shin et al. |
| 2020/0090658 A1 | 3/2020 | Shin et al. |
| 2020/0091958 A1 | 3/2020 | Curtis et al. |
| 2020/0092625 A1 | 3/2020 | Raffle |
| 2020/0098352 A1 | 3/2020 | Feinstein et al. |
| 2020/0098362 A1 | 3/2020 | Piernot et al. |
| 2020/0098368 A1 | 3/2020 | Lemay et al. |
| 2020/0103963 A1 | 4/2020 | Kelly et al. |
| 2020/0104357 A1 | 4/2020 | Bellegarda et al. |
| 2020/0104362 A1 | 4/2020 | Yang et al. |
| 2020/0104369 A1 | 4/2020 | Bellegarda |
| 2020/0104668 A1 | 4/2020 | Sanghavi et al. |
| 2020/0105260 A1 | 4/2020 | Piernot et al. |
| 2020/0112454 A1 | 4/2020 | Brown et al. |
| 2020/0117717 A1 | 4/2020 | Ramamurti et al. |
| 2020/0118566 A1 | 4/2020 | Zhou |
| 2020/0118568 A1 | 4/2020 | Kudurshian et al. |
| 2020/0125820 A1 | 4/2020 | Kim et al. |
| 2020/0127988 A1 | 4/2020 | Bradley et al. |
| 2020/0134316 A1 | 4/2020 | Krishnamurthy et al. |
| 2020/0135180 A1 | 4/2020 | Mukherjee et al. |
| 2020/0135209 A1 | 4/2020 | Delfarah et al. |
| 2020/0135213 A1 | 4/2020 | Kim et al. |
| 2020/0135226 A1 | 4/2020 | Mittal et al. |
| 2020/0137230 A1 | 4/2020 | Spohrer |
| 2020/0142505 A1 | 5/2020 | Choi et al. |
| 2020/0142554 A1 | 5/2020 | Lin et al. |
| 2020/0143812 A1 | 5/2020 | Walker, II et al. |
| 2020/0143819 A1 | 5/2020 | Delcroix et al. |
| 2020/0152186 A1 | 5/2020 | Koh et al. |
| 2020/0152187 A1 | 5/2020 | Kline et al. |
| 2020/0159579 A1 | 5/2020 | Shear et al. |
| 2020/0159651 A1 | 5/2020 | Myers |
| 2020/0159801 A1 | 5/2020 | Sekine |
| 2020/0160179 A1 | 5/2020 | Chien et al. |
| 2020/0160838 A1 | 5/2020 | Lee |
| 2020/0168120 A1 | 5/2020 | Rodriguez Bravo |
| 2020/0169637 A1 | 5/2020 | Sanghavi et al. |
| 2020/0175566 A1 | 6/2020 | Bender et al. |
| 2020/0176004 A1 | 6/2020 | Kleijn et al. |
| 2020/0176018 A1 | 6/2020 | Feinauer et al. |
| 2020/0184057 A1 | 6/2020 | Mukund |
| 2020/0184964 A1 | 6/2020 | Myers et al. |
| 2020/0184966 A1 | 6/2020 | Yavagal |
| 2020/0193997 A1 | 6/2020 | Piernot et al. |
| 2020/0210142 A1 | 7/2020 | Mu et al. |
| 2020/0211566 A1 | 7/2020 | Kang et al. |
| 2020/0218074 A1 | 7/2020 | Hoover et al. |
| 2020/0218780 A1 | 7/2020 | Jun et al. |
| 2020/0218805 A1 | 7/2020 | Liu et al. |
| 2020/0219517 A1 | 7/2020 | Wang et al. |
| 2020/0220914 A1 | 7/2020 | Carrigan et al. |
| 2020/0221155 A1 | 7/2020 | Hansen et al. |
| 2020/0226481 A1 | 7/2020 | Sim et al. |
| 2020/0226823 A1 | 7/2020 | Stachniak et al. |
| 2020/0227034 A1 | 7/2020 | Summa et al. |
| 2020/0227044 A1 | 7/2020 | Lindahl |
| 2020/0228774 A1 | 7/2020 | Kar et al. |
| 2020/0243069 A1 | 7/2020 | Amores et al. |
| 2020/0243094 A1 | 7/2020 | Thomson et al. |
| 2020/0249985 A1 | 8/2020 | Zeitlin |
| 2020/0251111 A1 | 8/2020 | Temkin et al. |
| 2020/0252508 A1 | 8/2020 | Gray |
| 2020/0258508 A1 | 8/2020 | Aggarwal et al. |
| 2020/0258512 A1 | 8/2020 | Smith et al. |
| 2020/0258513 A1 | 8/2020 | Smith et al. |
| 2020/0267222 A1 | 8/2020 | Phipps et al. |
| 2020/0267503 A1 | 8/2020 | Watkins et al. |
| 2020/0272485 A1 | 8/2020 | Karashchuk et al. |
| 2020/0275216 A1 | 8/2020 | Mckinney et al. |
| 2020/0279556 A1 | 9/2020 | Gruber et al. |
| 2020/0279576 A1 | 9/2020 | Binder et al. |
| 2020/0279627 A1 | 9/2020 | Nida et al. |
| 2020/0285327 A1 | 9/2020 | Hindi et al. |
| 2020/0286472 A1 | 9/2020 | Newendorp et al. |
| 2020/0286493 A1 | 9/2020 | Orr et al. |
| 2020/0294487 A1 | 9/2020 | Donohoe et al. |
| 2020/0294494 A1 | 9/2020 | Suyama et al. |
| 2020/0294508 A1 | 9/2020 | Kwasiborski et al. |
| 2020/0298394 A1 | 9/2020 | Han et al. |
| 2020/0301950 A1 | 9/2020 | Theo et al. |
| 2020/0302356 A1 | 9/2020 | Gruber et al. |
| 2020/0302919 A1 | 9/2020 | Greborio et al. |
| 2020/0302925 A1 | 9/2020 | Shah et al. |
| 2020/0302930 A1 | 9/2020 | Chen et al. |
| 2020/0302932 A1 | 9/2020 | Schramm et al. |
| 2020/0304955 A1 | 9/2020 | Gross et al. |
| 2020/0304972 A1 | 9/2020 | Gross et al. |
| 2020/0305084 A1 | 9/2020 | Freeman et al. |
| 2020/0310513 A1 | 10/2020 | Nicholson et al. |
| 2020/0312315 A1 | 10/2020 | Li et al. |
| 2020/0312317 A1 | 10/2020 | Kothari et al. |
| 2020/0314191 A1 | 10/2020 | Madhavan et al. |
| 2020/0319850 A1 | 10/2020 | Stasior et al. |
| 2020/0320592 A1 | 10/2020 | Soule et al. |
| 2020/0320988 A1 | 10/2020 | Rastogi et al. |
| 2020/0322571 A1 | 10/2020 | Awai |
| 2020/0327895 A1 | 10/2020 | Gruber et al. |
| 2020/0333875 A1 | 10/2020 | Bansal et al. |
| 2020/0334068 A1 | 10/2020 | Krishnamurthy et al. |
| 2020/0334492 A1 | 10/2020 | Zheng et al. |
| 2020/0334524 A1 | 10/2020 | Sprague et al. |
| 2020/0335121 A1 | 10/2020 | Mosseri et al. |
| 2020/0335128 A1 | 10/2020 | Sheeder et al. |
| 2020/0342082 A1 | 10/2020 | Sapozhnykov et al. |

(56) References Cited

U.S. PATENT DOCUMENTS

| | | |
|---|---|---|
| 2020/0342182 A1 | 10/2020 | Premkumar et al. |
| 2020/0342849 A1 | 10/2020 | Yu et al. |
| 2020/0342863 A1 | 10/2020 | Aggarwal et al. |
| 2020/0348813 A1 | 11/2020 | Sharifi et al. |
| 2020/0356243 A1 | 11/2020 | Meyer et al. |
| 2020/0356589 A1 | 11/2020 | Rekik et al. |
| 2020/0356610 A1 | 11/2020 | Coimbra et al. |
| 2020/0356634 A1 | 11/2020 | Srinivasan et al. |
| 2020/0357387 A1 | 11/2020 | Prabhavalkar et al. |
| 2020/0357391 A1 | 11/2020 | Ghoshal et al. |
| 2020/0357406 A1 | 11/2020 | York et al. |
| 2020/0357409 A1 | 11/2020 | Sun et al. |
| 2020/0364411 A1 | 11/2020 | Evermann |
| 2020/0364858 A1 | 11/2020 | Kaethner et al. |
| 2020/0365155 A1 | 11/2020 | Milden |
| 2020/0367006 A1 | 11/2020 | Beckhardt |
| 2020/0372633 A1 | 11/2020 | Lee, II et al. |
| 2020/0372719 A1 | 11/2020 | Andjelic et al. |
| 2020/0372904 A1 | 11/2020 | Vescovi et al. |
| 2020/0372905 A1 | 11/2020 | Wang et al. |
| 2020/0374243 A1 | 11/2020 | Jina et al. |
| 2020/0379610 A1 | 12/2020 | Ford et al. |
| 2020/0379640 A1 | 12/2020 | Bellegarda et al. |
| 2020/0379726 A1 | 12/2020 | Blatz et al. |
| 2020/0379727 A1 | 12/2020 | Blatz et al. |
| 2020/0379728 A1 | 12/2020 | Gada et al. |
| 2020/0380389 A1 | 12/2020 | Eldeeb et al. |
| 2020/0380956 A1 | 12/2020 | Rossi et al. |
| 2020/0380963 A1 | 12/2020 | Chappidi et al. |
| 2020/0380966 A1 | 12/2020 | Acero et al. |
| 2020/0380973 A1 | 12/2020 | Novitchenko et al. |
| 2020/0380974 A1 | 12/2020 | Gallagher et al. |
| 2020/0380980 A1 | 12/2020 | Shum et al. |
| 2020/0380984 A1 | 12/2020 | Venkatraman et al. |
| 2020/0380985 A1 | 12/2020 | Gada et al. |
| 2020/0382616 A1 | 12/2020 | Vaishampayan et al. |
| 2020/0382635 A1 | 12/2020 | Vora et al. |
| 2020/0394436 A1 | 12/2020 | Rakshit et al. |
| 2020/0411002 A1 | 12/2020 | Lee et al. |
| 2021/0006943 A1 | 1/2021 | Gross et al. |
| 2021/0011557 A1 | 1/2021 | Lemay et al. |
| 2021/0012113 A1 | 1/2021 | Petill et al. |
| 2021/0012775 A1 | 1/2021 | Kang et al. |
| 2021/0012776 A1 | 1/2021 | Peterson et al. |
| 2021/0035556 A1 | 2/2021 | Shen et al. |
| 2021/0035567 A1 | 2/2021 | Newendorp et al. |
| 2021/0043190 A1 | 2/2021 | Wang et al. |
| 2021/0065698 A1 | 3/2021 | Topcu et al. |
| 2021/0067631 A1 | 3/2021 | Van Os et al. |
| 2021/0072953 A1 | 3/2021 | Amarilio et al. |
| 2021/0073254 A1 | 3/2021 | Ghafourifar et al. |
| 2021/0073293 A1 | 3/2021 | Fenton et al. |
| 2021/0074264 A1 | 3/2021 | Liang et al. |
| 2021/0074295 A1 | 3/2021 | Moreno et al. |
| 2021/0082400 A1 | 3/2021 | Vishnoi et al. |
| 2021/0082420 A1 | 3/2021 | Kraljic et al. |
| 2021/0089124 A1 | 3/2021 | Manjunath et al. |
| 2021/0090314 A1 | 3/2021 | Hussen et al. |
| 2021/0092128 A1 | 3/2021 | Leblang |
| 2021/0097998 A1 | 4/2021 | Kim et al. |
| 2021/0099317 A1 | 4/2021 | Hilleli et al. |
| 2021/0104232 A1 | 4/2021 | Lee et al. |
| 2021/0104236 A1 | 4/2021 | Doggett et al. |
| 2021/0105528 A1 | 4/2021 | Van Os et al. |
| 2021/0110106 A1 | 4/2021 | Vescovi et al. |
| 2021/0110115 A1 | 4/2021 | Moritz et al. |
| 2021/0110254 A1 | 4/2021 | Duy et al. |
| 2021/0117214 A1 | 4/2021 | Presant et al. |
| 2021/0124417 A1 | 4/2021 | Ma |
| 2021/0124597 A1 | 4/2021 | Ramakrishnan et al. |
| 2021/0127031 A1 | 4/2021 | Kanemoto |
| 2021/0127220 A1 | 4/2021 | Mathieu et al. |
| 2021/0134318 A1 | 5/2021 | Harvey et al. |
| 2021/0141839 A1 | 5/2021 | Tang et al. |
| 2021/0142782 A1 | 5/2021 | Wolf et al. |
| 2021/0143987 A1 | 5/2021 | Xu et al. |
| 2021/0144251 A1 | 5/2021 | Chen |
| 2021/0149629 A1 | 5/2021 | Martel et al. |
| 2021/0149996 A1 | 5/2021 | Bellegarda |
| 2021/0150151 A1 | 5/2021 | Jiaming et al. |
| 2021/0151041 A1 | 5/2021 | Gruber et al. |
| 2021/0151053 A1 | 5/2021 | Takahashi et al. |
| 2021/0151070 A1 | 5/2021 | Binder et al. |
| 2021/0152684 A1 | 5/2021 | Weinstein et al. |
| 2021/0165826 A1 | 6/2021 | Graham et al. |
| 2021/0173555 A1 | 6/2021 | Raja et al. |
| 2021/0174020 A1 | 6/2021 | Sohn et al. |
| 2021/0174022 A1 | 6/2021 | Ishikawa et al. |
| 2021/0174403 A1 | 6/2021 | Bellini et al. |
| 2021/0176521 A1 | 6/2021 | Matthews |
| 2021/0182716 A1 | 6/2021 | Muramoto et al. |
| 2021/0191603 A1 | 6/2021 | Napolitano et al. |
| 2021/0191968 A1 | 6/2021 | Orr et al. |
| 2021/0208752 A1 | 7/2021 | Hwang |
| 2021/0208841 A1 | 7/2021 | Wilberding |
| 2021/0210089 A1 | 7/2021 | Ma et al. |
| 2021/0216134 A1 | 7/2021 | Fukunaga et al. |
| 2021/0216760 A1 | 7/2021 | Dominic et al. |
| 2021/0224032 A1 | 7/2021 | Ryan et al. |
| 2021/0224474 A1 | 7/2021 | Jerome et al. |
| 2021/0233532 A1 | 7/2021 | Aram et al. |
| 2021/0247959 A1 | 8/2021 | Agarwal et al. |
| 2021/0248804 A1 | 8/2021 | Abdelaziz et al. |
| 2021/0249009 A1 | 8/2021 | Manjunath et al. |
| 2021/0256980 A1 | 8/2021 | George-Svahn et al. |
| 2021/0258554 A1 | 8/2021 | Bruls et al. |
| 2021/0258881 A1 | 8/2021 | Freeman et al. |
| 2021/0264913 A1 | 8/2021 | Schramm et al. |
| 2021/0264916 A1 | 8/2021 | Kim et al. |
| 2021/0271333 A1 | 9/2021 | Hindi et al. |
| 2021/0273894 A1 | 9/2021 | Tian et al. |
| 2021/0278956 A1 | 9/2021 | Dolbakian et al. |
| 2021/0279548 A1 | 9/2021 | Adan et al. |
| 2021/0280180 A1 | 9/2021 | Skobeltsyn et al. |
| 2021/0281965 A1 | 9/2021 | Malik et al. |
| 2021/0287080 A1 | 9/2021 | Moloney |
| 2021/0294569 A1 | 9/2021 | Piersol et al. |
| 2021/0294571 A1 | 9/2021 | Carson et al. |
| 2021/0295602 A1 | 9/2021 | Scapel et al. |
| 2021/0303116 A1 | 9/2021 | Barlow |
| 2021/0303342 A1 | 9/2021 | Dunn et al. |
| 2021/0304075 A1 | 9/2021 | Duong et al. |
| 2021/0306812 A1 | 9/2021 | Gross et al. |
| 2021/0312917 A1 | 10/2021 | Weksler et al. |
| 2021/0312930 A1 | 10/2021 | Sugaya |
| 2021/0312931 A1 | 10/2021 | Paulik et al. |
| 2021/0313019 A1 | 10/2021 | Pribanic et al. |
| 2021/0314440 A1 | 10/2021 | Matias et al. |
| 2021/0318901 A1 | 10/2021 | Gruber et al. |
| 2021/0319178 A1 | 10/2021 | Zhang |
| 2021/0327409 A1 | 10/2021 | Naik |
| 2021/0327410 A1 | 10/2021 | Beaufays et al. |
| 2021/0334528 A1 | 10/2021 | Bray et al. |
| 2021/0335342 A1 | 10/2021 | Yuan et al. |
| 2021/0342050 A1 | 11/2021 | Wang |
| 2021/0342212 A1 | 11/2021 | Neumann |
| 2021/0349605 A1 | 11/2021 | Nonaka et al. |
| 2021/0349608 A1 | 11/2021 | Blatz et al. |
| 2021/0350799 A1 | 11/2021 | Hansen et al. |
| 2021/0350803 A1 | 11/2021 | Hansen et al. |
| 2021/0350810 A1 | 11/2021 | Phipps et al. |
| 2021/0352115 A1 | 11/2021 | Hansen et al. |
| 2021/0357172 A1 | 11/2021 | Sinesio et al. |
| 2021/0358294 A1 | 11/2021 | Parashar et al. |
| 2021/0365161 A1 | 11/2021 | Ellis et al. |
| 2021/0365174 A1 | 11/2021 | Ellis et al. |
| 2021/0365641 A1 | 11/2021 | Zhang et al. |
| 2021/0365863 A1 | 11/2021 | Friske et al. |
| 2021/0366473 A1 | 11/2021 | Maeng |
| 2021/0366475 A1 | 11/2021 | Wilkosz et al. |
| 2021/0366480 A1 | 11/2021 | Lemay et al. |
| 2021/0373851 A1 | 12/2021 | Stasior et al. |
| 2021/0375275 A1 | 12/2021 | Yoon et al. |
| 2021/0375290 A1 | 12/2021 | Hu et al. |

(56) References Cited

U.S. PATENT DOCUMENTS

| | | |
|---|---|---|
| 2021/0377381 A1 | 12/2021 | Aggarwal et al. |
| 2021/0390259 A1 | 12/2021 | Hildick-Smith et al. |
| 2021/0390955 A1 | 12/2021 | Piernot et al. |
| 2021/0393168 A1 | 12/2021 | Santarelli et al. |
| 2021/0398187 A1 | 12/2021 | Narayanan et al. |
| 2021/0402306 A1 | 12/2021 | Huang |
| 2021/0406260 A1 | 12/2021 | Sharifi et al. |
| 2021/0407318 A1 | 12/2021 | Pitschel et al. |
| 2021/0407502 A1 | 12/2021 | Vescovi et al. |
| 2022/0004825 A1 | 1/2022 | Xie et al. |
| 2022/0013106 A1 | 1/2022 | Deng et al. |
| 2022/0019292 A1 | 1/2022 | Lemay et al. |
| 2022/0020367 A1 | 1/2022 | Orkin et al. |
| 2022/0021631 A1 | 1/2022 | Jina et al. |
| 2022/0021978 A1 | 1/2022 | Gui et al. |
| 2022/0028379 A1 | 1/2022 | Carbune et al. |
| 2022/0028387 A1 | 1/2022 | Walker et al. |
| 2022/0030345 A1 | 1/2022 | Gong et al. |
| 2022/0035999 A1 | 2/2022 | Pawelec |
| 2022/0043986 A1 | 2/2022 | Nell et al. |
| 2022/0050661 A1 | 2/2022 | Lange et al. |
| 2022/0067283 A1 | 3/2022 | Bellegarda et al. |
| 2022/0068278 A1 | 3/2022 | York et al. |
| 2022/0083986 A1 | 3/2022 | Duffy et al. |
| 2022/0084511 A1 | 3/2022 | Nickson et al. |
| 2022/0092262 A1 | 3/2022 | Ni et al. |
| 2022/0093088 A1 | 3/2022 | Sridhar et al. |
| 2022/0093095 A1 | 3/2022 | Dighe et al. |
| 2022/0093098 A1 | 3/2022 | Samal et al. |
| 2022/0093101 A1 | 3/2022 | Krishnan et al. |
| 2022/0093109 A1 | 3/2022 | Orr et al. |
| 2022/0093110 A1 | 3/2022 | Kim et al. |
| 2022/0094765 A1 | 3/2022 | Niewczas |
| 2022/0100789 A1 | 3/2022 | Kumar et al. |
| 2022/0103491 A1 | 3/2022 | Yang et al. |
| 2022/0107780 A1 | 4/2022 | Gruber et al. |
| 2022/0114327 A1 | 4/2022 | Faaborg et al. |
| 2022/0115016 A1 | 4/2022 | Whalin |
| 2022/0122615 A1 | 4/2022 | Chen et al. |
| 2022/0130126 A1 | 4/2022 | Delgado et al. |
| 2022/0139396 A1 | 5/2022 | Gada et al. |
| 2022/0148587 A1 | 5/2022 | Drummie et al. |
| 2022/0155857 A1 | 5/2022 | Lee et al. |
| 2022/0156041 A1 | 5/2022 | Newendorp et al. |
| 2022/0157310 A1 | 5/2022 | Newendorp et al. |
| 2022/0157315 A1 | 5/2022 | Raux et al. |
| 2022/0157317 A1 | 5/2022 | Burakov et al. |
| 2022/0180868 A1 | 6/2022 | Sharifi et al. |
| 2022/0197491 A1 | 6/2022 | Meyer et al. |
| 2022/0198025 A1 | 6/2022 | Gupta et al. |
| 2022/0206298 A1 | 6/2022 | Goodman |
| 2022/0214775 A1 | 7/2022 | Shah et al. |
| 2022/0215159 A1 | 7/2022 | Qian et al. |
| 2022/0222437 A1 | 7/2022 | Lauber |
| 2022/0223154 A1 | 7/2022 | Zhou et al. |
| 2022/0229985 A1 | 7/2022 | Bellegarda et al. |
| 2022/0230653 A1 | 7/2022 | Binder et al. |
| 2022/0253969 A1 | 8/2022 | Kamenetskaya et al. |
| 2022/0254338 A1 | 8/2022 | Gruber et al. |
| 2022/0254339 A1 | 8/2022 | Acero et al. |
| 2022/0254347 A1 | 8/2022 | Lindahl |
| 2022/0261468 A1 | 8/2022 | Lin et al. |
| 2022/0262354 A1 | 8/2022 | Greborio et al. |
| 2022/0264262 A1 | 8/2022 | Gruber et al. |
| 2022/0284901 A1 | 9/2022 | Novitchenko et al. |
| 2022/0291816 A1 | 9/2022 | Fan et al. |
| 2022/0292128 A1 | 9/2022 | Sharifi et al. |
| 2022/0293124 A1 | 9/2022 | Weinberg et al. |
| 2022/0293125 A1 | 9/2022 | Maddika et al. |
| 2022/0295170 A1 | 9/2022 | Ito et al. |
| 2022/0300094 A1 | 9/2022 | Hindi et al. |
| 2022/0301549 A1 | 9/2022 | Lee et al. |
| 2022/0301566 A1 | 9/2022 | Van Os et al. |
| 2022/0308718 A1 | 9/2022 | Klein et al. |
| 2022/0329691 A1 | 10/2022 | Chinthakunta et al. |
| 2022/0343066 A1 | 10/2022 | Kwong et al. |
| 2022/0366889 A1 | 11/2022 | Yerroju et al. |
| 2022/0374109 A1 | 11/2022 | Kramer et al. |
| 2022/0374110 A1 | 11/2022 | Ramaswamy et al. |
| 2022/0374597 A1 | 11/2022 | Bellegarda et al. |
| 2022/0374727 A1 | 11/2022 | Hansen et al. |
| 2022/0375466 A1 | 11/2022 | Hergenrader et al. |
| 2022/0375553 A1 | 11/2022 | Lasko et al. |
| 2022/0382843 A1 | 12/2022 | Gong et al. |
| 2022/0382994 A1 | 12/2022 | Cox et al. |
| 2022/0383044 A1 | 12/2022 | Bellegarda |
| 2022/0383864 A1 | 12/2022 | Gruber et al. |
| 2022/0383872 A1 | 12/2022 | Li et al. |
| 2022/0391585 A1 | 12/2022 | Bellegarda et al. |
| 2022/0391603 A1 | 12/2022 | Pham et al. |
| 2022/0392446 A1 | 12/2022 | Webber et al. |
| 2022/0405117 A1 | 12/2022 | Gruber et al. |
| 2022/0406301 A1 | 12/2022 | Barros et al. |
| 2022/0406309 A1 | 12/2022 | Piernot et al. |
| 2022/0408173 A1 | 12/2022 | Gong et al. |
| 2023/0013615 A1 | 1/2023 | Sanghavi et al. |
| 2023/0017115 A1 | 1/2023 | Sanghavi et al. |
| 2023/0018457 A1 | 1/2023 | Zeitlin |
| 2023/0026764 A1 | 1/2023 | Karashchuk et al. |
| 2023/0029028 A1 | 1/2023 | Aitken et al. |
| 2023/0035643 A1 | 2/2023 | Binder et al. |
| 2023/0035941 A1 | 2/2023 | Herman et al. |
| 2023/0036059 A1 | 2/2023 | Blatz et al. |
| 2023/0036798 A1 | 2/2023 | Newendorp et al. |
| 2023/0040703 A1 | 2/2023 | Lemay et al. |
| 2023/0042224 A1 | 2/2023 | Patel et al. |
| 2023/0048256 A1 | 2/2023 | Gui et al. |
| 2023/0051062 A1 | 2/2023 | Hu et al. |
| 2023/0057442 A1 | 2/2023 | Stasior et al. |
| 2023/0058929 A1 | 2/2023 | Lasko et al. |
| 2023/0066552 A1 | 3/2023 | Van Os et al. |
| 2023/0072481 A1 | 3/2023 | Acero et al. |
| 2023/0076716 A1 | 3/2023 | Dogrusoz et al. |
| 2023/0081605 A1 | 3/2023 | O'Mara et al. |
| 2023/0087244 A1 | 3/2023 | Akmal et al. |
| 2023/0098174 A1 | 3/2023 | Simes et al. |
| 2023/0111509 A1 | 4/2023 | Kim et al. |
| 2023/0112859 A1 | 4/2023 | Vilhauer et al. |
| 2023/0134970 A1 | 5/2023 | Rasipuram et al. |
| 2023/0179704 A1 | 6/2023 | Chinthakunta et al. |
| 2023/0186921 A1 | 6/2023 | Paulik et al. |
| 2023/0197063 A1 | 6/2023 | Greborio et al. |
| 2023/0215435 A1 | 7/2023 | Manjunath et al. |
| 2023/0216963 A1 | 7/2023 | Van Os et al. |
| 2023/0236676 A1 | 7/2023 | Hindi et al. |
| 2023/0236717 A1 | 7/2023 | Meyer et al. |
| 2023/0245657 A1 | 8/2023 | Liang et al. |

FOREIGN PATENT DOCUMENTS

| | | |
|---|---|---|
| AU | 2015101171 A4 | 10/2015 |
| AU | 2017203668 A1 | 1/2018 |
| AU | 2018100187 A4 | 3/2018 |
| AU | 2017222436 A1 | 10/2018 |
| CA | 2666438 C | 6/2013 |
| CH | 709795 A1 | 12/2015 |
| CN | 1321296 A | 11/2001 |
| CN | 102866828 A | 1/2013 |
| CN | 102870065 A | 1/2013 |
| CN | 102882752 A | 1/2013 |
| CN | 102890936 A | 1/2013 |
| CN | 102893327 A | 1/2013 |
| CN | 102915731 A | 2/2013 |
| CN | 102917004 A | 2/2013 |
| CN | 102917271 A | 2/2013 |
| CN | 102918493 A | 2/2013 |
| CN | 102939515 A | 2/2013 |
| CN | 102955652 A | 3/2013 |
| CN | 103035240 A | 4/2013 |
| CN | 103035251 A | 4/2013 |
| CN | 103038728 A | 4/2013 |
| CN | 103064956 A | 4/2013 |
| CN | 103078995 A | 5/2013 |
| CN | 103093334 A | 5/2013 |

(56) References Cited

FOREIGN PATENT DOCUMENTS

| | | | |
|---|---|---|---|
| CN | 103093755 | A | 5/2013 |
| CN | 103105995 | A | 5/2013 |
| CN | 103109249 | A | 5/2013 |
| CN | 103135916 | A | 6/2013 |
| CN | 103187053 | A | 7/2013 |
| CN | 103197963 | A | 7/2013 |
| CN | 103198831 | A | 7/2013 |
| CN | 103209369 | A | 7/2013 |
| CN | 103217892 | A | 7/2013 |
| CN | 103226949 | A | 7/2013 |
| CN | 103236260 | A | 8/2013 |
| CN | 103246638 | A | 8/2013 |
| CN | 103268315 | A | 8/2013 |
| CN | 103277974 | A | 9/2013 |
| CN | 103280218 | A | 9/2013 |
| CN | 103282957 | A | 9/2013 |
| CN | 103292437 | A | 9/2013 |
| CN | 103324100 | A | 9/2013 |
| CN | 103327063 | A | 9/2013 |
| CN | 103365279 | A | 10/2013 |
| CN | 103366741 | A | 10/2013 |
| CN | 203249629 | U | 10/2013 |
| CN | 103390016 | A | 11/2013 |
| CN | 103412789 | A | 11/2013 |
| CN | 103414949 | A | 11/2013 |
| CN | 103426428 | A | 12/2013 |
| CN | 103455135 | A | 12/2013 |
| CN | 103455234 | A | 12/2013 |
| CN | 103456303 | A | 12/2013 |
| CN | 103456304 | A | 12/2013 |
| CN | 103456306 | A | 12/2013 |
| CN | 103457837 | A | 12/2013 |
| CN | 103475551 | A | 12/2013 |
| CN | 103477592 | A | 12/2013 |
| CN | 103533143 | A | 1/2014 |
| CN | 103533154 | A | 1/2014 |
| CN | 103543902 | A | 1/2014 |
| CN | 103546453 | A | 1/2014 |
| CN | 103562863 | A | 2/2014 |
| CN | 103582896 | A | 2/2014 |
| CN | 103593054 | A | 2/2014 |
| CN | 103595869 | A | 2/2014 |
| CN | 103608859 | A | 2/2014 |
| CN | 103620605 | A | 3/2014 |
| CN | 103645876 | A | 3/2014 |
| CN | 103677261 | A | 3/2014 |
| CN | 103686723 | A | 3/2014 |
| CN | 103714816 | A | 4/2014 |
| CN | 103716454 | A | 4/2014 |
| CN | 103727948 | A | 4/2014 |
| CN | 103730120 | A | 4/2014 |
| CN | 103744761 | A | 4/2014 |
| CN | 103748531 | A | 4/2014 |
| CN | 103760984 | A | 4/2014 |
| CN | 103761104 | A | 4/2014 |
| CN | 103765385 | A | 4/2014 |
| CN | 103778527 | A | 5/2014 |
| CN | 103780758 | A | 5/2014 |
| CN | 103792985 | A | 5/2014 |
| CN | 103794212 | A | 5/2014 |
| CN | 103795850 | A | 5/2014 |
| CN | 103809548 | A | 5/2014 |
| CN | 103841268 | A | 6/2014 |
| CN | 103885663 | A | 6/2014 |
| CN | 103902373 | A | 7/2014 |
| CN | 103930945 | A | 7/2014 |
| CN | 103942932 | A | 7/2014 |
| CN | 103943107 | A | 7/2014 |
| CN | 103956169 | A | 7/2014 |
| CN | 103959751 | A | 7/2014 |
| CN | 203721183 | U | 7/2014 |
| CN | 103971680 | A | 8/2014 |
| CN | 104007832 | A | 8/2014 |
| CN | 102693729 | B | 9/2014 |
| CN | 104036774 | A | 9/2014 |
| CN | 104038621 | A | 9/2014 |
| CN | 104050153 | A | 9/2014 |
| CN | 104090652 | A | 10/2014 |
| CN | 104092829 | A | 10/2014 |
| CN | 104113471 | A | 10/2014 |
| CN | 104125322 | A | 10/2014 |
| CN | 104144377 | A | 11/2014 |
| CN | 104145304 | A | 11/2014 |
| CN | 104169837 | A | 11/2014 |
| CN | 104180815 | A | 12/2014 |
| CN | 104185868 | A | 12/2014 |
| CN | 104219785 | A | 12/2014 |
| CN | 104240701 | A | 12/2014 |
| CN | 104243699 | A | 12/2014 |
| CN | 104281259 | A | 1/2015 |
| CN | 104281390 | A | 1/2015 |
| CN | 104284257 | A | 1/2015 |
| CN | 104284486 | A | 1/2015 |
| CN | 104335205 | A | 2/2015 |
| CN | 104335207 | A | 2/2015 |
| CN | 104335234 | A | 2/2015 |
| CN | 104350454 | A | 2/2015 |
| CN | 104360990 | A | 2/2015 |
| CN | 104374399 | A | 2/2015 |
| CN | 104376250 | A | 2/2015 |
| CN | 104378723 | A | 2/2015 |
| CN | 104423625 | A | 3/2015 |
| CN | 104423780 | A | 3/2015 |
| CN | 104427104 | A | 3/2015 |
| CN | 104463552 | A | 3/2015 |
| CN | 104464733 | A | 3/2015 |
| CN | 104487929 | A | 4/2015 |
| CN | 104516522 | A | 4/2015 |
| CN | 104520849 | A | 4/2015 |
| CN | 104573472 | A | 4/2015 |
| CN | 104575493 | A | 4/2015 |
| CN | 104575501 | A | 4/2015 |
| CN | 104575504 | A | 4/2015 |
| CN | 104584010 | A | 4/2015 |
| CN | 104584096 | A | 4/2015 |
| CN | 104584601 | A | 4/2015 |
| CN | 104604274 | A | 5/2015 |
| CN | 104679472 | A | 6/2015 |
| CN | 104685898 | A | 6/2015 |
| CN | 104699746 | A | 6/2015 |
| CN | 104731441 | A | 6/2015 |
| CN | 104769584 | A | 7/2015 |
| CN | 104769670 | A | 7/2015 |
| CN | 104798012 | A | 7/2015 |
| CN | 104821167 | A | 8/2015 |
| CN | 104821934 | A | 8/2015 |
| CN | 104836909 | A | 8/2015 |
| CN | 104854583 | A | 8/2015 |
| CN | 104867492 | A | 8/2015 |
| CN | 104869342 | A | 8/2015 |
| CN | 104951077 | A | 9/2015 |
| CN | 104967748 | A | 10/2015 |
| CN | 104969289 | A | 10/2015 |
| CN | 104978963 | A | 10/2015 |
| CN | 105025051 | A | 11/2015 |
| CN | 105027197 | A | 11/2015 |
| CN | 105093526 | A | 11/2015 |
| CN | 105100356 | A | 11/2015 |
| CN | 105144136 | A | 12/2015 |
| CN | 105164678 | A | 12/2015 |
| CN | 105164719 | A | 12/2015 |
| CN | 105190607 | A | 12/2015 |
| CN | 105247511 | A | 1/2016 |
| CN | 105247551 | A | 1/2016 |
| CN | 105264524 | A | 1/2016 |
| CN | 105264903 | A | 1/2016 |
| CN | 105265005 | A | 1/2016 |
| CN | 105278681 | A | 1/2016 |
| CN | 105320251 | A | 2/2016 |
| CN | 105320726 | A | 2/2016 |
| CN | 105338425 | A | 2/2016 |
| CN | 105379234 | A | 3/2016 |
| CN | 105427122 | A | 3/2016 |
| CN | 105430186 | A | 3/2016 |

(56)  References Cited

FOREIGN PATENT DOCUMENTS

| CN | 105468137 | A | 4/2016 |
| CN | 105471705 | A | 4/2016 |
| CN | 105472587 | A | 4/2016 |
| CN | 105516441 | A | 4/2016 |
| CN | 105554217 | A | 5/2016 |
| CN | 105556592 | A | 5/2016 |
| CN | 105677765 | A | 6/2016 |
| CN | 105791920 | A | 7/2016 |
| CN | 105808200 | A | 7/2016 |
| CN | 105830048 | A | 8/2016 |
| CN | 105869641 | A | 8/2016 |
| CN | 105872222 | A | 8/2016 |
| CN | 105917311 | A | 8/2016 |
| CN | 106030699 | A | 10/2016 |
| CN | 106062734 | A | 10/2016 |
| CN | 106062790 | A | 10/2016 |
| CN | 106164909 | A | 11/2016 |
| CN | 106294558 | A | 1/2017 |
| CN | 106415412 | A | 2/2017 |
| CN | 106462383 | A | 2/2017 |
| CN | 106462617 | A | 2/2017 |
| CN | 106463114 | A | 2/2017 |
| CN | 106465074 | A | 2/2017 |
| CN | 106471570 | A | 3/2017 |
| CN | 106534469 | A | 3/2017 |
| CN | 106558310 | A | 4/2017 |
| CN | 106575195 | A | 4/2017 |
| CN | 106575501 | A | 4/2017 |
| CN | 106773742 | A | 5/2017 |
| CN | 106776581 | A | 5/2017 |
| CN | 107004412 | A | 8/2017 |
| CN | 107450800 | A | 12/2017 |
| CN | 107480161 | A | 12/2017 |
| CN | 107491285 | A | 12/2017 |
| CN | 107491468 | A | 12/2017 |
| CN | 107491469 | A4 | 12/2017 |
| CN | 107506037 | A | 12/2017 |
| CN | 107545262 | A | 1/2018 |
| CN | 107608998 | A | 1/2018 |
| CN | 107615378 | A | 1/2018 |
| CN | 107623616 | A | 1/2018 |
| CN | 107786730 | A | 3/2018 |
| CN | 107852436 | A | 3/2018 |
| CN | 107871500 | A | 4/2018 |
| CN | 107919123 | A | 4/2018 |
| CN | 107924313 | A | 4/2018 |
| CN | 107978313 | A | 5/2018 |
| CN | 108268187 | A | 7/2018 |
| CN | 108647681 | A | 10/2018 |
| CN | 109447234 | A | 3/2019 |
| CN | 109657629 | A | 4/2019 |
| CN | 110135411 | A | 8/2019 |
| CN | 110263144 | A | 9/2019 |
| CN | 105164719 | B | 11/2019 |
| CN | 110531860 | A | 12/2019 |
| CN | 110598671 | A | 12/2019 |
| CN | 110647274 | A | 1/2020 |
| CN | 110825469 | A | 2/2020 |
| CN | 110945840 | A | 3/2020 |
| CN | 111124224 | A | 5/2020 |
| CN | 107123417 | B | 6/2020 |
| CN | 111316203 | A | 6/2020 |
| CN | 111934959 | A | 11/2020 |
| CN | 112204507 | A | 1/2021 |
| DE | 202016008226 | U1 | 5/2017 |
| DK | 179570 | B1 | 2/2019 |
| DK | 180129 | B1 | 6/2020 |
| EP | 1163576 | A4 | 11/2005 |
| EP | 1933230 | A1 | 6/2008 |
| EP | 2551784 | A1 | 1/2013 |
| EP | 2555536 | A1 | 2/2013 |
| EP | 2575128 | A2 | 4/2013 |
| EP | 2608610 | A1 | 6/2013 |
| EP | 2632129 | A1 | 8/2013 |
| EP | 2639792 | A1 | 9/2013 |
| EP | 2669889 | A2 | 12/2013 |
| EP | 2672229 | A2 | 12/2013 |
| EP | 2672231 | A2 | 12/2013 |
| EP | 2675147 | A1 | 12/2013 |
| EP | 2680257 | A1 | 1/2014 |
| EP | 2683147 | A1 | 1/2014 |
| EP | 2683175 | A1 | 1/2014 |
| EP | 2672231 | A3 | 4/2014 |
| EP | 2717259 | A2 | 4/2014 |
| EP | 2725577 | A2 | 4/2014 |
| EP | 2733598 | A2 | 5/2014 |
| EP | 2733896 | A1 | 5/2014 |
| EP | 2741175 | A2 | 6/2014 |
| EP | 2743846 | A2 | 6/2014 |
| EP | 2760015 | A1 | 7/2014 |
| EP | 2779160 | A1 | 9/2014 |
| EP | 2781883 | A2 | 9/2014 |
| EP | 2787683 | A1 | 10/2014 |
| EP | 2801890 | A1 | 11/2014 |
| EP | 2801972 | A1 | 11/2014 |
| EP | 2801974 | A2 | 11/2014 |
| EP | 2824564 | A1 | 1/2015 |
| EP | 2849177 | A1 | 3/2015 |
| EP | 2879402 | A1 | 6/2015 |
| EP | 2881939 | A1 | 6/2015 |
| EP | 2891049 | A1 | 7/2015 |
| EP | 2915021 | A2 | 9/2015 |
| EP | 2930715 | A1 | 10/2015 |
| EP | 2938022 | A1 | 10/2015 |
| EP | 2940556 | A1 | 11/2015 |
| EP | 2947859 | A1 | 11/2015 |
| EP | 2950307 | A1 | 12/2015 |
| EP | 2957986 | A1 | 12/2015 |
| EP | 2973380 | A2 | 1/2016 |
| EP | 2985984 | A2 | 2/2016 |
| EP | 2988513 | A1 | 2/2016 |
| EP | 2891049 | A4 | 3/2016 |
| EP | 2996359 | A1 | 3/2016 |
| EP | 3032532 | A1 | 6/2016 |
| EP | 3035329 | A1 | 6/2016 |
| EP | 3036594 | A2 | 6/2016 |
| EP | 3038333 | A1 | 6/2016 |
| EP | 3076267 | A1 | 10/2016 |
| EP | 3107101 | A1 | 12/2016 |
| EP | 3115905 | A1 | 1/2017 |
| EP | 3125097 | A2 | 2/2017 |
| EP | 3132442 | A1 | 2/2017 |
| EP | 2672231 | B1 | 5/2017 |
| EP | 3161612 | A1 | 5/2017 |
| EP | 3200185 | A1 | 8/2017 |
| EP | 3224708 | A1 | 10/2017 |
| EP | 3227771 | A1 | 10/2017 |
| EP | 3246916 | A1 | 11/2017 |
| EP | 3270658 | A1 | 1/2018 |
| EP | 3300074 | A1 | 3/2018 |
| EP | 3336805 | A1 | 6/2018 |
| EP | 2973380 | B1 | 8/2018 |
| EP | 2983065 | B1 | 8/2018 |
| EP | 3382530 | A1 | 10/2018 |
| EP | 3392876 | A1 | 10/2018 |
| EP | 3401773 | A1 | 11/2018 |
| EP | 2973002 | B1 | 6/2019 |
| EP | 3506151 | A1 | 7/2019 |
| EP | 3550483 | A1 | 10/2019 |
| EP | 3567584 | A1 | 11/2019 |
| EP | 3588912 | A1 | 1/2020 |
| EP | 3323058 | B1 | 2/2020 |
| EP | 3321928 | B1 | 4/2020 |
| EP | 3674922 | A1 | 7/2020 |
| EP | 4131256 | A1 | 2/2023 |
| JP | 2013-37688 | A | 2/2013 |
| JP | 2013-46171 | A | 3/2013 |
| JP | 2013-511214 | A | 3/2013 |
| JP | 2013-65284 | A | 4/2013 |
| JP | 2013-73240 | A | 4/2013 |
| JP | 2013-513315 | A | 4/2013 |
| JP | 2013-80476 | A | 5/2013 |
| JP | 2013-88535 | A | 5/2013 |
| JP | 2013-517566 | A | 5/2013 |

(56)        References Cited

FOREIGN PATENT DOCUMENTS

| | | |
|---|---|---|
| JP | 2013-131087 A | 7/2013 |
| JP | 2013-134430 A | 7/2013 |
| JP | 2013-134729 A | 7/2013 |
| JP | 2013-140520 A | 7/2013 |
| JP | 2013-527947 A | 7/2013 |
| JP | 2013-528012 A | 7/2013 |
| JP | 2013-148419 A | 8/2013 |
| JP | 2013-156349 A | 8/2013 |
| JP | 2013-174987 A | 9/2013 |
| JP | 2013-535059 A | 9/2013 |
| JP | 2013-200265 A | 10/2013 |
| JP | 2013-200423 A | 10/2013 |
| JP | 2013-205999 A | 10/2013 |
| JP | 2013-231655 A | 11/2013 |
| JP | 2013-238935 A | 11/2013 |
| JP | 2013-238936 A | 11/2013 |
| JP | 2013-248292 A | 12/2013 |
| JP | 2013-257694 A | 12/2013 |
| JP | 2013-258600 A | 12/2013 |
| JP | 2014-2586 A | 1/2014 |
| JP | 2014-10688 A | 1/2014 |
| JP | 2014-502445 A | 1/2014 |
| JP | 2014-26629 A | 2/2014 |
| JP | 2014-45449 A | 3/2014 |
| JP | 2014-507903 A | 3/2014 |
| JP | 2014-60600 A | 4/2014 |
| JP | 2014-72586 A | 4/2014 |
| JP | 2014-77969 A | 5/2014 |
| JP | 2014-89711 A | 5/2014 |
| JP | 2014-109889 A | 6/2014 |
| JP | 2014-124332 A | 7/2014 |
| JP | 2014-126600 A | 7/2014 |
| JP | 2014-127754 A | 7/2014 |
| JP | 2014-140121 A | 7/2014 |
| JP | 2014-518409 A | 7/2014 |
| JP | 2014-142566 A | 8/2014 |
| JP | 2014-145842 A | 8/2014 |
| JP | 2014-146940 A | 8/2014 |
| JP | 2014-150323 A | 8/2014 |
| JP | 2014-157323 A | 8/2014 |
| JP | 2014-519648 A | 8/2014 |
| JP | 2014-182042 A | 9/2014 |
| JP | 2014-524627 A | 9/2014 |
| JP | 2014-191272 A | 10/2014 |
| JP | 2014-219614 A | 11/2014 |
| JP | 2014-222514 A | 11/2014 |
| JP | 2015-1931 A | 1/2015 |
| JP | 2015-4928 A | 1/2015 |
| JP | 2015-8001 A | 1/2015 |
| JP | 2015-10979 A | 1/2015 |
| JP | 2015-12301 A | 1/2015 |
| JP | 2015-18365 A | 1/2015 |
| JP | 2015-501022 A | 1/2015 |
| JP | 2015-501034 A | 1/2015 |
| JP | 2015-504619 A | 2/2015 |
| JP | 2015-41845 A | 3/2015 |
| JP | 2015-52500 A | 3/2015 |
| JP | 2015-60423 A | 3/2015 |
| JP | 2015-81971 A | 4/2015 |
| JP | 2015-83938 A | 4/2015 |
| JP | 2015-94848 A | 5/2015 |
| JP | 2015-514254 A | 5/2015 |
| JP | 2015-519675 A | 7/2015 |
| JP | 2015-520409 A | 7/2015 |
| JP | 2015-524974 A | 8/2015 |
| JP | 2015-526776 A | 9/2015 |
| JP | 2015-527683 A | 9/2015 |
| JP | 2015-528140 A | 9/2015 |
| JP | 2015-528918 A | 10/2015 |
| JP | 2015-531909 A | 11/2015 |
| JP | 2016-504651 A | 2/2016 |
| JP | 2016-35614 A | 3/2016 |
| JP | 2016-508007 A | 3/2016 |
| JP | 2016-71247 A | 5/2016 |
| JP | 2016-119615 A | 6/2016 |
| JP | 2016-151928 A | 8/2016 |
| JP | 2016-524193 A | 8/2016 |
| JP | 2016-156845 A | 9/2016 |
| JP | 2016-536648 A | 11/2016 |
| JP | 2017-11608 A | 1/2017 |
| JP | 2017-19331 A | 1/2017 |
| JP | 2017-516153 A | 6/2017 |
| JP | 2017-123187 A | 7/2017 |
| JP | 2017-211608 A | 11/2017 |
| JP | 2017-537361 A | 12/2017 |
| JP | 2018-14086 A | 1/2018 |
| JP | 6291147 B1 | 2/2018 |
| JP | 2018-64297 A | 4/2018 |
| JP | 2018-511095 A | 4/2018 |
| JP | 2018-101242 A | 6/2018 |
| JP | 2018-113035 A | 7/2018 |
| JP | 2018-525653 A | 9/2018 |
| JP | 2018-525950 A | 9/2018 |
| JP | 2018-536889 A | 12/2018 |
| KR | 10-2013-0035983 A | 4/2013 |
| KR | 10-2013-0086750 A | 8/2013 |
| KR | 10-2013-0090947 A | 8/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0007282 A | 1/2014 |
| KR | 10-2014-0024271 A | 2/2014 |
| KR | 10-2014-0025996 A | 3/2014 |
| KR | 10-2014-0031283 A | 3/2014 |
| KR | 10-2014-0033574 A | 3/2014 |
| KR | 10-2014-0042994 A | 4/2014 |
| KR | 10-2014-0048779 A | 4/2014 |
| KR | 10-2014-0055204 A | 5/2014 |
| KR | 10-2014-0059697 A | 5/2014 |
| KR | 10-2014-0068752 A | 6/2014 |
| KR | 10-2014-0071208 A | 6/2014 |
| KR | 10-2014-0088449 A | 7/2014 |
| KR | 10-2014-0093949 A | 7/2014 |
| KR | 10-2014-0106715 A | 9/2014 |
| KR | 10-2014-0107253 A | 9/2014 |
| KR | 10-2014-0147557 A | 12/2014 |
| KR | 10-2015-0006454 A | 1/2015 |
| KR | 10-2015-0013631 A | 2/2015 |
| KR | 10-2015-0025059 A | 3/2015 |
| KR | 10-1506510 B1 | 3/2015 |
| KR | 10-2015-0038375 A | 4/2015 |
| KR | 10-2015-0039380 A | 4/2015 |
| KR | 10-2015-0041974 A | 4/2015 |
| KR | 10-2015-0043512 A | 4/2015 |
| KR | 10-1510013 B1 | 4/2015 |
| KR | 10-2015-0062811 A | 6/2015 |
| KR | 10-2015-0095624 A | 8/2015 |
| KR | 10-1555742 B1 | 9/2015 |
| KR | 10-2015-0113127 A | 10/2015 |
| KR | 10-2015-0131262 A | 11/2015 |
| KR | 10-2015-0138109 A | 12/2015 |
| KR | 10-2016-0004351 A | 1/2016 |
| KR | 10-2016-0010523 A | 1/2016 |
| KR | 10-2016-0040279 A | 4/2016 |
| KR | 10-2016-0055839 A | 5/2016 |
| KR | 10-2016-0065503 A | 6/2016 |
| KR | 10-2016-0101079 A | 8/2016 |
| KR | 10-2016-0101198 A | 8/2016 |
| KR | 10-2016-0105847 A | 9/2016 |
| KR | 10-2016-0121585 A | 10/2016 |
| KR | 10-2016-0127165 A | 11/2016 |
| KR | 10-2016-0140694 A | 12/2016 |
| KR | 10-2016-0147854 A | 12/2016 |
| KR | 10-2017-0004482 A | 1/2017 |
| KR | 10-2017-0036805 A | 4/2017 |
| KR | 10-2017-0096774 A | 8/2017 |
| KR | 10-2017-0104006 A | 9/2017 |
| KR | 10-2017-0107058 A | 9/2017 |
| KR | 10-1776673 B1 | 9/2017 |
| KR | 10-2018-0032632 A | 3/2018 |
| KR | 10-2018-0034637 A | 4/2018 |
| KR | 10-2018-0122837 A | 11/2018 |
| KR | 10-2018-0133525 A | 12/2018 |

(56)        References Cited

FOREIGN PATENT DOCUMENTS

| | | | |
|---|---|---|---|
| KR | 10-2018-0135877 | A | 12/2018 |
| KR | 10-1959328 | B1 | 3/2019 |
| KR | 10-2020-0007926 | A | 1/2020 |
| KR | 10-2020-0105519 | A | 9/2020 |
| RU | 2012141604 | A | 4/2014 |
| TW | 201312548 | A | 3/2013 |
| TW | 201407184 | A | 2/2014 |
| TW | 201610982 | A | 3/2016 |
| TW | 201629750 | A | 8/2016 |
| WO | 2011/084156 | A2 | 7/2011 |
| WO | 2011/088053 | A2 | 7/2011 |
| WO | 2011/116309 | A1 | 9/2011 |
| WO | 2012/033312 | A1 | 3/2012 |
| WO | 2012/092562 | A1 | 7/2012 |
| WO | 2012/145227 | A1 | 10/2012 |
| WO | 2012/167168 | A2 | 12/2012 |
| WO | 2012/173902 | A2 | 12/2012 |
| WO | 2013/009578 | A2 | 1/2013 |
| WO | 2013/022135 | A1 | 2/2013 |
| WO | 2013/022223 | A2 | 2/2013 |
| WO | 2013/048880 | A1 | 4/2013 |
| WO | 2013/049358 | A1 | 4/2013 |
| WO | 2013/057153 | A1 | 4/2013 |
| WO | 2013/101489 | A1 | 7/2013 |
| WO | 2013/118988 | A1 | 8/2013 |
| WO | 2013/122310 | A1 | 8/2013 |
| WO | 2013/128999 | A1 | 9/2013 |
| WO | 2013/133533 | A1 | 9/2013 |
| WO | 2013/137660 | A1 | 9/2013 |
| WO | 2013/163113 | A1 | 10/2013 |
| WO | 2013/163857 | A1 | 11/2013 |
| WO | 2013/169842 | A2 | 11/2013 |
| WO | 2013/173504 | A1 | 11/2013 |
| WO | 2013/173511 | A2 | 11/2013 |
| WO | 2013/176847 | A1 | 11/2013 |
| WO | 2013/184953 | A1 | 12/2013 |
| WO | 2013/184990 | A1 | 12/2013 |
| WO | 2014/003138 | A1 | 1/2014 |
| WO | 2014/004544 | A2 | 1/2014 |
| WO | 2014/008461 | A1 | 1/2014 |
| WO | 2014/018580 | A1 | 1/2014 |
| WO | 2014/021967 | A1 | 2/2014 |
| WO | 2014/022148 | A1 | 2/2014 |
| WO | 2014/028735 | A2 | 2/2014 |
| WO | 2014/028797 | A1 | 2/2014 |
| WO | 2014/031505 | A1 | 2/2014 |
| WO | 2014/032461 | A1 | 3/2014 |
| WO | 2014/040022 | A2 | 3/2014 |
| WO | 2014/046475 | A1 | 3/2014 |
| WO | 2014/047047 | A1 | 3/2014 |
| WO | 2014/048855 | A1 | 4/2014 |
| WO | 2014/066352 | A1 | 5/2014 |
| WO | 2014/070872 | A2 | 5/2014 |
| WO | 2014/073825 | A1 | 5/2014 |
| WO | 2014/078965 | A1 | 5/2014 |
| WO | 2014/093339 | A1 | 6/2014 |
| WO | 2014/093911 | A2 | 6/2014 |
| WO | 2014/096506 | A1 | 6/2014 |
| WO | 2014/124332 | A2 | 8/2014 |
| WO | 2014/137074 | A1 | 9/2014 |
| WO | 2014/138604 | A1 | 9/2014 |
| WO | 2014/143959 | A2 | 9/2014 |
| WO | 2014/144395 | A2 | 9/2014 |
| WO | 2014/144579 | A1 | 9/2014 |
| WO | 2014/144949 | A2 | 9/2014 |
| WO | 2014/149473 | A1 | 9/2014 |
| WO | 2014/151153 | A2 | 9/2014 |
| WO | 2014/124332 | A3 | 10/2014 |
| WO | 2014/159578 | A1 | 10/2014 |
| WO | 2014/159581 | A1 | 10/2014 |
| WO | 2014/162570 | A1 | 10/2014 |
| WO | 2014/169269 | A1 | 10/2014 |
| WO | 2014/173189 | A1 | 10/2014 |
| WO | 2013/173504 | A8 | 12/2014 |
| WO | 2014/197336 | A1 | 12/2014 |
| WO | 2014/197339 | A1 | 12/2014 |
| WO | 2014/197635 | A2 | 12/2014 |
| WO | 2014/197730 | A1 | 12/2014 |
| WO | 2014/200728 | A1 | 12/2014 |
| WO | 2014/200731 | A1 | 12/2014 |
| WO | 2014/203495 | A1 | 12/2014 |
| WO | 2014/204659 | A2 | 12/2014 |
| WO | 2014/209264 | A1 | 12/2014 |
| WO | 2014/210392 | A2 | 12/2014 |
| WO | 2015/018440 | A1 | 2/2015 |
| WO | 2015/020942 | A1 | 2/2015 |
| WO | 2015/029379 | A1 | 3/2015 |
| WO | 2015/030796 | A1 | 3/2015 |
| WO | 2015/036817 | A1 | 3/2015 |
| WO | 2015/041882 | A1 | 3/2015 |
| WO | 2015/041892 | A1 | 3/2015 |
| WO | 2015/047932 | A1 | 4/2015 |
| WO | 2015/053485 | A1 | 4/2015 |
| WO | 2015/054141 | A1 | 4/2015 |
| WO | 2015/080530 | A1 | 6/2015 |
| WO | 2015/084659 | A1 | 6/2015 |
| WO | 2015/092943 | A1 | 6/2015 |
| WO | 2015/094169 | A1 | 6/2015 |
| WO | 2015/094369 | A1 | 7/2015 |
| WO | 2015/098306 | A1 | 7/2015 |
| WO | 2015/099939 | A1 | 7/2015 |
| WO | 2015/112625 | A1 | 7/2015 |
| WO | 2015/116151 | A1 | 8/2015 |
| WO | 2015/121449 | A1 | 8/2015 |
| WO | 2015/127404 | A1 | 8/2015 |
| WO | 2015/151133 | A1 | 10/2015 |
| WO | 2015/153310 | A1 | 10/2015 |
| WO | 2015/157013 | A1 | 10/2015 |
| WO | 2015/183368 | A1 | 12/2015 |
| WO | 2015/183401 | A1 | 12/2015 |
| WO | 2015/183699 | A1 | 12/2015 |
| WO | 2015/184186 | A1 | 12/2015 |
| WO | 2015/184387 | A1 | 12/2015 |
| WO | 2015/200207 | A1 | 12/2015 |
| WO | 2016/004074 | A1 | 1/2016 |
| WO | 2016/027933 | A1 | 2/2016 |
| WO | 2016/028946 | A1 | 2/2016 |
| WO | 2016/033257 | A1 | 3/2016 |
| WO | 2016/039992 | A1 | 3/2016 |
| WO | 2016/040721 | A1 | 3/2016 |
| WO | 2016/045192 | A1 | 3/2016 |
| WO | 2016/048789 | A1 | 3/2016 |
| WO | 2016/049439 | A1 | 3/2016 |
| WO | 2016/051519 | A1 | 4/2016 |
| WO | 2016/052164 | A1 | 4/2016 |
| WO | 2016/054230 | A1 | 4/2016 |
| WO | 2016/057268 | A1 | 4/2016 |
| WO | 2016/075081 | A1 | 5/2016 |
| WO | 2016/085775 | A2 | 6/2016 |
| WO | 2016/085776 | A1 | 6/2016 |
| WO | 2016/089029 | A1 | 6/2016 |
| WO | 2016/100139 | A1 | 6/2016 |
| WO | 2016/111881 | A1 | 7/2016 |
| WO | 2016/118344 | A1 | 7/2016 |
| WO | 2016/144840 | A1 | 9/2016 |
| WO | 2016/144982 | A1 | 9/2016 |
| WO | 2016/144983 | A1 | 9/2016 |
| WO | 2016/175354 | A1 | 11/2016 |
| WO | 2016/187149 | A1 | 11/2016 |
| WO | 2016/190950 | A1 | 12/2016 |
| WO | 2016/191737 | A2 | 12/2016 |
| WO | 2016/209444 | A1 | 12/2016 |
| WO | 2016/209924 | A1 | 12/2016 |
| WO | 2017/044160 | A1 | 3/2017 |
| WO | 2017/044257 | A1 | 3/2017 |
| WO | 2017/044260 | A1 | 3/2017 |
| WO | 2017/044629 | A1 | 3/2017 |
| WO | 2017/053311 | A1 | 3/2017 |
| WO | 2017/058293 | A1 | 4/2017 |
| WO | 2017/059388 | A1 | 4/2017 |
| WO | 2017/071420 | A1 | 5/2017 |
| WO | 2017/142116 | A1 | 8/2017 |
| WO | 2017/160487 | A1 | 9/2017 |
| WO | 2017/200777 | A1 | 11/2017 |

(56)　　　　　　References Cited

FOREIGN PATENT DOCUMENTS

| WO | 2017/203484 A1 | 11/2017 |
|----|----------------|---------|
| WO | 2017/210035 A1 | 12/2017 |
| WO | 2017/213678 A1 | 12/2017 |
| WO | 2017/213682 A1 | 12/2017 |
| WO | 2017/218194 A1 | 12/2017 |
| WO | 2018/009397 A1 | 1/2018 |
| WO | 2018/014788 A1 | 1/2018 |
| WO | 2018/044633 A1 | 3/2018 |
| WO | 2018/057269 A1 | 3/2018 |
| WO | 2018/067528 A1 | 4/2018 |
| WO | 2018/075170 A1 | 4/2018 |
| WO | 2018/081833 A1 | 5/2018 |
| WO | 2018/090060 A1 | 5/2018 |
| WO | 2018/176053 A1 | 9/2018 |
| WO | 2018/208506 A1 | 11/2018 |
| WO | 2018/209152 A1 | 11/2018 |
| WO | 2018/213401 A1 | 11/2018 |
| WO | 2018/213415 A1 | 11/2018 |
| WO | 2018/213481 A1 | 11/2018 |
| WO | 2018/217014 A1 | 11/2018 |
| WO | 2018/231307 A1 | 12/2018 |
| WO | 2019/067930 A1 | 4/2019 |
| WO | 2019/078576 A1 | 4/2019 |
| WO | 2019/079017 A1 | 4/2019 |
| WO | 2019/143397 A1 | 7/2019 |
| WO | 2019/147429 A1 | 8/2019 |
| WO | 2019/190646 A2 | 10/2019 |
| WO | 2019/236217 A1 | 12/2019 |
| WO | 2020/010530 A1 | 1/2020 |
| WO | 2020/022572 A1 | 1/2020 |
| WO | 2020/068040 A1 | 4/2020 |
| WO | 2020/096706 A1 | 5/2020 |
| WO | 2020/109074 A1 | 6/2020 |
| WO | 2020/208302 A1 | 10/2020 |
| WO | 2020/214006 A1 | 10/2020 |
| WO | 2020/222871 A1 | 11/2020 |
| WO | 2021/054565 A1 | 3/2021 |
| WO | 2021/061349 A1 | 4/2021 |
| WO | 2021/062148 A1 | 4/2021 |
| WO | 2021/188439 A1 | 9/2021 |
| WO | 2021/252230 A1 | 12/2021 |
| WO | 2022/047214 A2 | 3/2022 |

OTHER PUBLICATIONS

Office Action received for Chinese Patent Application No. 202210141724.2, mailed on Aug. 30, 2023, 31 pages (9 pages of English Translation and 22 pages of Official Copy).

Notice of Allowance received for Chinese Patent Application No. 202210141724.2, mailed on Mar. 28, 2024, 2 pages (1 page of English Translation and 1 page of Official Copy).

Office Action received for European Patent Application No. 22198900.7, mailed on Jan. 4, 2024, 13 pages.

Corrected Notice of Allowance received for U.S. Appl. No. 17/949,136, mailed on Oct. 5, 2023, 2 pages.

Abdelaziz et al., "Speaker-Independent Speech-Driven Visual Speech Synthesis using Domain-Adapted Acoustic Models", May 15, 2019, 9 pages.

"Accessibility on iOS", Apple Inc., Online available at: https://developer.apple.com/accessibility/ios/, Retrieved on Jul. 26, 2021, 2 pages.

Advisory Action received for U.S. Appl. No. 15/151,191, mailed on Jun. 21, 2019, 5 pages.

"Alexa, Turn Up the Heat!, Smartthings Samsung [online]", Online available at: <https://web.archive.org/web/20160329142041/https://blog.smartthings.com/news/smartthingsupdates/alexa-turn-up-the-heat/>, Mar. 3, 2016, 3 pages.

Alsharif et al., "Long Short-Term Memory Neural Network for Keyboard Gesture Decoding", IEEE International Conference on Acoustics, Speech and Signal Processing (ICASSP), Brisbane, Australia, Sep. 2015, 5 pages.

Anania, Peter, "Amazon Echo with Home Automation (Smart-things)", Online available at: <https://www.youtube.com/watch?v=LMW6aXmsWNE>, Dec. 20, 2015, 1 page.

Android Authority, "How to use Tasker: A Beginner's Guide", Online available at: <https://youtube.com/watch?v= rDpdS_YWzFc>, May 1, 2013, 1 page.

Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.

Apple, "Apple previews innovative accessibility features combining the power of hardware, software, and machine learning", Available online at: https://www.apple.com/newsroom/2022/05/apple-previews-innovative-accessibility-features/, May 17, 2022, 10 pages.

Apple, "VoiceOver for OS X", Online available at: <http://www.apple.com/accessibility/voiceover/>, May 19, 2014, pp. 1-3.

Applicant-Initiated Interview Summary received for U.S. Appl. No. 15/151,191, mailed on Dec. 26, 2019, 5 pages.

Applicant-Initiated Interview Summary received for U.S. Appl. No. 15/931,384, mailed on Jun. 7, 2022, 4 pages.

Applicant-Initiated Interview Summary received for U.S. Appl. No. 15/931,384, mailed on Nov. 8, 2021, 3 pages.

Applicant-Initiated Interview Summary received for U.S. Appl. No. 17/949,136, mailed on Apr. 5, 2023, 3 pages.

Applicant-Initiated Interview Summary received for U.S. Appl. No. 17/949,136, mailed on Jun. 1, 2023, 3 pages.

Asakura et al., "What LG thinks; How the TV should be in the Living Room", HiVi, vol. 31, No. 7, Stereo Sound Publishing Inc., Jun. 17, 2013, pp. 68-71.

Ashington D.C. Tech & Gaming, "SwipeStatusBar—Reveal the Status Bar in a Fullscreen App", Online Available at: <https://www.youtube.com/watch?v=wA_tT9lAreQ>, Jul. 1, 2013, 3 pages.

"Ask Alexa—Things That Are Smart Wiki", Online available at: <http://thingsthataresmart.wiki/index.php?title=Ask_Alexa&oldid=4283>, Jun. 8, 2016, pp. 1-31.

Automate Your Life, "How to Setup Google Home Routines—A Google Home Routines Walkthrough", Online Available at: <https://www.youtube.com/watch?v=pXokZHP9kZg>, Aug. 12, 2018, 1 page.

Badshah et al., "Deep Features-based Speech Emotion Recognition For Smart Affective Services", Multimedia Tools and Applications, Oct. 31, 2017, pp. 5571-5589.

Bell, Jason, "Machine Learning Hands-On for Developers and Technical Professionals", Wiley, 2014, 82 pages.

Bellegarda, Jeromer, "Chapter 1: Spoken Language Understanding for Natural Interaction: The Siri Experience", Natural Interaction with Robots, Knowbots and Smartphones, 2014, pp. 3-14.

beointegration.com, "BeoLink Gateway—Programming Example", Online Available at: <https://www.youtube.com/watch?v=TXDaJFm5UH4>, Mar. 4, 2015, 3 pages.

Bodapati et al., "Neural Word Decomposition Models for Abusive Language Detection", Proceedings of the Third Workshop on Abusive Language Online, Aug. 1, 2019, pp. 135-145.

Brief Communication Regarding Oral Proceedings received for European Patent Application No. 22156627.6, mailed on Jul. 29, 2022, 1 page.

Burgess, Brian, "Amazon Echo Tip: Enable the Wake Up Sound", Online available at: <https://www.groovypost.com/howto/amazon-echo-tip-enable-wake-up-sound/>, Jun. 30, 2015, 4 pages.

Buttner et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.

Cambria et al., "Jumping NLP curves: A Review of Natural Language Processing Research", IEEE Computational Intelligence magazine, 2014, vol. 9, May 2014, pp. 48-57.

Chang et al., "Monaural Multi-Talker Speech Recognition with Attention Mechanism and Gated Convolutional Networks", Interspeech 2018, Sep. 2-6, 2018, pp. 1586-1590.

(56) References Cited

OTHER PUBLICATIONS

Chen et al., "A Convolutional Neural Network with Dynamic Correlation Pooling", 13th International Conference on Computational Intelligence and Security, IEEE, 2017, pp. 496-499.

Chen et al., "Progressive Joint Modeling in Unsupervised Single-Channel Overlapped Speech Recognition", IEEE/ACM Transactions On Audio, Speech, And Language Processing, vol. 26, No. 1, Jan. 2018, pp. 184-196.

Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.

Chenghao, Yuan, "MacroDroid", Online available at: https://www.ifanr.com/weizhizao/612531, Jan. 25, 2016, 7 pages.

Colt, Sam, "Here's One Way Apple's Smartwatch Could Be Better Than Anything Else", Business Insider, Aug. 21, 2014, pp. 1-4.

Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.

"Context-Sensitive User Interface", Online available at: https://web.archive.org/web/20190407003349/https://en.wikipedia.org/wiki/Context-sensitive_user_interface, Apr. 7, 2019, 3 pages.

Corrected Notice of Allowance received for U.S. Appl. No. 15/931,384, mailed on Oct. 3, 2022, 5 pages.

Corrected Notice of Allowance received for U.S. Appl. No. 15/931,384, mailed on Sep. 2, 2022, 3 pages.

Creswell et al., "Generative Adversarial Networks", IEEE Signal Processing Magazine, Jan. 2018, pp. 53-65.

Czech, Lucas, "A System for Recognizing Natural Spelling of English Words", Diploma Thesis, Karlsruhe Institute of Technology, May 7, 2014, 107 pages.

Dai et al., "Transformer-XL: Attentive Language Models Beyond a Fixed-Length Context", Online available at: arXiv:1901.02860v3, Jun. 2, 2019, 20 pages.

Decision to Grant received for European Patent Application No. 16862616.6, mailed on Feb. 17, 2022, 2 pages.

Deedeevuu, "Amazon Echo Alarm Feature", Online available at: <https://www.youtube.com/watch?v=fdjU8eRLk7c>, Feb. 16, 2015, 1 page.

Delcroix et al., "Context Adaptive Deep Neural Networks For Fast Acoustic Model Adaptation", ICASSP, 2015, pp. 4535-4539.

Delcroix et al., "Context Adaptive Neural Network for Rapid Adaptation of Deep CNN Based Acoustic Models", Interspeech 2016, Sep. 8-12, 2016, pp. 1573-1577.

Derrick, Amanda, "How to Set Up Google Home for Multiple Users", Lifewire, Online available at: <https://www.lifewire.com/set-up-google-home-multiple-users-4685691>, Jun. 8, 2020, 9 pages.

Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.

Dihelson, "How Can I Use Voice or Phrases as Triggers to Macrodroid?", Macrodroid Forums, Online Available at: <https://www.tapatalk.com/groups/macrodroid/how-can-i-use-voice-or-phrases-as-triggers-to-macr-t4845.html>, May 9, 2018, 5 pages.

"DIRECTV™ Voice", Now Part of the DIRECTTV Mobile App for Phones, Sep. 18, 2013, 5 pages.

Dwork et al., "The Algorithmic Foundations of Differential Privacy", Foundations and Trends in Theoretical Computer Science: vol. 9: No. 3-4, 211-407, 2014, 281 pages.

Earthling1984, "Samsung Galaxy Smart Stay Feature Explained", Online available at: <https://www.youtube.com/watch?v=RpjBNtSjupl>, May 29, 2013, 1 page.

Eder et al., "At the Lower End of Language—Exploring the Vulgar and Obscene Side of German", Proceedings of the Third Workshop on Abusive Language Online, Florence, Italy, Aug. 1, 2019, pp. 119-128.

Edim et al., "A Multi-Agent Based Virtual Personal Assistant for E-Health Service", Journal of Information Engineering and Applications, vol. 3, No. 11, 2013, 9 pages.

European Search Report received for European Patent Application No. 22156627.6, mailed on Jul. 13, 2022, 20 pages.

Extended European Search Report received for European Patent Application No. 16862616.6, mailed on Sep. 25, 2018, 11 pages.

Extended European Search Report received for European Patent Application No. 22156627.6, mailed on May 12, 2022, 17 pages.

Extended European Search Report received for European Patent Application No. 22198900.7, mailed on Jan. 9, 2023, 16 pages.

Filipowicz, Luke, "How to use the QuickType keyboard in iOS 8", Online available at: <https://www.imore.com/comment/568232>, Oct. 11, 2014, pp. 1-17.

Final Office Action received for U.S. Appl. No. 15/151,191, mailed on Jan. 25, 2019, 29 pages.

Final Office Action received for U.S. Appl. No. 15/931,384, mailed on Mar. 1, 2022, 41 pages.

Final Office Action received for U.S. Appl. No. 17/949,136, mailed on Apr. 21, 2023, 22 pages.

Fitzpatrick, Aidan, "Introducing Camo 1.5: AR modes", Available Online at: "https://reincubate.com/blog/camo-ar-modes-release/", Oct. 28, 2021, 8 pages.

Gadget Hacks, "Tasker Too Complicated? Give MacroDroid a Try [How-To]", Online available at: <https://www.youtube.com/watch?v=8YL9cWCykKc>, May 27, 2016, 1 page.

"Galaxy S7: How to Adjust Screen Timeout & Lock Screen Timeout", Online available at: <https://www.youtube.com/watch?v=n6e1WKUS2ww>, Jun. 9, 2016, 1 page.

Ganin et al., "Unsupervised Domain Adaptation by Backpropagation", in Proceedings of the 32nd International Conference on Machine Learning, vol. 37, Jul. 2015, 10 pages.

Gatys et al., "Image Style Transfer Using Convolutional Neural Networks", Proceedings of IEEE International Conference on Acoustics, Speech and Signal Processing (ICASSP), 2016, pp. 2414-2423.

Geyer et al., "Differentially Private Federated Learning: A Client Level Perspective", arXiv:1712.07557v2, Mar. 2018, 7 pages.

Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.

Goodfellow et al., "Generative Adversarial Networks", Proceedings of the Neural Information Processing Systems, Dec. 2014, 9 pages.

Google Developers, "Voice search in your app", Online available at: <https://www.youtube.com/watch?v=PS1FbB5qWEI>, Nov. 12, 2014, 1 page.

Gu et al., "BadNets: Evaluating Backdooring Attacks on Deep Neural Networks", IEEE Access, vol. 7, Mar. 21, 2019, pp. 47230-47244.

Guim, Mark, "How to Set a Person-Based Reminder with Cortana", Online available at:—<http://www.wpcentral.com/how-to-person-based-reminder-cortana>, Apr. 26, 2014, 15 pages.

Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, Online available at: https://dl.acm.org/doi/pdf/10.1145/3332165.3347873, Oct. 20-23, 2019, pp. 371-385.

Guo et al., "Time-Delayed Bottleneck Highway Networks Using a DFT Feature for Keyword Spotting", IEEE International Conference on Acoustics, Speech and Signal Processing (ICASSP), IEEE, 2018, 5 pages.

Guo et al., "VizLens: A Robust and Interactive Screen Reader for Interfaces in the Real World", In Proceedings of the 29th Annual Symposium on User Interface Software and Technology (UIST '16), Tokyo, Japan, Online available at: https://dl.acm.org/doi/pdf/10.1145/2984511.2984518, Oct. 16-19, 2016, pp. 651-664.

Gupta et al., "I-vector-based Speaker Adaptation Of Deep Neural Networks For French Broadcast Audio Transcription", ICASSP, 2014, 2014, pp. 6334-6338.

Gupta, Naresh, "Inside Bluetooth Low Energy", Artech House, 2013, 274 pages.

(56) References Cited

OTHER PUBLICATIONS

Haung et al., "A Study for Improving Device-Directed Speech Detection Toward Frictionless Human-Machine Interaction", in Proc. Interspeech, 2019, 5 pages.

Hawkeye, "Hawkeye—A better user testing platform", Online Available at: https://www.youtube.com/watch?v=el0TW0g_76o, Oct. 16, 2019, 3 pages.

Hawkeye, "Learn where people look in your products", Online Available at: https://www.usehawkeye.com, 2019, 6 pages.

"Headset Button Controller v7.3 APK Full APP Download for Andriod, Blackberry, iPhone", Online available at: <http://fullappdownload.com/headset-button-controller-v7-3-apk/>, Jan. 27, 2014, 11 pages.

Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.

Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.

Hershey et al., "Deep Clustering: Discriminative Embeddings For Segmentation And Separation", Proc. ICASSP, Mar. 2016, 6 pages.

"Hey Google: How to Create a Shopping List with Your Google Assistant", Online available at: <https://www.youtube.com/watch?v=w9NCsElax1Y>, May 25, 2018, 1 page.

Hinton et al., "Distilling the Knowledge in A Neural Network", arXiv preprintarXiv:1503.02531, Mar. 2, 2015, 9 pages.

Hook et al., "Automatic speech based emotion recognition using paralinguistics features", Bulletin of the Polish Academy of Sciences, Technical Sciences, vol. 67, No. 3, 2019, pp. 479-488.

"How to adjust the order of control center buttons on iPhone iOS12 version after buying a mobile phone", Available online at: https://jingyan.baidu.com/article/5bbb5albbe5a9 713eba1791b.html?, Jun. 14, 2019, 4 pages.

"How To Enable Google Assistant on Galaxy S7 and Other Android Phones (No. Root)", Online available at: <https://www.youtube.com/watch?v=HekIQbWyksE>, Mar. 20, 2017, 1 page.

"How to Use Ok Google Assistant Even Phone is Locked", Online available at: <https://www.youtube.com/watch?v=9B_gP4j_SP8>, Mar. 12, 2018, 1 page.

Hutsko et al., "iPhone All-in-One For Dummies", 3rd Edition, 2013, 98 pages.

id3.org, "id3v2.4.0-Frames", Online available at: <http://id3.org/id3v2.4.0-frames?action=print>, retrieved on Jan. 22, 2015, pp. 1-41.

Idasallinen, "What's The 'Like' Meter Based on?", Online Available at: <https://community.spotify.com/t5/Content-Questions/What-s-the-like-meter-based-on/td-p/1209974>, Sep. 22, 2015, 6 pages.

Ikeda, Masaru, "beGLOBAL Seoul 2015 Startup Battle: Talkey", YouTube Publisher, Online Available at: <https://www.youtube.com/watch?v=4Wkp7sAAldg>, May 14, 2015, 1 page.

Inews and Tech,"How To Use The QuickType Keyboard In IOS 8", Online available at: <http://www.inewsandtech.com/how-to-use-the-quicktype-keyboard-in-ios-8/>, Sep. 17, 2014, 6 pages.

Intention to Grant received for European Patent Application No. 16862616.6, mailed on Oct. 21, 2021, 8 pages.

"Interactive Voice", Online available at: <http://www.helloivee.com/company/>, retrieved on Feb. 10, 2014, 2 pages.

International Preliminary Report on Patentability received for PCT Patent Application No. PCT/US2016/035107, mailed on May 17, 2018, 24 pages.

International Search Report and Written Opinion received for PCT Patent Application No. PCT/US2016/035107, mailed on Aug. 31, 2016, 26 pages.

Internet Services and Social Net, "How to Search for Similar Websites", Online available at: <https://www.youtube.com/watch?v=nLf2uirpt5s>, see from 0:17 to 1:06, Jul. 4, 2013, 1 page.

"IPhone 6 Smart Guide Full Version for SoftBank", Gijutsu-Hyohron Co. Ltd., vol. 1, Dec. 1, 2014, 4 pages.

Isik et al., "Single-Channel Multi-Speaker Separation using Deep Clustering", Interspeech 2016, Sep. 8-12, 2016, pp. 545-549.

Jeon et al., "Voice Trigger Detection from LVCSR Hypothesis Lattices Using Bidirectional Lattice Recurrent Neural Networks", International Conference on Acoustics, Speech and Signal Processing (ICASSP), IEEE, Feb. 29, 2020, 5 pages.

Jonsson et al., "Proximity-based Reminders Using Bluetooth", 2014 IEEE International Conference on Pervasive Computing and Communications Demonstrations, 2014, pp. 151-153.

Kannan et al., "Smart Reply: Automated Response Suggestion for Email", Available Online at: https://arxiv.org/pdf/1606.04870.pdf, Jun. 15, 2016, 10 pages.

Karn, Ujjwal, "An Intuitive Explanation of Convolutional Neural Networks", The Data Science Blog, Aug. 11, 2016, 23 pages.

Kastrenakes, Jacob, "Siri's creators will unveil their new AI bot on Monday", The Verge, Online available at: <https://web.archive.org/web/20160505090418/https://www.theverge.com/2016/5/4/11593564/viv-labs-unveiling-monday-new-ai-from-siri-creators>, May 4, 2016, 3 pages.

Kickstarter, "Ivee Sleek: Wi-Fi Voice-Activated Assistant", Online available at: <https://www.kickstarter.com/projects/ivee/ivee-sleek-wi-fi-voice-activated-assistant>, retrieved on Feb. 10, 2014, pp. 1-13.

King et al., "Robust Speech Recognition Via Anchor Word Representations", Interspeech 2017, Aug. 20-24, 2017, pp. 2471-2475.

Kondrat, Tomek, "Automation for Everyone with MacroDroid", Online available at: https://www.xda-developers.com/automation-for-everyone-with-macrodroid/, Nov. 17, 2013, 6 pages.

Kruger et al., "Virtual World Accessibility with the Perspective Viewer", Proceedings of ICEAPVI, Athens, Greece, Feb. 12-14, 2015, 6 pages.

Kumar, Shiu, "Ubiquitous Smart Home System Using Android Application", International Journal of Computer Networks & Communications (IJCNC), vol. 6, No. 1, Jan. 2014, pp. 33-43.

Kumatani et al., "Direct Modeling of Raw Audio with DNNS For Wake Word Detection", in 2017 IEEE Automatic Speech Recognition and Understanding Workshop (ASRU), 2017, 6 pages.

Lee, Sungjin, "Structured Discriminative Model For Dialog State Tracking", Proceedings of the SIGDIAL 2013 Conference, Aug. 22-24, 2013, pp. 442-451.

Li et al., "Deep neural network for short-text sentiment classification", International Conference on Database Systems for Advanced Applications, Springer, Cham, 2016, 8 pages.

Lin, Luyuan, "An Assistive Handwashing System with Emotional Intelligence", Using Emotional Intelligence in Cognitive Intelligent Assistant Systems, 2014, 101 pages.

"Link Your Voice to Your Devices with Voice Match, Google Assistant Help", Online available at: <https://support.google.com/assistant/answer/9071681?co=GENIE.Platform%3DAndroid&hl=en>, Retrieved on Jul. 1, 2020, 2 pages.

Liou et al., "Autoencoder for Words", Neurocomputing, vol. 139, Sep. 2014, pp. 84-96.

Liu et al., "Accurate Endpointing with Expected Pause Duration", Sep. 6-10, 2015, pp. 2912-2916.

Loukides et al., "What Is the Internet of Things?", O'Reilly Media Inc., Online Available at: <https://www.oreilly.com/library/view/what-is-the/9781491975633/>, 2015, 31 pages.

Luo et al., "Speaker-Independent Speech Separation With Deep Attractor Network", IEEE/ACM Transactions On Audio, Speech, And Language Processing, vol. 26, No. 4, Apr. 2018, pp. 787-796.

Maas et al., "Combining Acoustic Embeddings And Decoding Features for End-Of-Utterance Detection in Real-Time Far-Field Speech Recognition Systems", in 2018 IEEE International Conference on Acoustics, Speech and Signal Processing (ICASSP), IEEE, 2018, 5 pages.

Mallidi et al., "Device-Directed Utterance Detection", Proc. Interspeech, Aug. 7, 2018, 4 pages.

Marketing Land, "Amazon Echo: Play music", Online Available at: <https://www.youtube.com/watch?v=A7V5NPbsXi4>, Apr. 27, 2015, 3 pages.

(56) References Cited

OTHER PUBLICATIONS

"Meet Ivee, Your Wi-Fi Voice Activated Assistant", Availale Online at: <http://www.helloivee.com/>, retrieved on Feb. 10, 2014, 8 pages.

"Method to Provide Remote Voice Navigation Capability on the Device", ip.com, Jul. 21, 2016, 4 pages.

Mhatre et al., "Donna Interactive Chat-bot acting as a Personal Assistant", International Journal of Computer Applications (0975-8887), vol. 140, No. 10, Apr. 2016, 6 pages.

"Microsoft Soundscape—A map delivered in 3D sound", Microsoft Research, Online available at: https://www.microsoft.com/en-us/research/product/soundscape/, Retrieved on Jul. 26, 2021, 5 pages.

Mikolov et al., "Linguistic Regularities in Continuous Space Word Representations", Proceedings of NAACL-HLT, Jun. 9-14, 2013, pp. 746-751.

Miller, Chance, "Google Keyboard Updated with New Personalized Suggestions Feature", Online available at:—<http://9to5google.com/2014/03/19/google-keyboard-updated-with-new-personalized-suggestions-feature/>, Mar. 19, 2014, 4 pages.

Mnih et al., "Human-Level Control Through Deep Reinforcement Learning", Nature, vol. 518, Feb. 26, 2015, pp. 529-533.

Modern Techies, "Braina-Artificial Personal Assistant for PC (like Cortana, Siri)!!!!", Online available at: <https://www.youtube.com/watch?v=_Coo2P8ilqQ>, Feb. 24, 2017, 3 pages.

Muller et al., "A Taxonomy for Information Linking in Augmented Reality", AVR 2016, Part I, LNCS 9768, 2016, pp. 368-387.

Muller et al., "Control Theoretic Models of Pointing", ACM Transactions on Computer-Human Interaction, Aug. 2017, 36 pages.

Myers, Brad A., "Shortcutter for Palm", Available at: <http://www.cs.cmu.edu/~pebbles/v5/shortcutter/palm/index.html>, retrieved on Jun. 18, 2014, 10 pages.

Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412.

"Natural Language Interface Using Constrained Intermediate Dictionary of Results", List of Publications Manually reviewed for the Search of U.S. Pat. No. 7,177,798, Mar. 22, 2013, 1 page.

NDTV, "Sony SmartWatch 2 Launched in India for Rs. 14,990", available at: <http://gadgets.ndtv.com/others/news/sony-smartwatch-2-launched-in-india-for-rs-14990-420319>, Sep. 18, 2013, 4 pages.

Non-Final Office Action received for U.S. Appl. No. 15/151,191, mailed on Jun. 15, 2018, 25 pages.

Non-Final Office Action received for U.S. Appl. No. 15/151,191, mailed on Oct. 16, 2019, 31 pages.

Non-Final Office Action received for U.S. Appl. No. 15/931,384, mailed on Aug. 4, 2021, 36 pages.

Non-Final Office Action received for U.S. Appl. No. 17/949,136, mailed on Jan. 30, 2023, 20 pages.

Norouzian et al., "Exploring Attention Mechanism for Acoustic based Classification of Speech Utterances into System-Directed and Non-System-Directed", International Conference on Acoustics, Speech and Signal Processing (ICASSP), IEEE, Feb. 1, 2019, 5 pages.

Notice of Allowance received for Chinese Patent Application No. 201680064269.3, mailed on Dec. 17, 2021, 2 pages.

Notice of Allowance received for U.S. Appl. No. 15/151,191, mailed on Feb. 18, 2020, 5 pages.

Notice of Allowance received for U.S. Appl. No. 15/931,384, mailed on Aug. 9, 2022, 9 pages.

Notice of Allowance received for U.S. Appl. No. 17/949,136, mailed on Jul. 20, 2023, 24 pages.

"Nuance Dragon Naturally Speaking", Version 13 End-User Workbook, Nuance Communications Inc., Sep. 2014, 125 pages.

Office Action received for Chinese Patent Application No. 201680064269.3, mailed on May 26, 2021, 14 pages.

Office Action received for European Patent Application No. 16862616.6, mailed on Jul. 13, 2021, 5 pages.

Office Action received for European Patent Application No. 16862616.6, mailed on Jul. 28, 2020, 14 pages.

Office Action received for European Patent Application No. 22156627.6, mailed on May 24, 2023, 11 pages.

Osxdaily, "Get a List of Siri Commands Directly from Siri", Online available at: <http://osxdaily.com/2013/02/05/list-siri-commands/>, Feb. 5, 2013, 15 pages.

Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.

Pathak et al., "Privacy-preserving Speech Processing: Cryptographic and String-matching Frameworks Show Promise", In: IEEE signal processing magazine, Online available at: <http://www.merl.com/publications/docs/TR2013-063.pdf>, Feb. 13, 2013, 16 pages.

Patra et al., "A Kernel-Based Approach for Biomedical Named Entity Recognition", Scientific World Journal, vol. 2013, 2013, pp. 1-7.

Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.

Pc Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.

Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.

Perlow, Jason, "Alexa Loop Mode with Playlist for Sleep Noise", Online Available at: <https://www.youtube.com/watch?v=nSkSuXziJSg>, Apr. 11, 2016, 3 pages.

Philips, Chris, "Thumbprint Radio: A Uniquely Personal Station Inspired By All of Your Thumbs Up", Pandora News, Online Available at: <https://blog.pandora.com/author/chris-phillips/>, Dec. 14, 2015, 7 pages.

Ping et al., "Deep Voice 3: Scaling Text to Speech with Convolutional Sequence Learning", Available online at: https://arxiv.org/abs/1710.07654, Feb. 22, 2018, 16 pages.

Pocketables.com, "AutoRemote example profile", Online available at: https://www.youtube.com/watch?v=kC_zhUnNZj8, Jun. 25, 2013, 1 page.

"Pose, Cambridge Dictionary Definition of Pose", Available online at: <https://dictionary.cambridge.org/dictionary/english/pose>, 4 pages.

Qian et al., "Single-channel Multi-talker Speech Recognition With Permutation Invariant Training", Speech Communication, Issue 104, 2018, pp. 1-11.

"Quick Type Keyboard on iOS 8 Makes Typing Easier", Online available at: <https://www.youtube.com/watch?v=0CldLR4fhVU>, Jun. 3, 2014, 3 pages.

"Radio Stations Tailored to You Based on the Music You Listen to on iTunes", Apple Announces iTunes Radio, Press Release, Jun. 10, 2013, 3 pages.

Rasch, Katharina, "Smart Assistants for Smart Homes", Doctoral Thesis in Electronic and Computer Systems, 2013, 150 pages.

Raux, Antoine, "High-Density Dialog Management The Topic Stack", Adventures in High Density, Online available at: https://medium.com/adventures-in-high-density/high-density-dialog-management-23efcf91db1e, Aug. 1, 2018, 10 pages.

Ravi, Sujith, "Google AI Blog: On-device Machine Intelligence", Available Online at: https://ai.googleblog.com/2017/02/on-device-machine-intelligence.html, Feb. 9, 2017, 4 pages.

Result of Consultation received for European Patent Application No. 16862616.6, mailed on Sep. 29, 2021, 3 pages.

Rios Mafe, "New Bar Search for Facebook", YouTube, available at: <https://www.youtube.com/watch?v=vwgN1WbvCas>, Jul. 19, 2013, 2 pages.

Ritchie, Rene, "QuickType keyboard in iOS 8: Explained", Online Available at: <https://www.imore.com/quicktype-keyboards-ios-8-explained>, Jun. 21, 2014, pp. 1-19.

(56) References Cited

OTHER PUBLICATIONS

Robbins, F. M., "Automatically place an Android Phone on Vibrate at Work", Available online at: https://mikefrobbins.com/2016/07/21/automatically-place-an-android-phone-on-vibrate-at-work/, Jul. 21, 2016, pp. 1-11.

Rodrigues et al., "Exploring Mixed Reality in Specialized Surgical Environments", In Proceedings of the 2017 CHI Conference Extended Abstracts on Human Factors in Computing Systems (CHI EA '17), Denver, CO, USA, Online available at: https://dl.acm.org/doi/pdf/10.1145/3027063.3053273, May 6-11, 2017, pp. 2591-2598.

Ross et al., "Epidemiology as a Framework for Large-Scale Mobile Application Accessibility Assessment", In Proceedings of the 19th International ACM Sigaccess Conference on Computers and Accessibility (ASSETS '17), Baltimore, MD, USA, Online available at: https://dl.acm.org/doi/pdf/10.1145/3132525.3132547, Oct. 29-Nov. 1, 2017, pp. 2-11.

Routines, "SmartThings Support", Online available at: <https://web.archive.org/web/20151207165701/https://support.smartthings.com/hc/en-us/articles/205380034-Routines>, 2015, 3 pages.

Rowland et al., "Designing Connected Products: UX for the Consumer Internet of Things", O'Reilly, May 2015, 452 pages.

Samsung Support, "Create a Quick Command in Bixby to Launch Custom Settings by at Your Command", Online Available at: <https://www.facebook.com/samsungsupport/videos/10154746303151213>, Nov. 13, 2017, 1 page.

Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.

Schenk et al., "GazeEverywhere: Enabling Gaze-only User Interaction on an Unmodified Desktop PC in Everyday Scenarios", In Proceedings of the 2017 CHI Conference on Human Factors in Computing Systems (CHI'17). ACM, New York, NY, 30343044. Online Available at: https://doi.org/10.1145/3025453.3025455, May 6-11, 2017, 11 pages.

Seehafer, Brent, "Activate Google Assistant on Galaxy S7 with Screen off", Online available at: <https://productforums.google.com/forum/#!topic/websearch/lp3qIGBHLVI>, Mar. 8, 2017, 4 pages.

Selfridge et al., "Interact: Tightly-coupling Multimodal Dialog with an Interactive Virtual Assistant", International Conference on Multimodal Interaction, ACM, Nov. 9, 2015, pp. 381-382.

Senior et al., "Improving DNN Speaker Independence With I-Vector Inputs", ICASSP, 2014, pp. 225-229.

Seroter et al., "SOA Patterns with BizTalk Server 2013 and Microsoft Azure", Packt Publishing, Jun. 2015, 454 pages.

Settle et al., "End-to-End Multi-Speaker Speech Recognition", Proc. ICASSP, Apr. 2018, 6 pages.

Shen et al., "Style Transfer from Non-Parallel Text by Cross-Alignment", 31st Conference on Neural Information Processing Systems (NIPS 2017), 2017, 12 pages.

Sigtia et al., "Efficient Voice Trigger Detection for Low Resource Hardware", in Proc. Interspeech 2018, Sep. 2-6, 2018, pp. 2092-2096.

Sigtia et al., "Multi-Task Learning for Voice Trigger Detection", in IEEE International Conference on Acoustics, Speech and Signal Processing (ICASSP), 2020, Apr. 20, 2020, 5 pages.

Simonite, Tom, "Confronting Siri: Microsoft Launches Digital Assistant Cortana", 2014, 2 pages.

Siou, Serge, "How To Control Apple TV 3rd Generation Using Remote app", Online available at: < https://www.youtube.com/watch?v=PhyKftZOS9M>, May 12, 2014, 3 pages.

"Skilled at Playing my iPhone 5", Beijing Hope Electronic Press, Jan. 2013, 6 pages.

"SmartThings +Amazon Echo", Smartthings Samsung [online], Online available at: <https://web.archive.org/web/20160509231428/https://blog.smartthings.com/featured/alexa-turn-on-my-smartthings/>, Aug. 21, 2015, 3 pages.

Smith, Jake, "Amazon Alexa Calling: How to Set it up and Use it on Your Echo", iGeneration, May 30, 2017, 5 pages.

Speicher et al., "What is Mixed Reality?", In Proceedings of the 2019 CHI Conference on Human Factors in Computing Systems (CHI '19). ACM, Article 537, Glasgow, Scotland, UK, Online available at: https://dl.acm.org/doi/pdf/10.1145/3290605.3300767, May 4-9, 2019, 15 pages.

Sperber et al., "Self-Attentional Models for Lattice Inputs", in Proceedings of the 57th Annual Meeting of the Association for Computational Linguistics, Florence, Italy, Association for Computational Linguistics, Jun. 4, 2019, 13 pages.

SRI, "SRI Speech: Products: Software Development Kits: EduSpeak", Online available at: <http://web.archive.org/web/20090828084033/http://www.speechatsri.com/products/eduspeak>shtml, retrieved on Jun. 20, 2013, pp. 1-2.

Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.

Sutskever et al., "Sequence to Sequence Learning with Neural Networks", Proceedings of the 27th International Conference on Neural Information Processing Systems, 2014, 9 pages.

Tamar et al., "Value Iteration Networks", Advances in Neural Information Processing Systems, vol. 29, 2016, 16 pages.

Tan et al., "Knowledge Transfer In Permutation Invariant Training For Single-channel Multi-talker Speech Recognition", ICASSP 2018, 2018, pp. 5714-5718.

Tech Target Contributor, "AI Accelerator", Available online at: https://searchenterpriseai.techtarget.com/definition/AI-accelerator, Apr. 2018, 3 pages.

Tech With Brett, "Everything the Google Nest Hub Can Do", Available online at: https://www.youtube.com/watch?v=x3vdytgru2E, Nov. 12, 2018, 13 pages.

Tech With Brett, "Google Home Multiple Users Setup", Available online at: https://www.youtube.com/watch?v=BQOAbRUeFRo&t=257s, Jun. 29, 2017, 4 pages.

Tkachenko, Sergey, "Chrome will automatically create Tab Groups", Available online at: https://winaero.com/chrome-will-automatically-create-tab-groups/, Sep. 18, 2020, 5 pages.

Tkachenko, Sergey, "Enable Tab Groups Auto Create in Google Chrome", Available online at: https://winaero.com/enable-tab-groups-auto-create-in-google-chrome/, Nov. 30, 2020, 5 pages.

"Use Macrodroid skillfully to automatically clock in with Ding Talk", Online available at: https://blog.csdn.net/qq_26614295/article/details/84304541, Nov. 20, 2018, 11 pages.

Vaswani et al., "Attention Is All You Need", 31st Conference on Neural Information Processing Systems (NIPS 2017), 2017, pp. 1-11.

Vazquez et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.

Velian Speaks Tech, "10 Google Assistant Tips!", Available online at: https://www.youtube.com/watch?v=3RNWA3NK9fs, Feb. 24, 2020, 3 pages.

Villemure et al., "The Dragon Drive Innovation Showcase: Advancing the State-of-the-art in Automotive Assistants", 2018, 7 pages.

Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.

Wang et al., "End-to-end Anchored Speech Recognition", Proc. ICASSP2019, May 12-17, 2019, 5 pages.

Wang et al., "Tacotron: Towards End to End Speech Synthesis", Available online at: https://arxiv.org/abs/1703.10135, Apr. 6, 2017, 10 pages.

Wang et al., "Training Deep Neural Networks with 8-bit Floating Point Numbers", 32nd Conference on Neural Information Processing Systems (Neurl PS 2018), 2018, 10 pages.

Wei et al., "Design and Implement On Smart Home System", 2013 Fourth International Conference on Intelligent Systems Design and Engineering Applications, Available online at: https://ieeexplore.ieee.org/document/6843433, 2013, pp. 229-231.

(56) References Cited

OTHER PUBLICATIONS

Weng et al., "Deep Neural Networks for Single-Channel Multi-Talker Speech Recognition", IEEE/ACM Transactions On Audio, Speech, And Language Processing, vol. 23, No. 10, Oct. 2015, pp. 1670-1679.

"What's on Spotify?", Music for everyone, Online Available at: <https://web.archive.org/web/20160428115328/https://www.spotify.com/us/>, Apr. 28, 2016, 6 pages.

Wikipedia, "Home Automation", Online Available at: <https://en.wikipedia.org/w/index.php?title=Home_automation&oldid=686569068>, Oct. 19, 2015, 9 pages.

Wikipedia, "Siri", Online Available at: <https://en.wikipedia.org/w/index.php?title=Siri&oldid=689697795>, Nov. 8, 2015, 13 pages.

Wikipedia, "Virtual Assistant", Wikipedia, Online Available at: <https://en.wikipedia.org/w/index.php?title=Virtual_assistant&oldid=679330666>, Sep. 3, 2015, 4 pages.

Win et al., "Myanmar Text to Speech System based on Tacotron-2", International Conference on Information and Communication Tehcnology Convergence (ICTC), Oct. 21-23, 2020, pp. 578-583.

"Working with the Dragon Bar", Nuance Communications Inc., Jun. 27, 2016, 2 pages.

Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.

X.Ai, "How it Works", Online available at: <https://web.archive.org/web/20160531201426/https://x.ai/how-it-works/>, May 31, 2016, 6 pages.

Xiang et al., "Correcting Phoneme Recognition Errors in Learning Word Pronunciation through Speech Interaction", Speech Communication, vol. 55, No. 1, Jan. 1, 2013, pp. 190-203.

Xu et al., "Policy Optimization of Dialogue Management in Spoken Dialogue System For Out-of-Domain Utterances", 2016 International Conference On Asian Language Processing (IALP), IEEE, Nov. 21, 2016, pp. 10-13.

Xu et al., "Show, Attend and Tell: Neural Image Caption Generation with Visual Attention", Proceedings of the 32nd International Conference on Machine Learning, Lille, France, 2015, 10 pages.

Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.

Yang, Astor, "Control Android TV via Mobile Phone APP RKRemoteControl", Online Available at: <https://www.youtube.com/watch?v=zpmUeOX_xro>, Mar. 31, 2015, 4 pages.

Yates, Michael C., "How Can I Exit Google Assistant After I'm Finished with it", Online available at: <https://productforums.google.com/forum/#!msg/phone-by-google/faECnR2RJwA/gKNtOkQgAQAJ>, Jan. 11, 2016, 2 pages.

Yeh, Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.

Young et al., "POMDP-Based Statistical Spoken Dialog Systems: A Review", Proceedings of the IEEE, vol. 101, No. 5, 2013, 18 pages.

Yousef, Zulfikar A., "Braina (A.I) Artificial Intelligence Virtual Personal Assistant", Online available at: <https://www.youtube.com/watch?v=2h6xpB8bPSA>, Feb. 7, 2017, 3 pages.

Yu et al., "Permutation Invariant Training Of Deep Models For Speaker-Independent Multi-talker Speech Separation", Proc. ICASSP, 2017, 5 pages.

Yu et al., "Recognizing Multi-talker Speech with Permutation Invariant Training", Interspeech 2017, Aug. 20-24, 2017, pp. 2456-2460.

Zhang et al., "Interaction Proxies for Runtime Repair and Enhancement of Mobile Application Accessibility", In Proceedings of the 2017 CHI Conference on Human Factors in Computing Systems (CHI '17). ACM, Denver, CO, USA, Online available at: https://dl.acm.org/doi/pdf/10.1145/3025453.3025846, May 6-11, 2017, pp. 6024-6037.

Zhang et al., "Very Deep Convolutional Networks for End-To-End Speech Recognition", IEEE International Conference on Acoustics, Speech and Signal Processing (ICASSP), 2017, 5 pages.

Zhao et al., "Big Data Analysis and Application", Aviation Industry Press, Dec. 2015, pp. 236-241.

Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.

Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.

Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.

Zhao et al., "Transferring Age and Gender Attributes for Dimensional Emotion Prediction from Big Speech Data Using Hierarchical Deep Learning", 2018 4th IEEE International Conference on Big Data Security on Cloud, 2018, pp. 20-24.

Zheng et al., "Intent Detection and Semantic Parsing for Navigation Dialogue Language Processing", 2017 IEEE 20th International Conference on Intelligent Transportation Systems (ITSC), 2017, 6 pages.

Zhong et al., "JustSpeak: Enabling Universal Voice Control on Android", W4A'14, Proceedings of the 11th Web for All Conference, No. 36, Apr. 7-9, 2014, 8 pages.

Zhou et al., "Learning Dense Correspondence via 3D-guided Cycle Consistency", Proceedings of the IEEE Conference on Computer Vision and Pattern Recognition (CVPR), 2016, 10 pages.

Zmolikova et al., "Speaker-Aware Neural Network Based Beamformer For Speaker Extraction In Speech Mixtures", Interspeech 2017, Aug. 20-24, 2017, pp. 2655-2659.

Corrected Notice of Allowance received for U.S. Appl. No. 17/949,136, mailed on Aug. 14, 2023, 3 pages.

Bao et al., "Detecting Target Objects by Natural Language Instructions Using an RGB-D Camera", Sensors (Basel, Switzerland) 2016, 16(12), 2117, Dec. 13, 2016, 23 pages.

Burgbacher et al, "Synthetic Word Gesture Generation for Stroke-Based Virtual Keyboards", IEEE Transactions on Human-Machine Systems, vol. 47, No. 2, Apr. 2017, 14 pages.

"Cake", Online Available at: <https://web.archive.org/web/20170808091948/https://emojipedia.org/search/?q=cake>, Aug. 8, 2017, 5 pages.

Castellini, Rick, "How to enable and use dictation with an iPhone or iPad", Online Available at: <https://www.youtube.com/watch?v=8w133yN6rTU>, Sep. 7, 2017, 3 pages.

Choi et al., "Evaluation of Frequency Warping Based Features and Spectro-Temporal Features for Speaker Recognition", Speech Sounds and Phonetic Science, Online Available at: http://koreascience.or.kr/article/JAKO201510534323834.page, vol. 7, No. 1, Mar. 31, 2015, pp. 3-10 (Official Copy only). {See communication under 37 CFR § 1.98(a) (3)}.

Gomes et al., "Mining Recurring Concepts in a Dynamic Feature Space", IEEE Transactions on Neural Networks and Learning Systems, vol. 25, No. 1, Jul. 31, 2013, pp. 95-110.

Hanqing et al., "Deep Learning of Instruction Intention Understanding Using Stacked Denoising Autoencoder", Journal of Shanghai Jiaotong University, vol. 50, No. 7, Jul. 28, 2016, 6 pages (Official Copy only). {See communication under 37 CFR § 1.98(a) (3)}.

Juan, Xu, "Characteristic Analysis on Unvoiced Consonants and its Application in Whispered Speaker Identification", China Academic Journal Electronic Publishing House, Retrieved from: http://www.cnki.net, 2013, 62 pages (Official Copy only). {See communication under 37 CFR § 1.98(a) (3)}.

(56) References Cited

OTHER PUBLICATIONS

Mehri et al.,"Multi-Granularity Representations of Dialog", Language Technologies Institute, Carnegie Mellon University, arXiv:1908.09890v1, Aug. 26, 2019, 10 pages.

Michalevsky et al., "Gyrophone: Recognizing Speech from Gyroscope Signals", Proceedings of the 23rd USENIX Security Symposium, Aug. 20-22, 2014, pp. 1053-1067.

Myrick et al., "How to Insert Emojis Using Your Voice with Google Assistant", Online available at: <https://web.archive.org/web/20211107160722/https://www.androidcentral.com/how-insert-emojis-using-your-voice-google-assistant>, Nov. 7, 2021, 11 pages.

Office Action received for European Patent Application No. 22198900.7, mailed on Jun. 20, 2023, 9 pages.

Products for Pals—ALS Tech, "Skyle for iPad Pro eye gaze control real world review", Online Available at: <https://www.youtube.com/watch?v=_3TxZtDJpFo>, Aug. 13, 2020, 4 pages.

Zhang et al., "A Fiber-Optic Sensor for Acoustic Emission Detection in a High Voltage Cable System", Online Available at: https://www.mdpi.com/1424-8220/16/12/2026, Nov. 30, 2016, 11 pages.

Zhang et al., "Compact Acoustic Modeling Based On Acoustic Manifold Using A Mixture Of Factor Analyzers", Workshop on Automatic Speech Recognition and Understanding, 2013, 6 pages.

Zhang et al., "IEHouse: A Non-Intrusive Household Appliance State Recognition System", IEEE Smart World, Ubiquitous Intelligence & Computing, Advanced & Trusted Computed, 2017, 8 pages.

Zhang et al., "Voicemoji: Emoji Entry Using Voice for Visually Impaired People", CHI '21, May 8-13, 2021, 18 pages.

Office Action received for Chinese Patent Application No. 202210141724.2, mailed on Jan. 10, 2024, 30 pages (9 pages of English Translation and 21 pages of Official Copy).

Intention to Grant received for European Patent Application No. 22198900.7, mailed on Aug. 12, 2024, 10 pages.

Office Action received for European Patent Application No. 22156627.6, mailed on Oct. 18, 2024, 14 pages.

Decision to Grant received for European Patent Application No. 22198900.7, mailed on Jan. 7, 2025, 2 pages.

Intention to Grant received for European Patent Application No. 22156627.6, mailed on Nov. 27, 2025, 9 pages.

Intention to Grant received for European Patent Application No. 22156627.6, mailed on Mar. 20, 2026, 9 pages.

* cited by examiner

Portable Multifunction Device 200

306      310      312

308

300

Speaker 211

Optical Sensor 264

Proximity Sensor 266

308

310 is SIM card slot
312 is headphone jack

302

Touch Screen 212

Contact Intensity Sensor(s) 265

Tactile Output Generator(s) 267

303

Microphone 213

Home 304

Accelerometer(s) 268

External Port 224

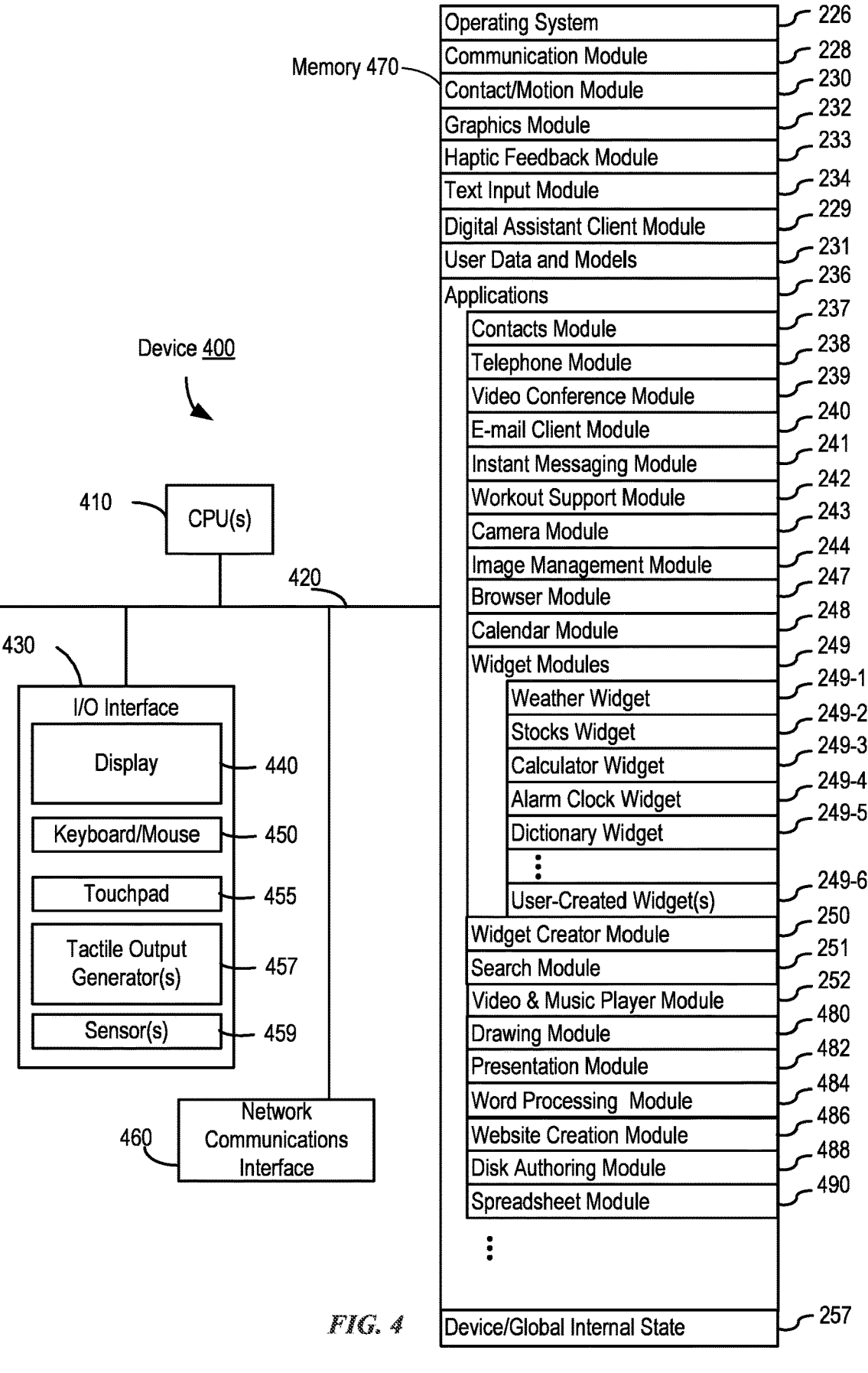

Device 400

410 — CPU(s)

420

430

I/O Interface

Display — 440

Keyboard/Mouse — 450

Touchpad — 455

Tactile Output Generator(s) — 457

Sensor(s) — 459

460 — Network Communications Interface

Memory 470

| | |
|---|---|
| Operating System | 226 |
| Communication Module | 228 |
| Contact/Motion Module | 230 |
| Graphics Module | 232 |
| Haptic Feedback Module | 233 |
| Text Input Module | 234 |
| Digital Assistant Client Module | 229 |
| User Data and Models | 231 |
| Applications | 236 |
| Contacts Module | 237 |
| Telephone Module | 238 |
| Video Conference Module | 239 |
| E-mail Client Module | 240 |
| Instant Messaging Module | 241 |
| Workout Support Module | 242 |
| Camera Module | 243 |
| Image Management Module | 244 |
| Browser Module | 247 |
| Calendar Module | 248 |
| Widget Modules | 249 |
| Weather Widget | 249-1 |
| Stocks Widget | 249-2 |
| Calculator Widget | 249-3 |
| Alarm Clock Widget | 249-4 |
| Dictionary Widget | 249-5 |
| ⋮ | |
| User-Created Widget(s) | 249-6 |
| Widget Creator Module | 250 |
| Search Module | 251 |
| Video & Music Player Module | 252 |
| Drawing Module | 480 |
| Presentation Module | 482 |
| Word Processing  Module | 484 |
| Website Creation Module | 486 |
| Disk Authoring Module | 488 |
| Spreadsheet Module | 490 |
| ⋮ | |
| Device/Global Internal State | 257 |

*FIG. 4*

Portable Multifunction Device 200

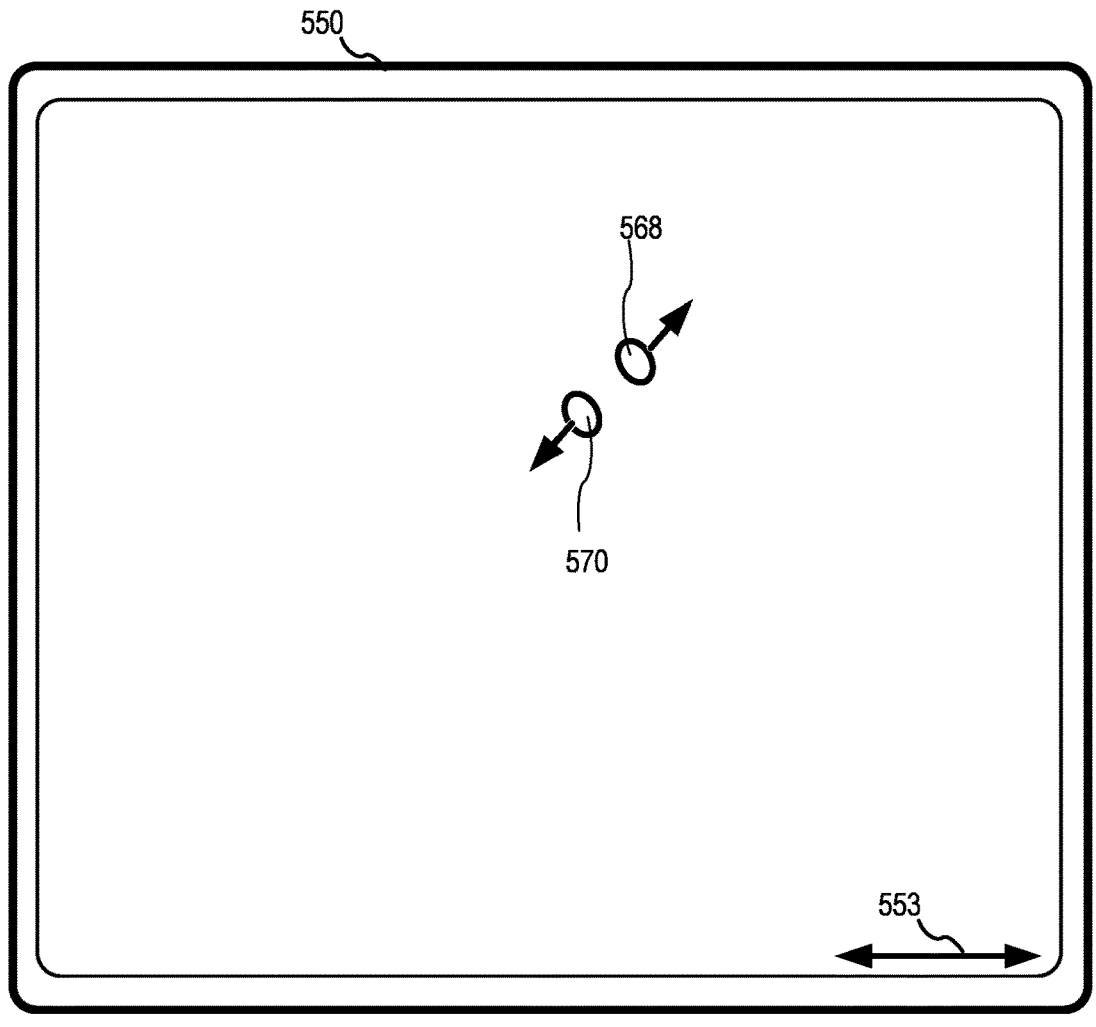
550
568
570
553
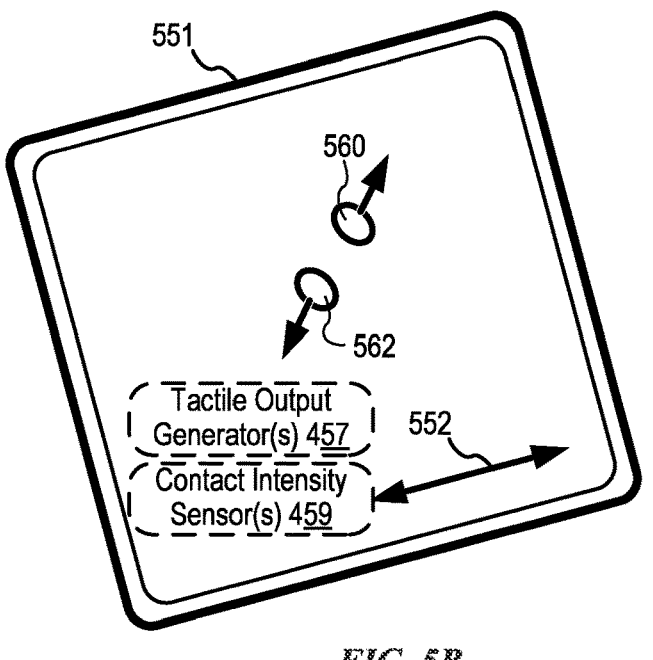
551
560
562
552
Tactile Output Generator(s) 457
Contact Intensity Sensor(s) 459
*FIG. 5B*

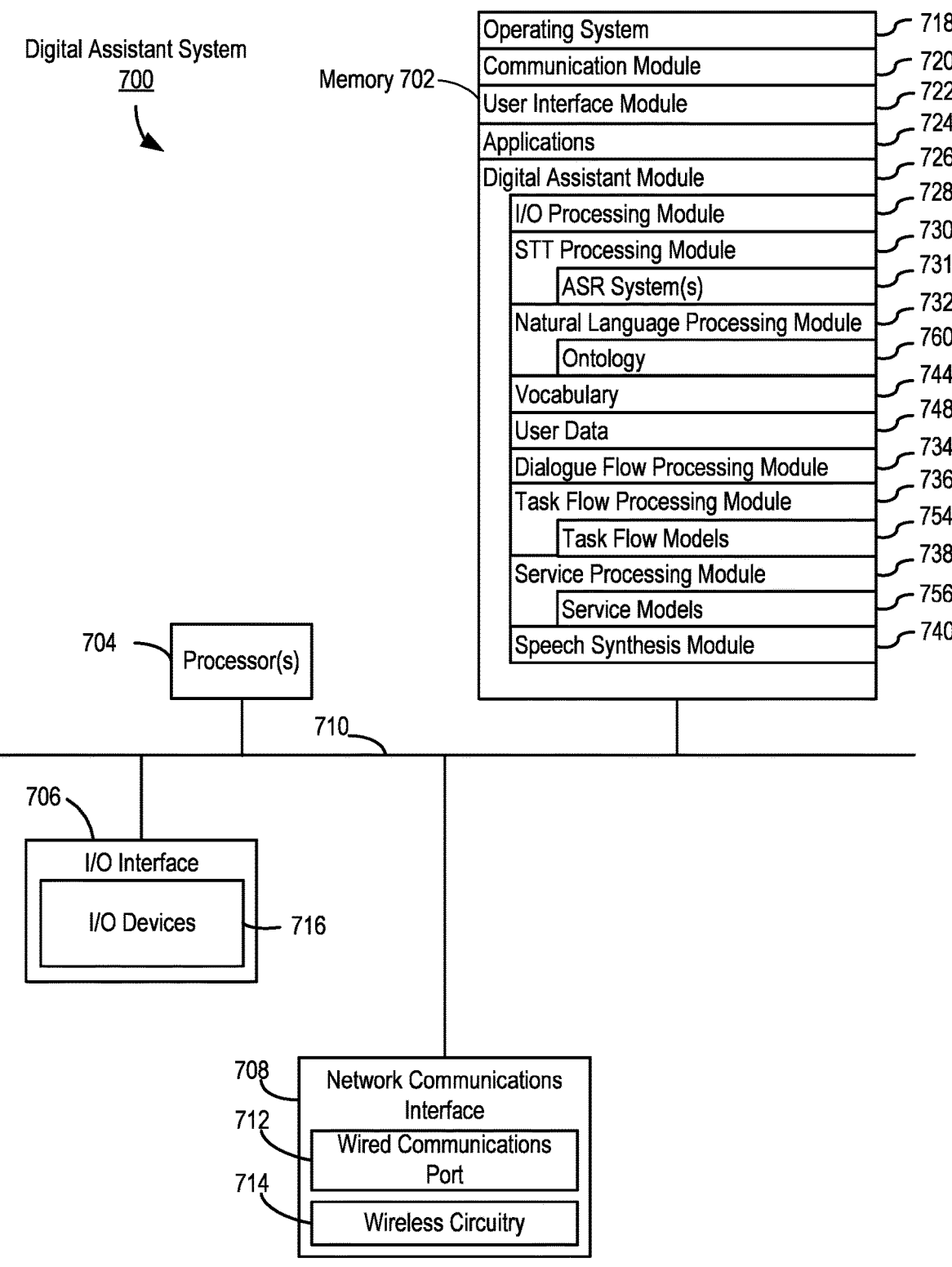

Digital Assistant System
700

Memory 702

Operating System — 718
Communication Module — 720
User Interface Module — 722
Applications — 724
Digital Assistant Module — 726
   I/O Processing Module — 728
   STT Processing Module — 730
      ASR System(s) — 731
   Natural Language Processing Module — 732
      Ontology — 760
   Vocabulary — 744
   User Data — 748
   Dialogue Flow Processing Module — 734
   Task Flow Processing Module — 736
      Task Flow Models — 754
   Service Processing Module — 738
      Service Models — 756
   Speech Synthesis Module — 740

704 — Processor(s)

710

706 — I/O Interface
   I/O Devices — 716

708 — Network Communications Interface
712 — Wired Communications Port
714 — Wireless Circuitry

*FIG. 7A*

Process 800

1000

1000

1000

Process <u>1100</u>

Process 1100
(cont.)

Process <u>1100</u>
(cont.)

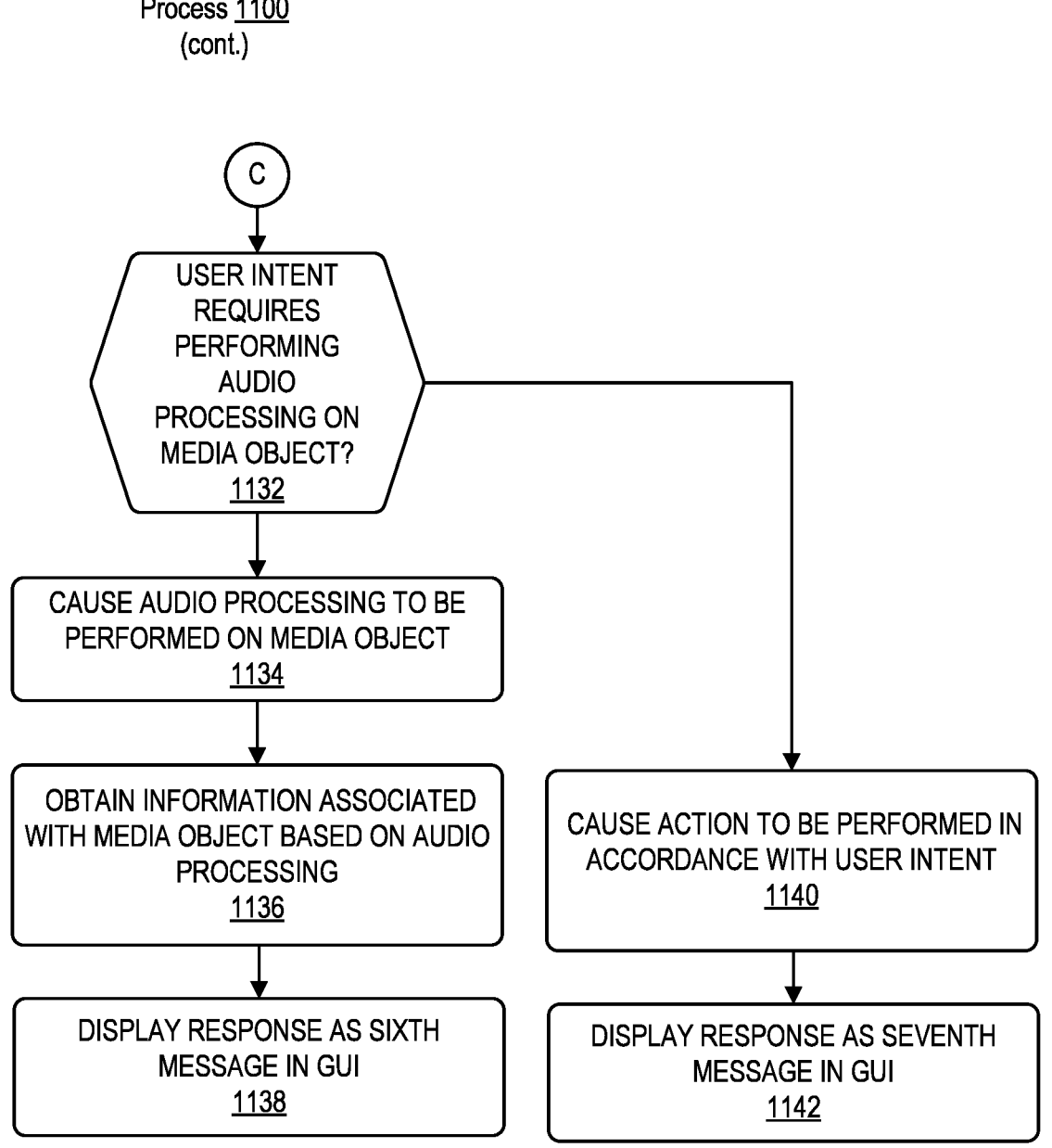

Process <u>1100</u>
(cont.)

C

USER INTENT
REQUIRES
PERFORMING
AUDIO
PROCESSING ON
MEDIA OBJECT?
<u>1132</u>

CAUSE AUDIO PROCESSING TO BE
PERFORMED ON MEDIA OBJECT
<u>1134</u>

OBTAIN INFORMATION ASSOCIATED
WITH MEDIA OBJECT BASED ON AUDIO
PROCESSING
<u>1136</u>

CAUSE ACTION TO BE PERFORMED IN
ACCORDANCE WITH USER INTENT
<u>1140</u>

DISPLAY RESPONSE AS SIXTH
MESSAGE IN GUI
<u>1138</u>

DISPLAY RESPONSE AS SEVENTH
MESSAGE IN GUI
<u>1142</u>

*FIG. 11D*

Process 1300

Process 1300
(cont.)

Process <u>1300</u>
(cont.)

Electronic Device
1600

┌─ 1602
Touch Screen Display Unit

┌─ 1608
Processing Unit

┌─ 1610
Display Enabling Unit

┌─ 1612
Receiving Unit

┌─ 1614
Causing Unit

┌─ 1604
Audio Input Unit

┌─ 1616
Obtaining Unit

┌─ 1618
Extracting Unit

┌─ 1620
Performing Unit

┌─ 1606
RF Unit

┌─ 1622
Populating Unit

┌─ 1624
Storing Unit

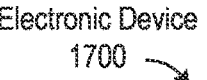
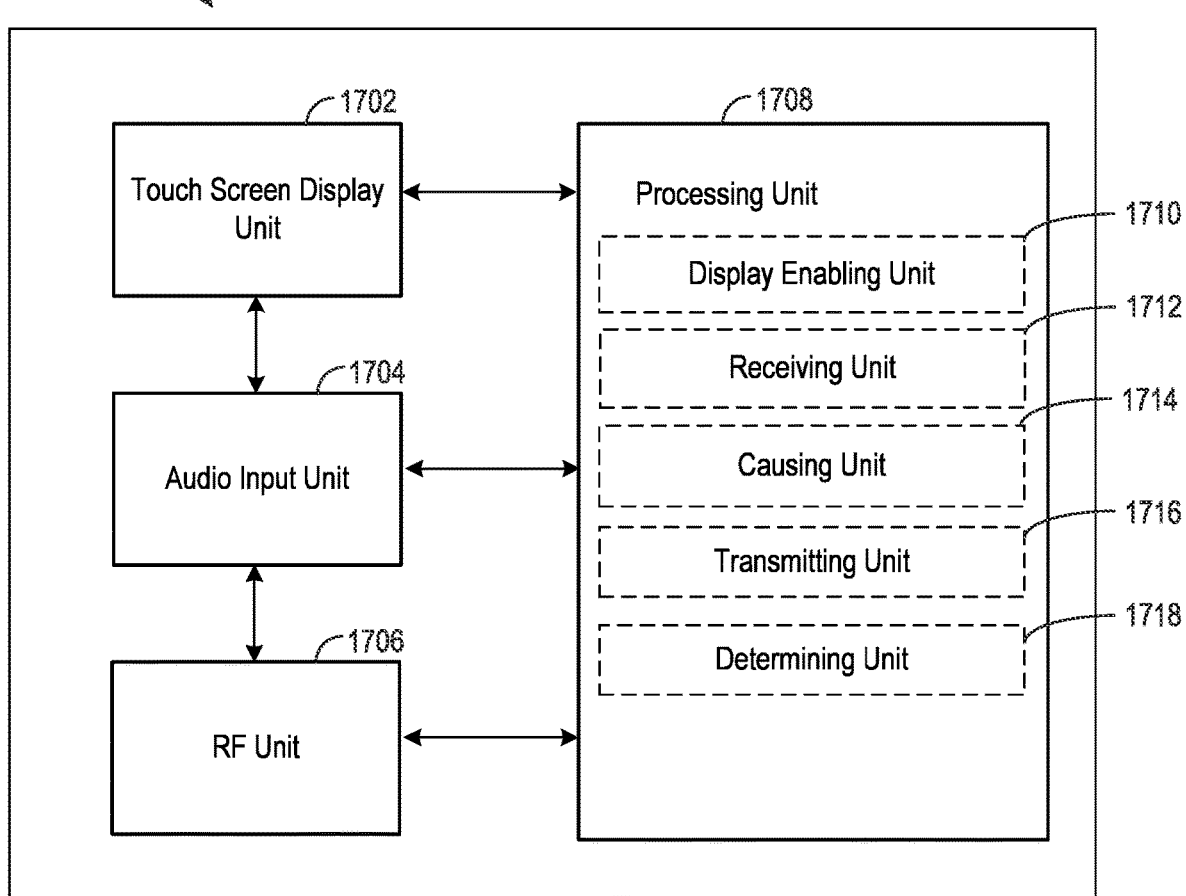
*FIG. 17*

INTELLIGENT AUTOMATED ASSISTANT IN A MESSAGING ENVIRONMENT

CROSS-REFERENCE TO RELATED APPLICATION

This application is a continuation of U.S. application Ser. No. 17/949,136, filed on Sep. 20, 2022, entitled "INTELLIGENT AUTOMATED ASSISTANT IN A MESSAGING ENVIRONMENT," which is a continuation of U.S. application Ser. No. 15/931,384, now U.S. Pat. No. 11,526,368, filed on May 13, 2020, entitled "INTELLIGENT AUTOMATED ASSISTANT IN A MESSAGING ENVIRONMENT," which is a continuation of U.S. application Ser. No. 15/151,191, now U.S. Pat. No. 10,691,473, filed on May 10, 2016, entitled "INTELLIGENT AUTOMATED ASSISTANT IN A MESSAGING ENVIRONMENT," which claims priority to U.S. Provisional Application Ser. No. 62/252,311, filed on Nov. 6, 2015, entitled "INTELLIGENT AUTOMATED ASSISTANT IN A MESSAGING ENVIRONMENT." The entire contents of each of these applications are incorporated herein by reference in their entireties.

FIELD

This relates generally to intelligent automated assistants and, more specifically, to intelligent automated assistants in a messaging environment.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

Typically, electronic devices implement a dedicated user interface for interacting with the digital assistant. For example, an electronic device can implement a dedicated voice interface for interacting with the digital assistant. Such dedicated user interfaces can limit the opportunities for interaction, which can limit the widespread adoption and application of digital assistants to benefit people's lives.

SUMMARY

Systems and processes for operating an intelligent automated assistant in a messaging environment are provided. In one example process, a graphical user interface (GUI) having a plurality of previous messages between a user of the electronic device and the digital assistant can be displayed on a display. The plurality of previous messages can be presented in a conversational view. User input can be received and in response to receiving the user input, the user input can be displayed as a first message in the GUI. A contextual state of the electronic device corresponding to the displayed user input can be stored. The process can cause an action to be performed in accordance with a user intent derived from the user input. A response based on the action can be displayed as a second message in the GUI.

In another example process, a GUI having a plurality of previous messages between a user and the digital assistant can be displayed on a display of an electronic device. The plurality of previous messages can be presented in a conversational view. A first user input including a media object can be received. In response to receiving the first user input, the media object can be displayed as a first message in the GUI. A second user input including text can be received. In response to receiving the second user input, the text can be displayed as a second message in the GUI. The process can cause a user intent corresponding to the first user input and the second user input to be determined. A determination of whether the user intent requires extracting text from the media object can be obtained. In response to obtaining a determination that the user intent requires extracting text from the media object: text from the media object can be extracted, a task in accordance with the user intent can be perform using the extracted text, and a response indicative of the user intent being satisfied can be displayed as a third message in the GUI.

In yet another example process, a GUI having a plurality of previous messages between a user of the electronic device and a user of a remote device can be displayed on the display of an electronic device. The plurality of previous messages can be presented in a conversational view. A first user input addressed to the digital assistant can be received from the user of the electronic device. In response to receiving the first user input, the first user input can be displayed as a first message in the GUI. The process can cause an action to be performed in accordance with a user intent derived from the first user input. A response based on the action can be displayed as a second message in the GUI.

BRIEF DESCRIPTION OF THE DRAWINGS

FIG. 4 is a block diagram of an exemplary multifunction device with a display and a touch-sensitive surface according to various examples.

FIG. 5B illustrates an exemplary user interface for a multifunction device with a touch-sensitive surface that is separate from the display according to various examples.

FIG. 7A is a block diagram illustrating a digital assistant system or a server portion thereof according to various examples.

FIGS. 11A-11D illustrate a process for operating a digital assistant in a messaging environment according to various examples.

FIG. 17 illustrates a functional block diagram of an electronic device according to various examples.

DETAILED DESCRIPTION

Figure 1:
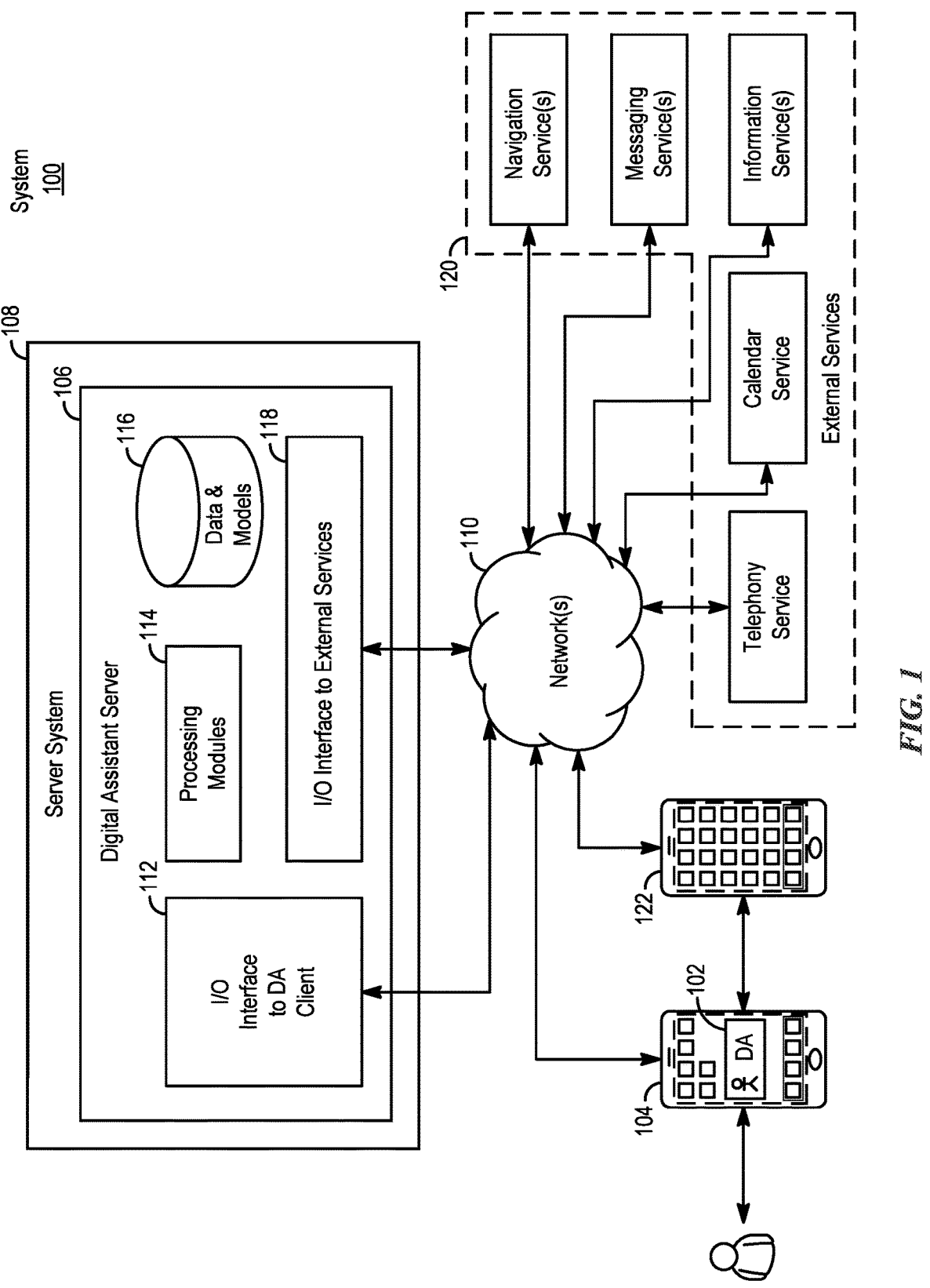
FIG. 1 is a block diagram illustrating a system and environment for implementing a digital assistant according to various examples.

In the following description of examples, reference is made to the accompanying drawings in which it is shown by way of illustration specific examples that can be practiced. It is to be understood that other examples can be used and structural changes can be made without departing from the scope of the various examples.

It can be desirable to implement a digital assistant in a messaging environment. The messaging platform can enable multiple modes of input (e.g., text, audio, images, video, etc.) to be sent and received. A user request can thus define a request to the digital assistant using a combination of inputs (e.g., image and text). As described herein, this can increase the functionality and capabilities of the digital assistant, thereby providing a richer interactive experience between a user and a digital assistant. In addition, the messaging platform is a visual interface which permits interactions in a broader range of environments than voice/audio based platforms. A digital assistant in a message environment can thus enable greater accessibility to the digital assistant. In particular, the digital assistant can be accessible in noisy environments or in environments where audio output is not desired (e.g., the library). Further, the messaging platform can be a conversational interface where short concise communications are exchanged between two or more parties and presented in a chronological format. A digital assistant in a message environment can thus enable the digital assistant to be a participant in a multi-party conversation where the benefits associated with the digital assistant can be shared among the multiple participants. Moreover, the chronological format enables a user to conveniently review previous interactions with the digital assistant and utilize the contextual history associated with the previous interactions to define a wider range of tasks.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input can both be inputs and, in some cases, can be separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 can implement a digital assistant. The terms "digital assistant," "virtual assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

As shown in FIG. 1, in some examples, a digital assistant can be implemented according to a client-server model. The digital assistant can include client-side portion 102 (hereafter "DA client 102") executed on user device 104 and server-side portion 106 (hereafter "DA server 106") executed on server system 108. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102 each residing on a respective user device 104.

In some examples, DA server 106 can include client-facing I/O interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 perform task execution based on inferred user intent. In some examples, DA server 106 can communicate with external services 120 through network(s) 110 for task completion or information acquisition. I/O interface to external services 118 can facilitate such communications.

User device 104 can be any suitable electronic device. For example, user devices can be a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-6B.) A portable multifunctional device can be, for example, a mobile telephone that also contains other functions, such as PDA and/or music player functions. Specific examples of portable multifunction devices can include the iPhone®, iPod Touch®, and iPad® devices from Apple Inc. of Cupertino, California. Other examples of portable multifunction devices can include, without limitation, laptop or tablet computers. Further, in some examples, user device 104 can be a non-portable multifunctional device. In particular, user device 104 can be a desktop computer, a game console, a television, or a television set-top box. In some examples, user device 104 can include a touch-sensitive surface (e.g., touch screen displays and/or touchpads). Further, user device 104 can optionally include one or more other physical user-interface devices, such as a physical keyboard, a mouse, and/or a joystick. Various examples of electronic devices, such as multifunctional devices, are described below in greater detail.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

In some examples, user device 104 can communicate with DA server 106 via second user device 122. Second user device 122 can be similar or identical to user device 104. For example, second user device 122 can be similar to devices 200, 400, or 600 described below with reference to FIGS. 2A, 4, and 6A-6B. User device 104 can be configured to communicatively couple to second user device 122 via a direct communication connection, such as Bluetooth, NFC, BTLE, or the like, or via a wired or wireless network, such as a local Wi-Fi network. In some examples, second user device 122 can be configured to act as a proxy between user device 104 and DA server 106. For example, DA client 102 of user device 104 can be configured to transmit information (e.g., a user request received at user device 104) to DA server 106 via second user device 122. DA server 106 can process the information and return relevant data (e.g., data content responsive to the user request) to user device 104 via second user device 122.

In some examples, user device 104 can be configured to communicate abbreviated requests for data to second user device 122 to reduce the amount of information transmitted from user device 104. Second user device 122 can be configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100 can include any number and type of user devices configured in this proxy configuration to communicate with DA server system 106.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

2. Electronic Devices

Figure 2A:
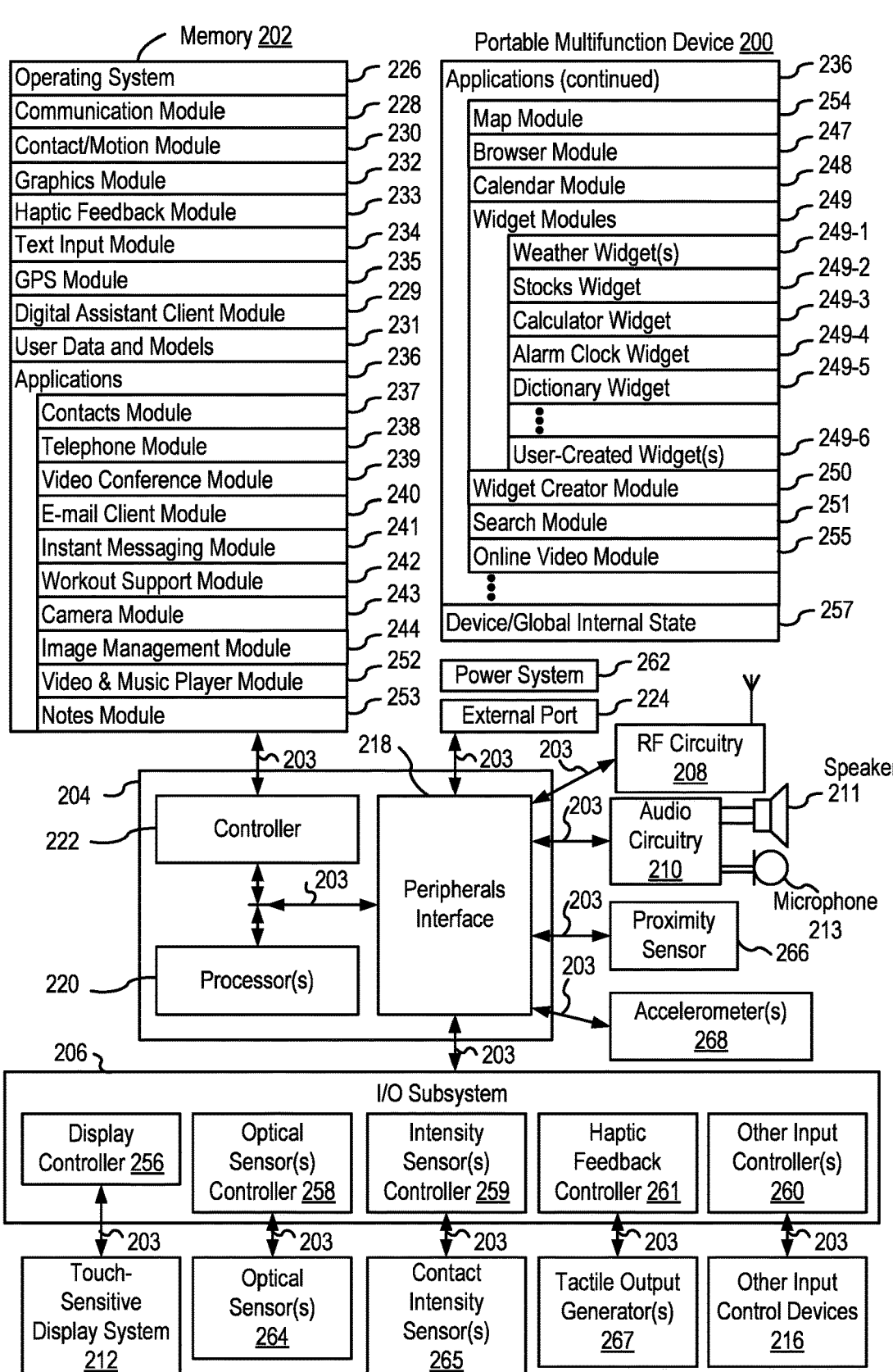
FIG. 2A is a block diagram illustrating a portable multifunction device implementing the client-side portion of a digital assistant according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 may include one or more computer-readable storage mediums. The computer-readable storage mediums may be tangible and non-transitory. Memory 202 may include high-speed random access memory and may also include non-volatile memory, such as one or more magnetic disk storage devices, flash memory devices, or other non-volatile solid-state memory devices. Memory controller 222 may control access to memory 202 by other components of device 200.

In some examples, a non-transitory computer-readable storage medium of memory 202 can be used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) can be stored on a non-transitory computer-readable storage medium (not shown) of the server system 108 or can be divided between the non-transitory computer-readable storage medium of memory 202 and the non-transitory computer-readable storage medium of server system 108. In the context of this document, a "non-transitory computer-readable storage medium" can be any medium that can contain or store the program for use by or in connection with the instruction execution system, apparatus, or device.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 may be implemented on a single chip, such as chip 204. In some other embodiments, they may be implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data may be retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button may disengage a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) may turn power to device 200 on or off. The user may be able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output may include graphics, text, icons, video, and any combination thereof (collectively termed "graphics"). In some embodiments, some or all of the visual output may correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 may use LCD (liquid crystal display) technology, LPD (light emitting polymer display) technology, or LED (light emitting diode) technology, although other display technologies may be used in other embodiments. Touch screen 212 and display controller 256 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 may be analogous to the multi-touch sensitive touchpads described in the following U.S. Pat. No. 6,323, 846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 may have a video resolution in excess of 100 dpi. In some embodiments, the touch screen has a video resolution of approximately 160 dpi. The user may make contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 212 or an extension of the touch-sensitive surface formed by the touch screen.

Device 200 also includes power system 262 for powering the various components. Power system 262 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 may also include one or more optical sensors 264. FIG. 2A shows an optical sensor coupled to optical sensor controller 258 in I/O subsystem 206. Optical sensor 264 may include charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 may capture still images or video. In some embodiments, an optical sensor is located on the back of device 200, opposite touch screen display 212 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 264 can be changed by the user (e.g., by rotating the lens and the sensor in the device housing) so that a single optical sensor 264 may be used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 may also include one or more proximity sensors 266. FIG. 2A shows proximity sensor 266 coupled to peripherals interface 218. Alternately, proximity sensor 266 may be coupled to input controller 260 in I/O subsystem 206. Proximity sensor 266 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 may also include one or more accelerometers 268. FIG. 2A shows accelerometer 268 coupled to peripherals interface 218. Alternately, accelerometer 268 may be coupled to an input controller 260 in I/O subsystem 206. Accelerometer 268 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 can store data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which may be a component of graphics module 232, provides soft keyboards for entering text in various applications (e.g., contacts module 237, e-mail client module 240, IM module 241, browser module 247, and any other application that needs text input).

GPS module 235 determines the location of the device and provides this information for use in various applications (e.g., to telephone module 238 for use in location-based dialing; to camera module 243 as picture/video metadata; and to applications that provide location-based services such as weather widgets, local yellow page widgets, and map/navigation widgets).

Digital assistant client module 229 can include various client-side digital assistant instructions to provide the client-side functionalities of the digital assistant. For example, digital assistant client module 229 can be capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 can also be capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output can be provided as voice, sound, alerts, text messages, menus, graphics, videos, animations, vibrations, and/or combinations of two or more of the above. During operation, digital assistant client module 229 can communicate with DA server 106 using RF circuitry 208.

User data and models 231 can include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 can includes various models (e.g., speech recognition models, statistical language models, natural language processing models, ontology, task flow models, service models, etc.) for processing user input and determining user intent.

In some examples, digital assistant client module 229 can utilize the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 can provide the contextual information or a subset thereof with the user input to DA server 106 to help infer the user's intent. In some examples, the digital assistant can also use the contextual information to determine how to prepare and deliver outputs to the user. Contextual information can be referred to as context data.

In some examples, the contextual information that accompanies the user input can include sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 can be provided to DA server 106 as contextual information associated with a user input.

In some examples, the digital assistant client module 229 can selectively provide information (e.g., user data 231) stored on the portable multifunction device 200 in response to requests from DA server 106. In some examples, digital assistant client module 229 can also elicit additional input from the user via a natural language dialogue or other user interfaces upon request by DA server 106. Digital assistant client module 229 can pass the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 may include the following modules (or sets of instructions), or a subset or superset thereof:

Contacts module 237 (sometimes called an address book or contact list);
Telephone module 238;
Video conference module 239;
E-mail client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which may include one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that may be stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 may be used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 238, video conference module 239, e-mail client module 240, or IM module 241; and so forth.

In conjunction with RF circuitry 208, audio circuitry 210, speaker 211, microphone 213, touch screen 212, display controller 256, contact/motion module 230, graphics module 232, and text input module 234, telephone module 238 may be used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that may be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 may be used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 may be used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 252, FIG. 2A). In some embodiments, memory 202 may store a subset of the modules and data structures identified above. Furthermore, memory 202 may store additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 may be reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
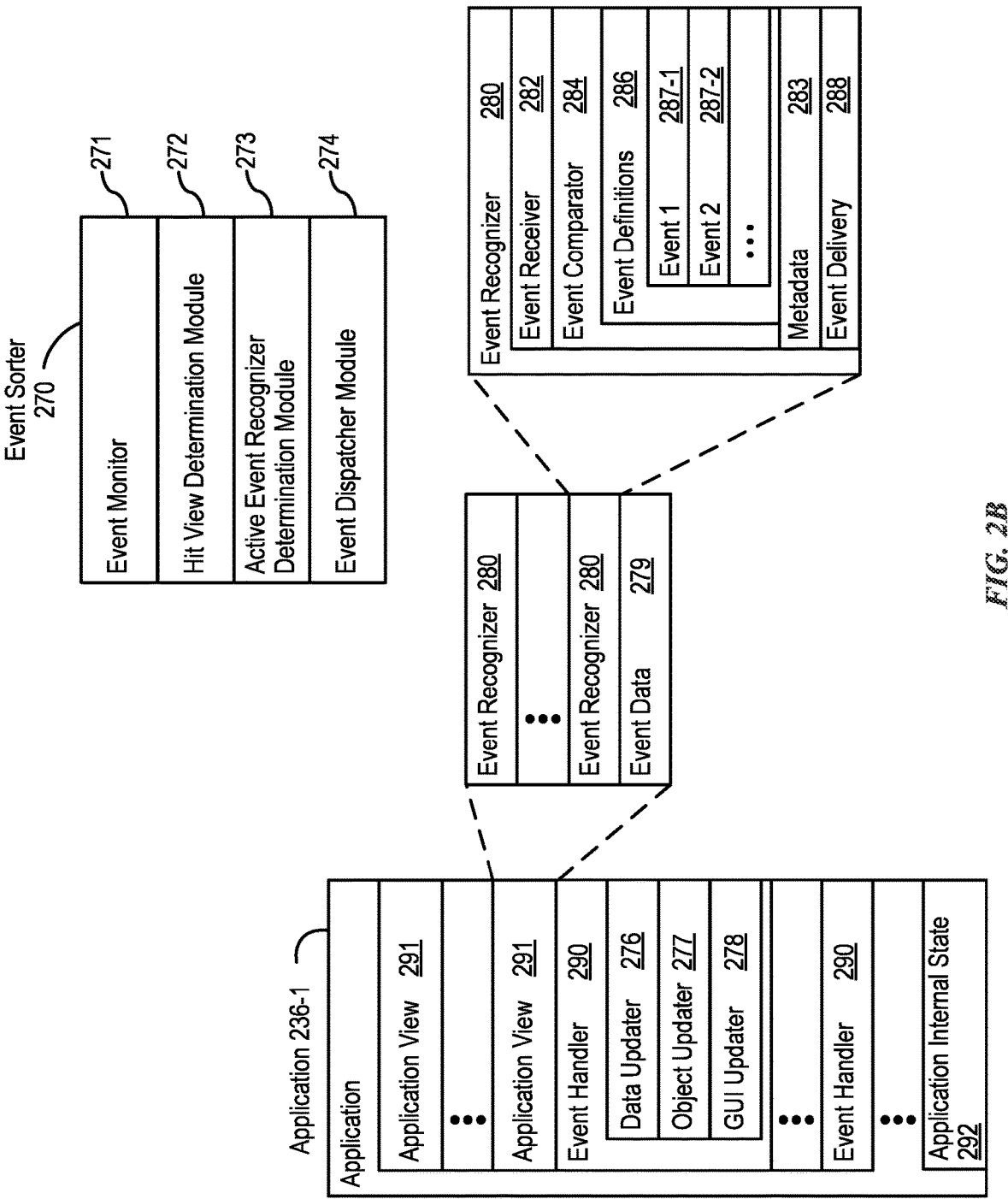
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 may utilize or call data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which may include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers may interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
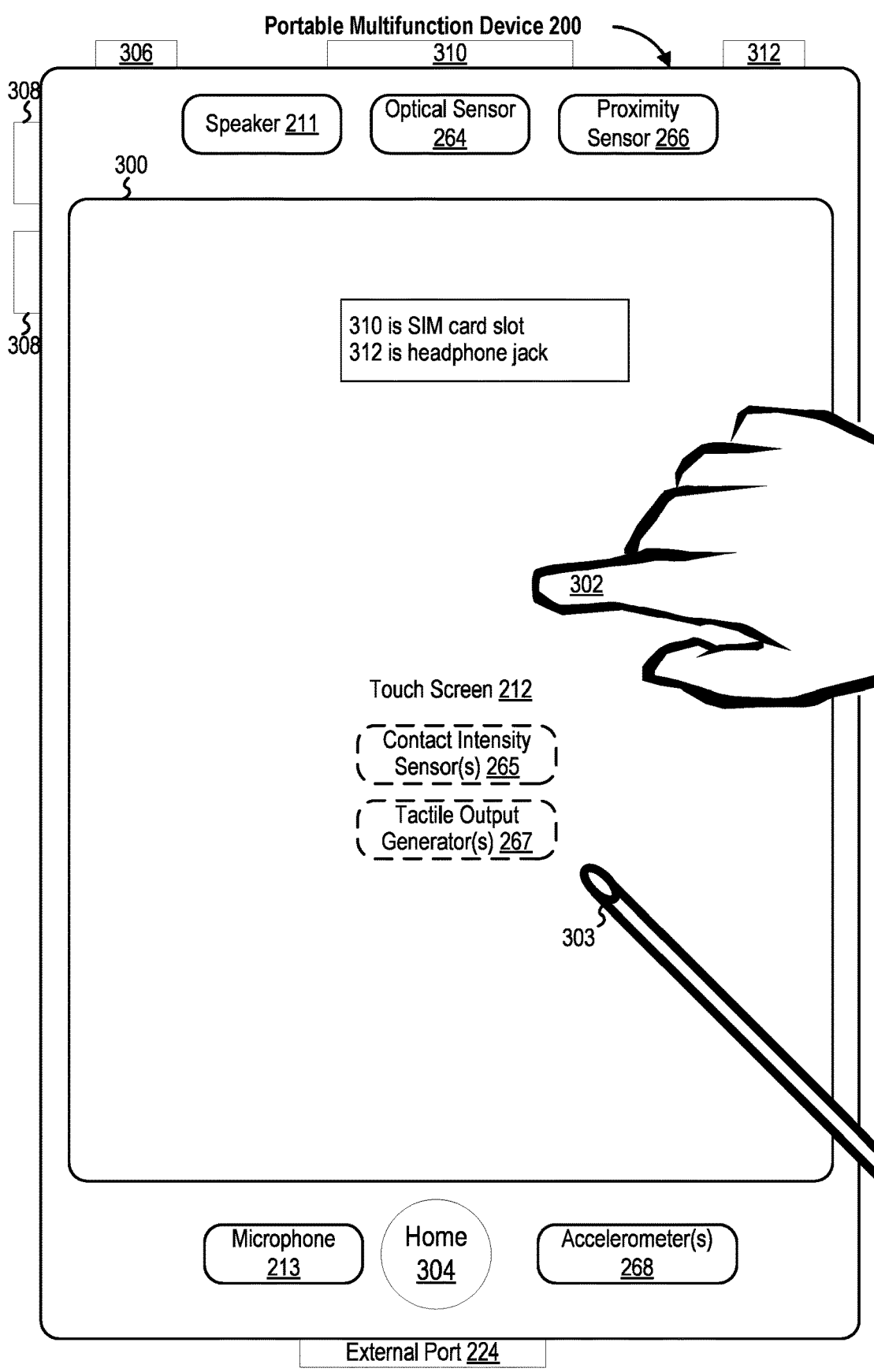
FIG. 3 illustrates a portable multifunction device implementing the client-side portion of a digital assistant according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 may also include one or more physical buttons, such as "home" or menu button 304. As described previously, menu button 304 may be used to navigate to any application 236 in a set of applications that may be executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 option-ally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 option-ally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 may be stored in one or more of the previously mentioned memory devices. Each of the above-identified modules corresponds to a set of instructions for performing a function described above. The above-identified modules or programs (e.g., sets of instructions) need not be implemented as separate soft-ware programs, procedures, or modules, and thus various subsets of these modules may be combined or otherwise rearranged in various embodiments. In some embodiments, memory 470 may store a subset of the modules and data structures identified above. Furthermore, memory 470 may store additional modules and data structures not described above.

Attention is now directed towards embodiments of user interfaces that may be implemented on, for example, por-table multifunction device 200.

Figure 5A:
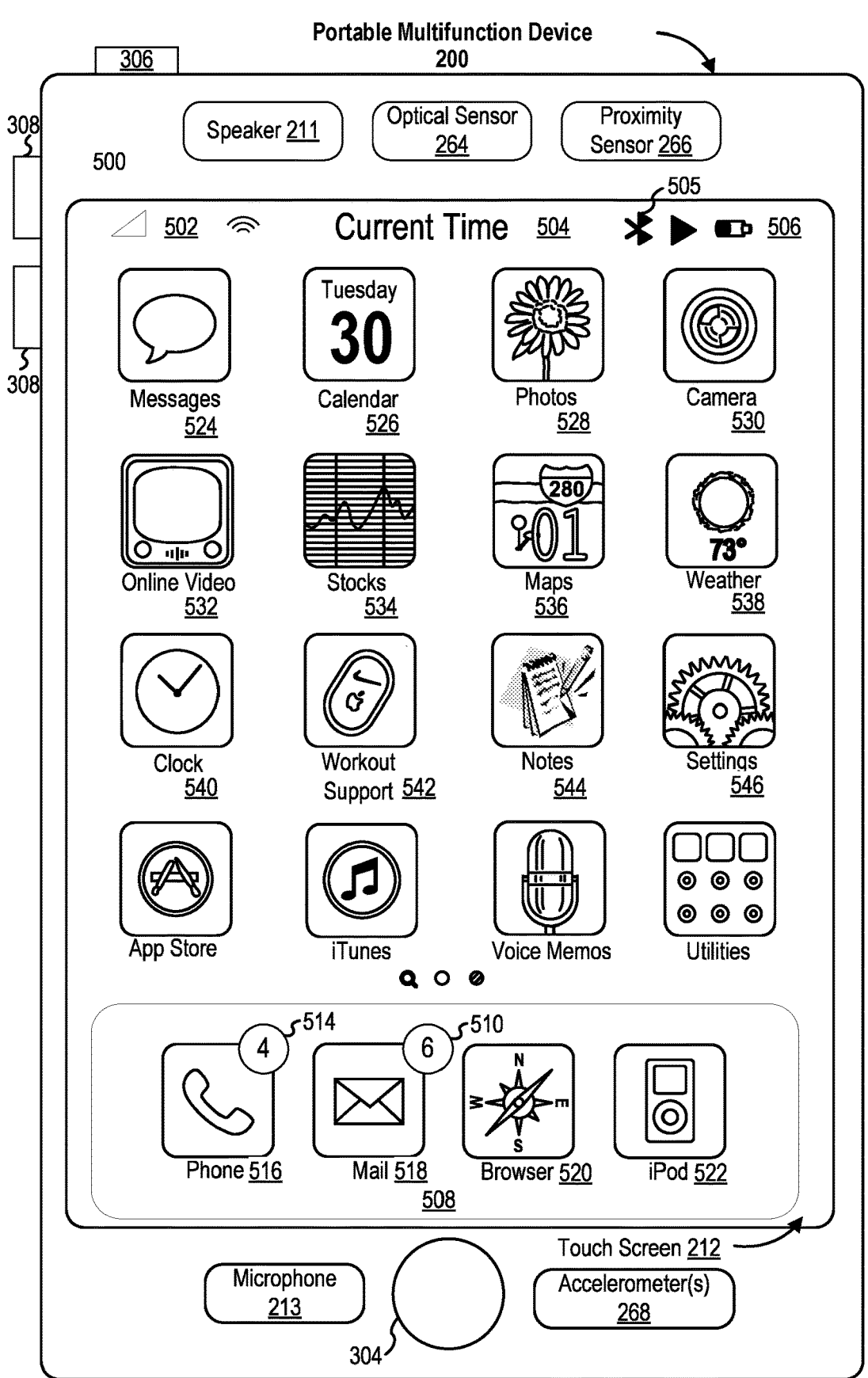
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces may be implemented on device 400. In some embodiments, user interface 500 includes the following elements, or a subset or superset thereof:

Signal strength indicator(s) 502 for wireless communica-tion(s), such as cellular and Wi-Fi signals;
Time 504;
Bluetooth indicator 505;
Battery status indicator 506;
Tray 508 with icons for frequently used applications, such as:
Icon 516 for telephone module 238, labeled "Phone," which optionally includes an indicator 514 of the number of missed calls or voicemail messages;
Icon 518 for e-mail client module 240, labeled "Mail," which optionally includes an indicator 510 of the number of unread e-mails;
Icon 520 for browser module 247, labeled "Browser;" and Icon 522 for video and music player module 252, also referred to as iPod (trademark of Apple Inc.) module 252, labeled "iPod;" and
Icons for other applications, such as:
Icon 524 for IM module 241, labeled "Messages;"
Icon 526 for calendar module 248, labeled "Calendar;"
Icon 528 for image management module 244, labeled "Photos;"
Icon 530 for camera module 243, labeled "Camera;"
Icon 532 for online video module 255, labeled "Online Video;"
Icon 534 for stocks widget 249-2, labeled "Stocks;"
Icon 536 for map module 254, labeled "Maps;"
Icon 538 for weather widget 249-1, labeled "Weather;"
Icon 540 for alarm clock widget 249-4, labeled "Clock;"
Icon 542 for workout support module 242, labeled "Workout Support;"
Icon 544 for notes module 253, labeled "Notes;" and
Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are com-bined), in some embodiments, the device detects inputs on a touch-sensitive surface that is separate from the display, as shown in FIG. 5B. In some embodiments, the touch-sensi-tive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger con-tacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
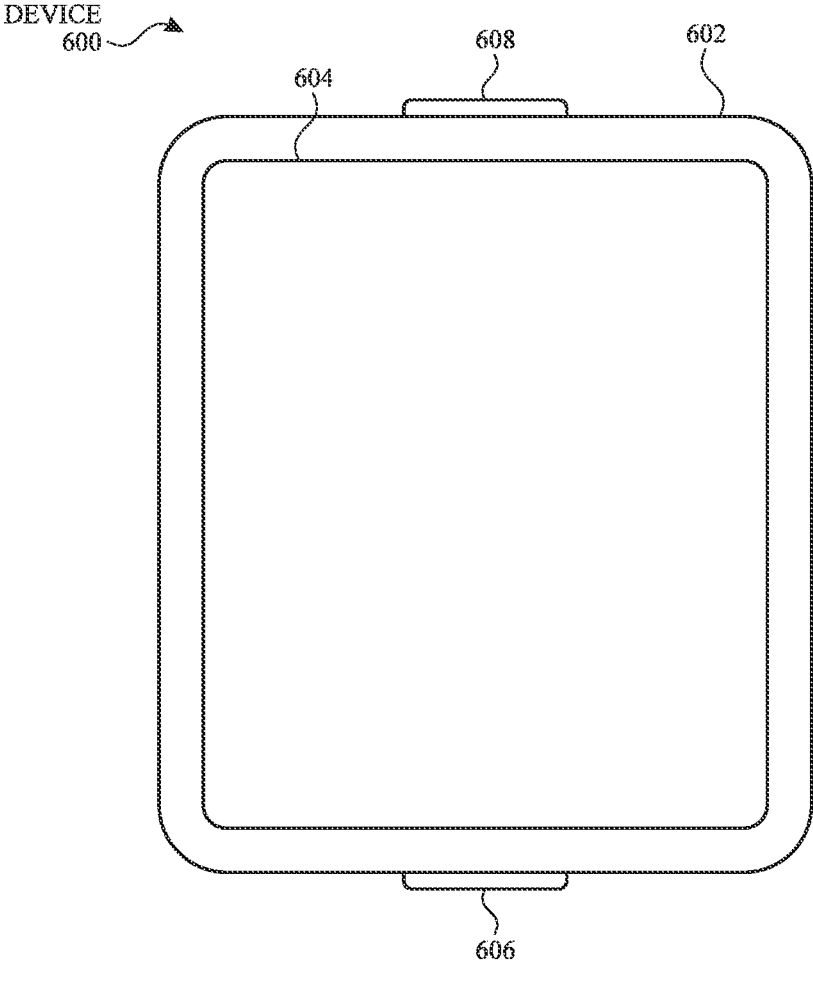
FIG. 6A illustrates a personal electronic device according to various examples.

FIG. 6A illustrates exemplary personal electronic device 600. Device 600 includes body 602. In some embodiments, device 600 can include some or all of the features described with respect to devices 200 and 400 (e.g., FIGS. 2A-4B). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) may have one or more intensity sensors for detecting intensity of contacts (e.g., touches) being applied. The one or more intensity sensors of touch screen 604 (or the touch-sensitive surface) can provide output data that represents the intensity of touches. The user interface of device 600 can respond to touches based on their intensity, meaning that touches of different intensities can invoke different user interface operations on device 600.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms may permit device 600 to be worn by a user.

Figure 6B:
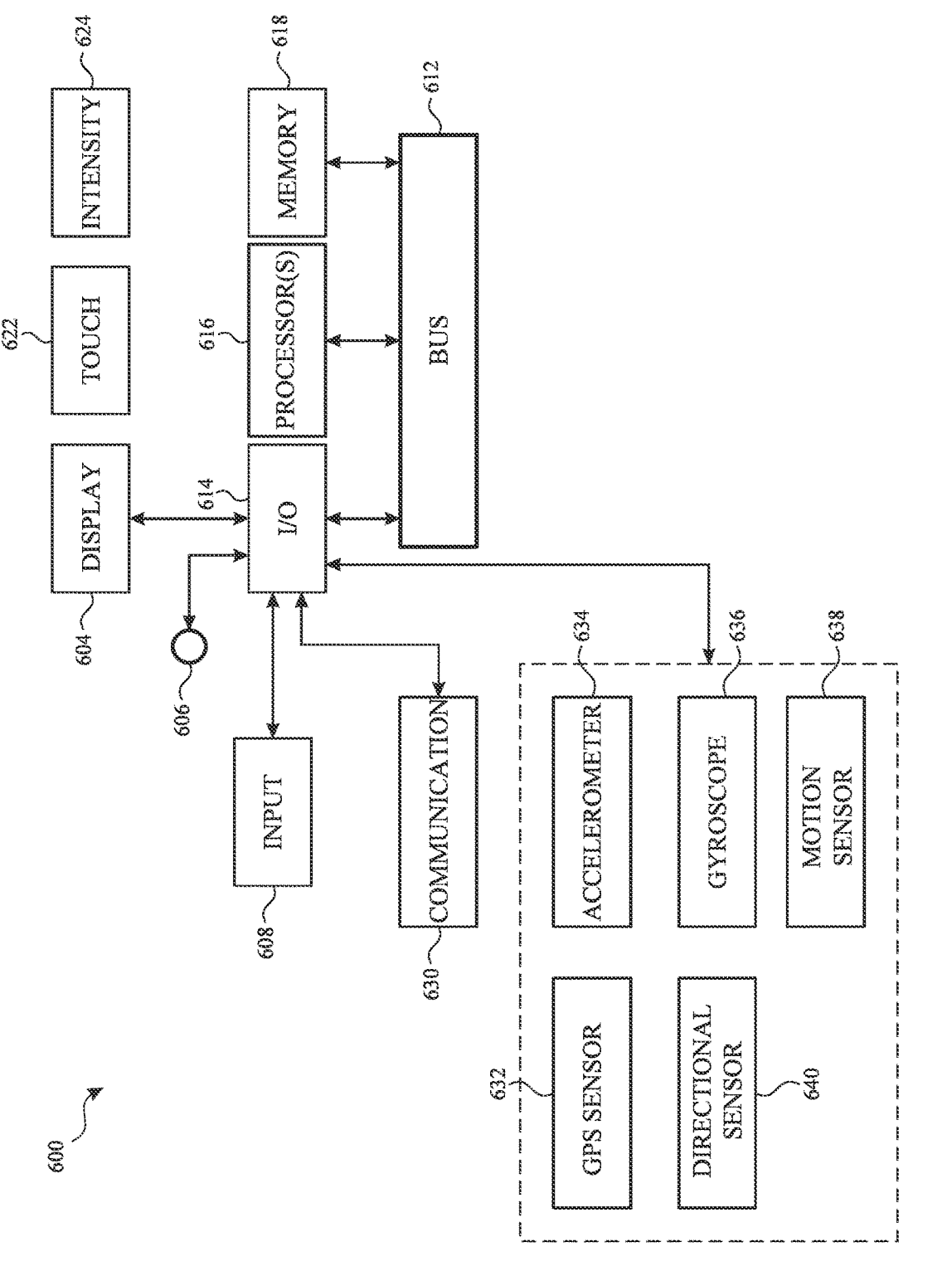
FIG. 6B is a block diagram illustrating a personal electronic device according to various examples.

FIG. 6B depicts exemplary personal electronic device 600. In some embodiments, device 600 can include some or all of the components described with respect to FIGS. 2A, 2B, and 4. Device 600 has bus 612 that operatively couples I/O section 614 with one or more computer processors 616 and memory 618. I/O section 614 can be connected to display 604, which can have touch-sensitive component 622 and, optionally, touch-intensity sensitive component 624. In addition, I/O section 614 can be connected with communication unit 630 for receiving application and operating system data, using Wi-Fi, Bluetooth, near field communication (NFC), cellular, and/or other wireless communication techniques. Device 600 can include input mechanisms 606 and/or 608. Input mechanism 606 may be a rotatable input device or a depressible and rotatable input device, for example. Input mechanism 608 may be a button, in some examples.

Input mechanism 608 may be a microphone, in some examples. Personal electronic device 600 can include various sensors, such as GPS sensor 632, accelerometer 634, directional sensor 640 (e.g., compass), gyroscope 636, motion sensor 638, and/or a combination thereof, all of which can be operatively connected to I/O section 614.

Memory 618 of personal electronic device 600 can be a non-transitory computer-readable storage medium, for storing computer-executable instructions, which, when executed by one or more computer processors 616, for example, can cause the computer processors to perform the techniques and processes described below. The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 600 is not limited to the components and configuration of FIG. 6B, but can include other or additional components in multiple configurations.

As used here, the term "affordance" refers to a user-interactive graphical user interface object that may be displayed on the display screen of devices 200, 400, and/or 600 (FIGS. 2, 4, and 6). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

FIG. 7A illustrates a block diagram of digital assistant system 700 in accordance with various examples. In some examples, digital assistant system 700 can be implemented on a standalone computer system. In some examples, digital assistant system 700 can be distributed across multiple computers. In some examples, some of the modules and functions of the digital assistant can be divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 can be an implementation of server system 108 (and/or DA server 106) shown in FIG. 1. It should be noted that digital assistant system 700 is only one example of a digital assistant system, and that digital assistant system 700 can have more or fewer components than shown, may combine two or more components, or may have a different configuration or arrangement of the components. The various components shown in FIG. 7A can be implemented in hardware, software instructions for execution by one or more processors, firmware, including one or more signal processing and/or application specific integrated circuits, or a combination thereof.

Digital assistant system 700 can include memory 702, one or more processors 704, input/output (I/O) interface 706, and network communications interface 708. These components can communicate with one another over one or more communication buses or signal lines 710.

In some examples, memory 702 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 can couple input/output devices 716 of digital assistant system 700, such as displays, keyboards, touch screens, and microphones, to user interface module 722. I/O interface 706, in conjunction with user interface module 722, can receive user inputs (e.g., voice input, keyboard inputs, touch inputs, etc.) and processes them accordingly. In some examples, e.g., when the digital assistant is implemented on a standalone user device, digital assistant system 700 can include any of the components and I/O communication interfaces described with respect to devices 200, 400, or 600 in FIGS. 2A, 4, 6A-6B, respectively. In some examples, digital assistant system 700 can represent the server portion of a digital assistant implementation, and can interact with the user through a client-side portion residing on a user device (e.g., devices 104, 200, 400, or 600).

In some examples, the network communications interface 708 can include wired communication port(s) 712 and/or wireless transmission and reception circuitry 714. The wired communication port(s) can receive and send communication signals via one or more wired interfaces, e.g., Ethernet, Universal Serial Bus (USB), FIREWIRE, etc. The wireless circuitry 714 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 can enable communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, can store programs, modules, instructions, and data structures including all or a subset of: operating system 718, communications module 720, user interface module 722, one or more applications 724, and digital assistant module 726. In particular, memory 702, or the computer-readable storage media of memory 702, can store instructions for performing the processes described below. One or more processors 704 can execute these programs, modules, and instructions, and reads/writes from/ to the data structures.

Operating system 718 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 720 can facilitate communications between digital assistant system 700 with other devices over network communications interface 708. For example, communications module 720 can communicate with RF circuitry 208 of electronic devices such as devices 200, 400, and 600 shown in FIG. 2A, 4, 6A-6B, respectively. Communications module 720 can also include various components for handling data received by wireless circuitry 714 and/or wired communications port 712.

User interface module 722 can receive commands and/or inputs from a user via I/O interface 706 (e.g., from a keyboard, touch screen, pointing device, controller, and/or microphone), and generate user interface objects on a display. User interface module 722 can also prepare and deliver outputs (e.g., speech, sound, animation, text, icons, vibrations, haptic feedback, light, etc.) to the user via the I/O interface 706 (e.g., through displays, audio channels, speakers, touch-pads, etc.).

Applications 724 can include programs and/or modules that are configured to be executed by one or more processors 704. For example, if the digital assistant system is implemented on a standalone user device, applications 724 can include user applications, such as games, a calendar application, a navigation application, or an email application. If digital assistant system 700 is implemented on a server, applications 724 can include resource management applications, diagnostic applications, or scheduling applications, for example.

Memory 702 can also store digital assistant module 726 (or the server portion of a digital assistant). In some examples, digital assistant module 726 can include the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules can have access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
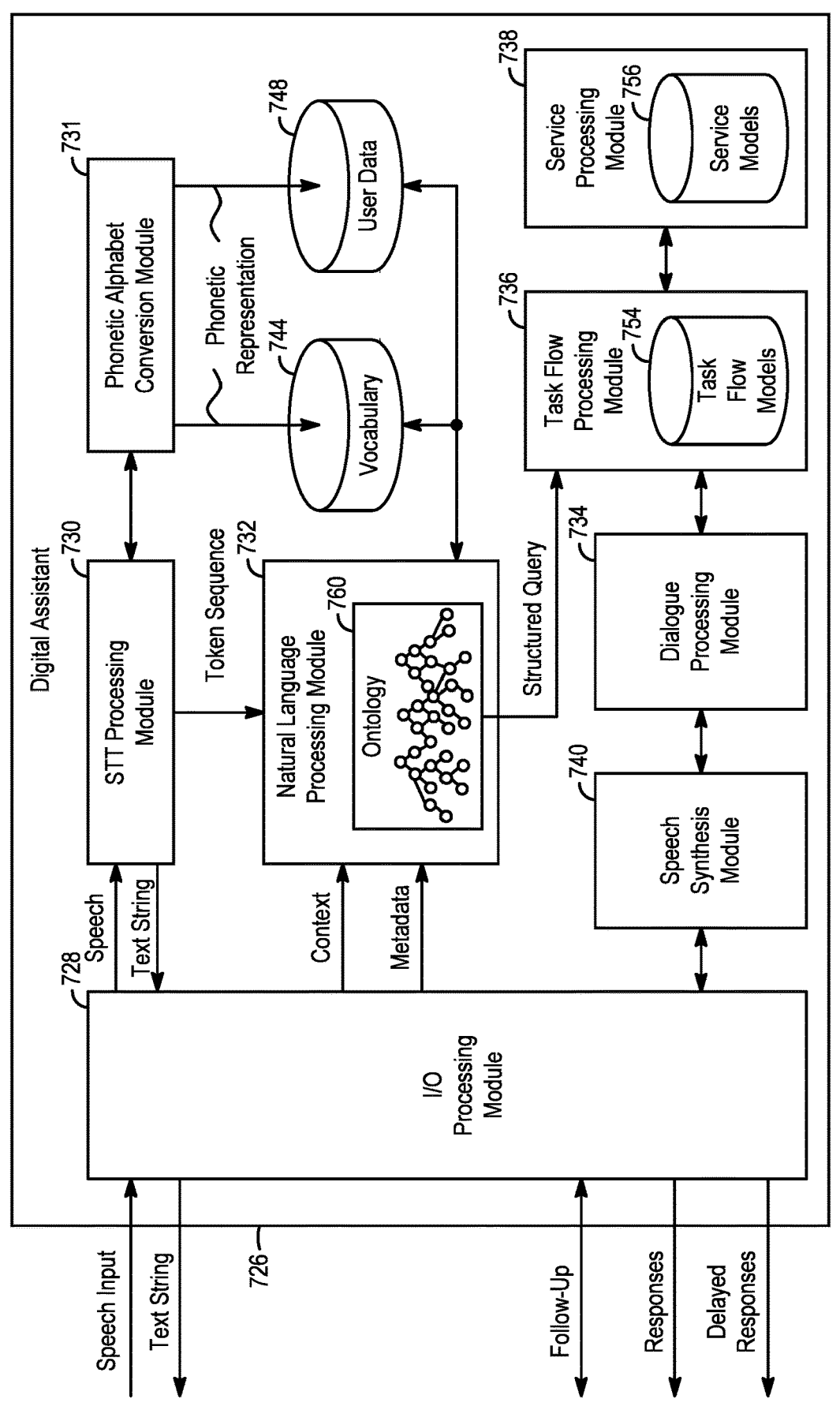
FIG. 7B illustrates the functions of the digital assistant shown in FIG. 7A according to various examples.

In some examples, as shown in FIG. 7B, I/O processing module 728 can interact with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 can also send follow-up questions to, and receive answers from, the user regarding the user request. When a user request is received by I/O processing module 728 and the user request can include speech input, I/O processing module 728 can forward the speech input to STT processing module 730 (or speech recognizer) for speech-to-text conversions.

STT processing module 730 can include one or more ASR systems. The one or more ASR systems can process the speech input that is received through I/O processing module 728 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result can be passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 can include and/or access a vocabulary of recognizable words via phonetic alphabet conversion module 731. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /təˈmeɪroʊ/ and /təˈmɑtoʊ/. Further, vocabulary words can be associated with custom candidate pronunciations that are based on previous speech inputs from the user. Such custom candidate pronunciations can be stored in STT processing module 730 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /təˈmeɪroʊ/ can be ranked higher than /təˈmɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /təˈmeɪroʊ/ can be associated with the United States, whereas the candidate pronunciation /t təˈmɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /təˈmeɪroʊ/ (associated with the United States) can be ranked higher than the candidate pronunciation /təˈmɑtoʊ/ (associated with Great Britain). In some examples, one of the ranked candidate pronunciations can be selected as a predicted pronunciation (e.g., the most likely pronunciation).

When a speech input is received, STT processing module 730 can be used to determine the phonemes corresponding to the speech input (e.g., using an acoustic model), and then attempt to determine words that match the phonemes (e.g., using a language model). For example, if STT processing module 730 can first identify the sequence of phonemes /t təˈmeɪroʊ /corresponding to a portion of the speech input, it can then determine, based on vocabulary index 744, that this sequence corresponds to the word "tomato."

In some examples, STT processing module 730 can use approximate matching techniques to determine words in an utterance. Thus, for example, the STT processing module 730 can determine that the sequence of phonemes /təˈmeɪroʊ/ corresponds to the word "tomato," even if that particular sequence of phonemes is not one of the candidate sequence of phonemes for that word.

Natural language processing module 732 ("natural language processor") of the digital assistant can take the sequence of words or tokens ("token sequence") generated by STT processing module 730, and attempt to associate the token sequence with one or more "actionable intents" recognized by the digital assistant. An "actionable intent" can represent a task that can be performed by the digital assistant, and can have an associated task flow implemented in task flow models 754. The associated task flow can be a series of programmed actions and steps that the digital assistant takes in order to perform the task. The scope of a digital assistant's capabilities can be dependent on the number and variety of task flows that have been implemented and stored in task flow models 754, or in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 730, natural language processing module 732 can also receive contextual information associated with the user request, e.g., from I/O processing module 728. The natural language processing module 732 can optionally use the contextual information to clarify, supplement, and/or further define the information contained in the token sequence received from STT processing module 730. The contextual information can include, for example, user preferences, hardware, and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 760. Ontology 760 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 760 can define how a parameter represented by the property node pertains to the task represented by the actionable intent node.

In some examples, ontology 760 can be made up of actionable intent nodes and property nodes. Within ontology 760, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 7C, ontology 760 can include a "restaurant reservation" node (i.e., an actionable intent node). Property nodes "restaurant," "date/time" (for the reservation), and "party size" can each be directly linked to the actionable intent node (i.e., the "restaurant reservation" node).

Figure 7C:
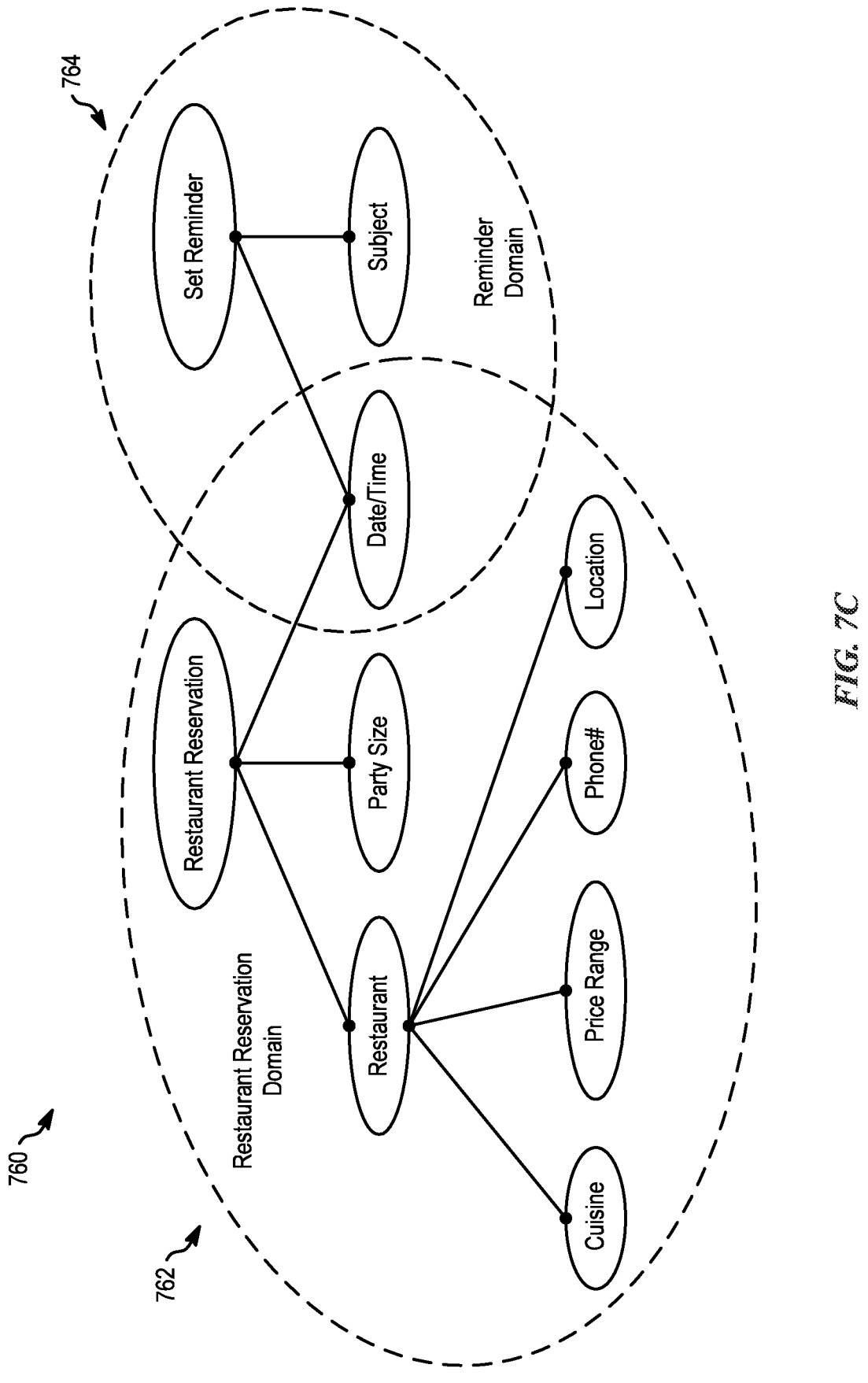
FIG. 7C illustrates a portion of an ontology according to various examples.
Figure 8:
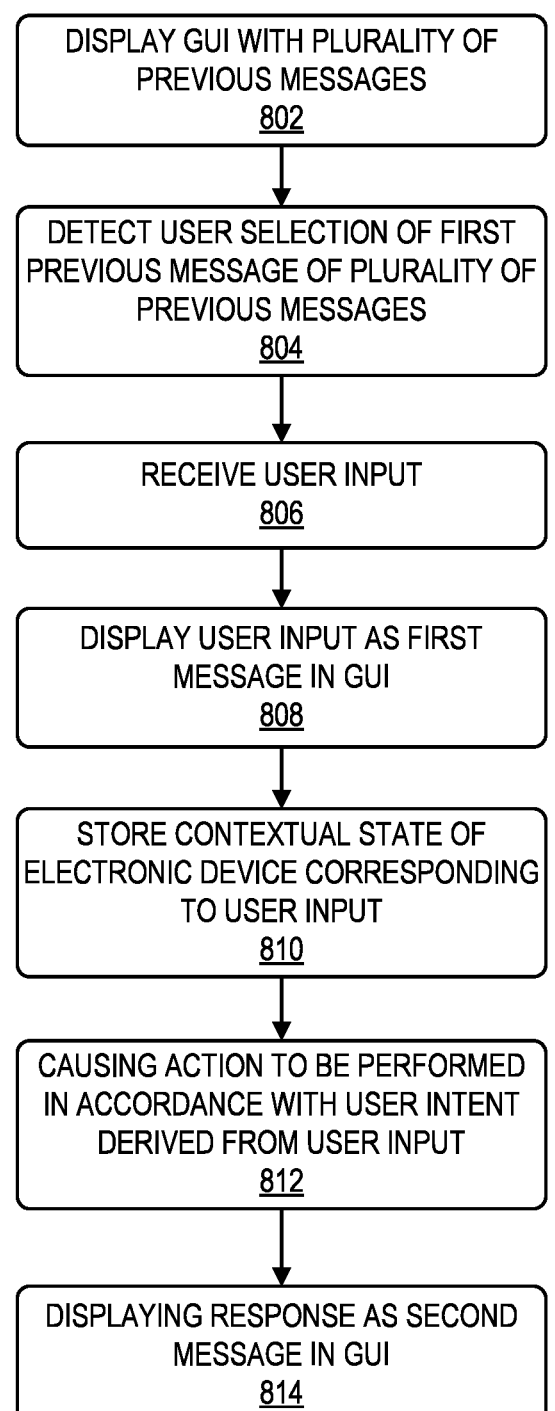
FIG. 8 illustrates a process for operating a digital assistant in a messaging environment according to various examples.

In addition, property nodes "cuisine," "price range," "phone number," and "location" can be sub-nodes of the property node "restaurant," and can each be linked to the "restaurant reservation" node (i.e., the actionable intent node) through the intermediate property node "restaurant." For another example, as shown in FIG. 7C, ontology 760 can also include a "set reminder" node (i.e., another actionable intent node). Property nodes "date/time" (for setting the reminder) and "subject" (for the reminder) can each be linked to the "set reminder" node. Since the property "date/time" can be relevant to both the task of making a restaurant reservation and the task of setting a reminder, the property node "date/time" can be linked to both the "restaurant reservation" node and the "set reminder" node in ontology 760.

An actionable intent node, along with its linked concept nodes, can be described as a "domain." In the present discussion, each domain can be associated with a respective actionable intent, and refers to the group of nodes (and the relationships there between) associated with the particular actionable intent. For example, ontology 760 shown in FIG. 7C can include an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 can include the actionable intent node "set reminder," and property nodes "subject" and "date/time." In some examples, ontology 760 can be made up of many domains. Each domain can share one or more property nodes with one or more other domains. For example, the "date/time" property node can be associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains can include, for example, "find a movie," "initiate a phone call," "find directions," "schedule a meeting," "send a message," and "provide an answer to a question," "read a list," "providing navigation instructions," "provide instructions for a task" and so on. A "send a message" domain can be associated with a "send a message" actionable intent node, and may further include property nodes such as "recipient(s)," "message type," and "message body." The property node "recipient" can be further defined, for example, by the sub-property nodes such as "recipient name" and "message address."

In some examples, ontology 760 can include all the domains (and hence actionable intents) that the digital assistant is capable of understanding and acting upon. In some examples, ontology 760 can be modified, such as by adding or removing entire domains or nodes, or by modifying relationships between the nodes within the ontology 760.

In some examples, nodes associated with multiple related actionable intents can be clustered under a "super domain" in ontology 760. For example, a "travel" super-domain can include a cluster of property nodes and actionable intent nodes related to travel. The actionable intent nodes related to travel can include "airline reservation," "hotel reservation," "car rental," "get directions," "find points of interest," and so on. The actionable intent nodes under the same super domain (e.g., the "travel" super domain) can have many property nodes in common. For example, the actionable intent nodes for "airline reservation," "hotel reservation," "car rental," "get directions," and "find points of interest" can share one or more of the property nodes "start location," "destination," "departure date/time," "arrival date/time," and "party size."

In some examples, each node in ontology 760 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 744 in association with the property or actionable intent represented by the node. For example, returning to FIG. 7B, the vocabulary associated with the node for the property of "restaurant" can include words such as "food," "drinks," "cuisine," "hungry," "eat," "pizza," "fast food," "meal," and so on. For another example, the vocabulary associated with the node for the actionable intent of "initiate a phone call" can include words and phrases such as "call," "phone," "dial," "ring," "call this number," "make a call to," and so on. The vocabulary index 744 can optionally include words and phrases in different languages.

Natural language processing module 732 can receive the token sequence (e.g., a text string) from STT processing module 730, and determine what nodes are implicated by the words in the token sequence. In some examples, if a word or phrase in the token sequence is found to be associated with one or more nodes in ontology 760 (via vocabulary index 744), the word or phrase can "trigger" or "activate" those nodes. Based on the quantity and/or relative importance of the activated nodes, natural language processing module 732 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 748 can include user-specific information, such as user-specific vocabulary, user preferences, user address, user's default and secondary languages, user's contact list, and other short-term or long-term information for each user. In some examples, natural language processing module 732 can use the user-specific information to supplement the information contained in the user input to further define the user intent. For example, for a user request "invite my friends to my birthday party," natural language processing module 732 can be able to access user data 748 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7." In this case, natural language processing module 732 can be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. In some examples, based on the speech input and the text derived from the speech input using STT processing module 730, natural language processing module 732 can generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} may not be specified in the structured query based on the information currently available. In some examples, natural language processing module 732 can populate some parameters of the structured query with received contextual information. For example, in some examples, if the user requested a sushi restaurant "near me," natural language processing module 732 can populate a {location} parameter in the structured query with GPS coordinates from the user device.

In some examples, natural language processing module 732 can pass the generated structured query (including any completed parameters) to task flow processing module 736 ("task flow processor"). Task flow processing module 736 can be configured to receive the structured query from natural language processing module 732, complete the structured query, if necessary, and perform the actions required to "complete" the user's ultimate request. In some examples, the various procedures necessary to complete these tasks can be provided in task flow models 754. In some examples, task flow models 754 can include procedures for obtaining additional information from the user and task flows for performing actions associated with the actionable intent.

As described above, in order to complete a structured query, task flow processing module 736 may need to initiate additional dialogue with the user in order to obtain additional information, and/or disambiguate potentially ambiguous utterances. When such interactions are necessary, task flow processing module 736 can invoke dialogue flow processing module 734 to engage in a dialogue with the user. In some examples, dialogue flow processing module 734 can determine how (and/or when) to ask the user for the additional information and receives and processes the user responses. The questions can be provided to and answers can be received from the users through I/O processing module 728. In some examples, dialogue flow processing module 734 can present dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 can generate questions such as "For how many people?" and "On which day?" to pass to the user. Once answers are received from the user, dialogue flow processing module 734 can then populate the structured query with the missing information, or pass the information to task flow processing module 736 to complete the missing information from the structured query.

Once task flow processing module 736 has completed the structured query for an actionable intent, task flow processing module 736 can proceed to perform the ultimate task associated with the actionable intent. Accordingly, task flow processing module 736 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 can perform the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 can employ the assistance of service processing module 738 ("service processing module") to complete a task requested in the user input or to provide an informational answer requested in the user input. For example, service processing module 738 can act on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among service models 756. Service processing module 738 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processing module 736, service processing module 738 can establish a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 740 (e.g., speech synthesizer) where it can be processed to synthesize the dialogue response in speech form. In yet other examples, the generated response can be data content relevant to satisfying a user request in the speech input.

Speech synthesis module 740 can be configured to synthesize speech outputs for presentation to the user. Speech synthesis module 740 synthesizes speech outputs based on text provided by the digital assistant. For example, the generated dialogue response can be in the form of a text string. Speech synthesis module 740 can convert the text string to an audible speech output. Speech synthesis module 740 can use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 can be configured to synthesize individual words based on phonemic strings corresponding to the words. For example, a phonemic string can be associated with a word in the generated dialogue response. The phonemic string can be stored in metadata associated with the word. Speech synthesis model 740 can be configured to directly process the phonemic string in the metadata to synthesize the word in speech form.

In some examples, instead of (or in addition to) using speech synthesis module 740, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Processes for Operating a Digital Assistant in a Messaging Environment

FIGS. 8, 11A-11D, and 13A-13C illustrate processes 800, 1100, and 1300 for operating a digital assistant in a messaging environment according to various examples. FIGS. 9A-9L, 12A-12H, and 14A-14I illustrate exemplary user interfaces of an electronic device for operating a digital assistant in a messaging environment according to various examples. Processes 800, 1100, and 1300 can be performed using one or more electronic devices implementing a digital assistant. In some examples, the processes can be performed at a client-server system (e.g., system 100) implementing a digital assistant. In some examples, the processes can be performed at an electronic device (e.g., device 104, 200, 400, or 600). In processes 800, 1100, and 1300, some blocks are, optionally, combined, the order of some blocks are, optionally, changed, and some blocks are, optionally, omitted. Further, one of ordinary skill would appreciate that the blocks of one exemplary process can be implemented in another exemplary process. For example, the blocks of processes 1100 or 1300 can be implemented in process 800.

Figures 9A, 9B:
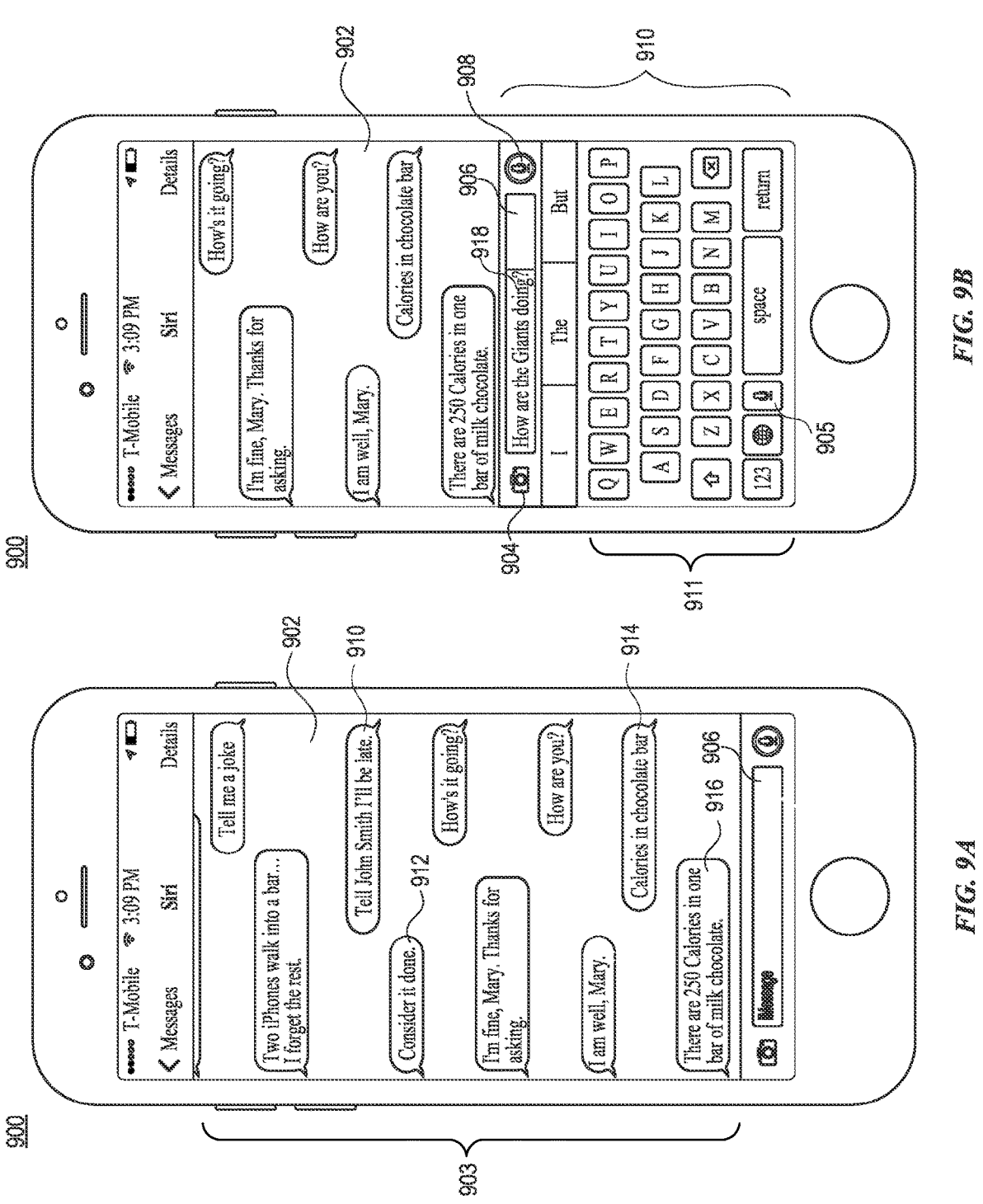
FIGS. 9A-9L illustrate exemplary user interfaces of an electronic device for operating a digital assistant in a messaging environment according to various examples.

Process 800 is described below with simultaneous reference to FIGS. 8 and 9A-9L. At block 802, a graphical user interface (GUI) can be displayed on the display (e.g., touch screen 212 or display 440) of an electronic device. For example, as shown in FIG. 9A, GUI 902 of electronic device 900 can be displayed. Electronic device 900 can be similar to one or more of devices 104, 200, 400, or 600, described above, and can implement a digital assistant. GUI 902 can be a GUI of a messaging application (e.g., messaging application implemented by instant messaging module 241) of the electronic device. The messaging application can be configured to send messages to and receive messages from one or more recipients. As shown, GUI 902 can include plurality of previous messages 903 that were previously exchanged between a user of electronic device 900 and the digital assistant. In particular, plurality of previous messages 903 can include previous messages from the user addressed to the digital assistant and previous messages generated by the digital assistant in response to the user's previous messages. For example, previous message 910 of plurality of previous messages 903 can be generated from user input and addressed to the digital assistant. Previous message 912 of plurality of previous messages 903 can be generated by the digital assistant in response to previous message 910 from the user.

As shown, plurality of previous messages 903 in GUI 902 can be presented in a conversational view. In particular, plurality of previous messages 903 can be displayed in chronological order. In the present example, plurality of previous messages 903 are displayed in chronological order from top to bottom where the oldest previous message is displayed at the top of GUI 902 and the most recent previous message is displayed at the bottom of GUI 902. Further, messages from the user can be displayed on a side of GUI 902 opposite from that of messages from the digital assistant. In particular, previous messages from the user (e.g., previous message 910) can be justified on the right side of GUI 902 whereas previous messages from the digital assistant (e.g., previous message 912) can be justified on the left side of GUI 902.

The plurality of previous messages can include one or more interactive sessions between the user and the digital assistant. Each interactive session can include two or more previous messages. In particular, an interactive session can be initiated by an initial request from a user and the messages in the interactive session can each be relevant to the initial request. For example, previous messages 910 and 912 can be part of the same interactive session.

The plurality of previous messages can represent a text history of all previous interactive sessions between the user and the digital assistant (e.g., since the last time the message history was cleared). The previous interactive sessions can include text-based interactions via the messaging application or voice-based interactions via a digital assistant interface separate from the messaging application. For example, as shown in FIG. 9A, previous messages 914 and 916 can be text transcriptions of a previous voice-based interaction between the user and the digital assistant that occurred outside of the messaging application. The previous voice-based interaction may have occurred prior to receiving the user input at block 806 of process 800 and may have been initiated when a user input was previously detected at the electronic device to invoke the digital assistant. Detecting the user input can include, for example, detecting the push of a button on the electronic device or detecting the selection of an affordance on the electronic device. In response to detecting the user input, the electronic device can sampled audio containing a user utterance. In this example, the user utterance can include the request "Calories in chocolate bar." The electronic device can cause the user utterance to be transcribed to text and the text representation of the user utterance can be included in GUI 902 as previous message 914. The electronic device can further cause an action to be performed in accordance with a user intent derived from the user utterance. In particular, the sampled audio data can be transmitted to a digital assistant server (e.g., DA server 106) to determine an actionable intent based on the user utterance and generate a task flow corresponding to the actionable intent. Alternatively, the electronic device can process the sampled audio data locally to determine the actionable intent and generate the corresponding task flow. The task flow can be executed by the digital assistant server and/or the electronic device to perform the action. In this example, the performed action can be a search for the number of calories in a chocolate bar. A response based on the results obtained from the search can be outputted by the electronic device action. For example, the response can provide the number of calories in a milk chocolate bar. As shown in FIG. 9A, a text representation of the response can be included in GUI 902 as previous message 916.

Each of the plurality of previous messages can be associated with a previous contextual state of the electronic device. The previous contextual state can be similar to the contextual state stored at block 810, described below. In particular, the previous contextual state can include information related to the state of the electronic device at the time user input associated with the previous message was received. For example, the previous contextual state can include temporal information (e.g., the time) defining when the user input was received or location information defining the location of the electronic device at the time the user input was received. Further, a pair of previous messages comprising the user input and the corresponding response to the user input from the digital assistant can be associated with the same previous contextual state. For example, previous messages 910 and 912 can be associated with the same previous contextual state. In particular, the previous contextual state of previous message 910 and 912 can be the state of the electronic device at the time user input associated with previous message 910 was received. Further, the previous contextual state associated with previous messages 910 and 912 can be different from the previous contextual state associated with previous messages 914 and 916.

In some examples, the previous contextual state of the electronic device associated with a previous message can optionally be utilized during a current interactive session between the user and the digital assistant. For example, the user may wish to find a restaurant at the location associated with a specific previous message. In these examples, block 804 can be performed.

At block 804, a user selection of a first previous message of the plurality of previous messages can be detected. The user selection can be any suitable user input associated with the first previous message. In particular, the user selection can be detected via GUI 902. The first previous message can be associated with a first previous contextual state of the electronic device. In response to detecting the user selection of the first previous message, the first previous contextual state of the electronic device can be retrieved. The retrieved first previous contextual state can then be utilized to process a user input (e.g., user input of block 806) representing a user request. In some examples, block 804 can be performed prior to block 806. In other examples, block 804 can be performed after block 806 and before block 808.

At block 806, user input can be received. The user input can be received via a user input interface of the electronic device. As shown in FIG. 9B, GUI 902 can include user input interface 910. The user input can include text and/or a media object. Text input can be received via keyboard 911 of user input interface 910. Alternatively, text input can be received using dictation button 905, which enables a user utterance received via the microphone (e.g., microphone 213) of the electronic device to be transcribed into text. The media object can be an image, an audio clip, a video clip, or the like. A media object can be received using image/video button 904 and audio button 908. In particular, selection of image/video button 904 can enable the user to retrieve an image/video stored on the electronic device or to capture a new image/video using the camera (e.g., optical sensor 264) of electronic device. Selection of audio button 908 can enable the user to record an audio clip via the microphone (e.g., microphone 213) of the electronic device. User input received via user input interface 910 can be displayed in text input field 906 before being submitted. The user input can represent a user request to perform a task or retrieve information. The user input can be in natural language form. In the present example shown in FIG. 9B, the user input can be text input 918 "How are the Giants doing?"

In some examples, the user can leverage previous messages to enable quicker entry of user input. In particular, a previous message of the plurality of previous messages can be selected to auto-populate the text input field of the user input interface. For example, with reference to FIG. 9A, a user input associated with previous message 910 can be detected. The user input can be a user selection of previous message 910 via GUI 902. In response to detecting the user input associated with previous message 910, text of previous message 910 (e.g., "Tell John Smith I'll be late.") can be displayed in text input field 906 of GUI 902. This can be desirable to allow a user to input a request with few actions and in less time. For example, if the user wishes to input the text "Tell John White I'll be late," the user can auto-populate the text of previous message 910 in text input field 906 and change "Smith" to "White."

At block 808, the user input of block 806 can be displayed as a first message in the GUI. For example, with reference to FIG. 9C, text input 918 can be displayed as message 922 in GUI 902. In particular, message 922 can be addressed to the digital assistant. Block 808 can be performed in response to receiving the user input at block 806.

At block 810, the electronic device can store a contextual state of the electronic device corresponding to the displayed user input. In particular, the contextual state can be stored in association with the first message. The contextual state being stored can include the state of the electronic device at the time the user input was received at block 806. In some examples, the contextual state of the electronic device can include temporal information of when the user input at block 806 was received. In some examples, the contextual state of the electronic device can include information derived from a physical sensor of the electronic device at the time the user input at block 806 was received (e.g., location information defining the location of the electronic device at the time the user input was received). In some examples, the contextual state of the electronic device can include information stored on the electronic device at the time the user input at block 806 was received. The information can be related to a predetermined application of the electronic device. For example, the information can include contact information, email messages, media files, calendar appointments, search histories, fitness data, or the like. In some examples, the information can include which applications are installed and/or actively running on the electronic device at the time the user input of block 806 was received. It should be appreciated that the contextual state of the electronic device can include various other types of contextual information associated with the electronic device at the time the user input of block 806 was received. In the present example shown in FIG. 9C, the contextual state of the electronic device can include at least the time and date at which the user input of block 806 was received at the electronic device and the location of the electronic device at the time the user input of block 806 was received. The time, date, and location information can be stored on the electronic device in association with first message 922. Block 810 can be performed in response to receiving the user input at block 806.

At block 812, the electronic device can cause an action to be performed in accordance with a user intent derived from the user input. Block 812 can be performed automatically without additional human intervention in response to receiving the user input at block 806 (or in response to displaying the first message at block 808). In particular, the electronic device can cause the user intent (e.g., actionable intent) to be determined (e.g., using natural language processing module 732) based on the user input of block 806 and cause a task flow corresponding to the user intent to be generated (e.g., using task flow processing module 736). The electronic device can further cause the task flow to be executed to perform the action. In the present example shown in FIG. 9D, the user intent can be determined to be searching for recent sports scores related to the "Giants" and thus the action can be performing a search for recent sports scores related to the "Giants." Results that at least partially satisfy the derived user intent can be obtained by performing the action. The displayed response at block 814 can thus be based on the results obtained by performing the action.

In some examples, receiving the user input at block 806 (or displaying the first message at block 808) can cause the electronic device to determine the user intent, generate the task flow, and perform the action. Alternatively, the electronic device can transmit a representation of the user input to a digital assistant server (e.g., DA server 106) and cause the digital assistant server to determine the user intent, generate the task flow, and perform the action.

In some examples, the stored contextual state of the electronic device of block 810 can be utilized to determine the user intent and thus the response displayed at block 814 can be based on the stored contextual state. For example, location information stored in association with first message 922 can indicate that the electronic device was located in San Francisco at the time text input 918 was received. Based on this location information, it can be determined that the user is more likely referring to the San Francisco Giants (baseball team) rather than the New York Giants (football team), and the action can include searching for the most recent scores related to the San Francisco Giants to obtain results. In particular, search results indicating that the San Francisco Giants won 7 to 1 over the San Diego Padres in its most recent game can be obtained. It should be appreciated that in other examples, the previous contextual states of any number of previous messages in GUI 902 can additionally or alternatively be used to determine the user intent.

Figures 9C, 9D:
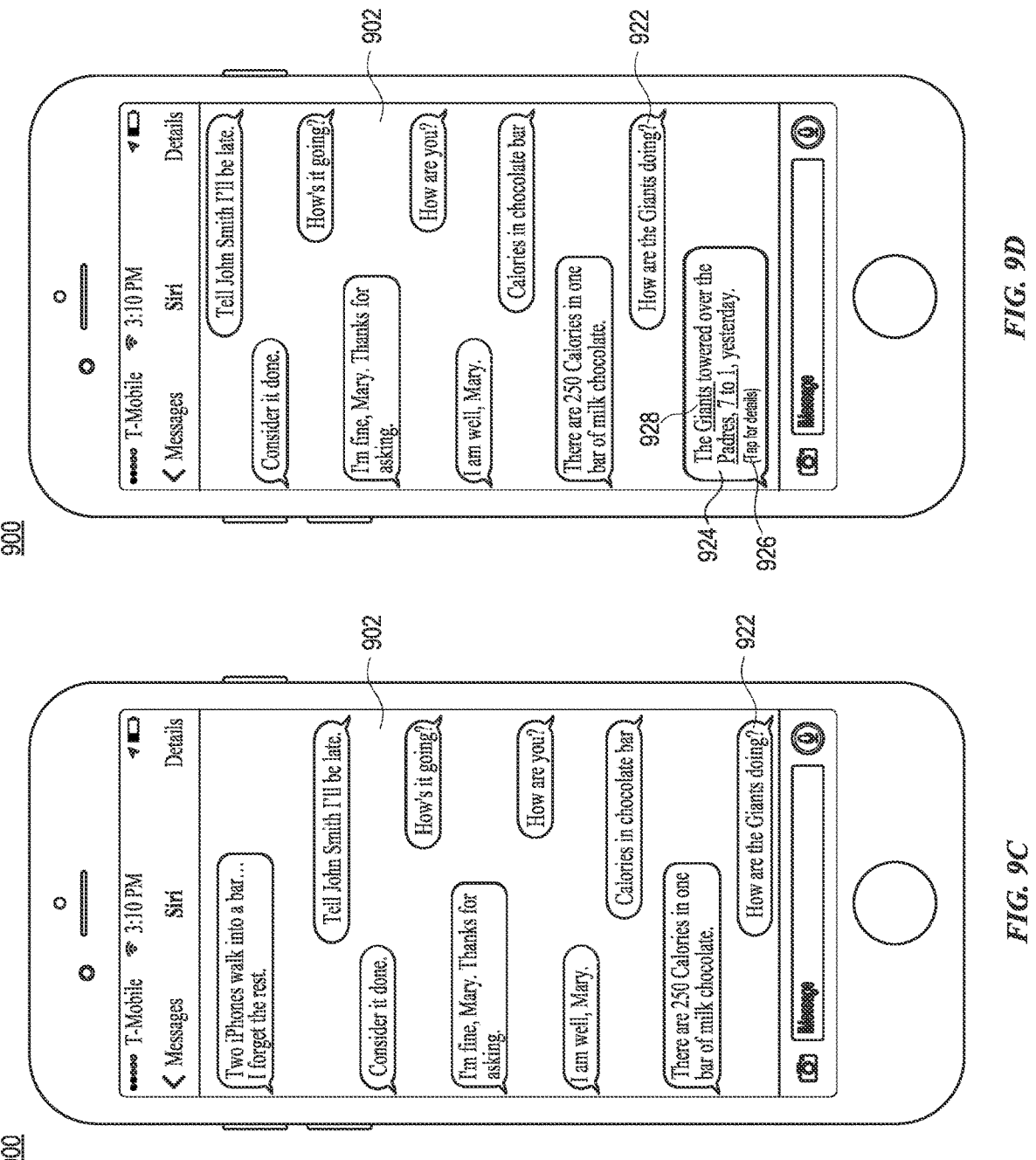
Figures 9E, 9F:
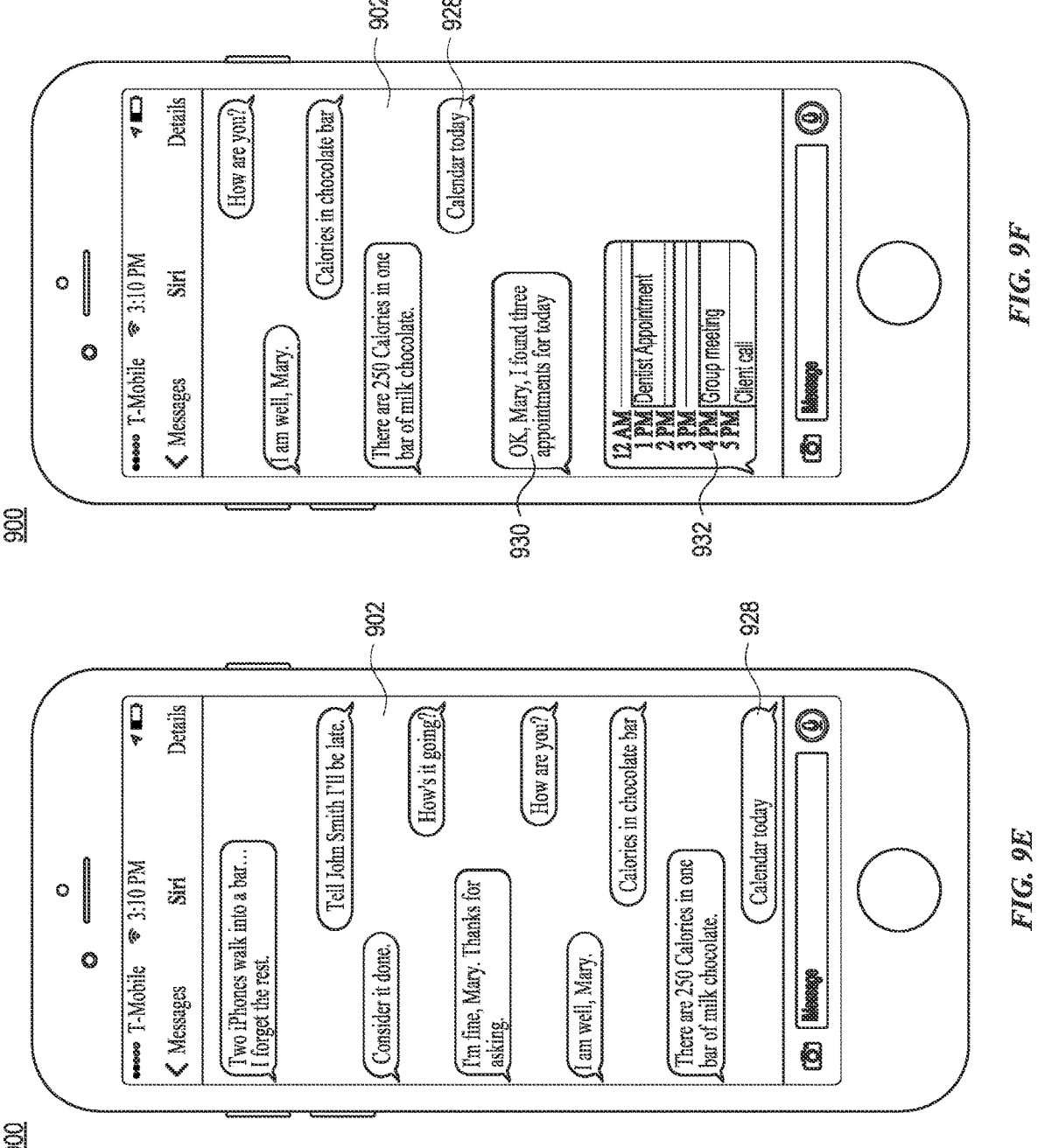

At block 814, a response based on the action of block 812 can be displayed as a second message in the GUI. For example, as shown in FIG. 9D, second message 924 can be displayed in GUI 902. Second message 924 can include a response based on the search results obtained at block 812. In particular, second message 924 can include the search results indicating that the San Francisco Giants won 7 to 1 over the San Diego Padres in its most recent game. The response can at least partially satisfy the user request represented by the user input of block 806. Further, the response can be in natural language form.

In some examples, the second message can be displayed without providing any audio output. For example, second message 924 can be displayed in GUI 902 without outputting any spoken audio corresponding to the text response in second message 924. This can be desirable to preserve the text based interactive environment associated with the messaging platform. In particular, a user may prefer to interact with the digital assistant using the messaging platform rather than a voice/audio interface when voice/audio based interactions are not possible, such as in a noisy environment, in a public setting with little privacy, or in a quiet setting (e.g., library).

Second message 924 can include only text. In particular, as shown in FIG. 9D, second message 924 can be concise with only a limited number of text sentence (e.g., at most one, two, or three sentences) and without any media object. Such concise responses facilitate the quick exchange of information, which is desired and expected by users in the messaging environment. In some examples, in order to provide the user with the option of obtaining a more detailed response, second message 924 can be configured to provide a more detailed response in accordance with a user selection of second message 924. This can enable the desirable concise format to be preserved while providing convenient access to additional details responsive to the user request. For example, as shown in FIG. 9D, block 814 can include displaying indication 926 (e.g., "Tap for details") in second message 924 that a more detailed response is available by selecting second message 926. In the present example, indication 926 can inform the user that second message 926 is configured to provide additional details related to the Giants in response to a user selection of second message 926.

In some examples, a user selection of second message 924 can be received via GUI 902 of electronic device 900. In the present example, the user selection of second message 926 can include a touch input via GUI 902 of electronic device 900. It should be recognized that in other examples, the user selection can include any suitable user input associated with the second message. In response to receiving the user selection of second message 924, detailed results based on the user intent can be obtained. In particular, receiving the user selection can cause an application of the electronic device to obtain additional results that satisfy the user intent. The application can be different from the messaging application. For example, the user selection of second message 924 can cause the Internet browser application (e.g., the Internet browser application of browser module 247) of the electronic device to perform a search based on the user intent and to obtain detailed results related to how the Giants are doing. The detailed results can include, for example, the total number of games won or lost by the Giants in the current season, news articles reporting the recent win against the Padres, future game schedules for the Giants, or the like. The obtained detailed result can be displayed in a GUI of the Internet browser application.

Whether or not the second message displayed at block 814 is selectable to provide a more detailed response can be based on the user intent derived from the user input at block 812. For example, in determining the actionable intent corresponding to the user input at block 812, a determination can be made as to whether the actionable intent is associated with one of a plurality of predetermined domains in the ontology. In some examples, the plurality of predetermined domains can include domains where a detailed response is most likely desired by the user. In particular, the plurality of predetermined domains can include domains such as "contacts," "restaurants," "movies," "sports," or "search." In response to a determination that the actionable intent is associated with one of a plurality of predetermined domains, the displayed second message at block 814 can be configured to provide a more detailed response in accordance with a user selection of the second message.

In some examples, hyperlinks can be provided in the response of the second message to provide the user with access to additional information relevant to the user request. For example, one or more words (or one or more character strings) in the second message can be highlighted to indicate that additional information related to the highlighted words is available upon user selection. In particular, process 800 can identify one or more words (or one or more character strings) in the displayed response corresponding to an entity. The entity can be a person, team, business, location, event, building, object, media item, or the like. In some examples, the one or more words corresponding to an entity can be identified based on the derived user intent at block 812. In the present example, the user intent can be determined to be associated with the domain "sports" and thus one or more words corresponding to a sports entity can be identified. In particular, as shown in FIG. 9D, the words "Giants," "Padres," and "7 to 1" can be identified. Process 800 can further include determining an action associated with the entity. In some examples, the action can include obtaining information related to the entity. The action can be performed using an application of the electronic device other than the messaging application. The electronic device can enable the selection of the one or more identified words in the displayed response (e.g., hyperlinking). In particular, detecting a user selection of the one or more identified words can cause the action associated with the entity to be performed. For example, in response to detecting the user selection of the word "Giants" in message 924, information related to the Giants can be retrieved using the Internet browser application. For example, the Internet browser application can be instructed to load the homepage of the Giants or perform an Internet search of the Giants. Although in FIG. 9D, the one or more words are highlighted by underlining, it should be recognized that other means of highlighting can be implemented, such as, using different fonts, colors, bolding, or the like.

In some examples, the one or more words corresponding to an entity can be identified based on the contextual state of the electronic device. For example, the user intent can be related to contacts (e.g., sending a message to "John White") and the one or more words can be identified based on a name or location stored in the contacts of the electronic device at the time the user input was received (e.g., "John White"). In response to detecting the user selection of the one or more identified words, the contact corresponding to the one or more identified words can be retrieved and displayed via, for example, a GUI of the contacts application. In another example, the user intent can be related to airline flights (e.g., searching for a flights landing in San Francisco from Chicago) and the response in the second message can include a flight numbers. Based on this user intent, the character string corresponding to the airline flight can be identified in the second message and can be highlighted and hyperlinked in the second message. In response to detecting the user selection of the flight number in the second message, the flight schedule and/or flight status associated with the flight number can be obtained and displayed (e.g., via a GUI of the Internet browser application).

In some examples, block 814 can further include displaying a media object in the GUI of the electronic device. The media object can be based on the user intent. In particular, the media object can at least partially satisfy the user request represented by the user input at block 806. In some examples, the media object can be displayed in the second message. In other examples, the media object can be displayed in a separate message (e.g., a third message). The media object can be an image, an audio clip, a video, or the like. In some examples, the media object can be a snippet of a GUI of an application of the electronic device (e.g., an application other than the messaging application). In an illustrative example shown in FIGS. 9E-9F, the user input "Calendar today" can be received (e.g., at block 806). The user input can represent a user request to retrieve appointments from the calendar application schedule for today. In response to receiving the user input, the user input can be displayed in GUI 902 as message 928 (e.g., at block 808). Based on the user intent derived from the user input, the appointments scheduled for today can be retrieved from the calendar application of the electronic device (e.g., at block 812). Further, a snippet of the GUI of the calendar application depicting the appointments scheduled for today can be obtained (e.g., at block 812). A text response addressing the user request can be displayed as message 930 in GUI 902 (e.g., at block 814). Further the snippet of the GUI of the calendar application can be displayed as message 932 in GUI 902. The snippet can be a graphical presentation of information requested by the user in the user input.

Displaying a media object in response to a user request in the user input can be desirable for presenting information that may otherwise be difficult to clearly and concisely present using text alone. In some examples, whether or not a media object is displayed in response to the user request can be based on the user intent derived from the user input. For example, in determining the actionable intent corresponding to the user input at block 812, a determination can be made as to whether the actionable intent is associated with one of a second plurality of predetermined domains in the ontology. In some examples, the second plurality of predetermined domains can include domains where information can be more clearly and concisely displayed in graphical or multimedia form. In particular, the second plurality of predetermined domains can include domains such as "calendar," "weather," "stocks," "maps," "health," or the like. In response to a determination that the actionable intent is associated with one of a second plurality of predetermined domains, a media object based on the user intent can be displayed at block 814.

The displayed media object can be selectable to provide the user with expanded results associated with the media object. In particular, in response to detecting the user selection of the media object, expanded results can be obtained and displayed. The expanded results can be obtained and displayed by an application of the electronic device other than the messaging application. For example, the user selection of media object 932 in FIG. 9F can cause the calendar application to display a GUI of the calendar application with the user's appointments scheduled for today. The expanded results can be larger and contain more information than the media object displayed at block 814.

Figures 9G, 9H:
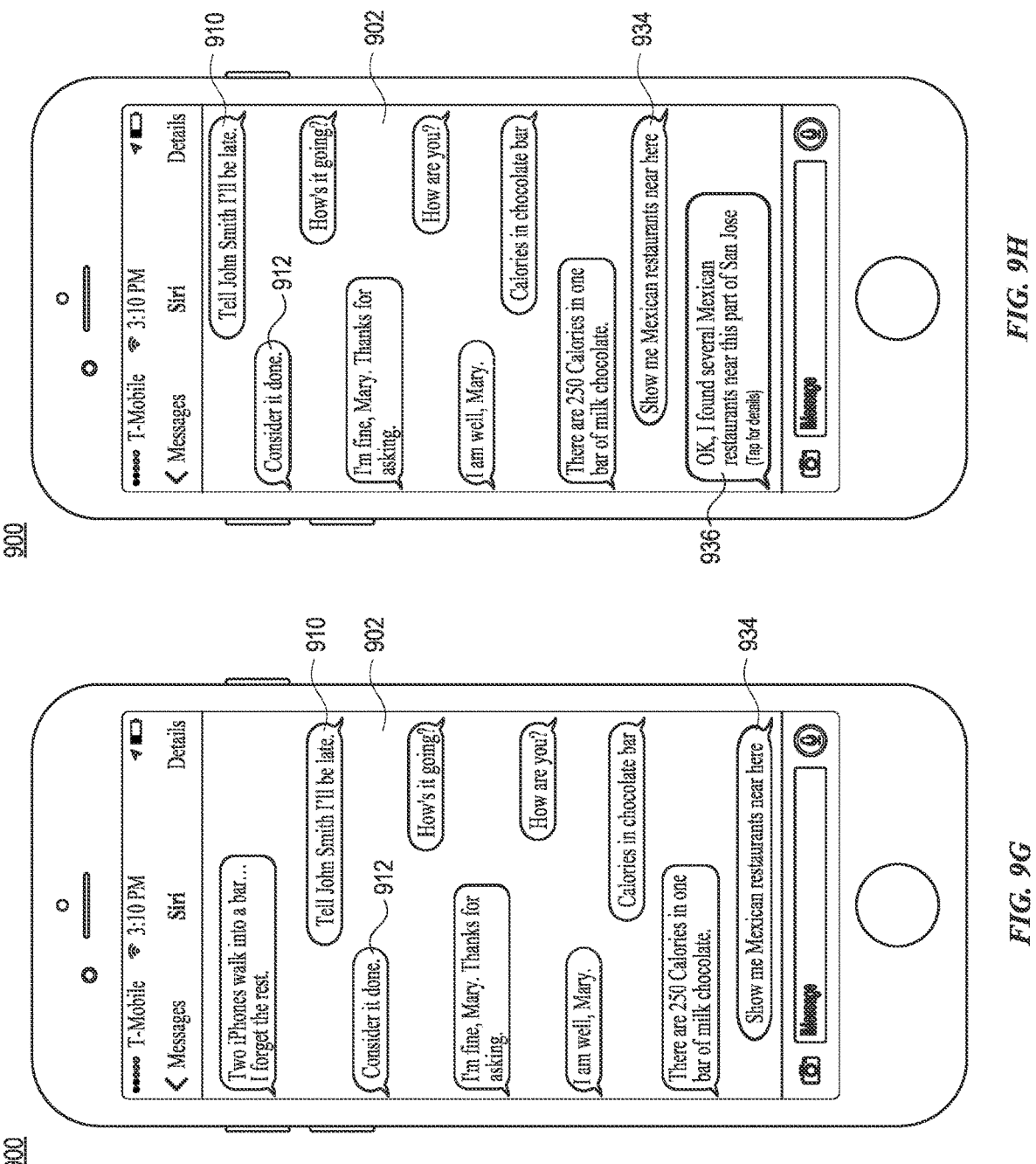

As discussed above, the previous contextual state of the electronic device associated with a previous message in GUI 902 can be utilized to facilitate a current interactive session between the user and the digital assistant. FIGS. 9G-H illustrate an example where the previous contextual state of the electronic device can be utilized to satisfy a user request represented by the user input of block 806. In this example, the user may have been traveling in an unfamiliar part of San Jose at the time previous message 910 was sent to the digital assistant. Further, the user may have noticed an interesting Mexican restaurant in that unfamiliar part of San Jose while sending previous message 910. The user may utilize the previous contextual state of the electronic device associated with previous message 910 in order to look up that Mexican restaurant at a later time. In the present example, the user input "Show me Mexican restaurants near here" can be received (e.g., at block 806) and in response to the user input, the user input can be displayed as message 934 (e.g., at block 808) in GUI 902. In response to detecting a user selection of previous message 910 (e.g., at block 804), the previous contextual state of the electronic device associated with previous message 910 can be retrieved. In particular, the previous contextual state of the electronic device associated with previous message 910 can include location information corresponding to the unfamiliar location in San Jose. The electronic device can cause an action to be performed in accordance with a user intent derived from the user input (e.g., at block 812). In response to detecting the user selection of previous message 910, the user intent can be derived based on the retrieved previous contextual state of the electronic device associated with previous message 910. In particular, it can be determined based on the user selection of previous message 910 that "near here" refers to the location of the electronic device at the time previous message 910 was sent (e.g., the unfamiliar part of San Jose). In this example, the action performed can be a search for Mexican restaurants near the location of the electronic device at the time previous message 910 was sent. The results obtained from the search are thus based on the previous contextual state of the electronic device associated with previous message 910. As shown in FIG. 9H, a response based on the obtained search results can be displayed as message 936. In particular, a list of Mexican restaurants near the unfamiliar part of San Jose can be displayed (e.g., in a separate application of the electronic device) in response to the user selection of message 936.

Figures 9I, 9J:
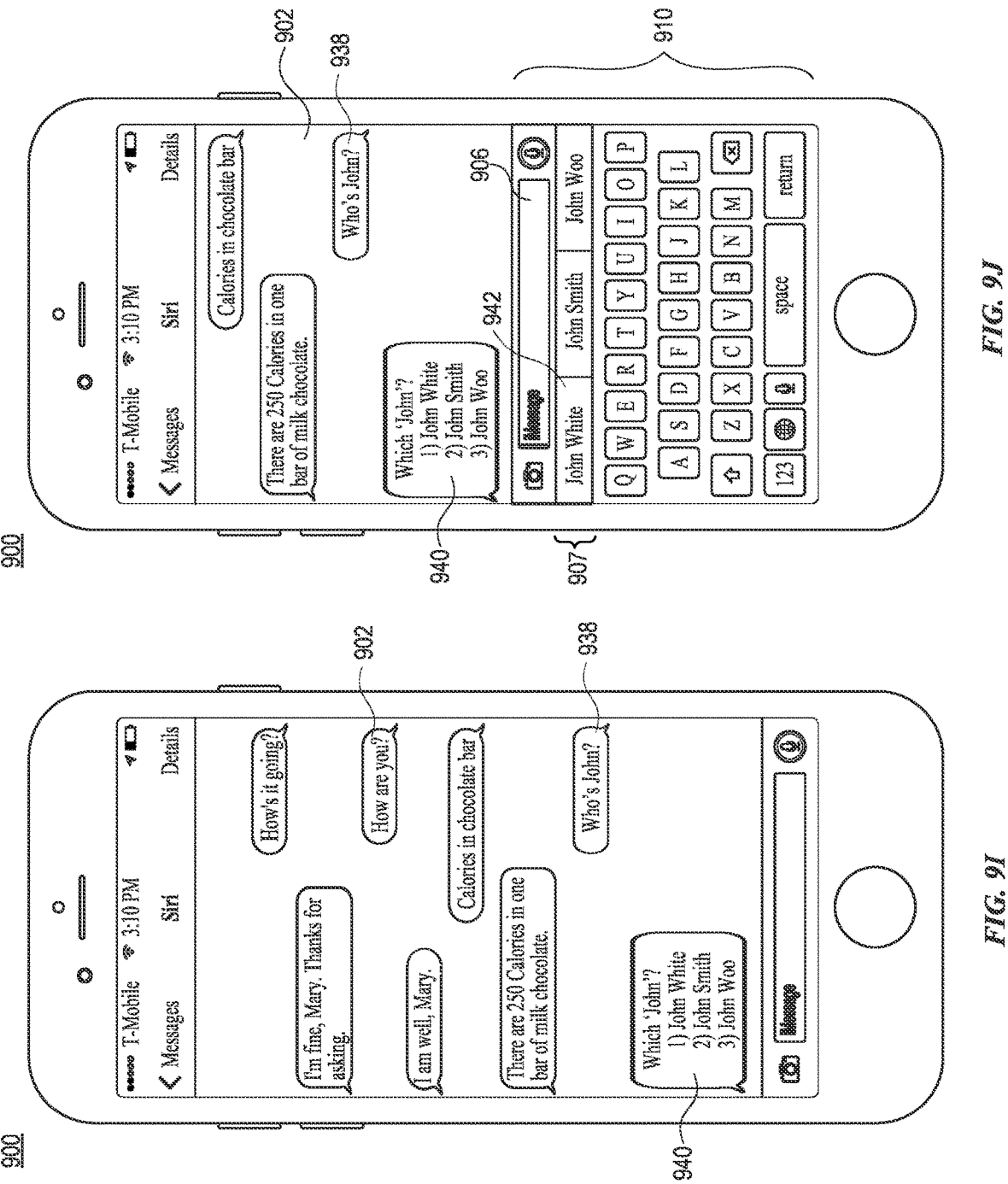

In some examples, the user input received at block 806 can include an ambiguous term. For example, in the user input of message 938 shown in FIG. 9I, the user input "Who's John?" can include the ambiguous term "John," which can have two or more interpretations. In particular, based on the contextual state of the electronic device at the time the user input of message 938 was received, it can be determined that there are three contacts (e.g., John White, John Smith, and John Woo) stored on the electronic device corresponding to the name "John." In these examples, the displayed response of message 940 (e.g., at block 814) can include a request for additional information related to the ambiguous term. For example, as shown in FIG. 9I, the request for additional information can include a list of possible interpretations (e.g., "John White," "John Smith," and "John Woo") for the ambiguous term "John.

User input interface 910 can be utilized to facilitate user response to the request for additional information related to the ambiguous term. In particular, user input interface 910 can include auto-complete interface 907. Auto-complete interface 907 can be configured to display suggested words or character strings that are a prediction of future user input. The suggested words or character strings can be based on one or more characters that the user has already inputted and is displayed in text field 906. Additionally or alternatively, the suggested words or character strings can be based on the displayed response from the digital assistant. As shown in FIG. 9J, two or more suggested character strings (e.g., "John White," "John Smith," and "John Woo") can be displayed in auto-complete interface 907. Each of the two or more suggested character strings can be responsive to the request for additional information. In particular, the two or more suggested character strings can include the list of possible interpretations of the ambiguous term (e.g., "John White," "John Smith," and "John Woo").

A user input indicating a selection of one of the list of possible interpretations can be received. In some examples, the user input can be a user selection of a suggested character string of the two or more suggested character strings. For example, a user selection of the suggested character string "John White" 942 in auto-complete interface 907 can be detected and in response, the suggested character string "John White" can be displayed as message 944 in GUI 902. It should be appreciated that, as an alternative to auto-complete interface 907, a response to the request for additional information related to the ambiguous term can be provided via text input. For example, text input "John White" can be received via the keyboard of user input interface 910 to select the intended interpretation of the ambiguous term "John." Further, as shown in FIGS. 9I and 9J, the list of possible interpretations of the ambiguous term can be numbered and thus in some examples, the text input corresponding number of the intended interpretation can be received. In particular, the text input "3" can be received to indicate selection of "John White" as the intended interpretation of the ambiguous term "John."

Figures 9K, 9L:
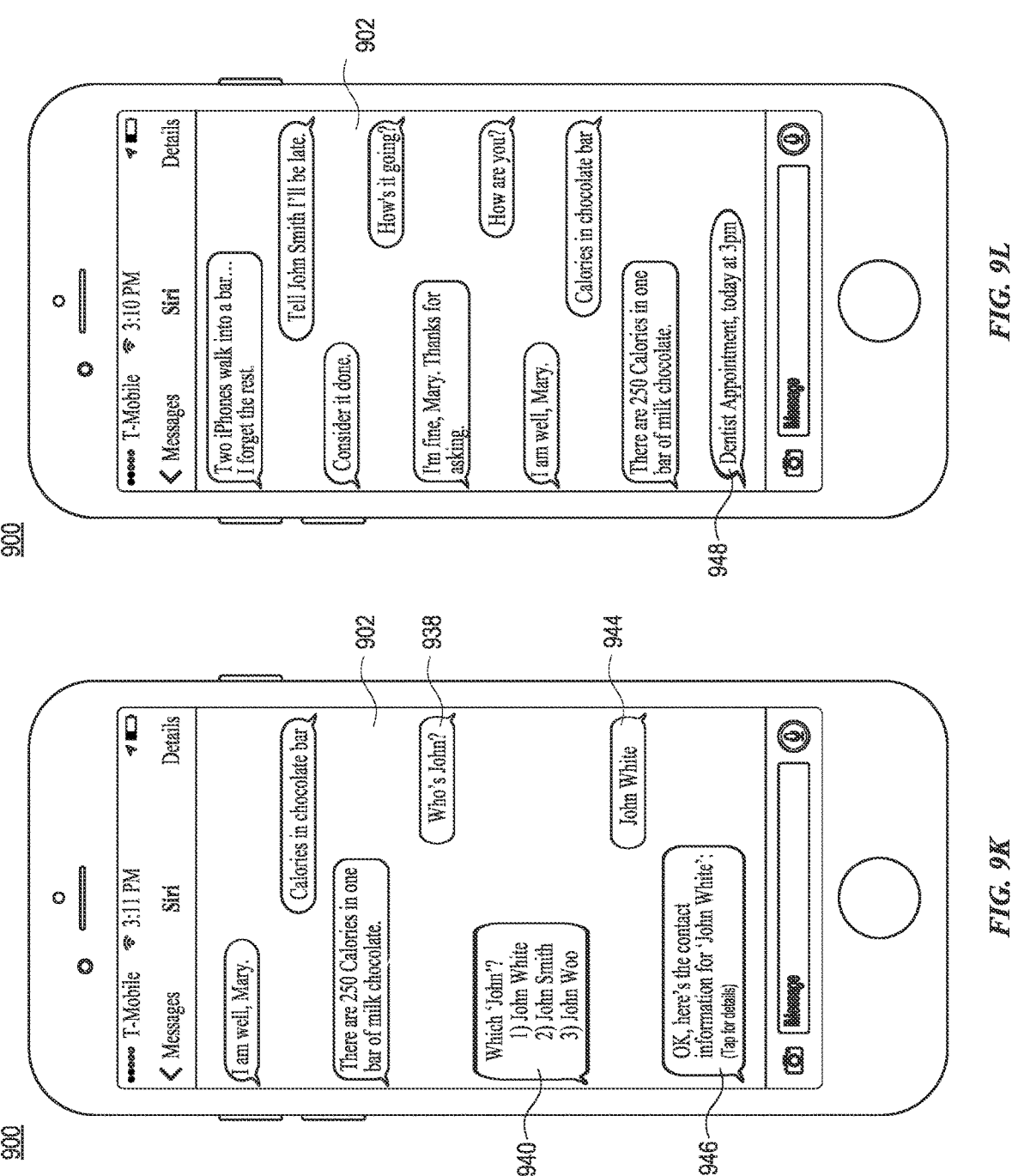

The electronic device can cause an action to be performed based on the user intent derived from the user input "Who's John?" and the user selection of "John White" as the intended interpretation of the ambiguous term "John." As shown in FIG. 9K, a response based on the performed action can be displayed as message 946. In particular, the response can be based on the selected interpretation "John White." In the present example, the contact information of "John White" can be displayed (e.g., using the contacts application of electronic device 1400) in response to the user selection of message 946.

Although in the above examples, auto-complete interface 907 is utilized for responding to disambiguation requests of the digital assistant, it should be recognized that auto-complete interface 907 can further be utilized to response to digital assistant requests other than disambiguation requests. For example, in response to a user request for show times for a movie at a cinema, the digital assistant can provide show time options and then ask the user whether he or she would like to purchase tickets. In this example, the displayed response at block 814 can be "Here are some available show times today: 730 pm, 1045 pm, 1200 am. Would you like to purchase tickets?" To facilitate user response to the digital assistant's question, the electronic device can display the suggested character strings "Yes" and "No" in auto-complete interface 907 for user selection. In response to the user selection of the suggested character string "Yes," the suggested character string "Yes" can be displayed as a message in the GUI. Further, a response based on the suggested character string "Yes" can be displayed. For example, the response can be a follow-up request asking the user which show time he or she would like to reserve. Alternatively, the response can be a message which when selected, causes a movie reservation website to be displayed on a GUI of the Internet browser application of the electronic device.

In some examples, notifications from various applications of the electronic device can be presented via the digital assistant on the messaging platform. The notifications can be received from applications of the electronic device other than the messaging application. In the present example shown in FIG. 9L, the notification can be a calendar alert from the calendar application for a dentist appointment. The calendar alert can be based on user input received prior to receiving the notification. For example, the user input can be input for creating a calendar entry for the dentist appointment in the calendar application. In response to receiving the notification, the notification can be displayed as a message in the GUI. For example, as shown in FIG. 9L, the notification for the dentist appointment can be displayed as message 948 in GUI 902. Convey notifications from other applications via the digital assistant on the message application can allow users to rely on a single application as the central platform for all communication. This can be desirable to streamline user interactions and improve user experience. In particular, receiving notifications through the messaging platform can allow all notifications to be stored and organized in a single location for easy referencing. Further, the digital assistant can be readily available to perform any tasks related to the notification. For example, upon receiving message 948 notifying the user of the dentist appointment, the user can conveniently request the digital assistant to send a message to the dentist indicating that the user will be 5 minutes late. Because the notification is associated with context information such as the contact information of the dentist, a message can readily be sent to the dentist without the user having to take additional time looking up the contact information of the dentist using one application and the switch to a separate application to compose the desired message. Other examples of notifications can include reminder notifications from the task reminder application for a task, stock price alerts from the stock application, fitness notifications from the fitness application related to reaching a fitness goal, or the like.

As described above, each message in GUI 902 can be associated with a contextual state of the electronic device. The message history can thus serve as a contextual history of the electronic device. In some examples, it may be desirable for the user to bookmark certain messages that are associated with important contextual states. For example, previous message 910 can be associated with a location that the user may be interested in referring to in the future. In these examples, a user input associated with previous message 910 can be received. The user input can be a predefined user input received via GUI 902 to bookmark previous message 910. In response to receiving the user input, a bookmark of previous message 910 can be stored in association with an affordance. The affordance can be displayed, for example, on a scroll bar (not shown) of GUI 902. The position of the affordance on the scroll bar can correspond to the position of previous message 910 among the plurality of previous messages. Selecting the affordance by the user can causes a focus of GUI 902 to change to previous message 910.

Figure 10A:
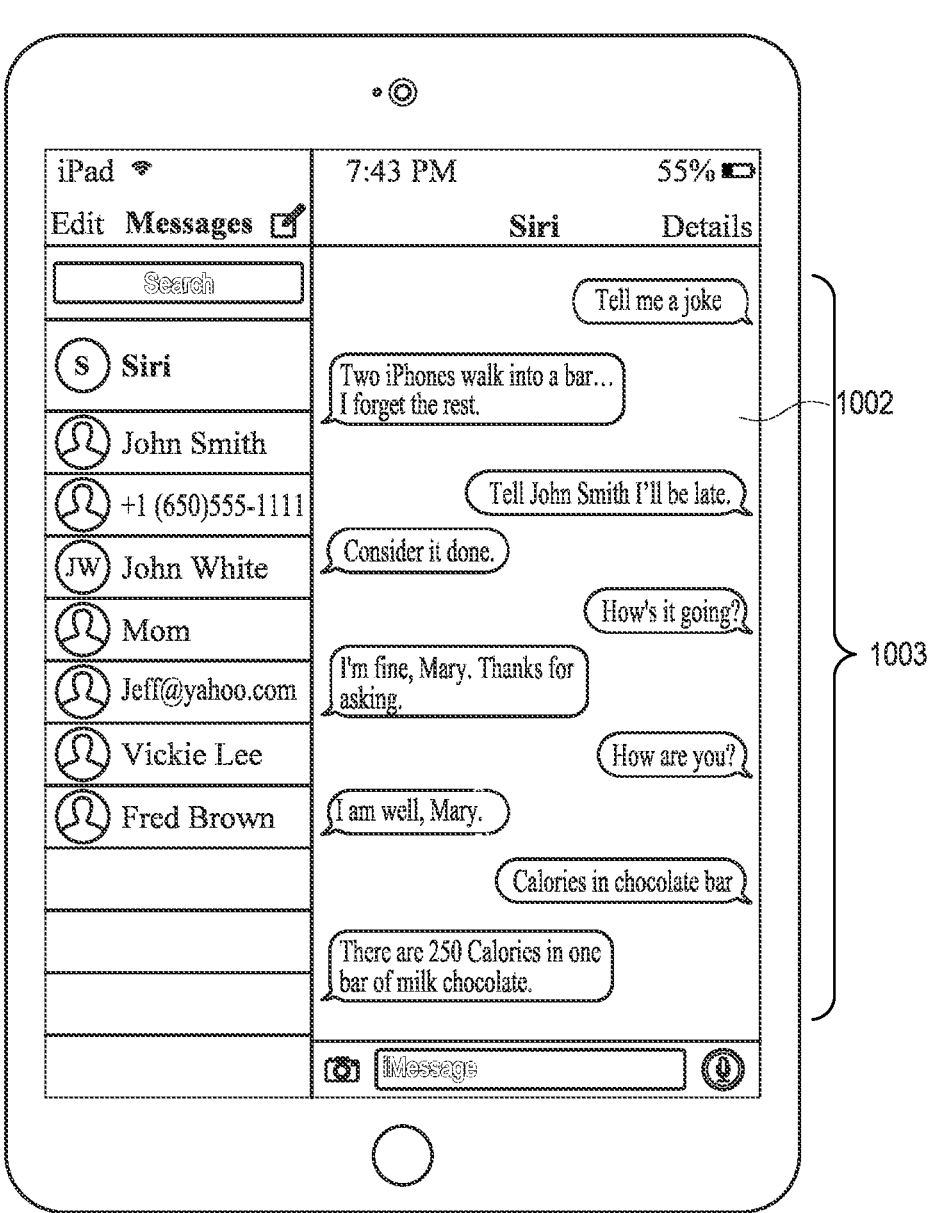
FIGS. 10A-10C illustrate user interfaces of an electronic device for operating a digital assistant in a messaging environment according to various examples.
Figure 10B:
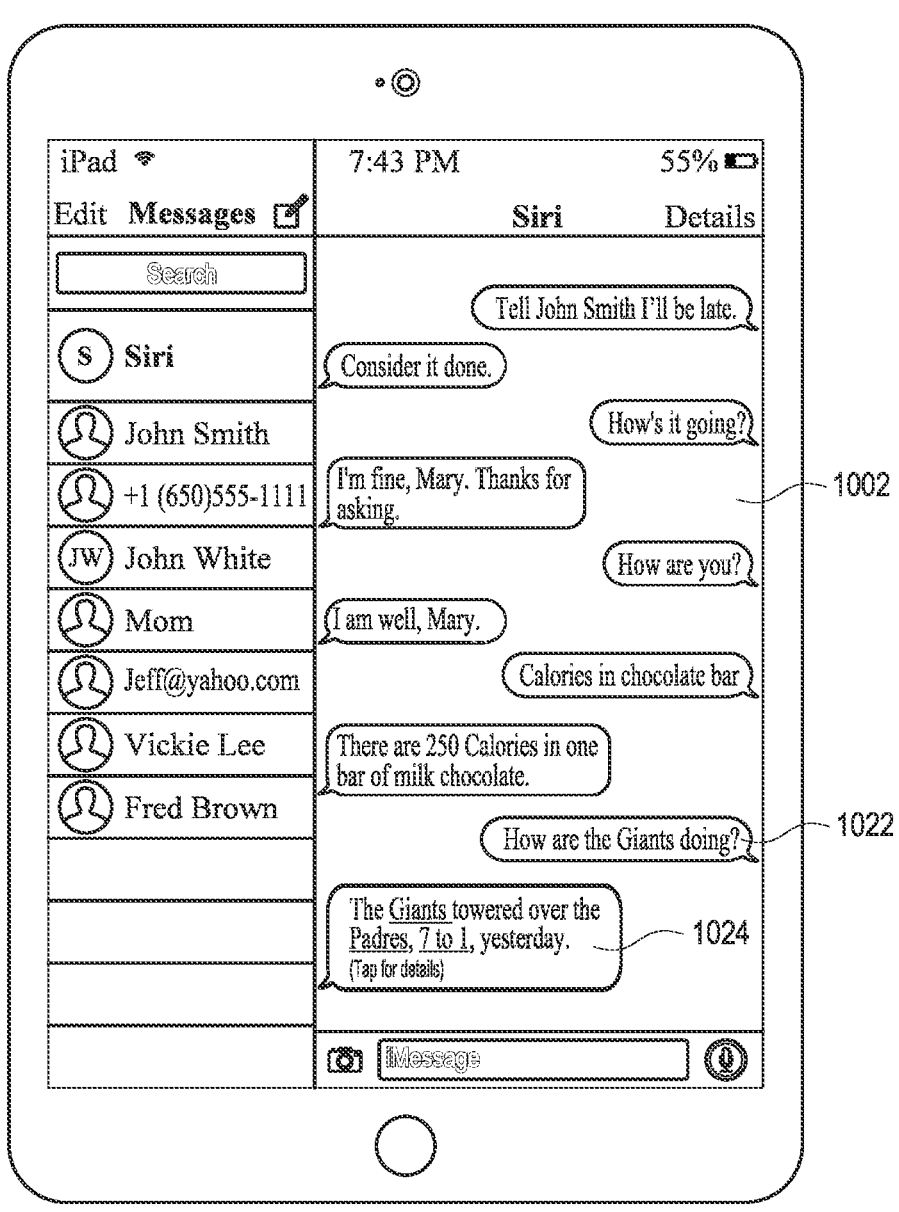
Figure 10C:
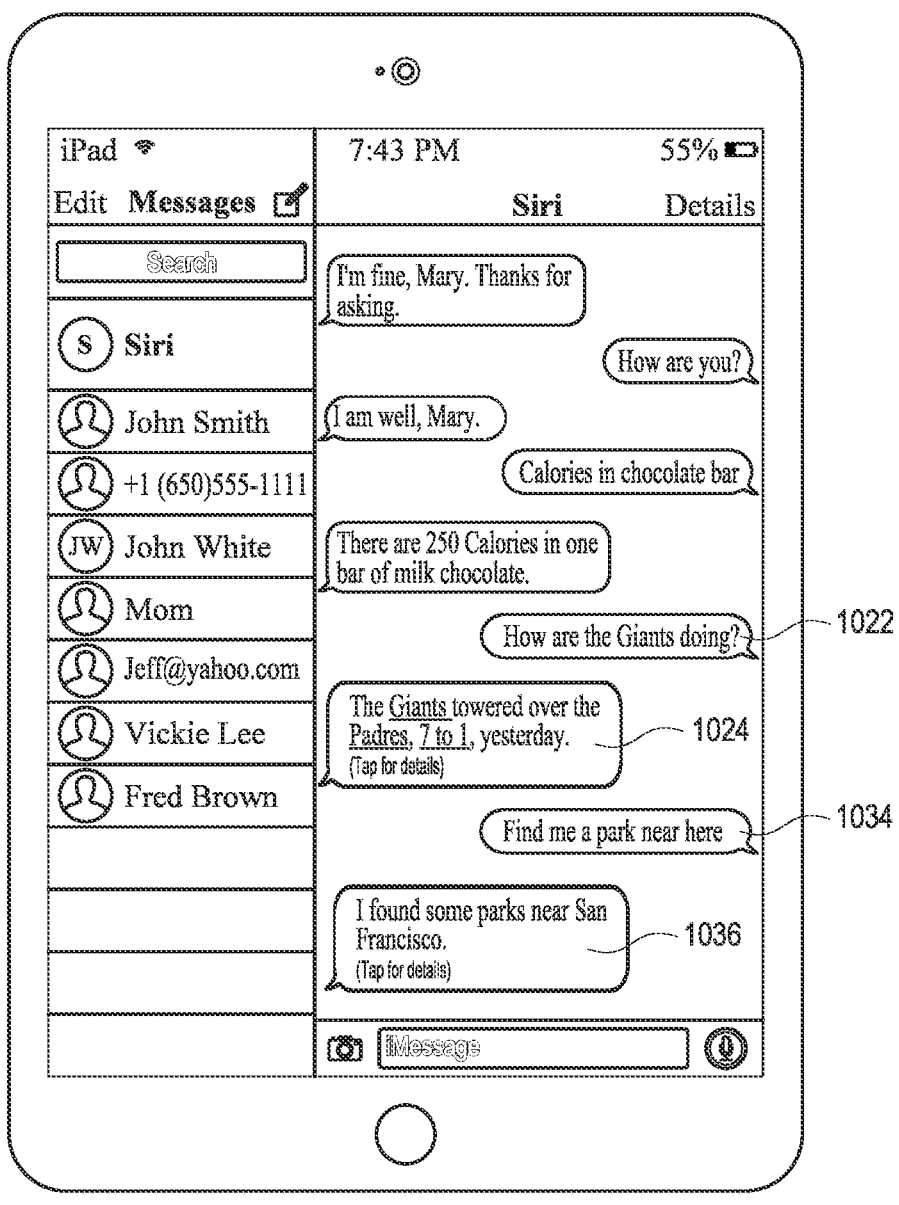

In some examples, the conversation history in GUI 902 can be synchronized with a corresponding GUI of the messaging application of a second electronic device. For example, FIGS. 10A-10C illustrates electronic device 1000 displaying GUI 1002. GUI 1002 can be the GUI of the messaging application of second electronic device 1000. Second electronic device 1002 can be separate and different from electronic device 900. Second electronic device 1000 can implement a digital assistant and the user can interact with the digital assistant of second electronic device 1000 via GUI 1002. As shown in FIG. 10A, GUI 1002 can include plurality of previous messages 1003 that are identical to plurality of previous messages 903. In particular, plurality of previous messages 1003 include messages exchanges at electronic device 900 between the user and the digital assistant implemented on electronic device 900. Electronic device 900 can cause plurality of previous messages 1003 to be displayed in GUI 1002 based on plurality of previous messages 903. Further, as shown in FIG. 10B, in response to displaying at block 808 the user input as first message 922 in GUI 902 of electronic device 900, electronic device 900 can cause the same first message to be displayed as message 1022 in GUI 1002 of second electronic device 1000. Similarly, in response to displaying at block 814 the response as second message 924 in GUI 902 of electronic device 900, electronic device 800 can cause the same second message to be displayed as message 1024 in GUI 1002 of second electronic device 1000. Thus, the message history at electronic device 900 between the user and the digital assistant can be accessible to the user when the user switches over to electronic device 1000.

Each of plurality of previous messages 1003 can be associated with a previous contextual state of electronic device 900 corresponding to a respective one of plurality of previous messages 903. Similarly, message 1022 can be associated with the same contextual state of electronic device 900 as message 922. These contextual states (and previous contextual states) can be stored on electronic device 1000. In some examples, the contextual state associated with a message generated at the electronic device can be utilized to process user requests addressed to the digital assistant of the second electronic device. For example, a user selection of message 1022 in GUI 1002 can be detected. In response to detecting the user selection of message 1022, the contextual state of electronic device 900 associated with message 1022 can be retrieved. In the present example, the contextual state associated with message 1022 can include location information of electronic device 900 at the time message 922 was generated. In particular, the location information can indicate that electronic device 900 was in San Francisco at the time message 922 was generated. With reference to FIG. 10C, a user input can be received at second electronic device 1000. The user input can be similar to the user input received at block 806. In particular, the user input can be received via a user input interface (not shown) of GUI 1002 that is similar to user input interface 910. In this example, the user input can be the text "Find me a park near here." In response to receiving the user input, the user input can be displayed as message 1034 in GUI 1002 of second electronic device 1000. Second electronic device 1000 can cause an action to be performed in accordance with a user intent. Causing the action to be performed can be similar to block 812 described above. The user intent can be derived from the user input "Find me a park near here" and from the contextual state of electronic device 900 at the time message 922 was generated. As described above, the contextual state can include location information associated with the city of San Francisco. Based on this contextual state of electronic device 900, it can be determined that the user intent is to search for parks in San Francisco and the performed action can thus be a search for parks in San Francisco. A response as message 1036 can be displayed in GUI 1002 of second electronic device 1000. Displaying the response can be similar to block 814 described above. The response can be based on the performed action. Specifically, in the present example, the response in message 1036 can provide access to results obtained from performing a search for parks in San Francisco.

Process 1100 is described below with simultaneous reference to FIGS. 11A-11D and 12A-12H. At block 1102, a graphical user interface (GUI) having a plurality of previous messages between a user and the digital assistant can be displayed on the display of an electronic device. For example, as shown in FIG. 12A, GUI 1202 of electronic device 1200 can be displayed. GUI 1202 can be a GUI of a messaging application of electronic device 1200. GUI 1202 includes plurality of previous message 1203 between the user of electronic device 1200 and the digital assistant implemented on electronic device 1200. Plurality of previous messages 1203 are presented in a conversational view. Electronic device 1200 can be similar to one or more of devices 104, 200, 400, 600, or 900. Block 1102 can be similar or identical to block 802 of process 800.

At block 1104, a first user input including a media object can be received. The media object can be an image, video clip, audio clip, or the like. In some examples, the media object can be received via a user input interface of GUI 1202. The user input interface can be similar to user input interface 910. For example, the media object can be received using buttons similar to image/video button 904 and audio button 908, described above. The media object can be retrieved from the memory of electronic device 1200. Alternatively, the media object can be generated based on input received via the microphone or the camera of electronic device 1200. In the present example shown in FIG. 12B, media object of user input can be an image of a business card.

At block 1106, the media object can be displayed as a first message in the GUI. For example, as shown in FIG. 12B, media object can be displayed as first message 1204 in GUI 1202. In the present example, the image of the business card in first message 1204 can depict contact information of an individual (e.g., "Joe Black"). It should be recognized that in other examples, the image can depict contact information of any entity (e.g., a person, an organization, a business, etc.) The image can be captured by the user via the camera of electronic device 1200. Block 1106 can be performed in response to receiving the first user input at block 1104.

Figures 12A, 12B:
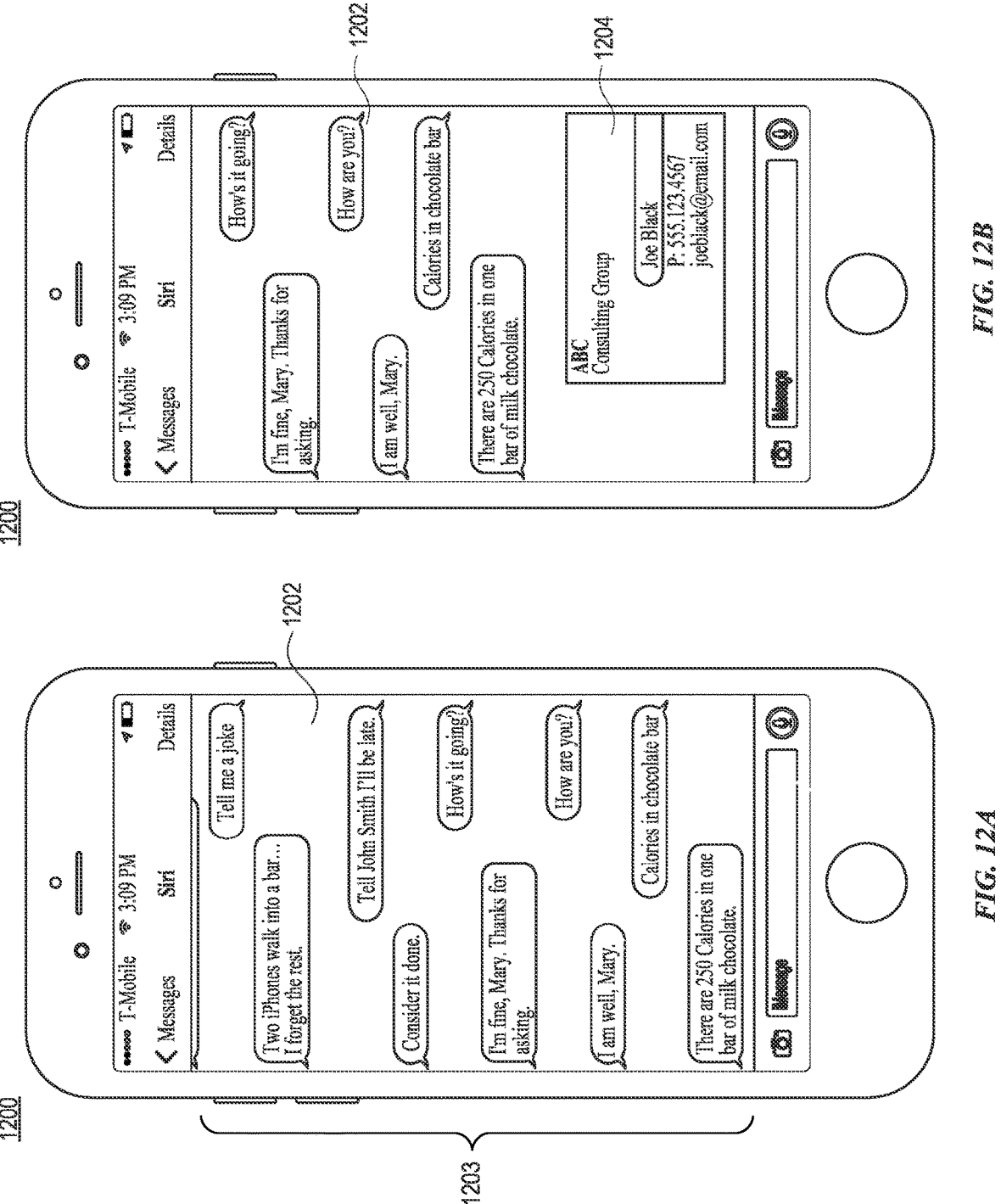
FIGS. 12A-12H illustrate user interfaces of an electronic device for operating a digital assistant in a messaging environment according to various examples.
Figures 12C, 12D:
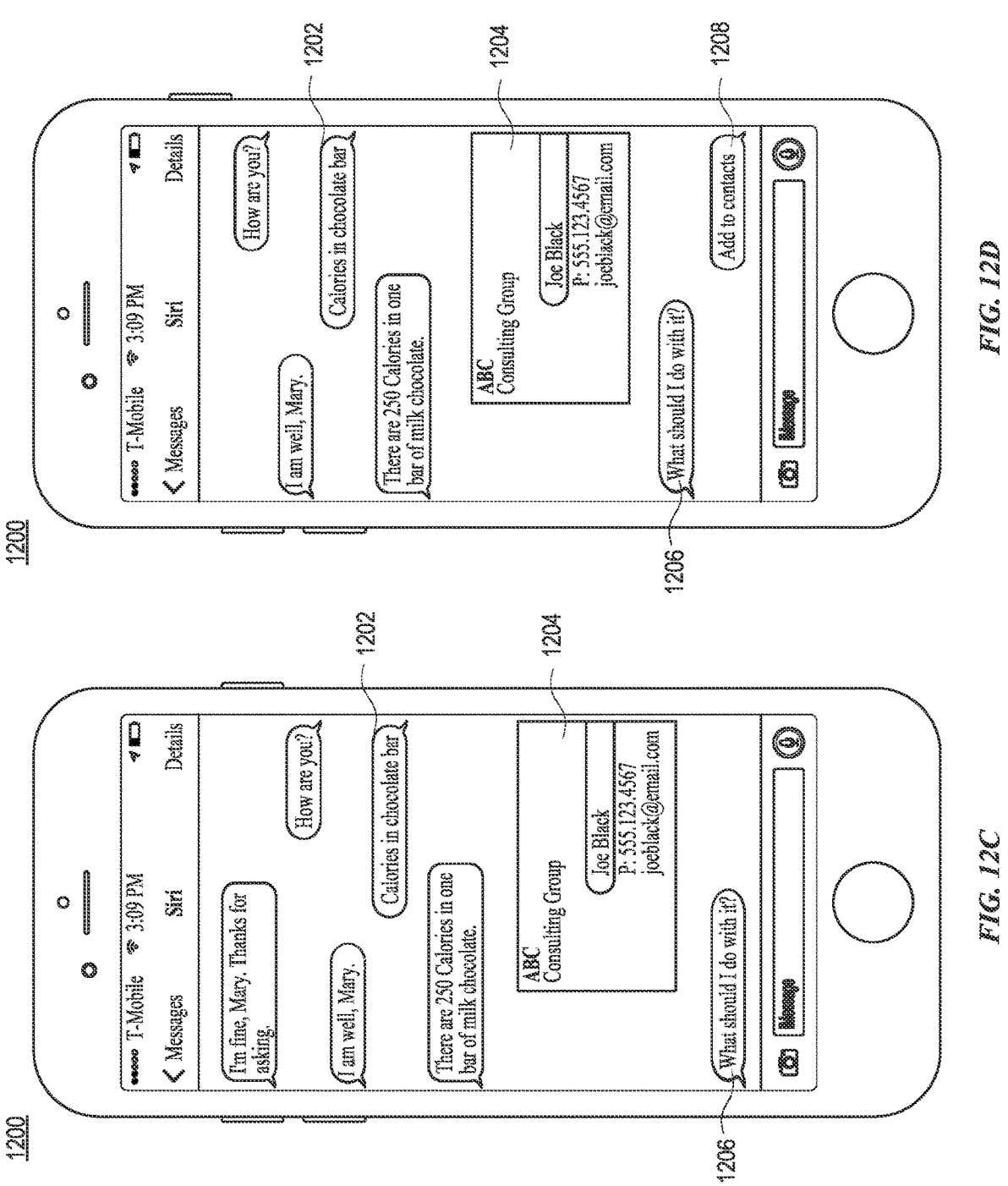

At block 1108, a request for additional information related to the media object can be displayed as a second message. For example as shown in FIG. 12C, second message 1206 can be displayed in GUI 1202. In this example, second message 1206 includes the request "What should I do with it?" It should be recognized that in other examples, the second message can include a different request related to the media object. In particular, the second message can include a request for clarification of the user's intent with respect to the media object. The request can thus prompt the user to more fully define the user's intent for providing the media object. Second message can be generated and displayed by the digital assistant in response to the media object of block 1104. Block 1108 can be performed after displaying the media object as the first message at block 1106 and before receiving the second user input at block 1110. In some examples, block 1108 can be optional.

At block 1110, a second user input including text can be received. In some examples, the text of the second user input can be received via a keyboard of GUI 1202 (e.g., keyboard 911.) In some examples, the text can be responsive to the request of block 1108 in the second message. In some examples, the text can represent a request to perform a task using the media object. In other examples, the text can represent a request to obtain information related to the media object. In the present example shown in FIG. 12D, the text can be "Add to contacts."

At block 1112, the text of block 1110 can be displayed as a third message in the GUI. For example, as shown in FIG. 12D, the text "Add to contacts" can be displayed as third message 1208 in GUI 1202. Block 1112 can be performed in response to receiving the second user input at block 1110. As evident in the present example, neither the media object of block 1104 nor the text of block 1110 are individually sufficient to represent a user request. Specifically, neither contains sufficient information to deduce a user intent. However, the combination of the media object of block 1104 and the text of block 1110 can represent a user request to the digital assistant.

At block 1114, the electronic device can cause a user intent (e.g., an actionable intent) corresponding to the first user input of block 1104 and the second user input of block 1110 to be determined. Block 1114 can include causing a domain among a plurality of domains in an ontology (e.g., ontology 760) to be determined based on the first user input and the second user input. The user intent can be determined using natural language processes (e.g., with natural language processing module 732) based on the first user input and the second user input. In some examples, the user intent can be determined at the electronic device. Alternatively, the electronic device can transmit the media object of block 1104 and the text of block 1110 to a remote server (e.g., DA server 106) where the user intent is determined based on the media object of block 1104 and the text of block 1110. In the present example, it can be determined that the "contacts" domain corresponds to the first user input and the second user input. Further, it can be determined that the user intent includes creating and storing a new contact entry in the contacts application of the electronic device based on the media object.

At block 1116, a determination of whether the user intent requires extracting text from the media object can be obtained. In some examples, the determination can be based on the user intent determined at block 1114. In particular, certain domains can be predetermined to require extracting text from the media object. For example, domains including contacts, calendar, reminders, and translation can be predetermined to require extracting text from the media object. In response to obtaining a determination that the user intent requires extracting text from the media object, block 1118 can be performed.

At block 1118, text from the media object can be extracted. Various techniques can be implemented to extract text from the media object. In examples where the media object is an image, optical character recognition can be performed on the image to extract text from the image. In examples where the media object is an audio clip or a video clip, speech to text recognition can be performed (e.g., using STT processing module 730) on the media object to extract text. Further, in examples where metadata is embedded in the media object, the media object can be processed to extract text from the metadata. In the present example, optical character recognition can be performed on the media object of message 1204 to extract the text depicted in the image of a business card. The extracted text can thus include contact information.

At block 1120, a task in accordance with the user intent can be performed using the extracted text. In particular, a task flow corresponding to the user intent of block 1114 can be determined. Block 1120 can thus include performing the tasks of the task flow to at least partially fulfill the user intent of block 1114. In the present example, a performed task can include determining contacts fields corresponding to one or more character strings of the extracted text. For example, the character strings "Joe," "Black," "joeblack@email.com," and "555.123.4567" of the extracted text can be determined to correspond to the first name contacts field, the last name contacts field, the email contacts field, and the phone number contacts field, respectively. Further, block 1120 can include populating, in accordance with the user intent, the extracted text into a text field of an application of the electronic device. Specifically, in the present example, a new contact entry can be created in the contacts application. The contact entry can be associated with the individual "Joe Black." Further, the character strings "Joe," "Black," "joeblack@email.com," and "555.123.4567" of the extracted text can be populated into the first name field, the last name field, the email field, and the phone number field of the new contact entry, respectively. In other examples, it can be determined that an existing contact in the contact application is associated with the extracted text (e.g., same name, email, phone number, or the like). In these examples, the existing contact can be edited and additional information based on the extract text can be populated into one or more text fields of the existing contact. Block 1120 can be performed automatically without additional user intervention in response to receiving the first user input of block 1104 and the second user input at block 1110.

Figures 12E, 12F:
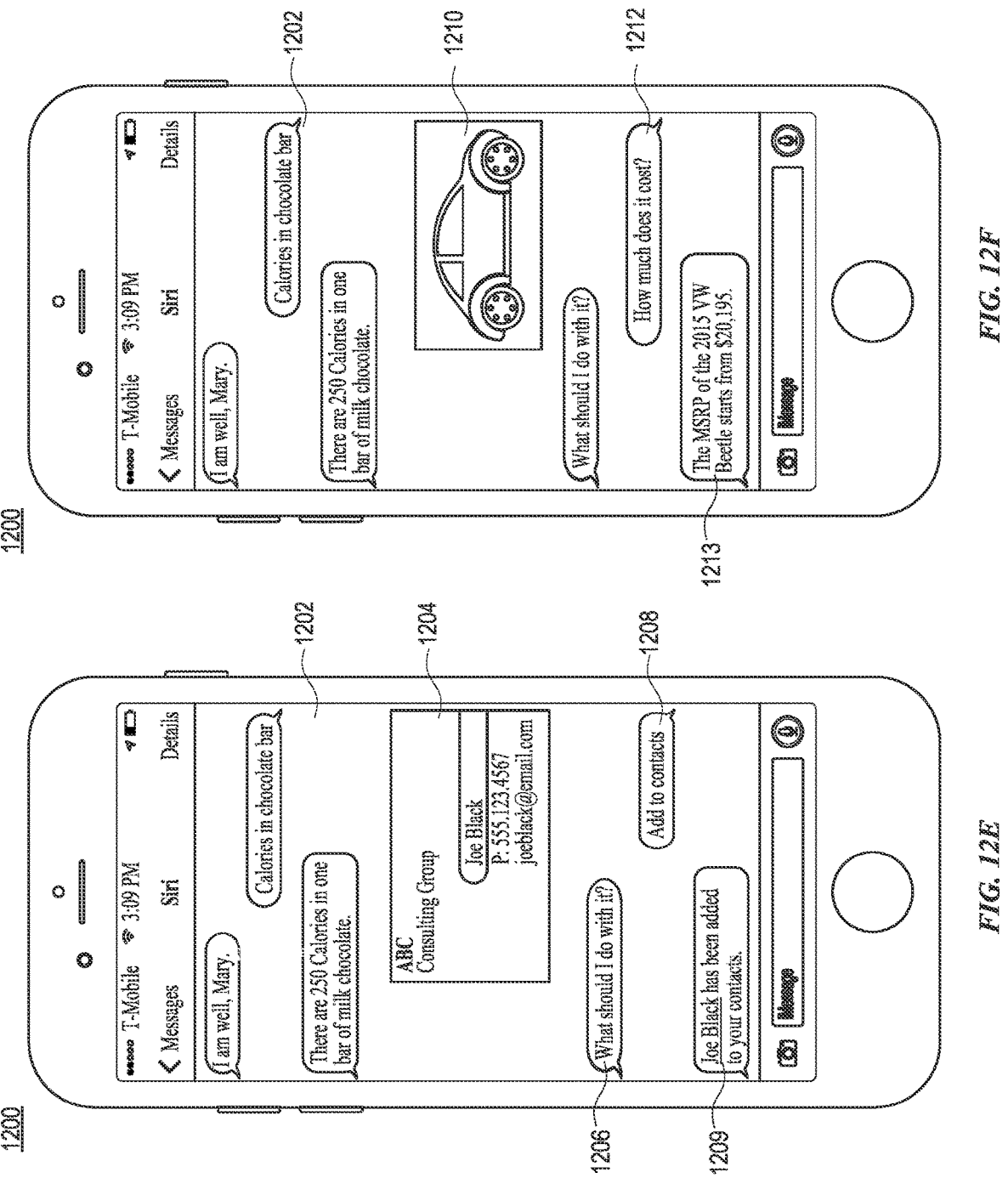

At block 1122, a response indicative of the user intent being satisfied can be displayed as a fourth message in the GUI. For example, as shown in FIG. 12E, the response "Joe Black has been added to your contacts" is displayed as fourth message 1209. The response can confirm that the user request represented by the first user input and the second user input has been performed. Further, in this example, the name "Joe Black" can be highlighted (e.g., underlined) to indicate to the user that the words "Joe Black" in message 1209 are selectable. In particular, message 1209 can be configured such that the user selection of the words "Joe Back" can cause the newly created/edited contact entry of Joe Black to be displayed in the contacts application of the electronic device.

In some examples, the response of block 1122 can include information requested by the user. For example, the task of block 1120 can include retrieving information in accordance with the user intent, and the retrieved information can be displayed in the response of the fourth message. In some examples, the response can include a request from the digital assistant for additional information. For example, the response can include a request for information to clarify the user's intent. In particular, the request can be a request to disambiguate an ambiguous term in the text of the second user input. In some examples, the response can request confirmation from the user prior to performing the task of block 1120.

Although blocks 1102-1122 of process 1100 are explained above with respect to using an image depicting contact information to create a new contact entry in the contacts application of the electronic device, it should be recognized that blocks 1102-1122 can include various other implementations. For example, a calendar entry in the calendar application of the electronic device can be created based on the first user input of block 1104 and the second user input of block 1110. In these examples, the media object of the first user input (e.g., block 1104) can include information about an event (e.g., an opera, concert, festival, examination, etc.). For example, the media object can be a picture of a pamphlet advertising the event. The picture can be captured using the electronic device and can depicting event information in text form. The event information can include, for example, a date, time, venue, and title for the event. The text of the second user input (e.g., block 1110) can include a request to create a calendar event using the media object. For example, the text of the second user input can be "Add to calendar." Based on the text and media object, the user intent can be determined at block 1114 to include creating a calendar entry in a calendar application of the electronic device using the media object. In examples where the media object is an image, text depicted in the image can be extracted using optical character recognition. The extracted text can be processed to identify one or more character strings associated with a text calendar field (e.g., start time, end time, title, location, event description, etc.) The task performed at block 1120 in accordance with the user intent can include creating a new calendar entry and populating one or more text fields of the calendar entry with the extracted text.

In some examples, a reminder event in the reminder application of the electronic device can be created based on the first user input of block 1104 and the second user input of block 1110. In these examples, the media object of the first user input can include information regarding a reminder task. For example, the media object can be a picture of a grocery store advertisement indicating that watermelon is on sale for 29 cents a pound. The picture can be taken using the electronic device. The text of the second user input can include a request to create a task reminder using the media object. For example, the text of the second user input can be "Create a reminder" or "Add to grocery list." Based on the media object and the text, the user intent can be determined at block 1114 to include creating a reminder entry in a reminder application of the electronic device using the media object. In examples where the media object is an image, text depicted in the image can be extracted using optical character recognition. The extracted text can be processed to identify one or more character strings associated with a respective text reminder field (e.g., task title, task description, task category, reminder trigger criterion, etc.). For example, the extracted text from the grocery store advertisement can include the character strings "whole seedless watermelon for 29 cents/lb," which is determined to be associated with the text reminder fields "task title" or "task description." Further, it can be determined based on the word "watermelon" that the task is associated with the predefined task category of "Grocery List," which can be associated with the reminder trigger criterion of being located within a predetermined distance of a grocery store. The task performed at block 1120 in accordance with the user intent can include creating a new task reminder and populating one or more text fields of the reminder entry with the extracted text. For example, the new task reminder can be for buying watermelon at the grocery store where a reminder is provided when the electronic device is within a predetermine distance of a grocery store.

In some examples, text extracted from a media object can be translated based on the first user input of block 1104 and the second user input of block 1110. In these examples, the media object can contain a first language in text or spoken form. For example, the media object can be a picture of a traffic sign depicting the French text "arrêt." The text of the second user input can include a request to translate the media object into a second language. For example, the text of the second user input can be "Translate into English." Based on the media object and the text, the user intent can be determined at block 1114 to include translating a first language in the media object to a second language. In examples where the media object is an image, text depicted in the image can be extracted using optical character recognition. During text extraction, the language of the text can be determined. For example, it can be determined in the present example that the extracted text is French. The task performed at block 1120 in accordance with the user intent can include obtaining the text of the second language corresponding to the text of the first language. For example, the extract French text "arrêt" can be translated into the corresponding English text "stop." The translation can be performed on the electronic device or the French text can be transmitted to a separate device to perform the translation. The displayed response of block 1122 can include the text of the second language. For example, the displayed response can be "It says 'stop.'"

Although in the examples described above, the media object is an image, it should be recognized that in other examples, the media object can be an audio/video clip. In particular, the audio/video file can include an utterance. In these examples, extracting text from the media object at block 1118 can include performing speech to text recognition on the media object to extract a text representation of the utterance. Further, it should be recognized that the examples described above of creating a contact entry, a calendar entry, a reminder entry, or performing a translation can be similarly performed using an audio/video clip instead of an image.

Figure 11A:
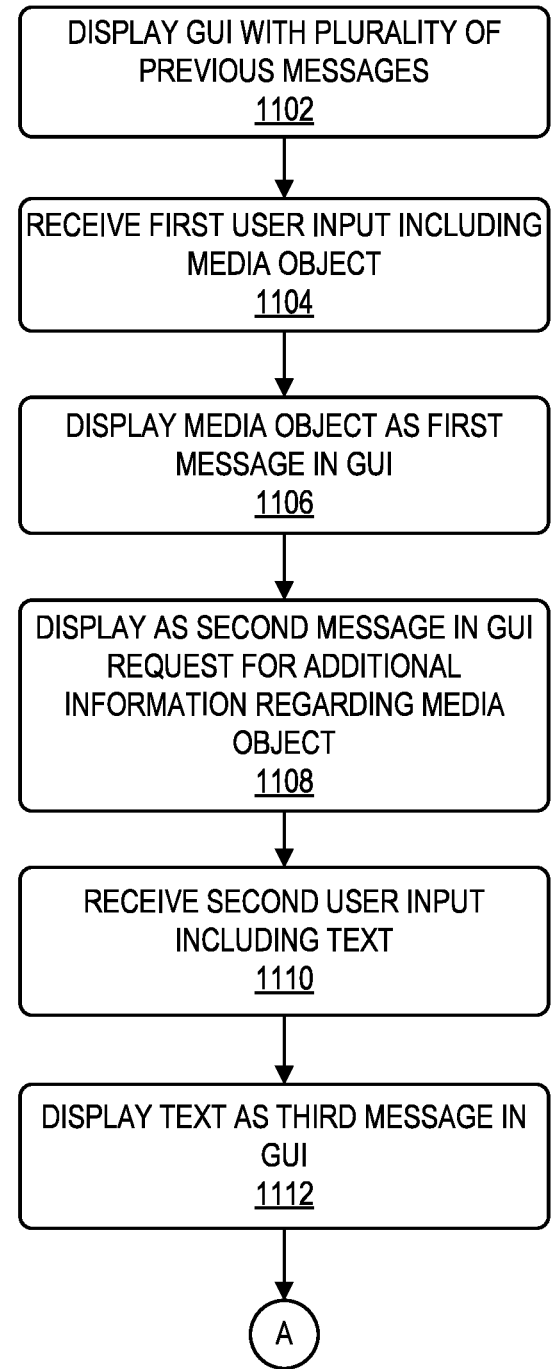
Figure 11B:
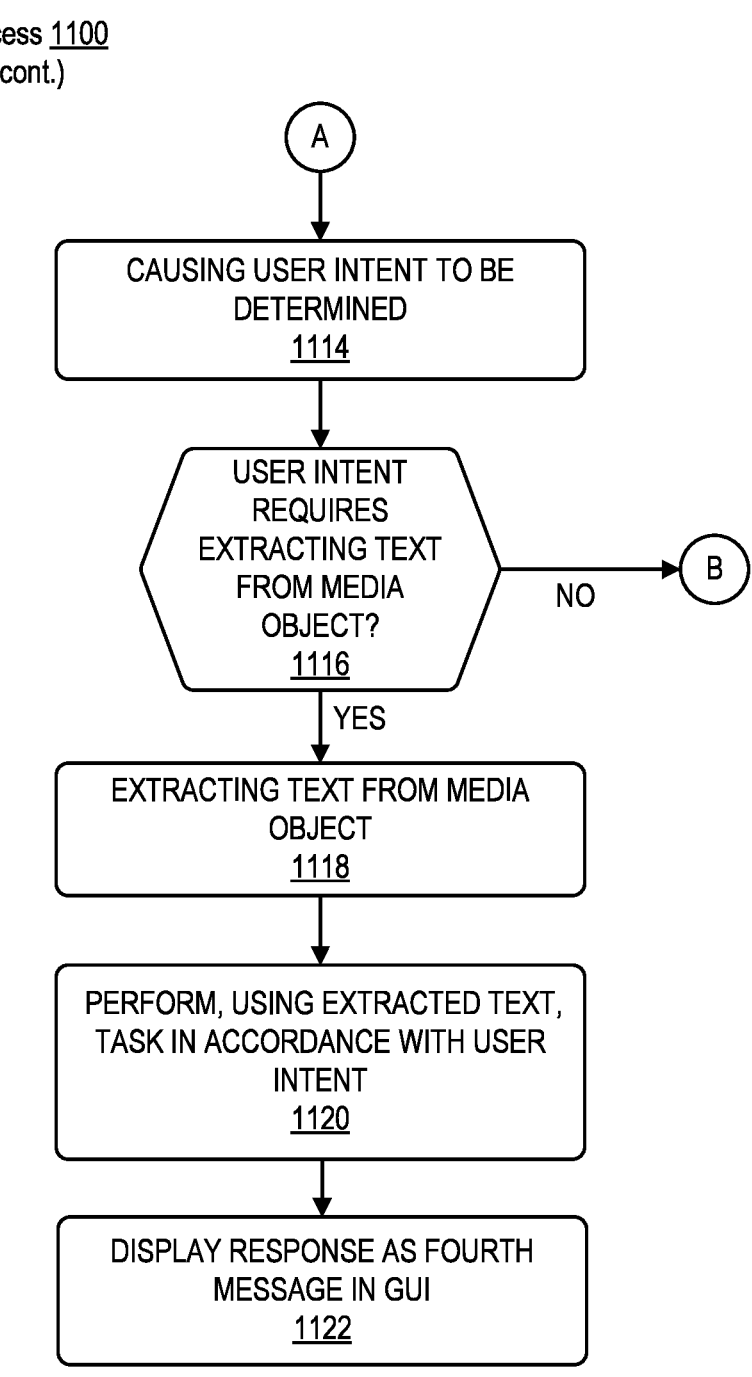
Figure 11C:
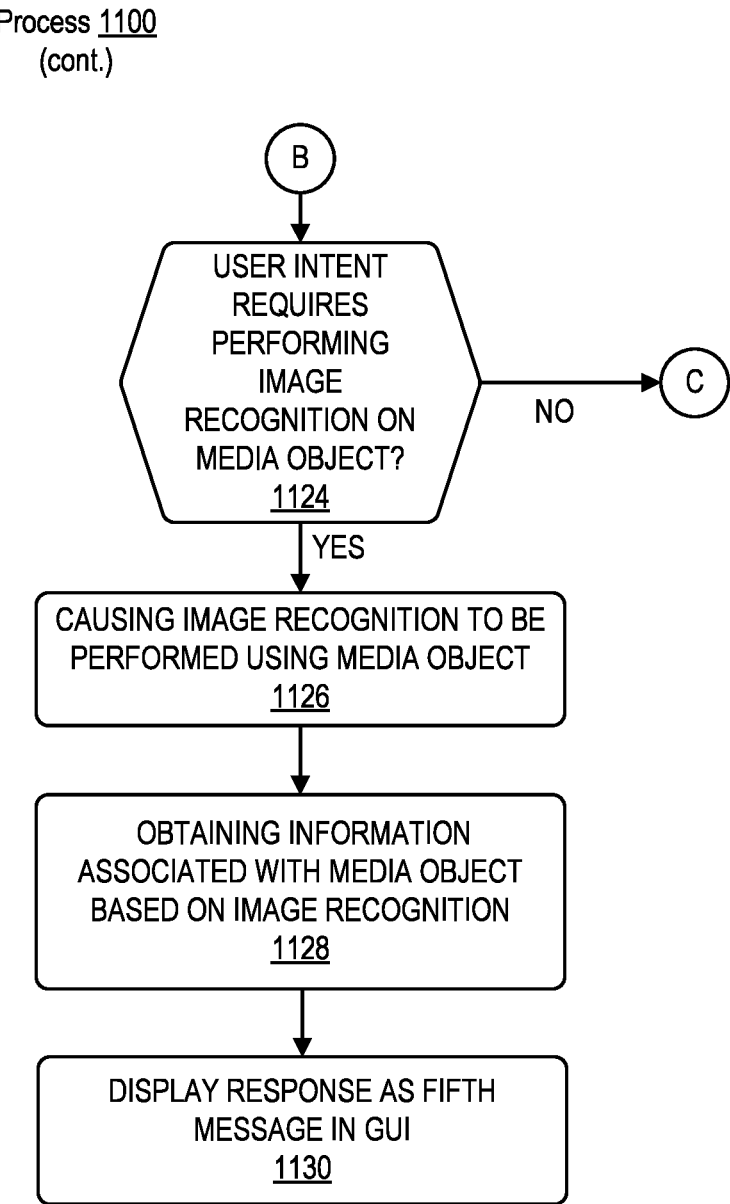

With reference back to block 1116, in response to obtaining a determination that the user intent does not require extracting text from the media object, block 1124 shown in FIG. 11C can be performed. At block 1124, a determination can be obtained as to whether the user intent requires performing image recognition on the media object. In some examples, the determination can be based on the user intent determined at block 1114 and the type of media object received at block 1104. For example, if the domain is determined to be the "search" domain and the media object is determined to be an image, then it can be determined that the user intent requires performing image recognition on the media object.

In an example illustrated in FIG. 12F, the media object displayed in message 1210 (e.g., at block 1106) can be an image of a retail object. In the present example, the retail object is a specific car (e.g., the 2015 Volkswagen Beetle). The text of the second user input displayed in message 1212 (e.g., at block 1112) can be a request to search for the price of the car depicted in the media object (e.g., "How much does this cost?"). Based on the image and the text, it can be determined at block 1114 that the user intent includes performing image recognition on the image to identify the retail object and then performing a price search of the identified retail object. In this example, a determination can be obtained at block 1124 that the user intent requires performing image recognition on the media object. In response to obtaining a determination that the user intent requires performing image recognition on the media object, block 1126 can be performed.

At block 1126, the electronic device can cause image recognition to be performed on the media object. In some examples, the media object can be transmitted to a separate server to perform the image recognition. In other examples, at least a portion of the image recognition can be performed on the electronic device. Image recognition can include extracting a set of representative image characteristics from the media object and then comparing the set of representative image characteristics to a plurality of sets of reference characteristics stored in a database to determine a best match. Each set of reference characteristics can be associated with reference information. The reference information can include information identifying the reference image corresponding to the respective set of reference characteristics. The image recognition results can be based on the reference information of the best matched set of reference characteristics. For example, the set of representative image characteristics of the media object in message 1210 can be found to best match a set of reference characteristics corresponding to a reference image of the 2015 Volkswagen Beetle. In particular, the image recognition results can include the character strings "2015," "Volkswagen," and "Beetle" based on the reference information associated with the best matched set of reference characteristics.

At block 1128, information associated with the media object can be obtained based on the image recognition. In particular, the information can be obtained in accordance with the user intent of block 1114 and using the image recognition results of block 1126. In the present example, based on the user intent of searching for the price of the retail object depicted in the media object, a price search using the image recognition results "2015 Volkswagen Beetle" can be performed. The obtained information can include price information of the retail object. For example, the obtained information can include the manufacturer's suggested retail price (MSRP) of the 2015 Volkswagen Beetle. In other examples, the obtained information can include the image recognition results.

At block 1130, a response indicative of the user intent being satisfied can be displaying as a fifth message in the GUI. The response can be based on the information associated with the media object. Block 1130 can be similar to block 1122. In the present example shown in FIG. 12F, the response can be displayed as message 1213 and can include MSRP information of the 2015 Volkswagen Beetle to satisfy the user intent.

Although blocks 1124-1130 of process 1100 are explained above with respect to searching for price information of a retail object depicted in the media object, it should be recognized that blocks 1124-1130 can include various other implementations. For example, location or entity information associated with the media object can be obtained with blocks 1124-1130. For example, the media object of block 1104 can be an image depicting the characteristics of a location (e.g., a map, a landmark, a flag, etc.). Alternatively, the media object can be an image depicting characteristics of an entity (e.g., a person, organism, thing, building, business, etc.). In these examples, the text at block 1110 can represent a request for information identifying the location or entity. For example, the text can be "Where is this place?" "What insect is this?" or "Which company uses this logo?" Based on the media object and the text, the user intent can be determined at block 1114 to include performing image recognition on the media object to obtain a recognition result and obtaining the identity of the location or entity represented in the media object. Based on the image recognition performed at block 1126, information associated with the media object can be obtained at block 1128. In these examples, the obtained information can include the identity of the location or entity represented in the media object. Further, the fifth message displayed at block 1130 can include the identity of the location or entity represented in the media object (e.g., "This is the country Algeria," "This is the Golden Gate Bridge," "This is an earwig," etc.).

With reference back to block 1124, in response to obtaining a determination that the user intent does not require performing image recognition on the media object, block 1132 of FIG. 11D can be performed. At block 1132, a determination can be obtained as to whether the user intent requires performing audio processing on the media object. In some examples, the determination can be based on the user intent determined at block 1114 and the type of media object received at block 1104. For example, if the domain is determined to be the "search" domain or the "music" domain and the media object is determined to be an audio file, then it can be determined that the user intent requires performing image recognition on the media object. In response to obtaining a determination that the user intent requires performing audio processing on the media object, block 1134 can be performed.

Figures 12G, 12H:
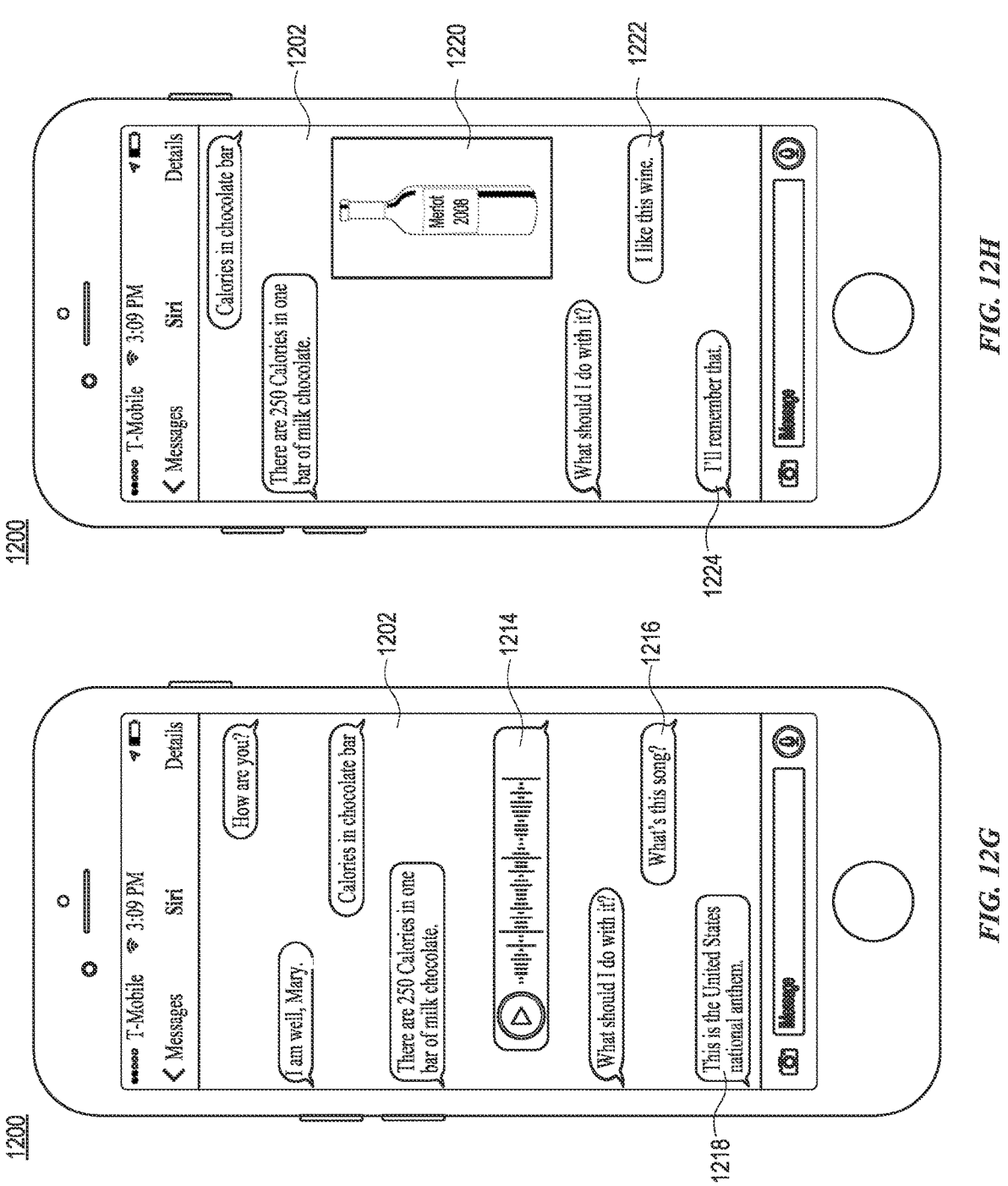
Figure 13A:
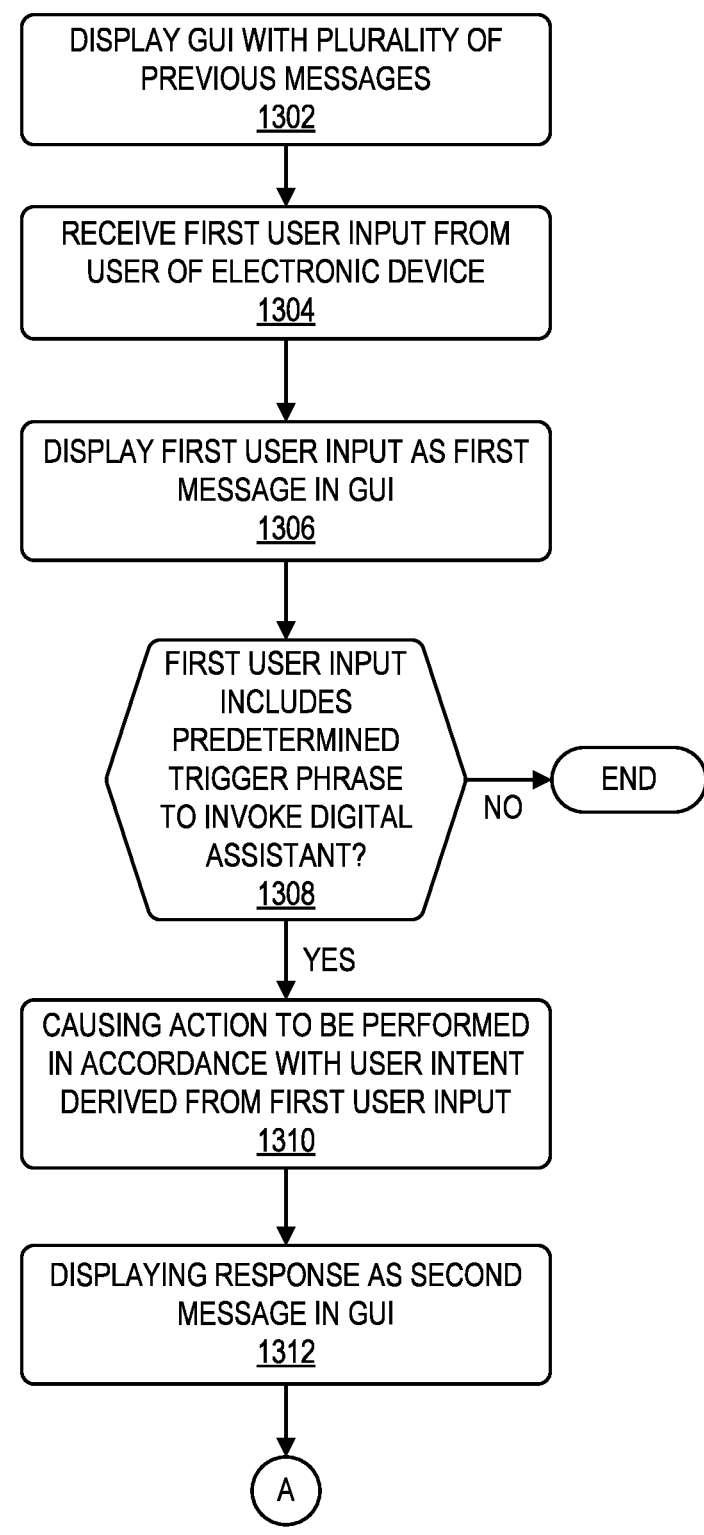
FIGS. 13A-13C illustrate a process for operating a digital assistant in a messaging environment according to various examples.
Figure 13B:
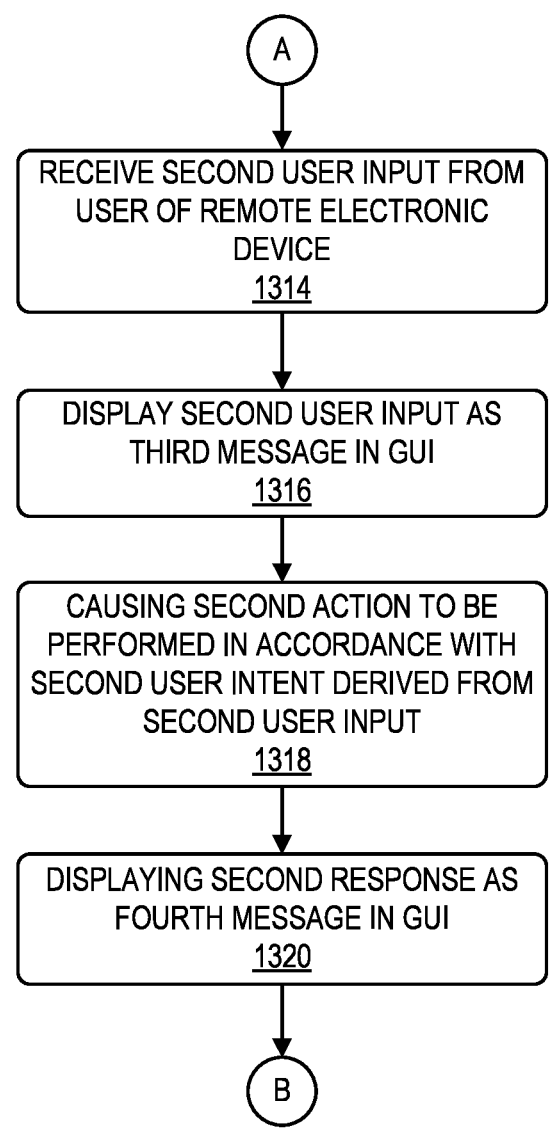
Figure 13C:
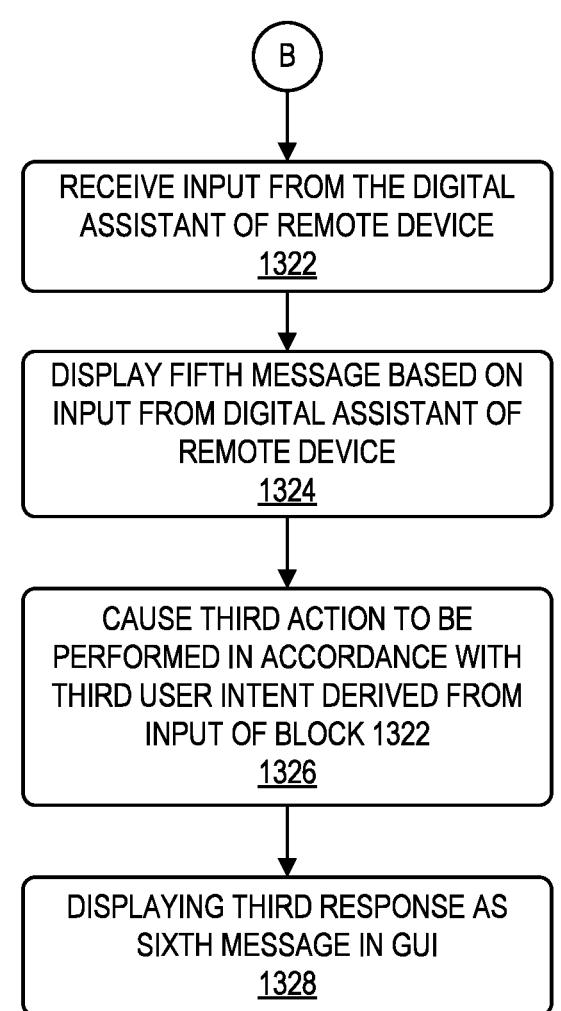

In the example illustrated in FIG. 12G, the media object displayed in message 1214 (e.g., at block 1106) can be an audio clip of a media item (e.g., a song, movie, soundtrack, etc.). In the present example, the audio clip can be a sung portion of the United States national anthem. The text of the second user input displayed in message 1216 (e.g., at block 1112) can be a request to perform a search based on the song corresponding to the audio clip (e.g., "What's this song?", "Who sang this?", "When was this song released?", etc.). Based on the audio clip and the text, it can be determined at block 1114 that the user intent includes performing audio recognition on the media item to identify the song in the audio clip. In this example, a determination can be obtained at block 1132 that the user intent requires performing audio processing (e.g., audio recognition) on the media object. In response to obtaining a determination that the user intent requires performing audio processing on the media object, block 1134 can be performed.

At block 1134, the electronic device can cause audio processing to be performed on the media object to be performed. In some examples, audio processing can include audio recognition (e.g., speaker recognition, music recognition, sound recognition, etc.). In some examples, the media object can be transmitted to a separate server to perform the audio recognition. In other examples, at least a portion of the audio recognition can be performed on the electronic device. Audio recognition can include extracting a sound print from the media object. The sound print can then be compared against a plurality of reference sound prints in a database to obtain a best matched reference sound print. Each reference sound print can be associated with reference information. The audio recognition results can be based on the reference information of the best matching reference sound print. In the present example, the best matched reference sound print can be associated with the United States national anthem. The audio recognition results can thus include reference information identifying the media object. For example, the reference information can include "Star Spangled Banner" or "United States national anthem."

At block 1136, information associated with the media object can be obtained based on the audio processing of block 1134. In the present example, the obtained information can include the audio recognition results (e.g., United States national anthem). In other examples, information related to the audio recognition results can be obtained. For example, a search can be performed using the text information identifying the media object of block 1134 to obtain additional information to satisfy the user intent. In particular, additional information about the identified song, such as the artist, composer, release date, album name, album price, and the like, can be obtained.

At block 1138, a response based on the information associated with the media object can be displayed as a sixth message in the GUI. The response can be indicative of the user intent being satisfied. Block 1138 can be similar to block 1122. In the present example shown in FIG. 12G, the response can be displayed as message 1218 and can identify the song in the media object as being "the United States national anthem." In some examples, the sixth message (e.g., message 1218) can be configured to be selectable by the user such that in response to detecting a user selection of the sixth message, the electronic device can cause additional information related to the media object (e.g., retail information) to be displayed. In particular, in response to detecting a user selection of the sixth message, a music search application (e.g., iTunes application) of the electronic device can be caused to search for media items (e.g., songs, albums, movies, games, etc.) corresponding to the identified media object and to displayed these media items for the user to browse or purchase.

It should be recognized that in some examples, the audio processing of block 1134 can include speech-to-text recognition. For example, speech-to-text recognition can be performed on speech in the media object to obtain text corresponding to the speech. In some examples, the information obtained at block 1136 can be based on the text corresponding to the speech in the media object. For example, a search can be performed using one or more words in the text corresponding to the speech in the media object in accordance with the user intent of block 1114. In other examples, the user may wish to store a transcription of the speech in the media object for future reference. In these examples, the text corresponding to the speech in the media object can be stored in association with an application (e.g., document manager application or a word processing application) of the electronic device in accordance with the user intent.

With reference back to block 1132, in response to obtaining a determination that the user intent does not require performing audio processing on the media object, block 1140 can be performed. At block 1140, the electronic device can cause an action to be performed in accordance with the user intent of block 1114. At block 1142, a response based on the action performed at block 1140 can be displayed as the seventh message in the GUI.

In some examples, process 1100 can be implemented to identify and store pertinent information for future retrieval. In these examples, the text of block 1110 can define an attribute related to the media object of block 1104. The attribute may not be explicitly indicated in the media object. For example, the media object can represent an entity and the attribute defined by the text of block 1110 can be a characteristic of the entity. In some examples, the attribute defined by the text of block 1110 can describe a relationship between the user and the contents of the media object. For example, as shown in FIG. 12H, the media object of block 1106 can be a picture of a bottle of wine (e.g., displayed as message 1220) and the text of block 1110 (e.g., displayed as message 1222) can define the user's opinion or preference for the wine (e.g., "I like this wine" or "This wine has vivid flavors of ground spice with hints of raspberry fruit and lemon zest"). In another example, the media object can be a picture of the parking space number at which the user parked his or her car and the text of block 1110 can indicate that the user parked at the location associated with the contents of the media object (e.g., "I parked here."). In the examples described above, it can be determined that the user intent is to store data that associated the defined attribute to the media object for future retrieval. Based on this user intent, it can be determined at block 1132 that the user intent does not require performing audio processing on the media object. In response to obtaining a determination that the user intent does not require performing audio processing on the media object, the electronic device can cause an action to be performed at block 1140 in accordance with the user intent of block 1114.

In these examples, the action of block 1140 can include storing data associating the attribute defined in the text of block 1110 to the media object of block 1104. In particular, the data can indicate that the attribute is a characteristic of the media object. For instance, in the example shown in FIG. 12H, the picture of the wine bottle in message 1220 can be stored (e.g., on the electronic device or on a remote device) in connection with a first attribute indicating that the picture is that of a bottle of wine and a second attribute indicating that the user likes the wine depicted in the picture.

In some examples, the data and/or the media object can be stored in association with an application of the electronic device. For example, the media object of block 1104 can be a picture of a person and the text of block 1110 can define the name of the person (e.g., "This is John Woo.") In this example, the picture of the person can be stored in association with the contacts application of the electronic device. If an existing contact entry is associated with the defined name, the picture can be auto-populated into the existing contact entry. If no existing contact entry is associated with the defined name, a new contact entry can be created. The picture and the defined name can then be auto-populated in the new contact entry. The contact entry thus associates the defined name with the picture.

In the present example shown in FIG. 12H, the response of block 1142 can be displayed as message 1224 and can confirm that the defined attribute is stored in association with the media object. Storing media items in association with user defined attributes can be desirable to help the user store and organize information deemed relevant to the user. For example, the user may ask the digital assistant to recommend a good wine in the future. The digital assistant can then refer back to the media object of message 1224 based on the stored attributes of "wine" and "like" associated with the media object and display the media object as a wine recommendation.

Figures 14A, 14B:
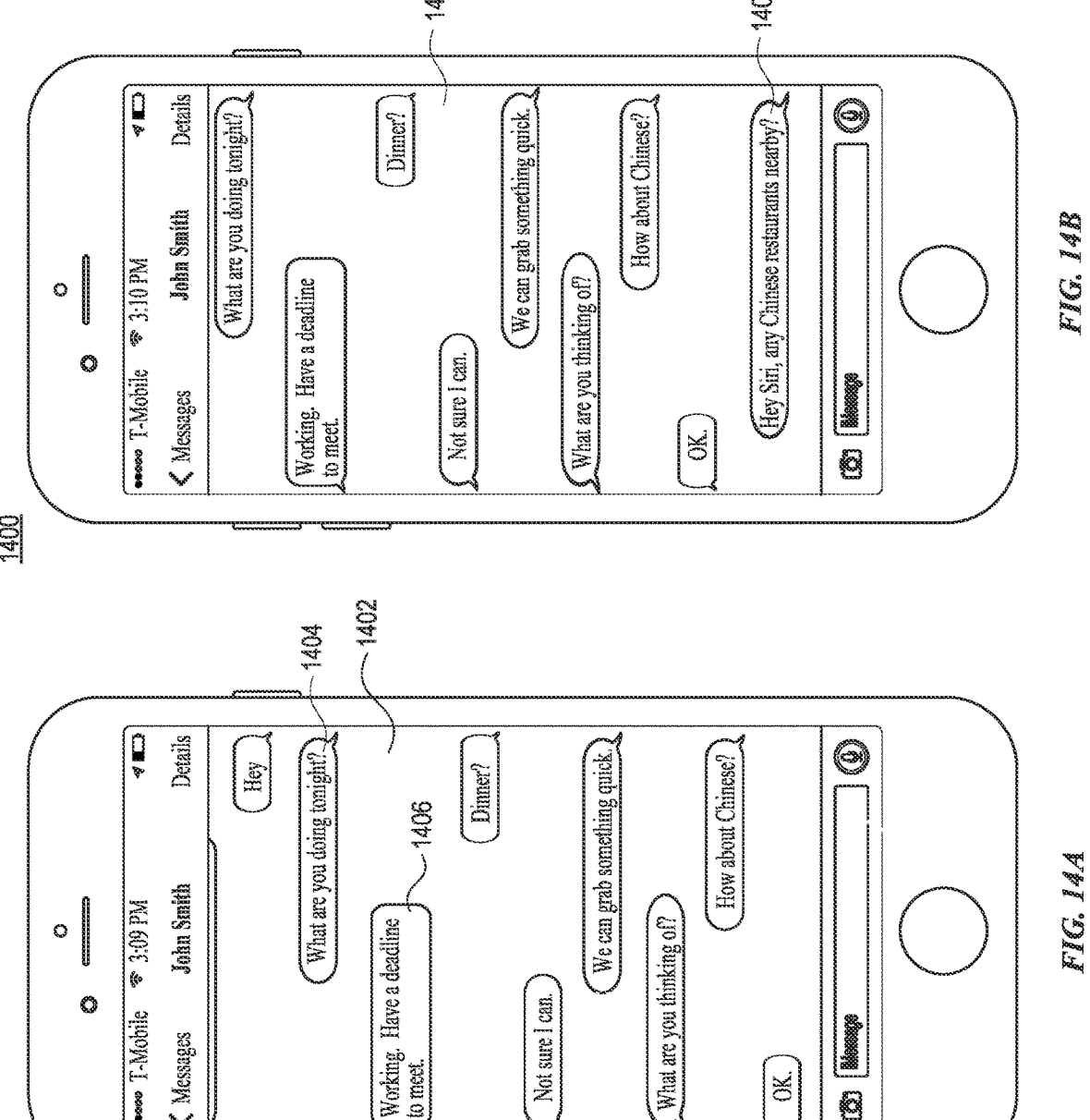
FIGS. 14A-14I illustrate user interfaces of an electronic device for operating a digital assistant in a messaging environment according to various examples.

Process 1300 is described below with simultaneous reference to FIGS. 13A-13C and 14A-14I. At block 1302, a graphical user interface (GUI) having a plurality of previous messages between a user of the electronic device and a user of a remote device can be displayed on the display of an electronic device. For example, as shown in FIG. 14A, GUI 1402 of electronic device 1400 can be displayed. GUI 1402 can be a GUI of a messaging application of electronic device 1400. As shown, GUI 1402 can include plurality of previous messages 1403 between the user of electronic device 1400 and a user of a remote device (not shown). For example, previous message 1404 can be generated from user input via GUI 1402 of electronic device 1400 and addressed to the user of the remote device. Previous message 1406 can be sent from the remote device and addressed to the user of electronic device 1400 in response to previous message 1404. Plurality of previous messages 1403 are presented in a conversational view. Electronic device 1400 can be similar to one or more of devices 104, 200, 400, 600, 900, or 1100. Electronic device 1400 and the remote device can be different devices. Block 1302 can be similar to block 802 of process 800, except that the plurality of previous messages are between two users of different devices rather than between the user of the electronic device and the digital assistant implemented on the electronic device. In particular, similar to plurality of previous message 903 of block 802, plurality of previous message 1403 of block 1302 can each be associated with a previous contextual state of electronic device 1400 at the time the respective previous message was generated.

At block 1304, a first user input addressed to the digital assistant can be received. The first user input can be similar to the user input of block 806. In particular, the first user input can be received from the user of the electronic device. The first user input can represent a user request and can include text input and/or a media object. The first user input can be received via a user input interface (e.g., user input interface 910) of electronic device 1400. Text input of the first user input can be in natural language form. Further, in some examples, the first user input can include a predetermined trigger phrase associated with the digital assistant of electronic device 1400. The predetermined trigger phrase can indicate that the first user input is addressed to the digital assistant. In the present example shown in FIG. 14B, the first user input includes the text "Hey Siri, any Chinese restaurants nearby?" In this example, the predetermined trigger phrase can be "Hey Siri."

At block 1306, the first user input can be displayed as a first message in the GUI. For example, with reference to FIG. 14B, the first user input can be displayed as first message 1408 in GUI 1402. Block 1306 can be performed in response to receiving the first user input at block 1304. In some examples, the first user input and first message 1408 can be associated with a contextual state of electronic device 1400. The contextual state can be similar to the contextual state of block 810 and can include the state of the electronic device at the time first user input was received or at the time first message 1408 was generated. In some examples, the contextual state can be stored in association with first message 1408 in response to receiving the first user input at block 1304.

At block 1308, a determination can be made as to whether the first user input includes a predetermined trigger phrase to invoke the digital assistant. In some examples, the determination can be made by electronic device 1400. In other examples, the determination can be obtained from a remote server (e.g., DA server 106). Block 1308 can include parsing the first user input of first message 1408 to identify any word or sequence of words corresponding to a predetermined trigger phrase. In response to determining that the first user input includes a predetermined trigger phrase, the digital assistant can be invoked and first message 1408 can be processed but the digital assistant. In particular, block 1310 can be performed in response to determining that the first user input includes a predetermined trigger phrase. In response to determining that the first user input does not include a predetermined trigger phrase, the digital assistant is not invoked and no further action is taken by the electronic device.

It should be recognized that in some examples, the digital assistant may still be invoked without a predetermined trigger phrase in the first user input. In these examples, the messages of GUI 1402 can be continuously processed by the digital assistant to determine whether a message from the user is intended to be addressed to the digital assistant or whether any action associated with a message can be taken by the digital assistant to assist the user. In particular, natural language processing can be performed on the first user input to attempt to determine an actionable intent. If an actionable intent can be determined from the first user input, then block 1310 can be performed. If an actionable intent cannot be determined from the first user input, then no action would be taken by the digital assistant. In the present example, the actionable intent of searching for a Chinese restaurant can be determined from first message 1408 and thus block 1310 can be performed.

At block 1310, the electronic device can cause an action to be performed in accordance with a user intent derived from the first user input. Block 1310 can include causing the user intent (e.g., actionable intent) to be determined (e.g., using natural language processing module 732) based on the first user input of block 1304 and causing a task flow corresponding to the user intent to be generated (e.g., using task flow processing module 736). Block 1310 can further include causing the task flow to be executed to perform the action in accordance with the user input. In some examples, performing the action can at least partially satisfy the derived user intent. In particular, results that at least partially satisfy the derived user intent can be obtained by performing the action.

In some examples, receiving the user input at block 1304 (or displaying the first message at block 1306) can cause the electronic device to determine the user intent, generate the task flow, and the action. Alternatively, the electronic device can transmit a representation of the first user input to a digital assistant server (e.g., DA server 106) and cause the digital assistant server to determine the user intent, generate the task flow, and perform the action.

In some examples, the contextual state of the electronic device associated with first message 1408 can be utilized to determine the user intent and thus the response displayed at block 1312 can be based on the stored contextual state. For example, location information stored in association with first message 1408 can indicate that the electronic device was located near Union Square in San Francisco at the time the first user input was received. Based on this location information, it can be determined that "nearby" in the first user input refers to near Union Square in San Francisco. Thus, in this example, the user intent corresponding to the first user input can be determined to be a search for Chinese restaurants near Union Square in San Francisco. The action caused to be performed in accordance with this user intent can be obtaining search results for Chinese restaurants near Union Square in San Francisco.

Figures 14C, 14D:
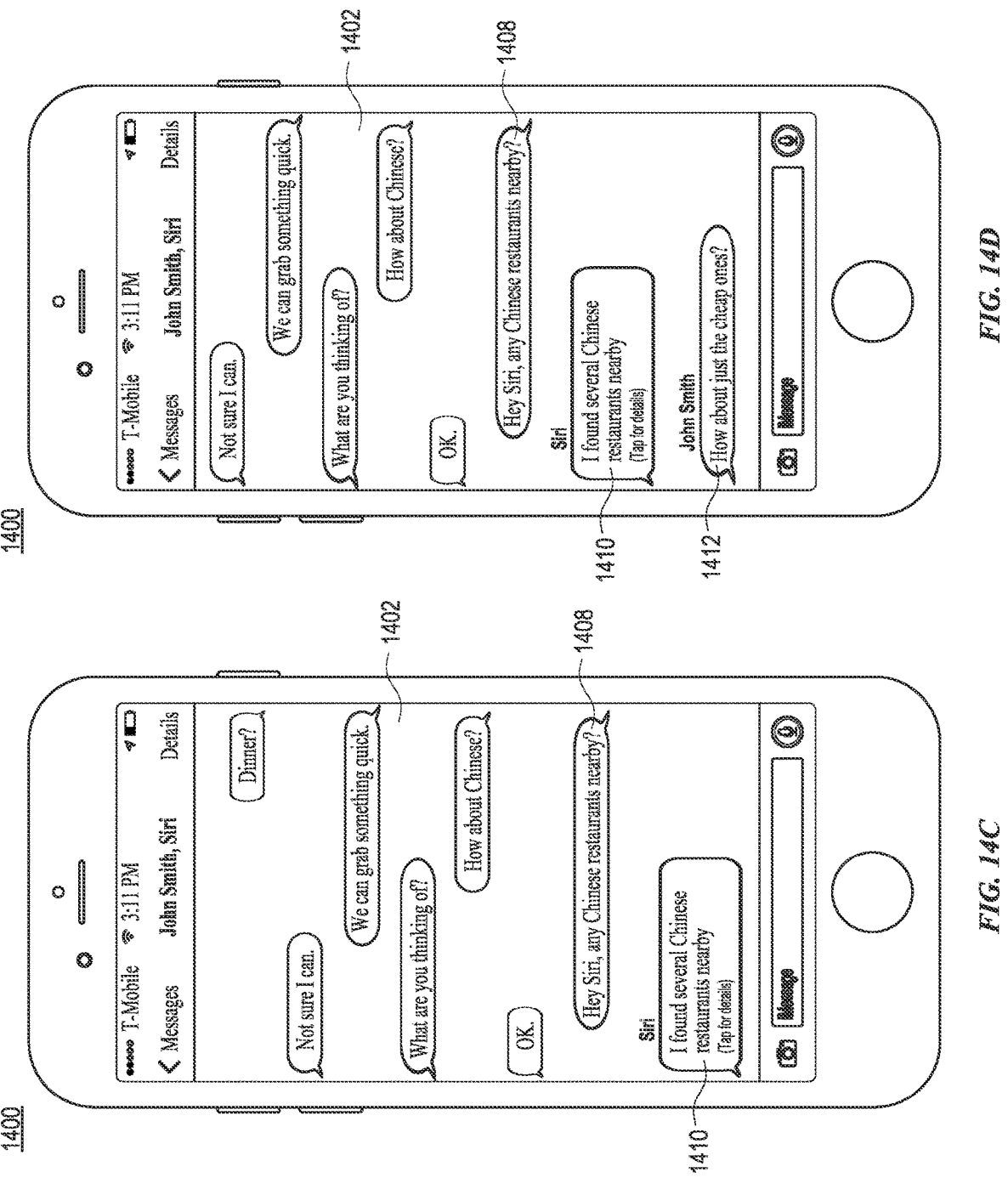

At block 1312, a response based on the action of block 1310 can be displayed as a second message in the GUI. For example, as shown in FIG. 14C, second message 1410 can be displayed in GUI 1402. Second message 1410 can include a response based on the search results obtained at block 1310. In particular, second message 1410 can include or provide access to the search results of Chinese restaurants located near Union Square in San Francisco. The response can be in natural language form and can at least partially satisfy the user request represented by the first user input of block 1304. In the present example, second message 1410 can be configured to provide additional details in accordance with the user input in response to a user selection of second message 1410. In particular, selection of second message 1410 by the user of electronic device 1400 can cause an application of electronic device 1400 to display detailed search results of Chinese restaurants near Union Square in San Francisco.

In some examples, block 1312 can further include transmitting the response (or causing the response to be transmitted) to the remote device and causing display of the response in a GUI of the remote device. Thus, electronic device 1400 can cause messages 1408 and 1410 to be displayed in the GUI of the remote device. Further message 1410 displayed in the GUI of the remote device can be configured to cause detailed search results to be displayed on the remote device in response to user selection of the message. In this way, the user of the remote device can view the conversation between the user of electronic device 1400 and the digital assistant of electronic device 1400. As described below, this will enable the user of the remote device to also participate in the conversation and thus benefit the assistance provided by the digital assistant of electronic device 1400. Blocks 1310 and 1312 can be performed automatically without additional human intervention in response to receiving the first user input of block 1304 (or in response to displaying the first user input as message 1408 at block 1306).

At block 1314, a second user input addressed to the digital assistant of electronic device 1400 can be received from the user of the remote device via the remote device. The second user input can include text input and/or a media object. In some examples, the second user input can be related to the first user input. In the present example shown in FIG. 14D, the second user input can include the text "How about just the cheap ones?"

At block 1316, the second user input can be displayed as a third message in the GUI. For example, as shown in FIG. 14D, the second user input can be displayed as third message 1412 in GUI 1402. Block 1316 can be performed in response to receiving the second user input.

At block 1318, the electronic device can cause a second action to be performed in accordance with a second user intent derived from the second user input and the user intent of block 1310. Block 1318 can be similar to block 1310 except that the second user input is derived from both the second user input and the user intent of block 1308. In particular, the electronic device can cause the second user intent to be initially determined based on the second user input. In particular, a determination can be made as to whether the second user input is a request to refine the user intent of block 1308. The determination can be based on one or more predetermined words in the second user input. In the present example, it can be determined based on the word "just" in the second user input that the second user input is a request to refine the user intent of block 1308. Other predetermined words can include "only," "filter," "narrow," and the like. Additionally or alternatively, the determination of whether the second user input is a request to refine the user intent of block 1308 can be based on the domain corresponding to the second user input. For example, if the domain corresponding to the second user input is the same as the domain corresponding to the first user input, then the second user input can be determined to be a request to refine the user intent of block 1308.

In response to determining that the second user input is a request to refine the user intent of block 1308, the second user intent can be determined based on the second user input and the user intent of block 1308. In the present example, the second user intent can be determined to include obtaining search results for Chinese restaurants near Union Square that are rated the least expensive. The second action in accordance with the second user intent can thus be performing a search for Chinese restaurants that are rated the least expensive. It should be appreciated that in the present example, the first user intent and the second user intent can correspond to the same domain of an ontology (e.g., the "search restaurant" domain). Further, the second user intent can include a parameter (e.g., rated the least expensive) that is not included in the user intent of block 1310.

Figures 14E, 14F:
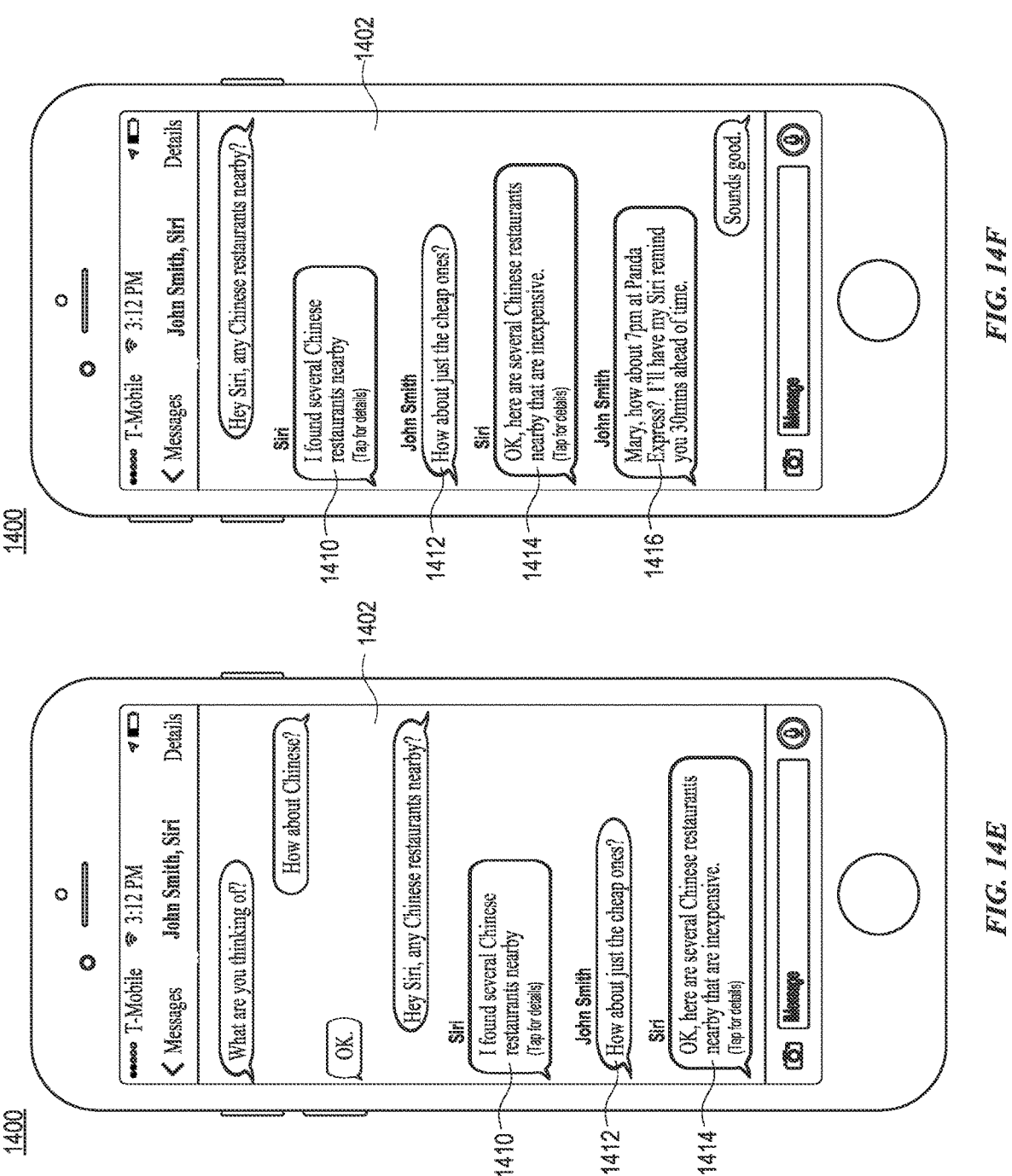

At block 1320, a second response based on the second action can be displayed as a fourth message in the GUI. In the present example as shown in FIG. 14E, message 1414 is displayed in GUI 1402. Message 1414 can include a second response based on the second action of block 1318. Block 1320 can be similar to block 1314. In this example, the second response can present search results of Chinese restaurants near Union Square in San Francisco that are rated least expensive.

In some examples, block 1320 can include transmitting the second response to the remote device and causing display of the second response in the GUI of the remote device. In this way, the results requested by the user of the remote device can be made accessible to the user of the remote device. The user of the remote device can thus become a participant of the conversation between the user of electronic device 1400 and the digital assistant of electronic device 1400.

In some examples, the digital assistant of the remote device can interact with the user of electronic device 1400 and/or with the digital assistant of the electronic device 1400 in the messaging environment. Blocks 1322-1328 of process 1300 and FIGS. 14F-I illustrate examples of such interactions. In the examples described below, the digital assistant of the remote device can be utilized to send the user of electronic device 1400 a reminder. In particular, as indicated in message 1416 of FIG. 14F, the user of the remote device can have the digital assistant of the remote device send a reminder to the user of electronic device 1400 thirty minutes prior to their 7:00 pm dinner appointment. Further, the user of the remote device can have the digital assistant of the remote device request that the user of electronic device 1400 call the user of the remote device upon arrival at the dinner location (e.g., Panda Express).

At block 1322, input from the digital assistant of the remote device can be received. The input can be generated automatically (e.g., in response to the time being 6:30 pm) by the digital assistant of the remote device and can include text input and/or a media object. In the present example shown in FIGS. 14G-H, the input can be received at 6:30 pm and can include text reminding the user of electronic device 1400 about the 7:00 pm dinner appointment at Panda Express. The input can further include text requesting the user of electronic device 1400 to call the user of the remote device upon arriving at the dinner venue (e.g., Panda Express). In response to receiving the input, block 1324 can be performed.

Figures 14G, 14H:
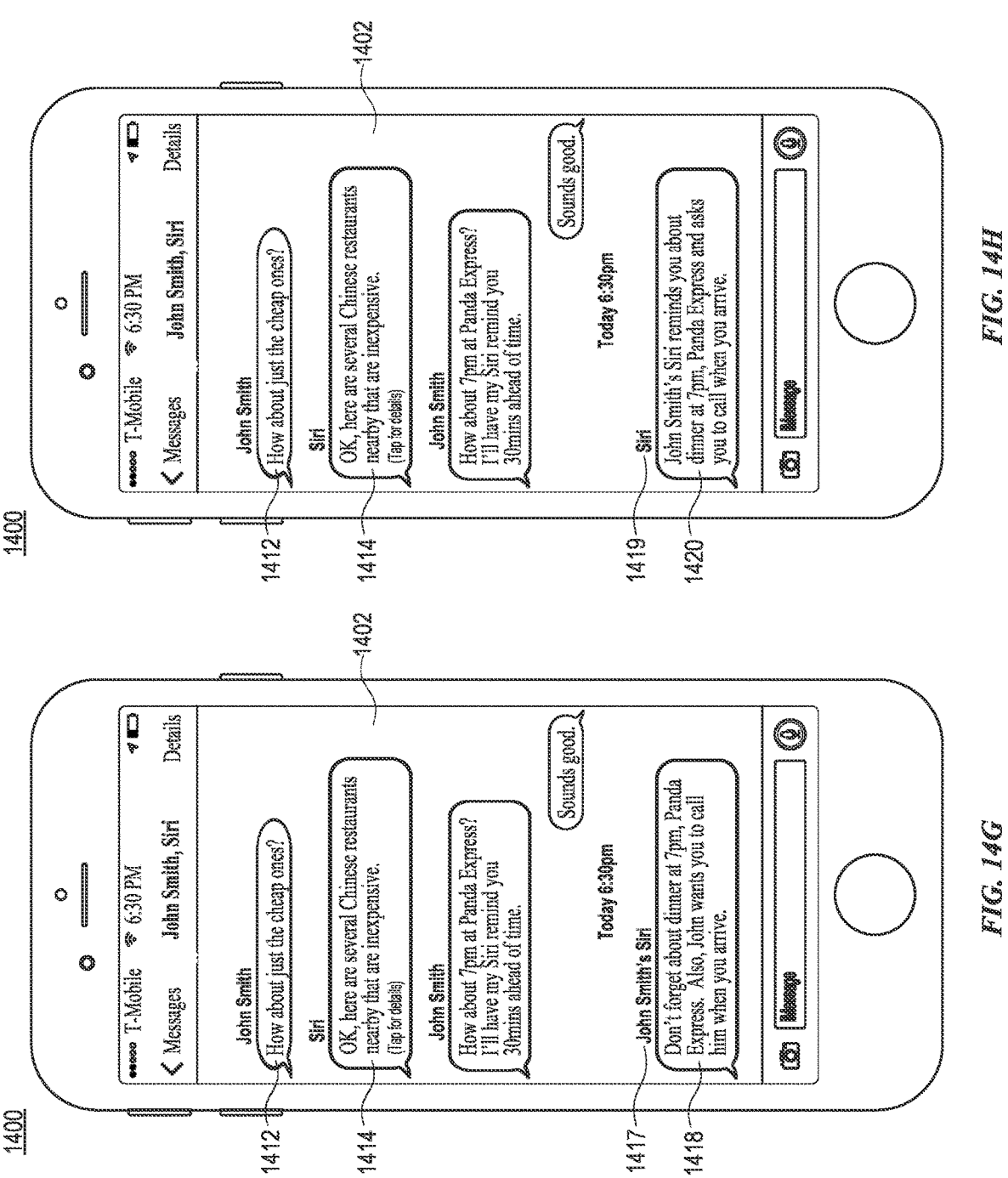

At block 1324, a fifth message based on the input of block 1322 can be displayed in the GUI. In some examples, the input from the digital assistant of the remote device can be directly displayed as the fifth message in the GUI. For example, as shown in FIG. 14G, fifth message 1418 displayed in GUI 1402 can include text of the input generated by the digital assistant of the remote device. Fifth message 1418 is thus directly addressed to the user of electronic device 1400 from the digital assistant of the remote device. Further, in some examples, indication 1417 that the content of fifth message 1418 was generated by the digital assistant of the remote device can be displayed. In this example, indication 1417 is text indicating that fifth message 1418 was created and sent by the digital assistant of the remote device.

In other examples, the input of block 1322 can be processed by the digital assistant of electronic device 1400 and a representation of the input can be generated and displayed as the fifth message in the GUI. For example, as shown in FIG. 14H, fifth message 1420 displayed in GUI 1402 can convey the information represented by the input of block 1322. In particular, receiving the input from the digital assistant of the remote device at block 1322 can cause the digital assistant of electronic device 1400 to generate and display fifth message 1420. The content of fifth message 1420 can thus be generated by the digital assistant of electronic device 1400 based on the input of block 1322. The input of block 1322 is thus conveyed indirectly to the user of electronic device 1400 through the digital assistant of electronic device 1400. As shown in FIG. 14H, indication 1419 that the content of the fifth message was generated by the digital assistant of electronic device 1400 can be displayed. In this example, indication 1419 is text indicating that fifth message 1420 was created and displayed by the digital assistant of electronic device 1400. Although conveying the input of block 1322 indirectly to the user of electronic device 1400 through the digital assistant of electronic device 1400 can require additional processing by electronic device 1400, it can improve user experience by reducing the number of participants in the conversation and thus reducing confusion.

In some examples, the input of block 1322 can cause the digital assistant of electronic device 1400 to perform an action. At block 1326, in response to receiving the input of block 1322, the electronic device can cause a third action to be performed in accordance with a third user intent derived from the input of block 1322. Block 1326 can be similar to block 1310. Block 1326 can include causing the third user intent corresponding to the input of block 1322 to be determined using natural language processing. More specifically, a determination can be made as to whether the input of block 1322 corresponds to an actionable intent. In the present example, the input of block 1322 can be determined to correspond to the actionable intent of creating a reminder. Specifically, the third user intent can include creating a reminder to call John Smith upon arriving at the location corresponding to Panda Express. Block 1326 can further include causing a third task flow corresponding to the third user intent to be generated and causing the task flow to be executed to perform the third action. In the present example, the third action can include creating a reminder to call John Smith upon arriving at location corresponding to Panda Express. The created reminder can be configured to cause a notification to be displayed on electronic device 1400 in response to detecting that electronic device 1400 is located within a predetermined distance of the location corresponding to Panda Express.

Figure 14I:
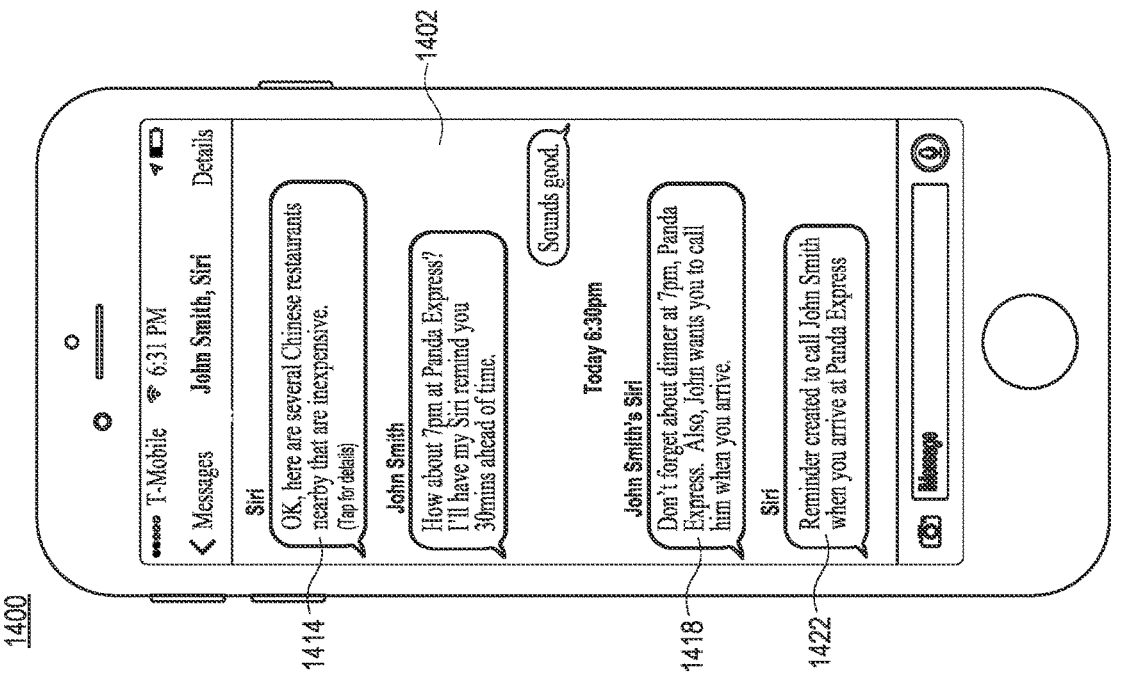

At block 1328, a third response based on the third action can be displayed as a sixth message in the GUI. For example, as shown in FIG. 14I, sixth message 1422 can be displayed in GUI 1402. Sixth message 1422 can include a third responses confirming that the reminder has been created. Sixth message 1422 can be generated and displayed by the digital assistant of electronic device 1400. In other examples, sixth message 1422 can include information obtained from performing the third action at block 1326.

Although in the examples described above, the digital assistant of the electronic device is a participant in the conversation between the users of only two electronic devices, it should be recognized that in other examples, the conversation can include the users of any number of electronic devices. Further, the digital assistants of any one of the participating electronic devices can participate in the conversation. Moreover, it should be recognized that the aspects of operating a digital assistant in a messaging environment in processes 800 and 1100 can be applied during the multi-participant conversations between the users of different devices.

5. Electronic Devices

Figure 15:
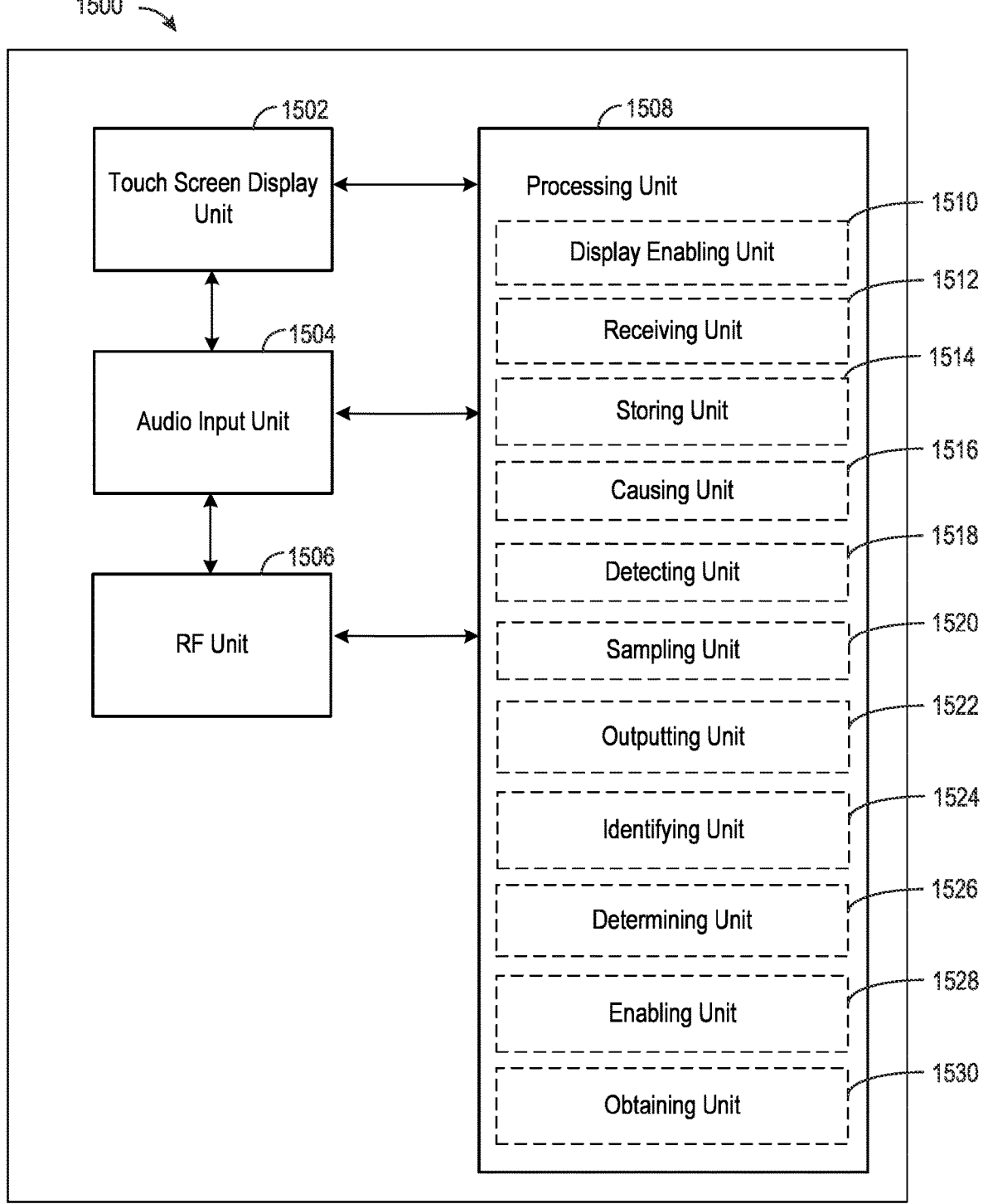
FIG. 15 illustrates a functional block diagram of an electronic device according to various examples.

FIG. 15 shows a functional block diagram of electronic device 1500 configured in accordance with the principles of the various described examples. The functional blocks of the device can be optionally implemented by hardware, software, or a combination of hardware and software to carry out the principles of the various described examples. It is understood by persons of skill in the art that the functional blocks described in FIG. 15 can be optionally combined or separated into sub-blocks to implement the principles of the various described examples. Therefore, the description herein optionally supports any possible combination, separation, or further definition of the functional blocks described herein.

As shown in FIG. 15, electronic device 1500 can include touch screen display unit 1502 configured to display a graphical user interface and to receive input from the user, audio input unit 1504 configured to receive audio input (e.g., speech input), and optionally, RF unit 1506 configured to transmit and receive information. Electronic device 1500 can further include processing unit 1508 coupled to touch screen display unit 1502, audio input unit 1504, and RF unit 1506. In some examples, processing unit 1508 can include display enabling unit 1510, receiving unit 1512, storing unit 1514, causing unit 1516, detecting unit 1518, sampling unit 1520, outputting unit 1522, identifying unit 1524, determining unit 1526, enabling unit 1528, and obtaining unit 1530.

In accordance with some embodiments, processing unit 1508 is configured to display (e.g., with display enabling unit 1510) on touch screen display unit 1502, a graphical user interface (GUI) having a plurality of previous messages between a user of the electronic device and the digital assistant. The plurality of previous messages is presented in a conversational view. Processing unit 1508 is further configured to receive (e.g., with receiving unit 1512) user input via touch screen display unit 1502. Processing unit 1508 is further configured to, in response to receiving the user input, display (e.g., with display enabling unit 1510 and on touch screen display unit 1510) the user input as a first message in the GUI. Processing unit 1508 is further configured to store (e.g., with storing unit 1514) a contextual state of the electronic device corresponding to the displayed user input. Processing unit 1508 is further configured to cause (e.g., with causing unit 1516) an action to be performed in accordance with a user intent derived from the user input. Processing unit 1508 is further configured to display (e.g., with display enabling unit 1510 and on touch screen display unit 1502) a response as a second message in the GUI, the response based on the action.

In some examples, each of the plurality of previous messages are associated with a previous contextual state of the electronic device.

In some examples, processing unit 1508 is further configured to prior to displaying the user input, detect (e.g., with detecting unit 1518) a user selection of a first previous message of the plurality of previous messages, where the first previous message is associated with a first previous contextual state of the electronic device. Causing the action to be performed can further comprises obtaining results using the first previous contextual state of the electronic device, where the results are based on the user intent.

In some examples, processing unit 1508 is further configured to, prior to receiving the user input, detect (e.g., with detecting unit 1518) a second user input. In some examples, processing unit 1508 is further configured to, in response to detecting the second user input, sample (e.g., with sampling unit 1520) audio data (e.g., via audio input unit 1504). The audio data contains a user utterance. Processing unit 1508 is further configured to cause (e.g., with causing unit 1516) a second action to be performed in accordance with a second user intent derived from the user utterance. Processing unit 1508 is further configured to output (e.g., with outputting unit 1522) a second response based on the second action, where a second previous message of the plurality of previous messages includes a text representation of the user utterance, and where a third previous message of the plurality of previous messages is based on the second response.

In some examples, processing unit 1508 is further configured to receive (e.g., with receiving unit 1512 and via touch screen display unit) a third user input associated with a fourth previous message of the plurality of previous messages. Processing unit 1508 is further configured to, in response to receiving the third user input, store (e.g., with storing unit 1514) a bookmark of the fourth previous message in association with an affordance. Processing unit 1508 is further configured to display (e.g., with display enabling unit 1510 and on touch screen display unit 1502) the affordance on the GUI, where selecting the affordance causes a focus of the GUI to change to the fourth previous message.

In some examples, processing unit 1508 is further configured to, in response to displaying the user input as a first message in the GUI of the electronic device, cause (e.g., with causing unit 1516) display of the first message in a GUI of a second electronic device. Processing unit 1508 is further configured to, in response to displaying the response as a second message in the GUI of the electronic device, cause (e.g., with causing unit 1516) display of the second message in the GUI of the second electronic device.

In some examples, processing unit 1508 is further configured to detect (e.g., with detecting unit 1518) a user selection of the first message in the GUI. The first message is generated from user input received at a separate electronic device. The first message is associated with a contextual state of the separate electronic device. Processing unit 1508 is further configured to receive (e.g., with receiving unit 1512 and via touch screen display unit 1502) a fourth user input. Processing unit 1508 is further configured to, in response to receiving the fourth user input, display (e.g., with display enabling unit 1510 and on touch screen display unit 1502) the fourth user input as a third message in the GUI. Processing unit 1508 is further configured to cause (e.g., with causing unit 1516) a third action to be performed in accordance with a third user intent, the third user intent derived from the fourth user input and the contextual state of the separate electronic device. Processing unit 1508 is further configured to display (e.g., with display enabling unit 1510 and on touch screen display unit 1502) a third response as a fourth message, the third response based on the third action.

In some examples, processing unit 1508 is further configured to identify (e.g., with identifying unit 1524), based on the contextual state of the electronic device and the derived user intent, one or more words in the displayed response corresponding to an entity. Processing unit 1508 is further configured to determine (e.g., with determining unit 1526) an action associated with the entity. Processing unit 1508 is further configured to enable (e.g., with enabling unit 1528) selection of one or more words in the displayed response, where detecting a user selection of the one or more words causes the action associated with the entity to be performed.

In some examples, the GUI of the electronic device includes a text input field. In these examples, processing unit 1508 is further configured to detect (e.g., with detecting unit 1518) a fifth user input associated with a first previous message of the plurality of previous messages. Processing unit 1508 is further configured to, in response to detecting the fifth user input, display (e.g., with display enabling unit 1510 and on touch screen display unit 1502) text of the first previous message in the text input field of the GUI.

In some examples, processing unit 1508 is further configured to receive (e.g., with receiving unit 1512 and using touch screen display unit 1502), via the GUI of the electronic device, a user selection of the second message. Processing unit 1508 is further configured to, in response to receiving the user selection of the second message, obtain (e.g., with obtaining unit 1530), using an application of the electronic device, detailed results based on the user intent. Processing unit 1508 is further configured to display (e.g., with display enabling unit 1510 and on touch screen display unit 1502) the detailed result in a GUI of the application.

In some examples, displaying the response as the second message includes displaying an indication in the second message that a more detailed response is available in response to selecting the second message. In some examples, the second message includes only text.

In some examples, processing unit 1508 is further configured to, display (e.g., with display enabling unit 1510 and on touch screen display unit 1502), based on the user intent, a media object in the GUI of the electronic device, the media object associated with an application of the electronic device.

In some examples, processing unit 1508 is further configured to detect (e.g., with detecting unit 1518) a user selection of the media object. In response to detecting the user selection of the media object, processing unit 1508 is further configured to obtain (e.g., with obtaining unit 1530), using an application of the electronic device, expanded results corresponding to the media object. Processing unit 1508 is further configured to display (e.g., with display enabling unit 1510 and on touch screen display unit 1502) the expanded results in a GUI of the application.

In some examples, processing unit 1508 is further configured to receive (e.g., with receiving unit 1512 and via touch screen display unit 1502) a notification from an application of the electronic device. Processing unit 1508 is further configured to, in response to receiving the notification, display (e.g., with display enabling unit 1510 and on touch screen display unit 1502) the notification as a fifth message in the GUI.

In some examples, the GUI of the electronic device includes a user input interface, where the displayed response includes a request for additional information. In these examples, processing unit 1508 is further configured to display (e.g., with display enabling unit 1510 and on touch screen display unit 1502) two or more suggested character strings in the user input interface, each of the two or more suggested character string responsive to the request for additional information. Processing unit 1508 is further configured to detect (e.g., with detecting unit 1518) a user selection of a suggested character string of the two or more suggested character strings. Processing unit 1508 is further configured to, in response to detecting a user selection of a suggested character string, display (e.g., with display enabling unit 1510 and on touch screen display unit 1502) the selected suggested character string as a sixth message in the GUI of the electronic device. Processing unit 1508 is further configured to display (e.g., with display enabling unit 1510 and on touch screen display unit 1502) a fourth response as a seventh message in the GUI of the electronic device, the fourth response based on the selected suggested character strings.

In some examples, the user input includes an ambiguous term. The displayed response includes a displayed request for additional information related to the ambiguous term. The displayed request for additional information includes a list of possible interpretations for the ambiguous term.

In some examples, processing unit 1508 is further configured to receive (e.g., with receiving unit 1512) a sixth user input indicating a selection of one of the list of possible interpretations. Processing unit 1508 is further configured to, in response to receiving the sixth user input, display (e.g., with display enabling unit 1510 and on touch screen display unit 1502) the sixth user input as an eighth message in the GUI. Processing unit 1508 is further configured to cause (e.g., with causing unit 1516) a sixth action to be performed in accordance with a user intent derived from the sixth user input. Processing unit 1508 is further configured to display (e.g., with display enabling unit 1510 and on touch screen display unit 1502) a sixth response as a ninth message in the GUI, the sixth response based on the sixth action.

In some examples, the contextual state includes a time the user input is received and data defining the location of the electronic device at the time the user input is received.

In some examples, the GUI of the electronic device is a GUI of a messaging application of the electronic device, the messaging application configured to send and receive messages from one or more recipients. In some examples, the plurality of previous messages are displayed in chronological order. In some examples, the first message and the second message are justified on opposite sides of the GUI. In some examples, the second message is displayed without providing any audio output.

In some examples, causing the action to be performed and displaying the response are performed automatically in response to receiving the user input and without additional human intervention.

In some examples, processing unit 1508 is further configured to cause (e.g., with causing unit 1516) the user intent to be determined based on the user input. Processing unit 1508 is further configured to cause (e.g., with causing unit 1516) a task flow to be determined based on the user intent. Processing unit 1508 is further configured to cause (e.g., with causing unit 1516) the task flow to executed to obtain results, where the displayed response is based on the obtained results.

The operations described above with reference to FIG. 8 can be optionally implemented by components depicted in FIGS. 1-4, 6A-6B, and 7A. For example, the operations of process 800 may be implemented by one or more of operating system 718, applications module 724, I/O processing module 728, STT processing module 730, natural language processing module 732, task flow processing module 736, service processing module 738, or processor(s) 220, 410, 704. It would be clear to a person having ordinary skill in the art how other processes can be implemented based on the components depicted in FIGS. 1-4, 6A-6B, and 7A.

Figure 16:
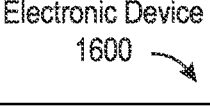
FIG. 16 illustrates a functional block diagram of an electronic device according to various examples.

FIG. 16 shows a functional block diagram of electronic device 1600 configured in accordance with the principles of the various described examples. The functional blocks of the device can be optionally implemented by hardware, software, or a combination of hardware and software to carry out the principles of the various described examples. It is understood by persons of skill in the art that the functional blocks described in FIG. 16 can be optionally combined or separated into sub-blocks to implement the principles of the various described examples. Therefore, the description herein optionally supports any possible combination, separation, or further definition of the functional blocks described herein.

As shown in FIG. 16, electronic device 1600 can include touch screen display unit 1602 configured to display a graphical user interface and to receive input from the user, audio input unit 1604 configured to receive audio input (e.g., speech input), and optionally, RF unit 1606 configured to transmit and receive information. Electronic device 1600 can further include processing unit 1608 coupled to touch screen display unit 1602, audio input unit 1604, and RF unit 1606. In some examples, processing unit 1608 can include display enabling unit 1610, receiving unit 1612, causing unit 1614, obtaining unit 1616, extracting unit 1618, performing unit 1620, populating unit 1622, and storing unit 1624.

In accordance with some embodiments, processing unit 1608 is configured to displayed (e.g., with display enabling unit 1610), on the display unit 1602, a graphical user interface (GUI) having a plurality of previous messages between a user and the digital assistant, the plurality of previous messages presented in a conversational view. Processing unit 1608 is further configured to receive (e.g., with receiving unit 1612) a first user input including a media object. Processing unit 1608 is further configured to, in response to receiving the first user input, display (e.g., with display enabling unit 1610 and on display unit 1602) the media object as a first message in the GUI. Processing unit 1608 is further configured to receive (e.g., with receiving unit 1612) a second user input including text. Processing unit 1608 is further configured to, in response to receiving the second user input, display (e.g., with display enabling unit 1610 and on display unit 1602) the text as a second message in the GUI. Processing unit 1608 is further configured to cause (e.g., with causing unit 1614) a user intent corresponding to the first user input and the second user input to be determined. Processing unit 1608 is further configured to obtain (e.g., with obtaining unit 1616) a determination of whether the user intent requires extracting text from the media object. Processing unit 1608 is further configured to, in response to obtaining a determination that the user intent requires extracting text from the media object: extract (e.g., with extracting unit 1618) text from the media object, perform (e.g., with performing unit 1620) a task in accordance with the user intent using the extracted text, and display (e.g., with display enabling unit 1610 and on display unit 1602), as a third message in the GUI, a response indicative of the user intent being satisfied.

In some examples, processing unit 1608 is further configured to, in accordance with the user intent, populate (e.g., with populating unit 1622) the extracted text into a text field of an application of the electronic device.

In some examples, the user intent comprises creating, using the media object, a contact entry in a contacts application of the electronic device. In these examples, the media object is an image depicting contact information of an entity, the extracted text includes the contact information, and performing the task in accordance with the user intent further comprises populating a text field of the contact entry with the extracted text, the contact entry associated with the entity.

In some examples, the user intent comprises creating, using the media object, a calendar entry in a calendar application of the electronic device. In these examples, the media object is an image depicting event information, the extracted text includes the event information, and performing the task in accordance with the user intent further comprises populating a text field of the calendar entry with the extracted text.

In some examples, the user intent comprises creating, using the media object, a reminder entry in a reminder application of the electronic device. In these examples, the media object is an image depicting a reminder task, the extracted text includes the reminder task, and performing the task in accordance with the user intent further comprises populating a text field of the reminder entry with the extracted text.

In some examples, the user intent comprises translating text of a first language in the media object to text of a second language. In these examples, the media object is an image depicting the text of the first language, the extracted text includes the text of the first language, performing the task in accordance with the user intent further comprises obtaining the text of the second language corresponding to the text of the first language, and the displayed response includes the text of the second language.

In some examples, processing unit 1608 is further configured to, in response to obtaining a determination that the user intent does not require extracting text from the media object, obtain (e.g., with obtaining unit 1616) a determination of whether the user intent requires performing image recognition on the media object. Processing unit 1608 is further configured to, in response to obtaining a determination that the user intent requires performing image recognition on the media object: cause (e.g., with causing unit 1614) image recognition on the media object to be performed, obtain (e.g., with obtaining unit 1616), based on the image recognition, information associated with the media object, and display (e.g., with display enabling unit 1610 and on display unit 1602), as a fourth message in the GUI, a response indicative of the user intent being satisfied. The response is based on the information associated with the media object.

In some examples, the media object depicts a retail object, and the information associated with the media object includes price information of the retail object. In some examples, the media object depicts a location, and the information associated with the media object includes the identity of the location. In some examples, the media object depicts an entity, and the information associated with the media object includes the identity of the entity.

In some examples, processing unit 1608 is further configured to in response to obtaining a determination that the user intent does not require performing image recognition on the media object, obtain (e.g., with obtaining unit 1616) a determination of whether the user intent requires performing audio processing on the media object. Processing unit 1608 is further configured to, in response to obtaining a determination that the user intent requires performing audio processing on the media object: cause (e.g., with causing unit 1614) audio processing on the media object to be performed, obtain (e.g., with obtaining unit 1616), based on the audio processing, information associated with the media object, and display (e.g., with displaying enabling unit 1610 and on display unit 1602), as a fifth message in the GUI, a response indicative of the user intent being satisfied. The response is based on the information associated with the media object.

In some examples, causing audio processing on the media object to be performed further comprises causing speech-to-text recognition to be performed on the media object to obtain text corresponding to speech in the media object. In some examples, the information is obtained using the text corresponding to the speech in the media object. In some examples, the text corresponding to the speech in the media object is stored in association with an application of the electronic device in accordance with the user intent.

In some examples, causing audio processing on the media object to be performed further comprises causing audio recognition to be performed using the media object to obtain text identifying the media object. In some examples, the information is obtained using the text identifying the media object. In some examples, processing unit 1608 is further configured to, in response to detecting a user selection of the fifth message in the GUI, cause (e.g., with causing unit 1614) retail information related to the media object to be displayed.

In some examples, the second user input defines an attribute related to the media object, the attribute not explicitly indicated in the media object. In these examples, processing unit 1608 is further configured to, in response to obtaining a determination that the user intent does not require performing audio processing on the media object, store (e.g., with storing unit 1624) data that associates the attribute to the media object.

In some examples, the attribute describes a relationship between the user and the media object. In some examples, processing unit 1608 is further configured to store (e.g., with storing unit 1624), based on the attribute, the media object in association with an application of the electronic device.

In some examples, processing unit 1608 is further configured to after displaying the media object as the first message and before receiving the second user input, display (e.g., with display enabling unit 1610 and on display unit 1602), as a sixth message in the GUI, a request for additional information regarding the media object.

In some examples, causing the user intent to be determined further comprises causing a domain among a plurality of domains of an oncology to be determined based on the first user input and the second user input.

The operations described above with reference to FIGS. 11A-11D can be optionally implemented by components depicted in FIGS. 1-4, 6A-6B, and 7A. For example, the operations of process 1100 may be implemented by one or more of operating system 718, applications module 724, I/O processing module 728, STT processing module 730, natural language processing module 732, task flow processing module 736, service processing module 738, or processor(s) 220, 410, 704. It would be clear to a person having ordinary skill in the art how other processes can be implemented based on the components depicted in FIGS. 1-4, 6A-6B, and 7A.

FIG. 17 shows a functional block diagram of electronic device 1700 configured in accordance with the principles of the various described examples. The functional blocks of the device can be optionally implemented by hardware, software, or a combination of hardware and software to carry out the principles of the various described examples. It is understood by persons of skill in the art that the functional blocks described in FIG. 17 can be optionally combined or separated into sub-blocks to implement the principles of the various described examples. Therefore, the description herein optionally supports any possible combination, separation, or further definition of the functional blocks described herein.

As shown in FIG. 17, electronic device 1700 can include touch screen display unit 1702 configured to display a graphical user interface and to receive input from the user, audio input unit 1704 configured to receive audio input (e.g., speech input), and optionally, RF unit 1706 configured to transmit and receive information. Electronic device 1700 can further include processing unit 1708 coupled to touch screen display unit 1702, audio input unit 1704, and RF unit 1706. In some examples, processing unit 1708 can include display enabling unit 1710, receiving unit 1712, causing unit 1714, transmitting unit 1717, and determining unit 1718.

In accordance with some embodiments, processing unit 1708 is configured to display (e.g., with display enabling unit 1710) on display unit 1702, a graphical user interface (GUI) having a plurality of previous messages between a user of the electronic device and a user of a remote device. The plurality of previous messages is presented in a conversational view. Processing unit 1708 is further configured to receive (e.g., with receiving unit 1712), from the user of the electronic device, a first user input addressed to a digital assistant of the electronic device. Processing unit 1708 is further configured to, in response to receiving the first user input, display (e.g., with display enabling unit 1710 and on display unit 1702) the first user input as a first message in the GUI. Processing unit 1708 is further configured to cause (e.g., with causing unit 1714) an action to be performed in accordance with a user intent derived from the first user input. Processing unit 1708 is further configured to display (e.g., with display enabling unit 1710 and on display unit 1702) a response as a second message in the GUI, the response based on the action.

In some examples, processing unit 1708 is further configured to receive (e.g., with receiving unit 1712), from the user of the remote device, a second user input addressed to the digital assistant. Processing unit 1708 is further configured to, in response to receiving the second user input, display (e.g., with display enabling unit 1710 and on display unit 1702) the second user input as a third message in the GUI. Processing unit 1708 is further configured to cause (e.g., with causing unit 1714) a second action to be performed in accordance with a second user intent derived from the second user input and the user intent. Processing unit 1708 is further configured to display (e.g., with display enabling unit 1710 and on display unit 1702) a second response as a fourth message in the GUI, the second response based on the second action.

In some examples, the second user intent comprises refining the user intent.

In some examples, the user intent and the second user intent both include a same domain, and the second user intent includes a parameter that the user intent does not include.

In some examples, processing unit 1708 is further configured to transmit (e.g., with transmitting unit 1716 and using RF unit 1706) the second response to the remote device. Processing unit 1708 is further configured to cause (e.g., with causing unit) display of the second response in a GUI of the remote device.

In some examples, processing unit 1708 is further configured to determine (e.g., with determining unit 1718) whether the first user input includes a predetermined trigger phrase to invoke the digital assistant. Processing unit 1708 is further configured to cause (e.g., with causing unit 1714) the action to be performed and display (e.g., with display enabling unit 1710 and on display unit 1702) the response as the second message in response to determining that the first user input includes a predetermined trigger phrase.

In some examples, processing unit 1708 is further configured to receive (e.g., with receiving unit 1712) input from a digital assistant of the remote device. Processing unit 1708 is further configured to, in response to receiving the input, display (e.g., with display enabling unit 1710 and on display unit 1702) the input as a fifth message in the GUI.

In some examples, processing unit 1708 is further configured to display (e.g., with display enabling unit 1710 and on display unit 1702) an indication in the GUI that a content of the fifth message was generated by the digital assistant of the remote device.

In some examples, processing unit 1708 is further configured to, in response to receiving the input from the digital assistant of the remote device, cause (e.g., with causing unit 1714) the digital assistant of the electronic device to generate a content of the fifth message, where the content of the fifth message includes the input from the digital assistant of the remote device. Processing unit 1708 is further configured to display (e.g., with display enabling unit 1710 and on display unit 1702) in the GUI, an indication that the content of the fifth message was generated by the digital assistant of the electronic device.

In some examples, processing unit 1708 is further configured to, in response to receiving the input from the digital assistant of the remote device: cause (e.g., with causing unit 1714) a third action to be performed in accordance with a third user intent derived from the input from the digital assistant of the remote device, and display (e.g., with display enabling unit 1710 and on display unit 1702) a third response as a sixth message in the GUI, the third response based on the third action.

In some examples, processing unit 1708 is further configured to transmit (e.g., with transmitting unit 1716) the response to the remote device. Processing unit 1708 is further configured to cause (e.g., with causing unit 1714) display of the response in a GUI of the remote device.

In some examples, causing the action to be performed and displaying the response are performed automatically in response to receiving the first user input and without additional human intervention.

The operations described above with reference to FIGS. 13A-13C can be optionally implemented by components depicted in FIGS. 1-4, 6A-6B, and 7A. For example, the operations of process 1300 may be implemented by one or more of operating system 718, applications module 724, I/O processing module 728, STT processing module 730, natural language processing module 732, task flow processing module 736, service processing module 738, or processor(s) 220, 410, 704. It would be clear to a person having ordinary skill in the art how other processes can be implemented based on the components depicted in FIGS. 1-4, 6A-6B, and 7A.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A non-transitory computer-readable storage medium storing one or more programs, the one or more programs comprising instructions, which when executed by one or more processors of an electronic device with a display, cause the electronic device to:

display, on the display, a first conversational element associated with a previous interaction between a user of the electronic device and a digital assistant implemented on the electronic device, wherein the previous interaction occurs at a first time, and wherein the first conversational element represents an interactive session that includes two or more previous messages between the user and the digital assistant;

detect a user input corresponding to a selection of the first conversational element;

in response to detecting the user input corresponding to the selection of the first conversational element:

retrieving a previous contextual state of the electronic device associated with the first conversational element at the first time when the previous interaction occurred, wherein the previous contextual state includes information related to a state of the electronic device at the first time when a previous user input associated with the first conversational element was received, and wherein each of the two or more previous messages between the user and the digital assistant is associated with the previous contextual state of the electronic device; and after receiving the user input corresponding to the selection of the first conversational element:

receive, at a second time after the first time, a user request; and in response to receiving the user request:

display a representation of the user request as a second conversational element; and display a response to the user request, wherein the response to the user request is determined based on the user request and the previous contextual state of the electronic device associated with the first conversational element at the first time when the previous interaction occurred that is retrieved in response to the user input corresponding to the selection of the first conversational element.

2. The non-transitory computer-readable storage medium of claim 1, wherein displaying the response to the user request includes displaying the response as a media object and/or as text.

3. The non-transitory computer-readable storage medium of claim 2, wherein the media object comprises an image, a video clip, or an audio clip.

4. The non-transitory computer-readable storage medium of claim 1, wherein the user request includes a media object.

5. The non-transitory computer-readable storage medium of claim 1, wherein the first conversational element includes a previous message received at the first time.

6. The non-transitory computer-readable storage medium of claim 1, wherein the previous contextual state of the electronic device associated with the first conversational element includes a location of the electronic device at the first time.

7. The non-transitory computer-readable storage medium of claim 1, wherein the previous contextual state of the electronic device associated with the first conversational element includes prior dialogue between the user and the digital assistant.

8. The non-transitory computer-readable storage medium of claim 1, wherein the previous contextual state of the electronic device associated with the first conversational element includes time and date information at the first time.

9. The non-transitory computer-readable storage medium of claim 1, wherein the previous contextual state of the electronic device associated with the first conversational element includes application information associated with the electronic device at the first time.

10. The non-transitory computer-readable storage medium of claim 9, wherein the application information includes at least one of:

contact information;

search history;

information indicating which applications are installed on the electronic device at the first time; and information indicating which applications are actively running on the electronic device at the first time.

11. The non-transitory computer-readable storage medium of claim 1, wherein the response to the user request is determined locally at the electronic device.

12. The non-transitory computer-readable storage medium of claim 1, wherein the response to the user request is determined by an external electronic device.

13. The non-transitory computer-readable storage medium of claim 1, wherein displaying the response to the user request includes displaying, in a messaging application user interface, an indication that a portion of the response to the user request is selectable, and wherein the one or more programs comprise further instructions, which when executed by the one or more processors of the electronic device, cause the electronic device to:

detect user selection of the indication; and in response to detecting the user selection of the indication, display a first application user interface different from the messaging application user interface.

14. The non-transitory computer-readable storage medium of claim 1, wherein displaying the response to the user request includes displaying an indication that a more detailed response to the user request is available, and wherein the one or more programs comprise further instructions, which when executed by the one or more processors of the electronic device, cause the electronic device to:

detect user selection of the indication; and in response to detecting the user selection of the indication, display expanded results associated with the response to the user request.

15. The non-transitory computer-readable storage medium of claim 14, wherein:

the response to the user request is displayed in a messaging application user interface; and the expanded results are displayed in an application user interface different from the messaging application user interface.

16. The non-transitory computer-readable storage medium of claim 1, wherein displaying the response to the user request includes displaying a request for additional information.

17. The non-transitory computer-readable storage medium of claim 16, wherein the request for additional information includes a list of one or more suggestions, and wherein the one or more programs comprise further instructions, which when executed by the one or more processors of the electronic device, cause the electronic device to:

detect user selection of a first suggestion of the one or more suggestions; and in response to detecting the user selection of the first suggestion, displaying a representation of the first suggestion as a third conversational element.

18. The non-transitory computer-readable storage medium of claim 1, wherein:

the user request includes an ambiguous term; and the ambiguous term is resolved based on the previous contextual state of the electronic device to determine the response to the user request based on the previous contextual state of the electronic device.

19. The non-transitory computer-readable storage medium of claim 1, wherein the one or more programs comprise further instructions, which when executed by the one or more processors of the electronic device, cause the electronic device to:

concurrently display, on the display:

the first conversational element associated with the previous interaction between the user and the digital assistant; and a third conversational element associated with a second previous interaction between the user and the digital assistant, wherein the third conversational element is different from the first conversational element, the second previous interaction is different from the previous interaction, and the second previous interaction occurs at a third time different from the first time;

while concurrently displaying the first conversational element and the third conversational element, detect a second user input corresponding to a selection of the third conversational element, wherein a second previous contextual state of the electronic device associated with the third conversational element is selected based on the second user input corresponding to the selection of the third conversational element; and after receiving the second user input corresponding to the selection of the third conversational element:

receive, at a fourth time after the third time, a second user request; and in response to receiving the second user request:

display a representation of the second user request as a fourth conversational element; and display a second response to the user request, wherein the second response to the second user request is determined based on the second previous contextual state of the electronic device associated with the third conversational element that is selected based on the second user input corresponding to the selection of the third conversational element.

20. A method, comprising:

at an electronic device with a display:

displaying, on the display, a first conversational element associated with a previous interaction between a user of the electronic device and a digital assistant implemented on the electronic device, wherein the previous interaction occurs at a first time, and wherein the first conversational element represents an interactive session that includes two or more previous messages between the user and the digital assistant;

detecting a user input corresponding to a selection of the first conversational element;

in response to detecting the user input corresponding to the selection of the first conversational element:

retrieving a previous contextual state of the electronic device associated with the first conversational element at the first time when the previous interaction occurred, wherein the previous contextual state includes information related to a state of the electronic device at the first time when a previous user input associated with the first conversational element was received, and wherein each of the two or more previous messages between the user and the digital assistant is associated with the previous contextual state of the electronic device; and after receiving the user input corresponding to the selection of the first conversational element:

receiving, at a second time after the first time, a user request; and in response to receiving the user request:

displaying a representation of the user request as a second conversational element; and displaying a response to the user request, wherein the response to the user request is determined based on the user request and the previous contextual state of the electronic device associated with the first conversational element at the first time when the previous interaction occurred that is retrieved in response to the user input corresponding to the selection of the first conversational element.

21. The method of claim 20, wherein displaying the response to the user request includes displaying the response as a media object and/or as text.

22. The method of claim 21, wherein the media object comprises an image, a video clip, or an audio clip.

23. The method of claim 20, wherein the user request includes a media object.

24. The method of claim 20, wherein the first conversational element includes a previous message received at the first time.

25. The method of claim 20, wherein the previous contextual state of the electronic device associated with the first conversational element includes a location of the electronic device at the first time.

26. The method of claim 20, wherein the previous contextual state of the electronic device associated with the first conversational element includes prior dialogue between the user and the digital assistant.

27. The method of claim 20, wherein the previous contextual state of the electronic device associated with the first conversational element includes time and date information at the first time.

28. The method of claim 20, wherein the previous contextual state of the electronic device associated with the first conversational element includes application information associated with the electronic device at the first time.

29. The method of claim 28, wherein the application information includes at least one of:

contact information;

search history;

information indicating which applications are installed on the electronic device at the first time; and information indicating which applications are actively running on the electronic device at the first time.

30. The method of claim 20, wherein the response to the user request is determined locally at the electronic device.

31. The method of claim 20, wherein the response to the user request is determined by an external electronic device.

32. The method of claim 20, wherein displaying the response to the user request includes displaying, in a messaging application user interface, an indication that a portion of the response to the user request is selectable, and wherein the method further comprises:

detecting user selection of the indication; and in response to detecting the user selection of the indication, displaying a first application user interface different from the messaging application user interface.

33. The method of claim 20, wherein displaying the response to the user request includes displaying an indication that a more detailed response to the user request is available, and wherein the method further comprises:

detecting user selection of the indication; and in response to detecting the user selection of the indication, displaying expanded results associated with the response to the user request.

34. The method of claim 33, wherein:

the response to the user request is displayed in a messaging application user interface; and the expanded results are displayed in an application user interface different from the messaging application user interface.

35. The method of claim 20, wherein displaying the response to the user request includes displaying a request for additional information.

36. The method of claim 35, wherein the request for additional information includes a list of one or more suggestions, and wherein the method further comprises:

detecting user selection of a first suggestion of the one or more suggestions; and in response to detecting the user selection of the first suggestion, displaying a representation of the first suggestion as a third conversational element.

37. The method of claim 20, wherein:

the user request includes an ambiguous term; and the ambiguous term is resolved based on the previous contextual state of the electronic device to determine the response to the user request.

38. The method of claim 20, wherein the method further comprises:

concurrently displaying, on the display:

the first conversational element associated with the previous interaction between the user and the digital assistant; and a third conversational element associated with a second previous interaction between the user and the digital assistant, wherein the third conversational element is different from the first conversational element, the second previous interaction is different from the previous interaction, and the second previous interaction occurs at a third time different from the first time;

while concurrently displaying the first conversational element and the third conversational element, detecting a second user input corresponding to a selection of the third conversational element, wherein a second previous contextual state of the electronic device associated with the third conversational element is selected based on the second user input corresponding to the selection of the third conversational element; and after receiving the second user input corresponding to the selection of the third conversational element:

receiving, at a fourth time after the third time, a second user request; and in response to receiving the second user request:

displaying a representation of the second user request as a fourth conversational element; and displaying a second response to the user request, wherein the second response to the second user request is determined based on the second previous contextual state of the electronic device associated with the third conversational element that is selected based on the second user input corresponding to the selection of the third conversational element.

39. An electronic device, comprising:

a display;

one or more processors;

a memory; and one or more programs, wherein the one or more programs are stored in the memory and configured to be executed by the one or more processors, the one or more programs including instructions for:

displaying, on the display, a first conversational element associated with a previous interaction between a user of the electronic device and a digital assistant implemented on the electronic device, wherein the previous interaction occurs at a first time, and wherein the first conversational element represents an interactive session that includes two or more previous messages between the user and the digital assistant;

detecting a user input corresponding to a selection of the first conversational element;

in response to detecting the user input corresponding to the selection of the first conversational element:

retrieving a previous contextual state of the electronic device associated with the first conversational element at the first time when the previous interaction occurred, wherein the previous contextual state includes information related to a state of the electronic device at the first time when a previous user input associated with the first conversational element was received, and wherein each of the two or more previous messages between the user and the digital assistant is associated with the previous contextual state of the electronic device; and after receiving the user input corresponding to the selection of the first conversational element:

receiving, at a second time after the first time, a user request; and in response to receiving the user request:

displaying a representation of the user request as a second conversational element; and displaying a response to the user request, wherein the response to the user request is determined based on the user request and the previous contextual state of the electronic device associated with the first conversational element at the first time when the previous interaction occurred that is retrieved in response to the user input corresponding to the selection of the first conversational element.

40. The electronic device of claim 39, wherein displaying the response to the user request includes displaying the response as a media object and/or as text.

41. The electronic device of claim 40, wherein the media object comprises an image, a video clip, or an audio clip.

42. The electronic device of claim 39, wherein the user request includes a media object.

43. The electronic device of claim 39, wherein the first conversational element includes a previous message received at the first time.

44. The electronic device of claim 39, wherein the previous contextual state of the electronic device associated with the first conversational element includes a location of the electronic device at the first time.

45. The electronic device of claim 39, wherein the previous contextual state of the electronic device associated with the first conversational element includes prior dialogue between the user and the digital assistant.

46. The electronic device of claim 39, wherein the previous contextual state of the electronic device associated with the first conversational element includes time and date information at the first time.

47. The electronic device of claim 39, wherein the previous contextual state of the electronic device associated with the first conversational element includes application information associated with the electronic device at the first time.

48. The electronic device of claim 47, wherein the application information includes at least one of:

contact information;

search history;

information indicating which applications are installed on the electronic device at the first time; and information indicating which applications are actively running on the electronic device at the first time.

49. The electronic device of claim 39, wherein the response to the user request is determined locally at the electronic device.

50. The electronic device of claim 39, wherein the response to the user request is determined by an external electronic device.

51. The electronic device of claim 39, wherein displaying the response to the user request includes displaying, in a messaging application user interface, an indication that a portion of the response to the user request is selectable, and wherein the one or more programs further include instructions for:

detecting user selection of the indication; and in response to detecting the user selection of the indication, displaying a first application user interface different from the messaging application user interface.

52. The electronic device of claim 39, wherein displaying the response to the user request includes displaying an indication that a more detailed response to the user request is available, and wherein the one or more programs further include instructions for:

detecting user selection of the indication; and in response to detecting the user selection of the indication, displaying expanded results associated with the response to the user request.

53. The electronic device of claim 52, wherein:

the response to the user request is displayed in a messaging application user interface; and the expanded results are displayed in an application user interface different from the messaging application user interface.

54. The electronic device of claim 39, wherein displaying the response to the user request includes displaying a request for additional information.

55. The electronic device of claim 54, wherein the request for additional information includes a list of one or more suggestions, and wherein the one or more programs further include instructions for:

detecting user selection of a first suggestion of the one or more suggestions; and in response to detecting the user selection of the first suggestion, displaying a representation of the first suggestion as a third conversational element.

56. The electronic device of claim 39, wherein:

the user request includes an ambiguous term; and the ambiguous term is resolved based on the previous contextual state of the electronic device to determine the response to the user request.

57. The electronic device of claim 39, wherein the one or more programs further include instructions for:

concurrently displaying, on the display:

the first conversational element associated with the previous interaction between the user and the digital assistant; and a third conversational element associated with a second previous interaction between the user and the digital assistant, wherein the third conversational element is different from the first conversational element, the second previous interaction is different from the previous interaction, and the second previous interaction occurs at a third time different from the first time;

while concurrently displaying the first conversational element and the third conversational element, detecting a second user input corresponding to a selection of the third conversational element, wherein a second previous contextual state of the electronic device associated with the third conversational element is selected based on the second user input corresponding to the selection of the third conversational element; and after receiving the second user input corresponding to the selection of the third conversational element:

receiving, at a fourth time after the third time, a second user request; and in response to receiving the second user request:

displaying a representation of the second user request as a fourth conversational element; and displaying a second response to the user request, wherein the second response to the second user request is determined based on the second previous contextual state of the electronic device associated with the third conversational element that is selected based on the second user input corresponding to the selection of the third conversational element.

* * * * *